US006866097B2

(12) United States Patent
Vinegar et al.

(10) Patent No.: US 6,866,097 B2
(45) Date of Patent: *Mar. 15, 2005

(54) IN SITU THERMAL PROCESSING OF A COAL FORMATION TO INCREASE A PERMEABILITY/POROSITY OF THE FORMATION

(75) Inventors: Harold J. Vinegar, Houston, TX (US); Scott Lee Wellington, Belliare, TX (US); Eric Pierre de Rouffignac, Houston, TX (US); John Michael Karanikas, Houston, TX (US); Ilya Emil Berchenko, Friendswood, TX (US); George Leo Stegemeier, Houston, TX (US); Gordon Thomas Shahin, Jr., Bellaire, TX (US); Kevin Albert Maher, Bellaire, TX (US); Etuan Zhang, Houston, TX (US); Thomas David Fowler, Katy, TX (US); Robert Charles Ryan, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/841,284

(22) Filed: Apr. 24, 2001

(65) Prior Publication Data

US 2004/0108111 A1 Jun. 10, 2004

Related U.S. Application Data

(60) Provisional application No. 60/199,215, filed on Apr. 24, 2000, provisional application No. 60/199,214, filed on Apr. 24, 2000, and provisional application No. 60/199,213, filed on Apr. 24, 2000.

(51) Int. Cl.[7] .................... E21B 43/24; E21B 43/243; E21B 43/26; E21B 43/30

(52) U.S. Cl. ................... 166/245; 166/251.1; 166/256; 166/261; 166/267; 166/302; 166/308

(58) Field of Search .......................... 166/57, 60, 245, 166/251.1, 256, 261, 266, 267, 272.1, 272.2, 302, 308

(56) References Cited

U.S. PATENT DOCUMENTS 48,994 A 7/1865 Parry (List continued on next page.)

FOREIGN PATENT DOCUMENTS

CA 1165361 4/1984

(List continued on next page.)

OTHER PUBLICATIONS

Rogers, Rudy E. "Coalbed Methane: Principles and Practice" Prentice–Hall, Inc. 1994, pp. 164–165.

Hyne, Norman J. Geology for Petroleum Exploration, Drilling, and Production. McGraw–Hill Book Company, 1984, p. 264.

(List continued on next page.)

Primary Examiner—George Suchfield

(57) ABSTRACT

A coal formation may be treated using an in situ thermal process. A mixture of hydrocarbons, $H_2$, and/or other formation fluids may be produced from the formation. Heat may be applied to the formation to raise a temperature of a portion of the formation to a pyrolysis temperature. Heat may increase a permeability of the formation. The permeability may increase uniformly throughout the treated formation. The permeability of the treated portion may increase to a relatively high permeability as compared to an initial permeability of the untreated coal formation. The porosity of the treated formation may also uniformly increase.

156 Claims, 103 Drawing Sheets

U.S. PATENT DOCUMENTS

| | | |
|---|---|---|
| 94,813 A | 9/1869 | Dickey |
| 326,439 A | 9/1885 | McEachen |
| 760,304 A | 5/1904 | Butler |
| 1,269,747 A | 6/1918 | Rogers |
| 1,342,741 A | 6/1920 | Day |
| 1,457,479 A | 6/1923 | Wolcott |
| 1,510,655 A | 10/1924 | Clark |
| 1,634,236 A | 6/1927 | Ranney |
| 1,666,488 A | 4/1928 | Crawshaw |
| 1,681,523 A | 8/1928 | Downey et al. |
| 1,913,395 A | 1/1933 | Karrick |
| 2,244,256 A | 6/1941 | Looman |
| 2,423,674 A | 7/1947 | Agren |
| 2,444,755 A | 7/1948 | Steffen |
| 2,466,945 A | 4/1949 | Greene |
| 2,472,445 A | 6/1949 | Sprong |
| 2,484,063 A | 10/1949 | Ackley |
| 2,497,868 A | 2/1950 | Dalin |
| 2,548,360 A | 4/1951 | Germain |
| 2,593,477 A | 4/1952 | Newman et al. |
| 2,595,979 A | 5/1952 | Pevere et al. |
| 2,623,596 A | 12/1952 | Whorton et al. |
| 2,630,306 A | 3/1953 | Evans |
| 2,630,307 A | 3/1953 | Martin |
| 2,634,961 A | 4/1953 | Ljungstrom |
| 2,642,943 A | 6/1953 | Smith et al. |
| 2,670,802 A | 3/1954 | Ackley |
| 2,685,930 A | 8/1954 | Albaugh |
| 2,695,163 A | 11/1954 | Pearce et al. |
| 2,703,621 A | 3/1955 | Ford |
| 2,714,930 A | 8/1955 | Carpenter |
| 2,732,195 A | 1/1956 | Ljungstrom |
| 2,734,579 A | 2/1956 | Elkins |
| 2,771,954 A | 11/1956 | Jenks et al. |
| 2,777,679 A | 1/1957 | Ljungstrom |
| 2,780,449 A | 2/1957 | Fisher et al. |
| 2,780,450 A | 2/1957 | Ljungstrom |
| 2,786,660 A | 3/1957 | Alleman |
| 2,789,805 A | 4/1957 | Ljungstrom |
| 2,793,696 A | 5/1957 | Morse |
| 2,804,149 A | 8/1957 | Kile |
| 2,841,375 A | 7/1958 | Salomonsson |
| 2,890,754 A | 6/1959 | Hoffstrom et al. |
| 2,890,755 A | 6/1959 | Eurrnius et al. |
| 2,902,270 A | 9/1959 | Salomonsson et al. |
| 2,906,337 A | 9/1959 | Henning |
| 2,906,340 A | 9/1959 | Herzog |
| 2,914,309 A | 11/1959 | Salomonsson |
| 2,923,535 A | 2/1960 | Ljungstrom |
| 2,932,352 A | 4/1960 | Stegemeier |
| 2,939,689 A | 6/1960 | Ljungstrom |
| 2,954,826 A | 10/1960 | Sievers |
| 2,958,519 A | 11/1960 | Hurley |
| 2,974,937 A | 3/1961 | Kiel |
| 2,994,376 A | 8/1961 | Crawford et al. |
| 2,998,457 A | 8/1961 | Paulsen |
| 3,004,603 A | 10/1961 | Rogers et al. |
| 3,007,521 A | 11/1961 | Trantham et al. |
| 3,010,513 A | 11/1961 | Gerner |
| 3,010,516 A | 11/1961 | Schleicher |
| 3,036,632 A | 5/1962 | Koch et al. |
| 3,044,545 A | 7/1962 | Tooke |
| 3,061,009 A | 10/1962 | Shirley |
| 3,062,282 A | 11/1962 | Schleicher |
| 3,084,919 A | 4/1963 | Slater |
| 3,095,031 A | 6/1963 | Eurenius et al. |
| 3,105,545 A | 10/1963 | Prats et al. |
| 3,106,244 A | 10/1963 | Parker |
| 3,110,345 A | 11/1963 | Reed et al. |
| 3,113,619 A | 12/1963 | Reichle |
| 3,113,623 A | 12/1963 | Krueger |
| 3,114,417 A | 12/1963 | McCarthy |
| 3,116,792 A | 1/1964 | Purre |
| 3,120,264 A | 2/1964 | Barron |
| 3,127,935 A | 4/1964 | Poettmann et al. |
| 3,127,936 A | 4/1964 | Eurenius |
| 3,131,763 A | 5/1964 | Kunetka et al. |
| 3,132,692 A | 5/1964 | Marx et al. |
| 3,139,928 A | 7/1964 | Broussard |
| 3,142,336 A | 7/1964 | Doscher |
| 3,149,670 A | 9/1964 | Grant |
| 3,149,672 A | 9/1964 | Orkiszewski et al. |
| 3,163,745 A | 12/1964 | Boston |
| 3,164,207 A | 1/1965 | Thessen et al. |
| 3,181,613 A | 5/1965 | Krueger |
| 3,182,721 A | 5/1965 | Hardy |
| 3,183,675 A | 5/1965 | Schroeder |
| 3,191,679 A | 6/1965 | Miller |
| 3,205,944 A | 9/1965 | Walton |
| 3,205,946 A | 9/1965 | Prats et al. |
| 3,207,220 A | 9/1965 | Williams |
| 3,208,531 A | 9/1965 | Tamplen |
| 3,209,825 A | 10/1965 | Alexander et al. |
| 3,221,811 A | 12/1965 | Prats |
| 3,233,668 A | 2/1966 | Hamilton et al. |
| 3,237,689 A | 3/1966 | Justheim |
| 3,241,611 A | 3/1966 | Dougan |
| 3,250,327 A | 5/1966 | Crider |
| 3,267,680 A | 8/1966 | Schlumberger |
| 3,273,640 A | 9/1966 | Huntington |
| 3,275,076 A | 9/1966 | Sharp |
| 3,284,281 A | 11/1966 | Thomas |
| 3,294,167 A | 12/1966 | Vogel |
| 3,310,109 A | 3/1967 | Marx et al. |
| 3,316,962 A | 5/1967 | Lange |
| 3,338,306 A | 8/1967 | Cook |
| 3,352,355 A | 11/1967 | Putman |
| 3,379,248 A | 4/1968 | Strange |
| 3,380,913 A | 4/1968 | Henderson |
| 3,528,501 A | 9/1970 | Parker |
| 3,547,193 A | 12/1970 | Gill |
| 3,562,401 A | 2/1971 | Long |
| 3,595,082 A | 7/1971 | Miller et al. |
| 3,599,714 A | 8/1971 | Messman et al. |
| 3,605,890 A | 9/1971 | Holm |
| 3,617,471 A | 11/1971 | Schlinger et al. |
| 3,661,423 A | 5/1972 | Garrett |
| 3,675,715 A | 7/1972 | Speller, Jr. |
| 3,680,633 A | 8/1972 | Bennett |
| 3,766,982 A * | 10/1973 | Justheim ................. 166/247 |
| 3,770,398 A | 11/1973 | Abraham et al. |
| 3,775,185 A | 11/1973 | Kunz et al. |
| 3,794,116 A | 2/1974 | Higgins |
| 3,809,159 A | 5/1974 | Young et al. |
| 3,882,941 A | 5/1975 | Pelofsky |
| 3,922,148 A | 11/1975 | Child |
| 3,924,680 A | 12/1975 | Terry |
| 3,948,319 A | 4/1976 | Pritchett |
| 3,954,140 A | 5/1976 | Hendrick |
| 3,973,628 A | 8/1976 | Colgate |
| 3,986,349 A | 10/1976 | Egan |
| 3,987,851 A | 10/1976 | Tham |
| 3,993,132 A | 11/1976 | Cram et al. |
| 3,999,607 A | 12/1976 | Pennington et al. |
| 4,005,752 A | 2/1977 | Cha |
| 4,008,762 A | 2/1977 | Fisher et al. |
| 4,016,239 A | 4/1977 | Fenton |
| 4,019,575 A | 4/1977 | Pisio et al. |
| 4,026,357 A | 5/1977 | Redford |
| 4,042,026 A | 8/1977 | Pusch et al. |
| 4,043,393 A | 8/1977 | Fisher et al. |

| | | | | | |
|---|---|---|---|---|---|
| 4,049,053 A | 9/1977 | Fisher et al. | 4,571,491 A | 2/1986 | Vinegar et al. |
| 4,057,293 A | 11/1977 | Garrett | 4,572,299 A | 2/1986 | Vanegmond et al. |
| 4,067,390 A | 1/1978 | Camacho et al. | 4,573,530 A | 3/1986 | Audeh et al. |
| 4,069,868 A | 1/1978 | Terry | 4,576,231 A | 3/1986 | Dowling et al. |
| 4,076,761 A | 2/1978 | Chang et al. | 4,583,046 A | 4/1986 | Vinegar et al. |
| 4,084,637 A | 4/1978 | Todd | 4,583,242 A | 4/1986 | Vinegar et al. |
| 4,087,130 A | 5/1978 | Garrett | 4,592,423 A | 6/1986 | Savage et al. |
| 4,089,372 A | 5/1978 | Terry | 4,594,468 A | 6/1986 | Minderhoud |
| 4,089,374 A | 5/1978 | Terry | 4,597,441 A | 7/1986 | Ware et al. |
| 4,091,869 A | 5/1978 | Hoyer | 4,605,680 A | 8/1986 | Beuther et al. |
| 4,093,025 A | 6/1978 | Terry | 4,608,818 A | 9/1986 | Goebel et al. |
| 4,093,026 A | 6/1978 | Ridley | 4,613,754 A | 9/1986 | Vinegar et al. |
| 4,096,163 A | 6/1978 | Chang et al. | 4,616,705 A | 10/1986 | Stegemeier et al. |
| 4,099,567 A | 7/1978 | Terry | 4,626,665 A | 12/1986 | Fort, III |
| 4,114,688 A | 9/1978 | Terry | 4,635,197 A | 1/1987 | Vinegar et al. |
| 4,130,575 A | 12/1978 | Jorn | 4,637,464 A | 1/1987 | Forgac et al. |
| 4,133,825 A | 1/1979 | Stroud et al. | 4,640,352 A | 2/1987 | Vanmeurs et al. |
| 4,138,442 A | 2/1979 | Chang et al. | 4,644,283 A | 2/1987 | Vinegar et al. |
| 4,144,935 A | 3/1979 | Bridges et al. | 4,651,825 A | 3/1987 | Wilson |
| RE30,019 E | 6/1979 | Lindquist | 4,658,215 A | 4/1987 | Vinegar et al. |
| 4,183,405 A | 1/1980 | Magnie | 4,662,438 A | 5/1987 | Taflove et al. |
| 4,186,801 A | 2/1980 | Madgavkar et al. | 4,662,439 A | 5/1987 | Puri |
| 4,197,911 A | 4/1980 | Anada | 4,662,443 A | 5/1987 | Puri et al. |
| 4,228,854 A | 10/1980 | Sacuta | 4,663,711 A | 5/1987 | Vinegar et al. |
| 4,243,101 A | 1/1981 | Grupping | 4,671,102 A | 6/1987 | Vinegar et al. |
| 4,250,230 A | 2/1981 | Terry | 4,691,771 A | 9/1987 | Ware et al. |
| 4,250,962 A | 2/1981 | Madgavkar et al. | 4,694,907 A | 9/1987 | Stahl et al. |
| 4,252,191 A | 2/1981 | Pusch et al. | 4,704,514 A | 11/1987 | Van Egmond et al. |
| 4,273,188 A | 6/1981 | Vogel et al. | 4,716,960 A | 1/1988 | Eastlund et al. |
| 4,274,487 A | 6/1981 | Hollingsworth et al. | 4,719,423 A | 1/1988 | Vinegar et al. |
| 4,277,416 A | 7/1981 | Grant | 4,728,892 A | 3/1988 | Vinegar et al. |
| RE30,738 E | 9/1981 | Bridges et al. | 4,730,162 A | 3/1988 | Vinegar et al. |
| 4,299,086 A | 11/1981 | Madgavkar et al. | 4,743,854 A | 5/1988 | Vinegar et al. |
| 4,299,285 A | 11/1981 | Tsai et al. | 4,762,425 A | 8/1988 | Shakkottai et al. |
| 4,306,621 A | 12/1981 | Boyd et al. | 4,769,602 A | 9/1988 | Vinegar et al. |
| 4,324,292 A | 4/1982 | Jacobs et al. | 4,769,606 A | 9/1988 | Vinegar et al. |
| 4,344,483 A | 8/1982 | Fisher et al. | 4,772,634 A | 9/1988 | Farooque |
| 4,353,418 A | 10/1982 | Hoekstra et al. | 4,787,452 A | 11/1988 | Jennings, Jr. |
| 4,359,687 A | 11/1982 | Vinegar et al. | 4,793,656 A | 12/1988 | Siddoway et al. |
| 4,363,361 A | 12/1982 | Madgavkar et al. | 4,817,711 A | 4/1989 | Jeambey |
| 4,366,668 A | 1/1983 | Madgavkar et al. | 4,818,370 A | 4/1989 | Gregoli et al. |
| 4,378,048 A | 3/1983 | Madgavkar et al. | 4,827,761 A | 5/1989 | Vinegar et al. |
| 4,381,641 A | 5/1983 | Madgavkar et al. | 4,848,924 A | 7/1989 | Nuspl et al. |
| 4,384,613 A | 5/1983 | Owen et al. | 4,856,341 A | 8/1989 | Vinegar et al. |
| 4,396,062 A | 8/1983 | Iskander | 4,860,544 A | 8/1989 | Krieg et al. |
| 4,397,732 A | 8/1983 | Hoover et al. | 4,866,983 A | 9/1989 | Vinegar et al. |
| 4,398,151 A | 8/1983 | Vinegar et al. | 4,884,455 A | 12/1989 | Vinegar et al. |
| 4,407,973 A | 10/1983 | van Dijk et al. | 4,886,118 A | 12/1989 | Van Meurs et al. |
| 4,409,090 A | 10/1983 | Hanson et al. | 4,895,206 A | 1/1990 | Price |
| 4,412,124 A | 10/1983 | Kobayashi | 4,927,857 A | 5/1990 | McShea, III et al. |
| 4,423,311 A | 12/1983 | Varney, Sr. | 4,928,765 A | 5/1990 | Nielson |
| 4,444,255 A | 4/1984 | Geoffrey et al. | 4,974,425 A | 12/1990 | Krieg et al. |
| 4,444,258 A | 4/1984 | Kalmar | 4,983,319 A | 1/1991 | Gregoli et al. |
| 4,448,251 A | 5/1984 | Stine | 4,984,594 A | 1/1991 | Vinegar et al. |
| 4,448,252 A | 5/1984 | Stoddard et al. | 4,987,368 A | 1/1991 | Vinegar |
| 4,457,365 A | 7/1984 | Kasevich et al. | 4,994,093 A | 2/1991 | Wetzel et al. |
| 4,463,807 A | 8/1984 | Stoddard et al. | 5,008,085 A | 4/1991 | Bain et al. |
| 4,476,927 A | 10/1984 | Riggs | 5,014,788 A | 5/1991 | Puri et al. |
| 4,485,869 A | 12/1984 | Sresty et al. | 5,020,596 A | 6/1991 | Hemsath |
| 4,489,782 A | 12/1984 | Perkins | 5,046,559 A | 9/1991 | Glandt |
| 4,501,445 A | 2/1985 | Gregoli | 5,050,386 A | 9/1991 | Krieg et al. |
| 4,508,170 A | 4/1985 | Littmann | 5,060,287 A | 10/1991 | Van Egmond |
| 4,513,816 A | 4/1985 | Hubert | 5,060,726 A | 10/1991 | Glandt et al. |
| 4,524,113 A | 6/1985 | Lesieur | 5,064,006 A | 11/1991 | Waters et al. |
| 4,524,826 A | 6/1985 | Savage | 5,065,818 A | 11/1991 | Van Egmond |
| 4,530,401 A | 7/1985 | Hartman et al. | 5,082,054 A | 1/1992 | Kiamanesh |
| 4,537,252 A | 8/1985 | Puri | 5,082,055 A | 1/1992 | Hemsath |
| 4,540,882 A | 9/1985 | Vinegar et al. | 5,126,037 A | 6/1992 | Showalter |
| 4,542,648 A | 9/1985 | Vinegar et al. | 5,168,927 A | 12/1992 | Stegemeier et al. |
| 4,549,396 A | 10/1985 | Garwood et al. | 5,182,792 A | 1/1993 | Goncalves |
| 4,570,715 A | 2/1986 | Van Meurs et al. | 5,189,283 A | 2/1993 | Carl, Jr. et al. |

| Patent | Date | Inventor |
|---|---|---|
| 5,190,405 A | 3/1993 | Vinegar et al. |
| 5,207,273 A | 5/1993 | Cates et al. |
| 5,211,230 A | 5/1993 | Ostapovich et al. |
| 5,217,076 A | 6/1993 | Masek |
| 5,226,961 A | 7/1993 | Nahm et al. |
| 5,229,102 A | 7/1993 | Minet et al. |
| 5,229,583 A | 7/1993 | van Egmond et al. |
| 5,236,039 A | 8/1993 | Edelstein et al. |
| 5,255,742 A | 10/1993 | Mikus |
| 5,261,490 A | 11/1993 | Ebinuma |
| 5,284,878 A | 2/1994 | Studer et al. |
| 5,285,846 A | 2/1994 | Mohn |
| 5,289,882 A | 3/1994 | Moore |
| 5,297,626 A | 3/1994 | Vinegar et al. |
| 5,306,640 A | 4/1994 | Vinegar et al. |
| 5,316,664 A | 5/1994 | Gregoli et al. |
| 5,318,116 A | 6/1994 | Vinegar et al. |
| 5,339,897 A | 8/1994 | Leaute |
| 5,340,467 A | 8/1994 | Gregoli et al. |
| 5,349,859 A | 9/1994 | Kleppe |
| 5,366,012 A | 11/1994 | Lohbeck |
| 5,388,640 A | 2/1995 | Puri et al. |
| 5,388,641 A | 2/1995 | Yee et al. |
| 5,388,642 A | 2/1995 | Puri et al. |
| 5,388,643 A | 2/1995 | Yee et al. |
| 5,388,645 A | 2/1995 | Puri et al. |
| 5,391,291 A | 2/1995 | Winquist et al. |
| 5,392,854 A | 2/1995 | Vinegar et al. |
| 5,402,847 A | 4/1995 | Wilson et al. |
| 5,404,952 A | 4/1995 | Vinegar et al. |
| 5,409,071 A | 4/1995 | Wellington et al. |
| 5,411,089 A | 5/1995 | Vinegar et al. |
| 5,411,104 A | 5/1995 | Stanley |
| 5,415,231 A | 5/1995 | Northrop et al. |
| 5,431,224 A | 7/1995 | Laali |
| 5,433,271 A | 7/1995 | Vinegar et al. |
| 5,437,506 A | 8/1995 | Gray |
| 5,439,054 A | 8/1995 | Chaback et al. |
| 5,454,666 A | 10/1995 | Chaback et al. |
| 5,491,969 A | 2/1996 | Cohn et al. |
| 5,497,087 A | 3/1996 | Vinegar et al. |
| 5,498,960 A | 3/1996 | Vinegar et al. |
| 5,525,322 A | 6/1996 | Willms |
| 5,541,517 A | 7/1996 | Hartmann et al. |
| 5,553,189 A | 9/1996 | Stegemeier et al. |
| 5,554,453 A | 9/1996 | Steinfeld et al. |
| 5,566,756 A | 10/1996 | Chaback et al. |
| 5,621,844 A | 4/1997 | Bridges |
| 5,624,188 A | 4/1997 | West |
| 5,632,336 A | 5/1997 | Notz et al. |
| 5,656,239 A | 8/1997 | Stegemeier et al. |
| 5,676,212 A | 10/1997 | Kuckes |
| RE35,696 E | 12/1997 | Mikus |
| 5,713,415 A | 2/1998 | Bridges |
| 5,767,584 A | 6/1998 | Gore et al. |
| 5,861,137 A | 1/1999 | Edlund |
| 5,862,858 A | 1/1999 | Wellington et al. |
| 5,868,202 A | 2/1999 | Hsu |
| 5,899,269 A | 5/1999 | Wellington et al. |
| 5,955,039 A | 9/1999 | Dowdy |
| 5,968,349 A | 10/1999 | Duyvesteyn et al. |
| 5,984,010 A | 11/1999 | Elias et al. |
| 5,985,138 A | 11/1999 | Humphreys |
| 5,997,214 A | 12/1999 | de Rouffignac et al. |
| 6,016,867 A | 1/2000 | Gregoli et al. |
| 6,016,868 A | 1/2000 | Gregoli et al. |
| 6,019,172 A | 2/2000 | Wellington et al. |
| 6,023,554 A | 2/2000 | Vinegar et al. |
| 6,056,057 A | 5/2000 | Vinegar et al. |
| 6,079,499 A | 6/2000 | Mikus et al. |
| 6,085,512 A | 7/2000 | Agee et al. |
| 6,094,048 A | 7/2000 | Vinegar et al. |
| 6,102,122 A | 8/2000 | de Rouffignac |
| 6,102,622 A | 8/2000 | Vinegar et al. |
| 6,152,987 A | 11/2000 | Ma et al. |
| 6,172,124 B1 | 1/2001 | Wolflick et al. |
| 6,173,775 B1 | 1/2001 | Elias et al. |
| 6,187,465 B1 | 2/2001 | Galloway |
| 6,244,338 B1 | 6/2001 | Mones |
| 6,328,104 B1 | 12/2001 | Graue |
| 6,354,373 B1 | 3/2002 | Vercaemer et al. |
| 6,389,814 B2 | 5/2002 | Viteri et al. |
| 6,412,559 B1 | 7/2002 | Gunter et al. |
| 6,485,232 B1 | 11/2002 | Vinegar et al. |
| 2001/0049342 A1 * | 12/2001 | Passey et al. ............... 507/200 |
| 2002/0018697 A1 | 2/2002 | Vinegar et al. |

FOREIGN PATENT DOCUMENTS

| | | |
|---|---|---|
| CA | 1196594 | 11/1985 |
| CA | 1253555 | 5/1989 |
| CA | 1288043 | 8/1991 |
| CA | 2015460 | 10/1991 |
| CA | 1168283 | 5/1994 |
| EP | 0570228 B1 | 9/1996 |
| EP | 940558 A1 | 9/1999 |
| GB | 156396 | 1/1921 |
| GB | 674082 | 6/1952 |
| GB | 697189 | 9/1953 |
| GB | 1454324 | 11/1976 |
| GB | 1501310 | 2/1978 |
| GB | 2086416 | 5/1982 |
| SE | 121737 | 3/1948 |
| SE | 123136 | 11/1948 |
| SE | 123137 | 11/1948 |
| SE | 123138 | 11/1948 |
| SE | 126674 | 11/1949 |
| SU | 1836876 | 12/1994 |
| WO | 95/06093 | 3/1995 |
| WO | 95/12742 | 5/1995 |
| WO | 95/12743 | 5/1995 |
| WO | 95/12744 | 5/1995 |
| WO | 95/12745 | 5/1995 |
| WO | 95/12746 | 5/1995 |
| WO | 95/33122 | 12/1995 |
| WO | 97/01017 | 1/1997 |
| WO | 99/01640 | 1/1999 |
| WO | 01/81505 A1 | 11/2001 |
| WO | 01/81723 A1 | 11/2001 |

OTHER PUBLICATIONS

Hobson, G.D., Modern Petroleum Technology, Halsted Press, Applied Science Publishers LTD. 1973, pp. 786, 787.

Thermal, Mechanical, and Physical Properties of Selected Bituminous Coals and Cokes, J. M. Singer and R. P. Tye, US Department of Interior, Bureau of Mines (1979) Government Report No. 8364.

Rogers, Rudy E. "Coalbed Methane: Principles and Practice" Prentice–Hall, Inc. 1994, pp. 68–97.

Department of Energy Coal Sample Bank and Database http://www.energy.psu.edu/arg/doesb.htm, Jun. 4, 2002.

Comparison of Methods for Measuring Kerogen Pyrolysis Rates and Fitting Kinetic Parameters, Burnham et al., Mar. 23, 1987, (29 pages).

Further Comparison of Methods for Measuring Kerogen Pyrolysis Rates and Fitting Kinetic Parameters, Burnham et al., Sep. 1987, (16 pages).

Tests of a Mechanism for $H_2S$ Release During Coal Pyrolysis, Coburn et al., May 31, 1991, (6 pages).

Kinetic Studies of Gas Evolution During Pyrolysis of Sub-bituminous Coal, J. H. Campbell et al., May 11, 1976, (14 pages).

Excavation of the Partial Seam Crip Underground Coal Gasification Test Site, Robert J. Cena, Aug. 14, 1987, (11 pages).

Evolution of Sulfur Gases During Coal Pyrolysis, Oh et al., Feb. 3, 1988, (11 pages).

Coal Pyrolysis and Methane Decomposition In the Presence of a Hot Char Bed, Peters et al., Aug. 1983, (21 pages).

Pyrolysis Kinetics and Maturation of Coals from the San Juan Basin, John G. Reynolds & Alan K. Burnham, Dec. 1992, (30 page.

Numerical Model of Coal Gasification in a Packed Bed, A.M. Winslow, Apr. 1976 (27 pages).

LLL In–Situ Coal Gasification Program, Stephens et al., Jun., 14, 1976 (12 pages).

Pyrolysis of Subbituminous Coal as it Relates to In–Situ Coal Gasification, J.H. Campbell, Jan. 17, 1977 (20 pages).

The Historical Development of Underground Coal Gasification, D. Olness & D.W. Gregg, Jun. 30, 1977 (60 pages).

Laboratory Measurements of Groundwater Leaching and Transport of Pollutants Produced During Underground Coal Gasification, V.A. Dalton & J.H. Campbell, Mar. 1, 1978 (21 pages).

The Hoe Creek II Field Experiment of Underground Coal Gasification, Preliminary Results, Aiman et al., Feb. 27, 1978 (26 pages).

Ground–Water and Subsidence Investigations of the LLL In Situ Coal Gasification Experiments, Mead et al, Jul. 17–2, 1978 (31 pages).

Geotechnical Instrumentation Applied to In Situ Coal Gasification Induced Subsidence, Ganow et al. Jun. 21, 1978 (1 pages).

The Use of Tracers in Laboratory and Field Tests of Underground Coal Gasification and Oil Shale Retorting, Lyczkowski et al., Jun. 16, 1978 (19 pages).

Underground Gasification of Rocky Mountain Coal, D.R. Stephens and R.W. Hill, Jul. 18, 1978 (15 pages).

High–BTU Gas Via In Situ Coal Gasification, Stephens et al., Oct., 1978 (41 pages).

A One–Dimensional Model for In Situ Coal Gasification, Thorsness et al., Aug. 25, 1978 (76 pages).

Control Aspects of Underground Coal Gasification: LLL Investigations of Ground–Water and Subsidence Effects, Mead et al., Nov. 10, 1978 (21 pages).

Environmental Controls for Underground Coal Gasification: Ground–Water Effects and Control Technologies, Warre Mead & Ellen Raber, Mar. 14, 1980 (19 pages).

Results from the Third LLL Underground Coal Gasification Experiment at Hoe Creek, Hill et al., May 20, 1980 (12 page.

Results From the Hoe Creek No. 3 Underground Coal Gasification Experiment, Thorsness et al., May 1980, (11 pages).

Steam Tracer Experiment at the Hoe Creek No. 3 Underground Coal Gasification Field Test, C.B. Thorsness, Nov. 26, 1980 (51 pages).

Computer Models to Support Investigations of Surface Subsidence and Associated Ground Motion Induced by Underground Coal Gasification, R.T. Langland & B.C. Trent, Jul. 1981 (16 pages).

Burn Cavity Growth During the Hoe Creek No. 3 Underground Coal Gasification Experiment, R.W. Hill, Jun. 8, 198 (28 pages).

The Controlled Retracting Injection Point (Crip) System: A Modified Stream Method for In Site Coal Gasification, R.W. Hill & M.J. Shannon, Apr. 15, 1981 (11 pages).

Coal Block Gasification Experiments: Laboratory Results and Field Plans: C.B. Thorsness & R.W. Hill, Jul. 1981 (23 pages).

Laboratory Scale Simulation of Underground Coal Gasification: Experiment and Theory, J.R. Creighton & (27 pages).

Underground Coal Gasification—A Leading Contender in the Synfuels Industry, D.R. Stephens, Oct. 27, 1981 (42 pages).

Computer Models to Support Investigations of Surface Subsidence and Associated Ground Motion Induced by Underground Coal Gasification, B.C. Trent & R.T. Langland, Aug. 1981 (40 pages).

The Hoe Creek Experiements: LLNL's Underground Coal Gasification Project in Wyoming, D.R. Stephens, Oct. 1981 (162 pages).

Technical Underground Coal Gasification Summation: 1982 Status, Stephens et al., Jul. 1982 (22 pages).

Review of Underground Coal Gasification Field Experiments at Hoe Creek (34 pages).

Underground Coal Gasification Using Oxygen and Steam, Stephens et al., Jan. 19, 1984 (37 pages).

Shale Oil Cracking Kinetics and Diagnostics, Bissell et al., Nov. 1983, (27 pages).

Mathematical Modeling of Modified In Situ and Aboveground Oil Shale Retorting, Robert L. Braun, Jan. 1981 (4 pages).

Progress Report on Computer Model for In Situ Oil Shale Retorting, R.L. Braun & R.C.Y. Chin, Jul. 14, 1977 (34 pages).

Analysis of Multiple Gas–Solid Reactions During the Gasification of Char in Oil Shale Blocks, Braun et al., Apr. 198 (14 pages).

Chemical Kinetics and Oil Shale Process Design, Alan K. Burnham, Jul. 1993 (16 pages).

Reaction Kinetics and Diagnostics For Oil Shale Retorting, Alan K. Burnham, Oct. 19, 1981 (32 pages).

Reaction Kinetics Between Steam and Oil Shale Char, A.K. Burnham, Oct. 1978 (8 pages).

General Kinetic Model of Oil Shale Pyrolysis, Alan K. Burnham & Robert L. Braun, Dec. 1984 (25 pages).

General Model of Oil Shale Pyrolysis, Alan K. Burnham & Robert L. Braun, Nov. 1983 (22 pages).

Pyrolysis Kinetics for Green River Oil Shale From the Saline Zone, Burnham et al., Feb., 1982 (33 pages).

Reaction Kinetics Between $CO_2$ and Oil Shale Char, A.K. Burnham, Mar. 22, 1978 (9 pages front & back).

Reaction Kinetics Between $CO_2$ and Oil Shale Residual Carbon. I. Effect of Heating Rate on Reactivity, Alan K. Burnham, Jul. 11, 1978 (11 pages front and back).

High–Pressure Pyrolysis of Colorado Oil Shale, Alan K. Burnham & Mary F. Singleton, Oct. 1982 (23 pages).

A Possible Mechanism Of Alkene/Alkane Production in Oil Shale Retorting, A.K. Burnham, R.L. Ward, Nov. 2, 1980 (20 pages).

Enthalpy Relations For Eastern Oil Shale, David W. Camp, Nov. 1987 (13 pages).

Oil Shale Retorting: Part 3 A Correlation of Shale Oil 1–Alkene/n–Alkane Ratios With Yield, Coburn et al., Aug. 1, 1977 (18 pages).

The Composition of Green River Shale Oil, Glen L. Cook, et al., 1968 (12 pages).

On–line, Mass Spectrometric Determination of Ammonia From Oil Shale Pyrolysis Using Isobutane Chemical Ionization, Crawford et al., Mar. 1988 (16 pages).

Thermal Degradation of Green River Kerogen at 150° to 350° C Rate of Production Formation, J.J. Cummins & W.E. Robinson, 1972 (18 pages).

Retorting of Green River Oil Shale Under High–Pressure Hydrogen Atmospheres, LaRue et al., Jun. 1977 (38 pages).

Retorting and Combustion Processes In Surface Oil–Shale Retorts, A.E. Lewis & R.L. Braun, May 2, 1980 (12 pages).

Oil Shale Retorting Processes: A Technical Overview, Lewis et al., Mar. 1984 (18 pages).

Study of Gas Evolution During Oil Shale Pyrolysis by TQMS, Oh et al., Feb. 1988 (10 pages).

The Permittivity and Electrical Conductivity of Oil Shale, A.J. Piwinskii & A. Duba, Apr. 28, 1975 (12 pages).

Oil Degradation During Oil Shale Retorting, J.H. Raley & R.L. Braun, May 24, 1976 (14 pages).

Kinetic Analysis of California Oil Shale By Programmed Temperature Microphyrolysis, John G. Reynolds & Alan K. Burnham, Dec. 9, 1991 (14 pages).

Analysis of Oil Shale and Petroleum Source Rock Pyrolysis by Triple Quadrupole Mass Spectrometry: Comparisons o Gas Evolution at the Heating Rate of 10° C/Min., Reynolds et al. Oct. 5, 1990 (57 pages).

Catalytic Activity of Oxidized (Combusted) Oil Shale for Removal of Nitrogen Oxides with Ammonia as a Reductant in Combustion Gas Streams, Part II, Reynolds et al., Jan. 4, 1993 (9 pages).

Fluidized–Bed Pyrolysis of Oil Shale, J.H. Richardson & E.B. Huss, Oct. 1981 (27 pages).

Retorting Kinetics for Oil Shale From Fluidized–Bed Pyrolysis, Richardson et al., Dec. 1981 (30 pages).

Recent Experimental Developments in Retorting Oil Shale at the Lawrence Livermore Laboratory, Albert J. Rothman Aug. 1978 (32 pages).

The Lawrence Livermore Laboratory Oil Shale Retorts, Sandholtz et al. Sep. 18, 1978 (30 pages).

Operating Laboratory Oil Shale Retorts In An In–Situ Mode, W. A. Sandholtz et al., Aug. 18, 1977 (16 pages).

Some Relationships of Thermal Effects to Rubble–Bed Structure and Gas–Flow Patterns in Oil Shale Retorts, W. A. Sandholtz, Mar. 1980 (19 pages).

Assay Products from Green River Oil Shale, Singleton et al., Feb. 18, 1986 (213 pages).

Biomarkers in Oil Shale: Occurrence and Applications, Singleton et al., Oct. 1982 (28 pages).

Occurrence of Biomarkers in Green River Shale Oil, Singleton et al., Mar. 1983 (29 pages).

An Instrumentation Proposal for Retorts in the Demonstration Phase of Oil Shale Development, Clyde J. Sisemore, Apr. 19, 1977, (34 pages).

A Laboratory Apparatus for Controlled Time/Temperature Retorting of Oil Shale, Stout et al., Nov. 1, 1976 (19 pages).

$SO_2$ Emissions from the Oxidation of Retorted Oil Shale, Taylor et al., Nov. 1981 (9 pages).

Nitric Oxide (NO) Reduction by Retorted Oil Shale, R.W. Taylor & C.J. Morris, Oct. 1983 (16 pages).

Coproduction of Oil and Electric Power from Colorado Oil Shale, P. Henrik Wallman, Sep. 24, 1991 (20 pages).

$^{13}C$ NMR Studies of Shale Oil, Raymond L. Ward & Alan K. Burnham, Aug. 1982 (22 pages).

Identification by $^{13}C$ NMR of Carbon Types in Shale Oil and their Relationship to Pyrolysis Conditions, Raymond L. Ward & Alan K. Burnham, Sep. 1983 (27 pages).

A Laboratory Study of Green River Oil Shale Retorting Under Pressure In a Nitrogen Atmosphere, Wise et al., Sep. 1976 (24 pages).

Quantitative Analysis and Evolution of Sulfur–Containing Gases from Oil Shale Pyrolysis by Triple Quadrupole Mass Spectrometry, Wong et al., Nov. 1983 (34 pages).

Quantitative Analysis & Kinetics of Trace Sulfur Gas Species from Oil Shale Pyrolysis by Triple Quadrupole Mass Spectrometry (TQMS), Wong et al., Jul. 5–7, 1983 (34 pages).

Application of Self–Adaptive Detector System on a Triple Quadrupole MS/MS to High Expolsives and Sulfur–Containing Pyrolysis Gases from Oil Shale, Carla M. Wong & Richard W. Crawford, Oct. 1983 (17 pages).

An Evaluation of Triple Quadrupole MS/MS for On–Line Gas Analyses of Trace Sulfur Compounds from Oil Shale Processing, Wong et al., Jan. 1985 (30 pages).

Source and Kinetics of Sulfur Species in Oil Shale Pyrolysis Gas by Triple Quadrupole Mass Spectrometry, Wong et al., Oct. 1983 (14 pages).

The Centralia Partial Seam CRIP Underground Coal Gasification Experiment, Cena et al., Jun. 1984 (38 pages).

Results of the Centralia Underground Coal Gasification Field Test, Hill et al., Aug. 1984 (18 pages).

Excavation of the Partial Seam Crip Underground Coal Gasification Test Site, Cena et al., Aug. 14, 1987 (11 page.

Assessment of the CRIP Process for Underground Coal Gasification: The Rocky Mountain I Test, Cena et al., Aug. 1988 (22 pages).

Mild Coal Gasification–Product Separation, Pilot–Unit Support, Twin Screw Heat Transfer, and $H_2S$ Evolution, Camp et al., Aug. 9, 1991 (12 pages).

Underground Coal Gasification Site Selection and Characterization in Washington State and Gasification Test Design Randolph Stone & R.W. Hill, Sep. 10, 1980 (62 pages).

Coal, Encyclopedia of Chemical Technology, Kirk, R.E., Kroschwitz, J.I., Othmer, D.F., Wiley, New York, 4th edition, 1991, vol. 6, pp. 423–488.

Cortez et al., UK Patent Application GB 2,068,014 A, Date of Publication: Aug. 5, 1981.

Wellington et al., U.S. patent application 60/273,354, Filed Mar. 5, 2001.

The VertiTrak System Brochure, Baker Hughes, INT–01–1307A4, 2001 8 pages.

Tar and Pitch, G. Collin and H. Hoeke. Ullmann's Encyclopedia of Industrial Chemistry, vol. A 26, 1995, p. 91–127.

Appalachian Coals: Potential Reservoirs for Sequestering Carbon Dioxide Emissions from Power Plants While Enhancing CBM Production; C.W. Byer, et al., Proceedings of the International Coalbed Methane Symposium.

The Pros and Cons of Carbon Dioxide Dumping Global Warming Concerns Have Stimulated a Search for Carbon Sequestration Technologies; C. Hanisch, Environmental Science and Technology, American Chemical Society, Easton, PA.

Pilot Test Demonstrates How Carbon Dioxide Enhances Coal Bed Methane Recovery, Lanny Schoeling and Michael McGovern, Petroleum Technology Digest, Sep. 2000, p. 14–15.

In Situ Measurement of Some Thermoporoelastic Parameters of a Granite, Berchenko et al., Poromechanics, A Tribute to Maurice Biot, 1998, p. 545–550.
Conversion characteristics of selected Canadian coals based on hydrogenation and pyrolysis experiments, W. Kalkreuth, C. Roy, and M. Steller. Geological Survey of Canada, Paper 89–8, 1989, pp. 108–114, XP001014535.
Some Effects of Pressure on Oil–Shale Retorting, Society of Petroleum Engineers Journal, J.H. Bae, Sep., 196 pp. 287–292.
New in situ shale–oil recovery process uses hot natural gas; The Oil & Gas Journal; May 16, 1966, p. 151.
Evaluation of Downhole Electric Impedance Heating Systems for Paraffin Control in Oil Wells; Industry Applications Society 37$^{th}$ Annual Petroleum and Chemical Industry Conference; The Institute of Electrical and Electronics Enginee Inc., Bosch et al., Sep. 1990, pp. 223–227.
New System Stops Paraffin Build–up; Petroleum Engineer, Eastlund et al., Jan. 1989, (3 pages).
Oil Shale Retorting: Effects of Particle Size and Heating Rate on Oil Evolution and Intraparticle Oil Degradation; Campbell et al. In Situ 2(1), 1978, pp. 1–47.
The Potential For In Situ Retorting of Oil Shale In the Piceance Creek Basin of Northwestern Colorado; Dougan et al Quarterly of the Colorado School of Mines, pp. 57–72.
Retoring Oil Shale Underground–Problems & Possibilities; B.F. Grant, Qtly of Colorado School of Mines, pp 39–46.
Molecular Mechanism of Oil Shale Pyrolysis in Nitrogen and Hydrogen Atmospheres, Hershkowitz et al.; Geochemistry and Chemistry of Oil Shales, American Chemical Society, May 1983 pp. 301–316.
The Characteristics of a Low Temperature in Situ Shale Oil; George Richard Hill & Paul Dougan, Quarterly of the Colorado School of Mines, 1967; pp. 75–90.
Direct Production Of A Low Pour Point High Gravity Shale Oil; Hill et al., I & EC Product Research and Development, 6(1), Mar. 1967; pp. 52–59.
Refining Of Swedish Shale Oil, L. Lundquist, pp. 621–627.
The Benefits of In Situ Upgrading Reactions to the Integrated Operations of the Orinoco Heavy–Oil Fields and Downstream Facilities, Myron Kuhlman, Society of Petroleum Engineers, Jun. 2000; pp. 1–14.
Monitoring Oil Shale Retorts by Off–Gas Alkene/Alkane Ratios, John H. Raley, Fuel, vol. 59, Jun. 1980, pp. 419–442.
The Shale Oil Question, Old and New Viewpoints, A Lecture in the Engineering Science Academy, Dr. Fredrik Ljungstrom, Feb. 23, 1950, published in Teknisk Trdskrift, Jan. 1951 p. 33–40.

Underground Shale Oil Pyrolysis According to the Ljungstroem Method; Svenska Skifferolje Aktiebolaget (Swedish Shale Oil Corp.), IVA, vol. 24, 1953, No. 3, pp. 118–123.
Kinetics of Low–Temperature Pyrolysis of Oil Shale by the IITRI RF Process, Sresty et al.; 15$^{th}$ Oil Shale Symposium Colorado School of Mines, Apr. 1982 pp. 1–13.
Bureau of Mines Oil–Shale Research, H.M. Thorne, Quarterly of the Colorado School of Mines, pp. 77–90.
Application of a Microretort to Problems in Shale Pyrolysis, A. W. Weitkamp & L.C. Gutberlet, Ind. Eng. Chem. Process Des. Develop. vol. 9, No. 3, 1970, pp. 386–395.
Oil Shale, Yen et al., Developments in Petroleum Science 5, 1976, pp. 187–189, 197–198.
The Composition of Green River Shale Oils, Glenn L. Cook, et al., United Nations Symposium on the Development and Utilization of Oil Shale Resources, 1968, pp. 1–23.
High–Pressure Pyrolysis of Green River Oil Shale, Burnham et al., Geochemistry and Chemistry of Oil Shales, American Chemical Society, 1983, pp. 335–351.
Geochemistry and Pyrolysis of Oil Shales, Tissot et al., Geochemistry and Chemistry of Oil Shales, American Chemic Society, 1983, pp. 1–11.
A Possible Mechanism of Alkene/Alkane Production, Burnham et al., Oil Shale, Tar Sands, and Related Materials, American Chemical Society, 1981, pp. 79–92.
The Ljungstroem In–Situ Method of Shale Oil Recovery, G. Salomonsson, Oil Shale and Cannel Coal, vol. 2, Proceedings of the Second Oil Shale and Cannel Coal Conference, Institute of Petroleum, 1951, London, pp. 260–280.
Developments in Technology for Green River Oil Shale, G.U. Dinneen, United Nations Symposium on the Development and Utilization of Oil Shale Resources, Laramie Petroleum Research Center, Bureau of Mines, 1968, pp. 1–20.
The Thermal and Structural Properties of a Hanna Basin Coal, R.E. Glass, Transactions of the ASME, vol. 106, Jun. 1984, pp. 266–271.
The Thermal and Structural Properties of the Coal in the Big Coal Seam, R.E. Glass, In Situ, 8(2), 1984, pp. 193–205.
Investigation of the Temperature Variation of the Thermal Conductivity and Thermal Diffusivity of Coal, Badzioch et al., Fuel, vol. 43, No. 4, Jul. 1964, pp. 267–280.
On the Mechanism of Kerogen Pyrolysis, Alan K. Burnham & James A. Happe, Jan. 10, 1984 (17 pages).
Proposed Field Test of the Lins Method Thermal Oil Recovery Process in Athabasca McMurray Tar Sands, Husky Oil Company.

* cited by examiner

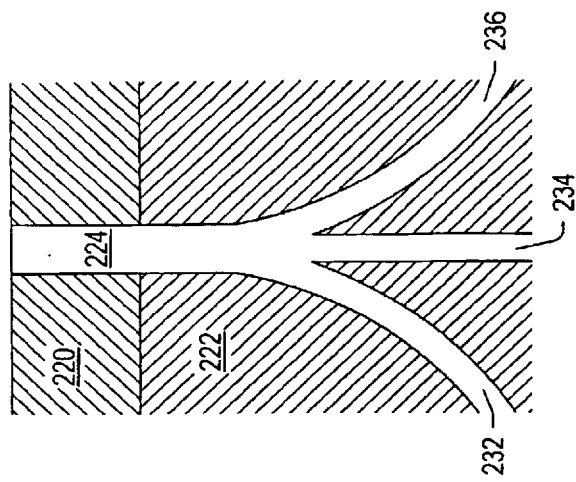
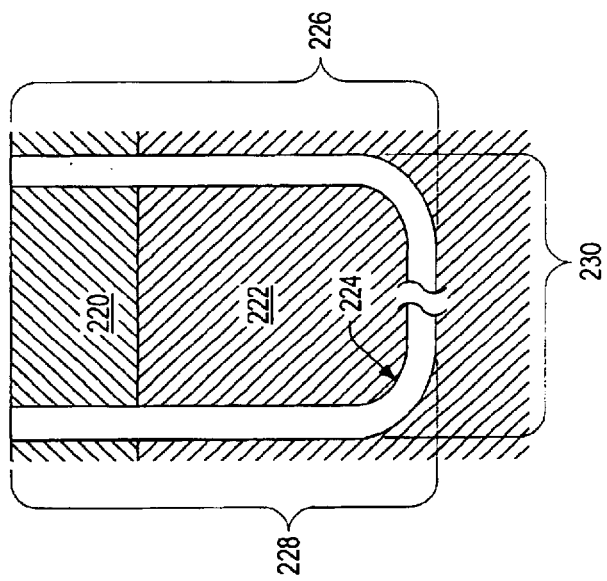
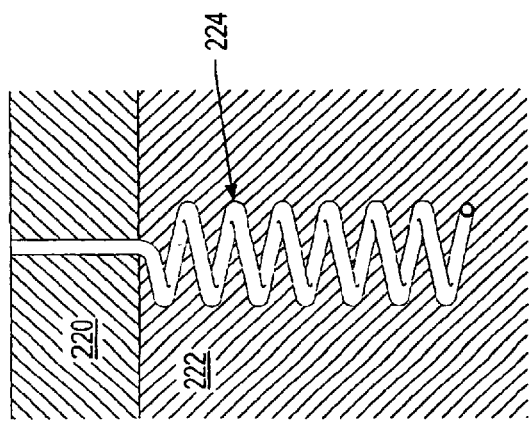
FIG. 3c
FIG. 3b
FIG. 3a

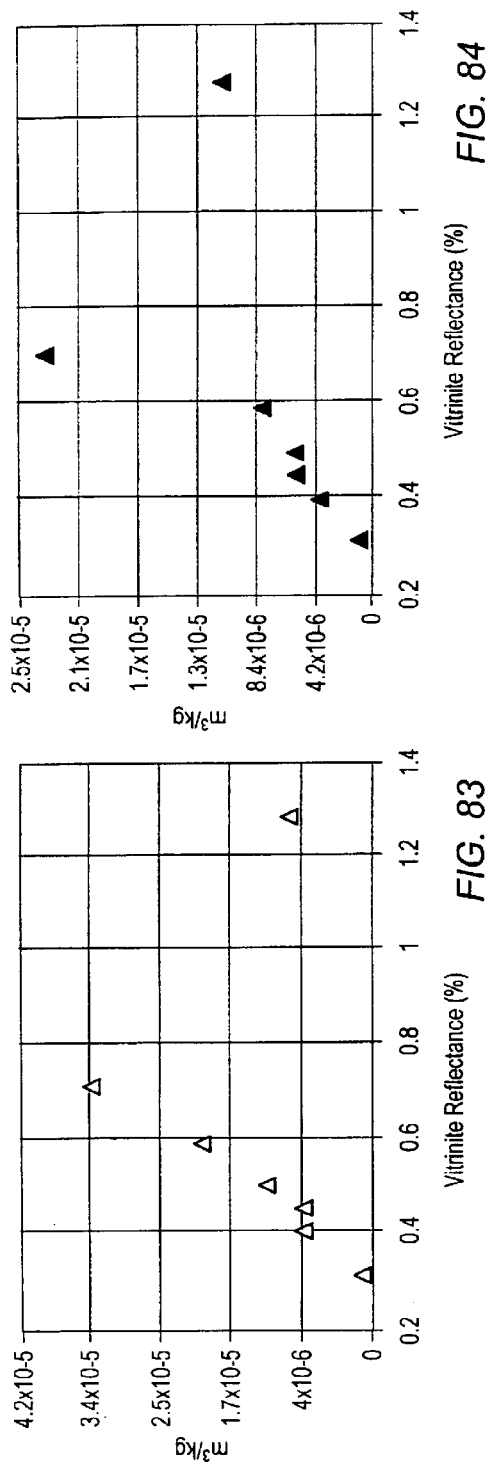
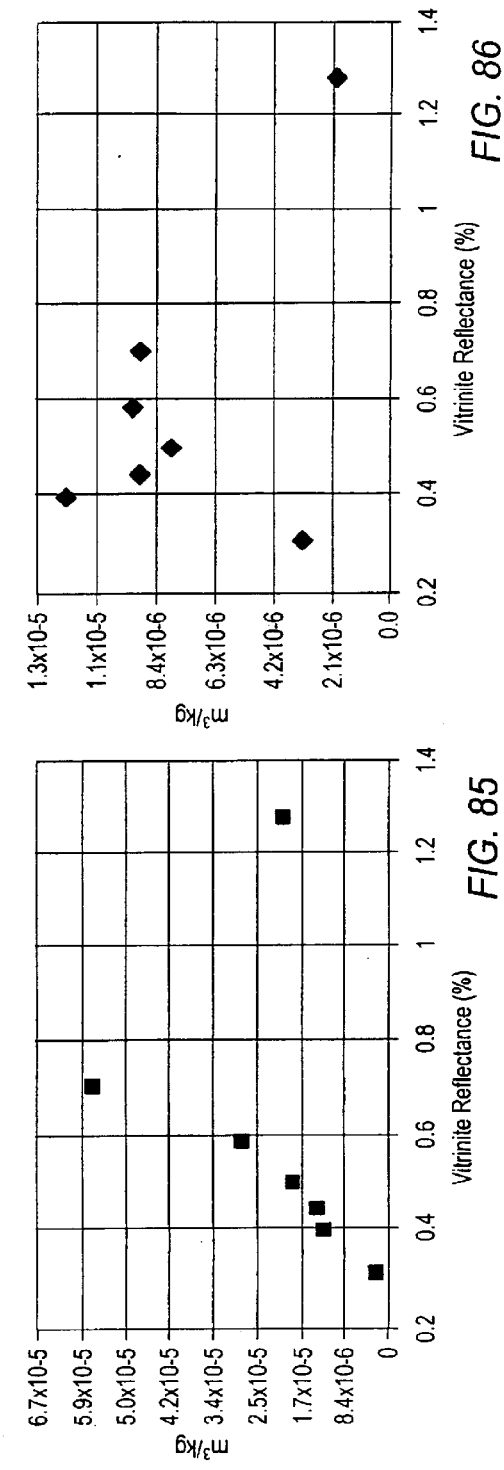
FIG. 83
FIG. 84
FIG. 85
FIG. 86

IN SITU THERMAL PROCESSING OF A COAL FORMATION TO INCREASE A PERMEABILITY/POROSITY OF THE FORMATION

PRIORITY CLAIM

This application claims priority to U.S. Provisional Application No. 60/199,215 entitled "In Situ Energy Recovery," filed Apr. 24, 2000, U.S. Provisional Application No. 60/199,214 entitled "In Situ Energy Recovery From Coal," filed Apr. 24, 2000, and U.S. Provisional Application No. 60/199,213 entitled "Emissionless Energy Recovery From Coal," filed Apr. 24, 2000. The above-referenced provisional applications are hereby incorporated by reference as if fully set forth herein.

BACKGROUND OF THE INVENTION

1. Field of the Invention

The present invention relates generally to methods and systems for production of hydrocarbons, hydrogen, and/or other products from coal formations. Certain embodiments relate to in situ conversion of hydrocarbons to produce hydrocarbons, hydrogen, and/or novel product streams from underground coal formations.

2. Description of Related Art

Hydrocarbons obtained from subterranean (e.g., sedimentary) formations are often used as energy resources, as feedstocks, and as consumer products. Concerns over depletion of available hydrocarbon resources have led to development of processes for more efficient recovery, processing and/or use of available hydrocarbon resources, for example coal. In situ processes for coal formations may be used to remove hydrocarbon materials from subterranean formations. Chemical and/or physical properties of coal within a subterranean formation may need to be changed to allow coal to be more easily removed from the subterranean formation. The chemical and physical changes may include in situ reactions that produce removable fluids, composition changes, solubility changes, phase changes, and/or viscosity changes of the hydrocarbon material within the formation. A fluid may be, but is not limited to, a gas, a liquid, an emulsion, a slurry and/or a stream of solid particles that has flow characteristics similar to liquid flow.

Examples of in situ processes utilizing downhole heaters are illustrated in U.S. Pat. Nos. 2,634,961 to Ljungstrom, U.S. Pat. No. 2,732,195 to Ljungstrom, U.S. Pat. No. 2,780,450 to Ljungstrom. U.S. Pat. No. 2,789,805 to Ljungstrom, U.S. Pat. No. 2,923,535 issued to Ljungstrom, and U.S. Pat. No. 4,886,118 to Van Meurs et al. each of which is incorporated by reference as if fully set forth herein.

A heat source may be used to heat a subterranean formation. Electrical heaters may be used to heat the subterranean formation by radiation and/or conduction. An electrical heater may resistively heat an element. U.S. Pat. No. 2,548,360 to Germain, which is incorporated by reference as if fully set forth herein, describes an electrical heating element placed within a viscous oil within a wellbore. The heater element heats and thins the oil to allow the oil to be pumped from the wellbore. U.S. Pat. No. 4,716,960 to Eastlund et al. which is incorporated by reference as if fully set forth herein, describes electrically heating tubing of a petroleum well by passing a relatively low voltage current through the tubing to prevent formation of solids. U.S. Pat. No. 5,065,818 to Van Egmond, which is incorporated by reference as if fully set forth herein, describes an electrical heating element that is cemented into a well borehole without a casing surrounding the heating element.

U.S. Pat. No. 6,023,554 to Vinegar et al., which is incorporated by reference as if fully set forth herein, describes an electrical heating element that is positioned within a casing. The heating element generates radiant energy that heats the casing. A granular solid fill material may be placed between the casing and the formation. The casing may conductively heat the fill material, which in turn conductively heats the formation.

U.S. Pat. No. 4,570,715 to Van Meurs et al., which is incorporated by reference as if fully set forth herein, describes an electrical heating element. The heating element has an electrically conductive core, a surrounding layer of insulating material, and a surrounding metallic sheath. The conductive core may have a relatively low resistance at high temperatures. The insulating material may have electrical resistance, compressive strength and heat conductivity properties that are relatively high at high temperatures. The insulating layer may inhibit arcing from the core to the metallic sheath. The metallic sheath may have tensile strength and creep resistance properties that are relatively high at high temperatures.

U.S. Pat. No. 5,060,287 to Van Egmond, which is incorporated by reference as if fully set forth herein, describes an electrical heating element having a copper-nickel alloy core.

Combustion of a fuel may be used to heat a formation. Combusting a fuel to heat a formation may be more economical than using electricity to heat a formation. Several different types of heaters may use fuel combustion as a heat source that heats a formation. The combustion may take place in the formation, in a well and/or near the surface. Combustion in the formation may be a fireflood. An oxidizer may be pumped into the formation. The oxidizer may be ignited to advance a fire front towards a production well. Oxidizer pumped into the formation may flow through the formation along fracture lines in the formation. Ignition of the oxidizer may not result in the fire front flowing uniformly through the formation.

A flameless combustor may be used to combust a fuel within a well. U.S. Pat. No. 5,255,742 to Mikus, U.S. Pat. No. 5,404,952 to Vinegar et al., U.S. Pat. No. 5,862,858 to Wellington et al., and U.S. Pat. No. 5,899,269 to Wellington et al., which are incorporated by reference as if fully set forth herein, describe flameless combustors. Flameless combustion may be accomplished by preheating a fuel and combustion air to a temperature above an auto-ignition temperature of the mixture. The fuel and combustion air may be mixed in a heating zone to combust. In the heating zone of the flameless combustor, a catalytic surface may be provided to lower the auto-ignition temperature of the fuel and air mixture.

Heat may be supplied to a formation from a surface heater. The surface heater may produce combustion gases that are circulated through wellbores to heat the formation. Alternately, a surface burner may be used to heat a heat transfer fluid that is passed through a wellbore to heat the formation. Examples of fired heaters, or surface burners that may be used to heat a subterranean formation, are illustrated in U.S. Pat. No. 6,056,057 to Vinegar et al. and U.S. Pat. No. 6,079,499 to Mikus et al., which are both incorporated by reference as if fully set forth herein.

Coal is often mined and used as a fuel within an electricity generating power plant. Most coal that is used as a fuel to generate electricity is mined. A significant number of coal formations are, however, not suitable for economical mining. For example, mining coal from steeply dipping coal seams, from relatively thin coal seams (e.g., less than about 1 meter thick), and/or from deep coal seams may not be economically feasible. Deep coal seams include coal seams that are at, or extend to, depths of greater than about 3000 feet (about 914 m) below surface level. The energy conversion efficiency of burning coal to generate electricity is relatively low, as compared to fuels such as natural gas. Also, burning coal to generate electricity often generates significant amounts of carbon dioxide, oxides of sulfur, and oxides of nitrogen that are released into the atmosphere.

Synthesis gas may be produced in reactors or in situ within a subterranean formation. Synthesis gas may be produced within a reactor by partially oxidizing methane with oxygen. In situ production of synthesis gas may be economically desirable to avoid the expense of building, operating, and maintaining a surface synthesis gas production facility. U.S. Pat. No. 4,250,230 to Terry, which is incorporated by reference as if fully set forth herein, describes a system for in situ gasification of coal. A subterranean coal seam is burned from a first well towards a production well. Methane, hydrocarbons, $H_2$, CO, and other fluids may be removed from the formation through the production well. The $H_2$ and CO may be separated from the remaining fluid. The $H_2$ and CO may be sent to fuel cells to generate electricity.

U.S. Pat. No. 4,057,293 to Garrett, which is incorporated by reference as if fully set forth herein, discloses a process for producing synthesis gas. A portion of a rubble pile is burned to heat the rubble pile to a temperature that generates liquid and gaseous hydrocarbons by pyrolysis. After pyrolysis, the rubble is further heated, and steam or steam and air are introduced to the rubble pile to generate synthesis gas.

U.S. Pat. No. 5,554,453 to Steinfeld et al., which is incorporated by reference as if fully set forth herein, describes an ex situ coal gasifier that supplies fuel gas to a fuel cell. The fuel cell produces electricity. A catalytic burner is used to burn exhaust gas from the fuel cell with an oxidant gas to generate heat in the gasifier.

Carbon dioxide may be produced from combustion of fuel and from many chemical processes. Carbon dioxide may be used for various purposes, such as, but not limited to, a feed stream for a dry ice production facility, supercritical fluid in a low temperature supercritical fluid process, a flooding agent for coal bed demethanation, and a flooding agent for enhanced oil recovery. Although some carbon dioxide is productively used, many tons of carbon dioxide are vented to the atmosphere.

As outlined above, there has been a significant amount of effort to develop methods and systems to economically produce hydrocarbons, hydrogen, and/or other products from coal formations. At present, however, there are still many coal formations from which hydrocarbons, hydrogen, and/or other products cannot be economically produced. Thus, there is still a need for improved methods and systems for production of hydrocarbons, hydrogen, and/or other products from various coal formations.

SUMMARY OF THE INVENTION

In an embodiment, hydrocarbons within a coal formation may be converted in situ within the formation to yield a mixture of relatively high quality hydrocarbon products, hydrogen, and other products. One or more heat sources may be used to heat a portion of the coal formation to temperatures that allow pyrolysis of the hydrocarbons. Hydrocarbons, hydrogen, and other formation fluids may be removed from the formation through one or more production wells. The formation fluids may be removed in a vapor phase. Temperature and pressure in at least a portion of the formation may be controlled during pyrolysis to yield improved products from the formation.

A heated formation may also be used to produce synthesis gas. In certain embodiments synthesis gas is produced after production of pyrolysis fluids.

A formation may be heated to a temperature greater than 400° C. prior to contacting a synthesis gas generating fluid with the formation. Contacting a synthesis gas generating fluid, such as water, steam, and/or carbon dioxide, with carbon and/or hydrocarbons within the formation results in generation of synthesis gas if the temperature of the carbon is sufficiently high. Synthesis gas generation is, in some embodiments, an endothermic process. Additional heat may be added to the formation during synthesis gas generation to maintain a high temperature within the formation. The heat may be added from heater wells and/or from oxidizing carbon and/or hydrocarbons within the formation. The generated synthesis gas may be removed from the formation through one or more production wells.

After production of pyrolysis fluids and/or synthesis gas, fluid may be sequestered within the formation. To store a significant amount of fluid within the formation, a temperature of the formation will often need to be less than about 100° C. Water may be introduced into at least a portion of the formation to generate steam and reduce a temperature of the formation. The steam may be removed from the formation. The steam may be utilized for various purposes, including, but not limited to, heating another portion of the formation, generating synthesis gas in an adjacent portion of the formation, generating electricity, and/or as a steam flood in a oil reservoir. After the formation is cooled, fluid (e.g., carbon dioxide) may be pressurized and sequestered in the formation. Sequestering fluid within the formation may result in a significant reduction or elimination of fluid that is released to the environment due to operation of the in situ conversion process.

In an embodiment, one or more heat sources may be installed into a formation to heat the formation. Heat sources may be installed by drilling openings (well bores) into the formation. In some embodiments openings may be formed in the formation using a drill with a steerable motor and an accelerometer. Alternatively, an opening may be formed into the formation by geosteered drilling. Alternately, an opening may be formed into the formation by sonic drilling.

One or more heat sources may be disposed within the opening such that the heat source may be configured to transfer heat to the formation. For example, a heat source may be placed in an open wellbore in the formation. In this manner, heat may conductively and radiatively transfer from the heat source to the formation. Alternatively, a heat source may be placed within a heater well that may be packed with gravel, sand, and/or cement. The cement may be a refractory cement.

In some embodiments one or more heat sources may be placed in a pattern within the formation. For example, in one embodiment, an in situ conversion process for coal may include heating at least a portion of a coal formation with an array of heat sources disposed within the formation. In some embodiments, the array of heat sources can be positioned substantially equidistant from a production well. Certain patterns (e.g., triangular arrays, hexagonal arrays, or other array patterns) may be more desirable for specific applications. In addition, the array of heat sources may be disposed such that a distance between each heat source may be less than about 70 feet (21 m). In addition, the in situ conversion process for hydrocarbons may include heating at least a portion of the formation with heat sources disposed substantially parallel to a boundary of the hydrocarbons. Regardless of the arrangement of or distance between the heat sources, in certain embodiments, a ratio of heat sources to production wells disposed within a formation may be greater than about 5, 8, 10, 20, or more.

Certain embodiments may also include allowing heat to transfer from one or more of the heat sources to a selected section of the heated portion. In an embodiment, the selected section may be disposed between one or more heat sources. For example, the in situ conversion process may also include allowing heat to transfer from one or more heat sources to a selected section of the formation such that heat from one or more of the heat sources pyrolyzes at least some hydrocarbons within the selected section. In this manner, the in situ conversion process may include heating at least a portion of a coal formation above a pyrolyzation temperature of hydrocarbons in the formation. For example, a pyrolyzation temperature may include a temperature of at least about 270° C. Heat may be allowed to transfer from one or more of the heat sources to the selected section substantially by conduction.

One or more heat sources may be located within the formation such that superposition of heat produced from one or more heat sources may occur. Superposition of heat may increase a temperature of the selected section to a temperature sufficient for pyrolysis of at least some of the hydrocarbons within the selected section. Superposition of heat may vary depending on, for example, a spacing between heat sources. The spacing between heat sources may be selected to optimize heating of the section selected for treatment. Therefore, hydrocarbons may be pyrolyzed within a larger area of the portion. In this manner, spacing between heat sources may be selected to increase the effectiveness of the heat sources, thereby increasing the economic viability of a selected in situ conversion process for hydrocarbons. Superposition of heat tends to increase the uniformity of heat distribution in the section of the formation selected for treatment.

Various systems and methods may be used to provide heat sources. In an embodiment, a natural distributed combustor system and method may be configured to heat at least a portion of a coal formation. The system and method may first include heating a first portion of the formation to a temperature sufficient to support oxidation of at least some of the hydrocarbons therein. One or more conduits may be disposed within one or more openings. One or more of the conduits may be configured to provide an oxidizing fluid from an oxidizing fluid source into an opening in the formation. The oxidizing fluid may oxidize at least a portion of the hydrocarbons at a reaction zone within the formation. Oxidation may generate heat at the reaction zone. The generated heat may transfer from the reaction zone to a pyrolysis zone in the formation. The heat may transfer by conduction, radiation, and/or convection. In this manner, a heated portion of the formation may include the reaction zone and the pyrolysis zone. The heated portion may also be located substantially adjacent to the opening. One or more of the conduits may also be configured to remove one or more oxidation products from the reaction zone and/or formation. Alternatively, additional conduits may be configured to remove one or more oxidation products from the reaction zone and/or formation.

In an embodiment, a system and method configured to heat a coal formation may include one or more insulated conductors disposed in one or more openings in the formation. The openings may be uncased. Alternatively, the openings may include a casing. As such, the insulated conductors may provide conductive, radiant, or convective heat to at least a portion of the formation. In addition, the system and method may be configured to allow heat to transfer from the insulated conductor to a section of the formation. In some embodiments, the insulated conductor may include a copper-nickel alloy. In some embodiments, the insulated conductor may be electrically coupled to two additional insulated conductors in a 3-phase Y configuration.

In an embodiment, a system and method may include one or more elongated members disposed in an opening in the formation. Each of the elongated members may be configured to provide heat to at least a portion of the formation. One or more conduits may be disposed in the opening. One or more of the conduits may be configured to provide an oxidizing fluid from an oxidizing fluid source into the opening. In certain embodiments, the oxidizing fluid may be configured to substantially inhibit carbon deposition on or proximate to the elongated member.

In an embodiment, a system and method for heating a coal formation may include oxidizing a fuel fluid in a heater. The method may further include providing at least a portion of the oxidized fuel fluid into a conduit disposed in an opening in the formation. In addition, additional heat may be transferred from an electric heater disposed in the opening to the section of the formation. Heat may be allowed to transfer substantially uniformly along a length of the opening.

Energy input costs may be reduced in some embodiments of systems and methods described above. For example, an energy input cost may be reduced by heating a portion of a coal formation by oxidation in combination with heating the portion of the formation by an electric heater. The electric heater may be turned down and/or off when the oxidation reaction begins to provide sufficient heat to the formation. In this manner, electrical energy costs associated with heating at least a portion of a formation with an electric heater may be reduced. Thus, a more economical process may be provided for heating a coal formation in comparison to heating by a conventional method. In addition, the oxidation reaction may be propagated slowly through a greater portion of the formation such that fewer heat sources may be required to heat such a greater portion in comparison to heating by a conventional method.

Certain embodiments as described herein may provide a lower cost system and method for heating a coal formation. For example, certain embodiments may provide substantially uniform heat transfer along a length of a heater. Such a length of a heater may be greater than about 300 m or possibly greater than about 600 m. In addition, in certain embodiments, heat may be provided to the formation more efficiently by radiation. Furthermore, certain embodiments of systems as described herein may have a substantially longer lifetime than presently available systems.

In an embodiment, an in situ conversion system and method for hydrocarbons may include maintaining a portion of the formation in a substantially unheated condition. In this manner, the portion may provide structural strength to the formation and/or confinement/isolation to certain regions of the formation. A processed coal formation may have alternating heated and substantially unheated portions arranged in a pattern that may, in some embodiments, resemble a checkerboard pattern, or a pattern of alternating areas (e.g., strips) of heated and unheated portions.

In an embodiment, a heat source may advantageously heat only along a selected portion or selected portions of a length of the heater. For example, a formation may include several coal layers. One or more of the coal layers may be separated by layers containing little and/or no coal. A heat source may include several discrete high heating zones that may be separated by low heating zones. The high heating zones may be disposed proximate coal layers such that the layers may be heated. The low heating zones may be disposed proximate to layers containing little or no hydrocarbons such that the layers may not be substantially heated. For example, an electrical heater may include one or more low resistance heater sections and one or more high resistance heater sections. In this manner, low resistance heater sections of the electrical heater may be disposed in and/or proximate to layers containing little or no hydrocarbons. In addition, high resistance heater sections of the electrical heater may be disposed proximate coal layers. In an additional example, a fueled heater (e.g., surface burner) may include insulated sections. In this manner, insulated sections of the fueled heater may be placed proximate to or adjacent to layers containing little or no hydrocarbons. Alternately, a heater with distributed air and/or fuel may be configured such that little and/or no fuel may be combusted proximate to or adjacent to layers containing little or no hydrocarbons. Such a fueled heater may include flameless combustors and natural distributed combustors.

In an embodiment, a heating rate of the formation may be slowly raised through the pyrolysis temperature range. For example, an in situ conversion process for coal may include heating at least a portion of a coal formation to raise an average temperature of the portion above about 270° C. by a rate less than a selected amount (e.g., about 10° C., 5° C., 3° C., 1° C., 0.5° C., or 0.1° C.) per day. In a further embodiment, the portion may be heated such that an average temperature of the selected section may be less than about 375° C. or, in some embodiments, less than about 400° C.

In an embodiment, a temperature of the portion may be monitored through a test well disposed in a formation. For example, the test well may be positioned in a formation between a first heat source and a second heat source. Certain systems and methods may include controlling the heat from the first heat source and/or the second heat source to raise the monitored temperature at the test well at a rate of less than about a selected amount per day. In addition or alternatively, a temperature of the portion may be monitored at a production well. In this manner, an in situ conversion process for coal may include controlling the heat from the first heat source and/or the second heat source to raise the monitored temperature at the production well at a rate of less than a selected amount per day.

Certain embodiments may include heating a selected volume of a coal formation. Heat may be provided to the selected volume by providing power to one or more heat sources. Power may be defined as heating energy per day provided to the selected volume. A power (Pwr) required to generate a heating rate (h, in units of, for example, ° C./day) in a selected volume (V) of a coal formation may be determined by the following equation: $Pwr = h*V*C_v*\rho_B$. In this equation, an average heat capacity of the formation ($C_v$) and an average bulk density of the formation ($\rho_B$) may be estimated or determined using one or more samples taken from the coal formation.

Certain embodiments may include raising and maintaining a pressure in a coal formation. Pressure may be, for example, controlled within a range of about 2 bars absolute to about 20 bars absolute. For example, the process may include controlling a pressure within a majority of a selected section of a heated portion of the formation. The controlled pressure may be above about 2 bars absolute during pyrolysis. In an alternate embodiment, an in situ conversion process for coal may include raising and maintaining the pressure in the formation within a range of about 20 bars absolute to about 36 bars absolute.

In an embodiment, compositions and properties of formation fluids produced by an in situ conversion process for coal may vary depending on, for example, conditions within a coal formation.

Certain embodiments may include controlling the heat provided to at least a portion of the formation such that production of less desirable products in the portion may be substantially inhibited. Controlling the heat provided to at least a portion of the formation may also increase the uniformity of permeability within the formation. For example, controlling the heating of the formation to inhibit production of less desirable products may, in some embodiments, include controlling the heating rate to less than a selected amount (e.g. 10° C., 5° C., 3° C., 1° C., 0.5° C., or 0.1° C.) per day.

Controlling pressure, heat and/or heating rates of a selected section in a formation may increase production of selected formation fluids. For example, the amount and/or rate of heating may be controlled to produce formation fluids having an American Petroleum Institute ("API") gravity greater than about 25. Heat and/or pressure may be controlled to inhibit production of olefins in the produced fluids.

Controlling formation conditions to control the pressure of hydrogen in the produced fluid may result in improved qualities of the produced fluids. In some embodiments it may be desirable to control formation conditions so that the partial pressure of hydrogen in a produced fluid is greater than about 0.5 bars absolute, as measured at a production well.

In an embodiment, operating conditions may be determined by measuring at least one property of the formation. At least the measured properties may be input into a computer executable program. At least one property of formation fluids selected to be produced from the formation may also be input into the computer executable program. The program may be operable to determine a set of operating conditions from at least the one or more measured properties. The program may also be configured to determine the set of operating conditions from at least one property of the selected formation fluids. In this manner, the determined set of operating conditions may be configured to increase production of selected formation fluids from the formation.

Certain embodiments may include altering a composition of formation fluids produced from a coal formation by altering a location of a production well with respect to a heater well. For example, a production well may be located with respect to a heater well such that a non-condensable gas fraction of produced hydrocarbon fluids may be larger than a condensable gas fraction of the produced hydrocarbon fluids.

Condensable hydrocarbons produced from the formation will typically include paraffins, cycloalkanes, monoaromatics, and di-aromatics as major components. Such condensable hydrocarbons may also include other components such as tri-aromatics, etc.

In certain embodiments, a majority of the hydrocarbons in produced fluid may have a carbon number of less than approximately 25. Alternatively, less than about 15 weight % of the hydrocarbons in the fluid may have a carbon number greater than approximately 25. In other embodiments fluid produced may have a weight ratio of hydrocarbons having carbon numbers from 2 through 4, to methane, of greater than approximately greater than approximately 0.3. The non-condensable hydrocarbons may include, but are not limited to, hydrocarbons having carbon numbers less than 5.

In certain embodiments, the API gravity of the hydrocarbons in produced fluid may be approximately 20 or above (e.g., 25, 30, 35, 40, 50, etc.). In certain embodiments, the hydrogen to carbon atomic ratio in produced fluid may be at least approximately 1.7 (e.g., 1.8, 1.9, etc.).

In certain embodiments, fluid produced from a formation may include oxygenated hydrocarbons. In an example, the condensable hydrocarbons may include an amount of oxygenated hydrocarbons greater than about 5% by weight of the condensable hydrocarbons.

Condensable hydrocarbons of a produced fluid may also include olefins. For example, the olefin content of the condensable hydrocarbons may be from about 0.1% by weight to about 15% by weight. Alternatively, the olefin content of the condensable hydrocarbons may be from about 0.1% by weight to about 2.5% by weight or, in some embodiments less than about 5% by weight.

Non-condensable hydrocarbons of a produced fluid may also include olefins. For example, the olefin content of the non-condensable hydrocarbons may be gauged using the ethene/ethane molar ratio. In certain embodiments the ethene/ethane molar ratio may range from about 0.001 to about 0.15.

Fluid produced from the formation may include aromatic compounds. For example, the condensable hydrocarbons may include an amount of aromatic compounds greater than about 20% or about 25% by weight of the condensable hydrocarbons. The condensable hydrocarbons may also include relatively low amounts of compounds with more than two rings in them (e.g., tri-aromatics or above). For example, the condensable hydrocarbons may include less than about 1%, 2%, or about 5% by weight of tri-aromatics or above in the condensable hydrocarbons.

In particular, in certain embodiments asphaltenes (i.e., large multi-ring aromatics that are substantially insoluble in hydrocarbons) make up less than about 0.1% by weight of the condensable hydrocarbons. For example, the condensable hydrocarbons may include an asphaltene component of from about 0.0% by weight to about 0.1% by weight or, in some embodiments, less than about 0.3% by weight.

Condensable hydrocarbons of a produced fluid may also include relatively large amounts of cycloalkanes. For example, the condensable hydrocarbons may include a cycloalkane component of up to 30% by weight (e.g., from about 5% by weight to about 30% by weight) of the condensable hydrocarbons.

In certain embodiments, the condensable hydrocarbons of the fluid produced from a formation may include compounds containing nitrogen. For example, less than about 1% by weight (when calculated on an elemental basis) of the condensable hydrocarbons is nitrogen (e.g., typically the nitrogen is in nitrogen containing compounds such as pyridines, amines, amides, etc.).

In certain embodiments, the condensable hydrocarbons of the fluid produced from a formation may include compounds containing oxygen. In certain embodiments between about 5% and about 30% by weight of the condensable hydrocarbons are typically oxygen containing compounds such as phenols, substituted phenols, ketones, etc. In some instances certain compounds containing oxygen (e.g., phenols) may be valuable and, as such, may be economically separated from the produced fluid.

In certain embodiments, the condensable hydrocarbons of the fluid produced from a formation may include compounds containing sulfur. For example, less than about 1% by weight (when calculated on an elemental basis) of the condensable hydrocarbons is sulfur (e.g., typically the sulfur is in sulfur containing compounds such as thiophenes, mercaptans, etc.).

Furthermore, the fluid produced from the formation may include ammonia (typically the ammonia condenses with the water, if any, produced from the formation). For example, the fluid produced from the formation may in certain embodiments include about 0.05% or more by weight of ammonia. Certain formations may produce larger amounts of ammonia (e.g. up to about 10% by weight of the total fluid produced may be ammonia).

Furthermore, a produced fluid from the formation may also include molecular hydrogen ($H_2$), water, carbon dioxide, hydrogen sulfide, etc. For example, the fluid may include a $H_2$ content between about 10% to about 80% by volume of the non-condensable hydrocarbons.

Certain embodiments may include heating to yield at least about 15% by weight of a total organic carbon content of at least some of the coal formation into formation fluids.

In an embodiment, an in situ conversion process for treating a coal formation may include providing heat to a section of the formation to yield greater than about 60% by weight of the potential hydrocarbon products and hydrogen, as measured by the Fischer Assay.

In certain embodiments, heating of the selected section of the formation may be controlled to pyrolyze at least about 20% by weight (or in some embodiments about 25% by weight) of the hydrocarbons within the selected section of the formation.

Certain embodiments may include providing a reducing agent to at least a portion of the formation. A reducing agent provided to a portion of the formation during heating may increase production of selected formation fluids. A reducing agent may include, but is not limited to, molecular hydrogen. For example, pyrolyzing at least some hydrocarbons in a coal formation may include forming hydrocarbon fragments. Such hydrocarbon fragments may react with each other and other compounds present in the formation. Reaction of these hydrocarbon fragments may increase production of olefin and aromatic compounds from the formation. Therefore, a reducing agent provided to the formation may react with hydrocarbon fragments to form selected products and/or inhibit the production of non-selected products.

In an embodiment, a hydrogenation reaction between a reducing agent provided to a coal formation and at least some of the hydrocarbons within the formation may generate heat. The generated heat may be allowed to transfer such that at least a portion of the formation may be heated. A reducing agent such as molecular hydrogen may also be autogenously generated within a portion of a coal formation during an in situ conversion process for coal. In this manner, the autogenously generated molecular hydrogen may hydrogenate formation fluids within the formation. Allowing formation waters to contact hot carbon in the spent formation may generate molecular hydrogen. Cracking an injected hydrocarbon fluid may also generate molecular hydrogen.

Certain embodiments may also include providing a fluid produced in a first portion of a coal formation to a second portion of the formation. In this manner, a fluid produced in a first portion of a coal formation may be used to produce a reducing environment in a second portion of the formation. For example, molecular hydrogen generated in a first portion of a formation may be provided to a second portion of the formation. Alternatively, at least a portion of formation fluids produced from a first portion of the formation may be provided to a second portion of the formation to provide a reducing environment within the second portion. The second portion of the formation may be treated according to any of the embodiments described herein.

Certain embodiments may include controlling heat provided to at least a portion of the formation such that a thermal conductivity of the portion may be increased to greater than about 0.5 W/(m ° C.) or, in some embodiments, greater than about 0.6 W/(m ° C.).

In certain embodiments a mass of at least a portion of the formation may be reduced due, for example, to the production of formation fluids from the formation. As such, a permeability and porosity of at least a portion of the formation may increase. In addition, removing water during the heating may also increase the permeability and porosity of at least a portion of the formation.

Certain embodiments may include increasing a permeability of at least a portion of a coal formation to greater than about 0.01, 0.1, 1, 10, 20 and/or 50 Darcy. In addition, certain embodiments may include substantially uniformly increasing a permeability of at least a portion of a coal formation. Some embodiments may include increasing a porosity of at least a portion of a coal formation substantially uniformly.

In certain embodiments, after pyrolysis of a portion of a formation, synthesis gas may be produced from carbon and/or hydrocarbons remaining within the formation. Pyrolysis of the portion may produce a relatively high, substantially uniform permeability throughout the portion. Such a relatively high, substantially uniform permeability may allow generation of synthesis gas from a significant portion of the formation at relatively low pressures. The portion may also have a large surface area and/or surface area/volume. The large surface area may allow synthesis gas producing reactions to be substantially at equilibrium conditions during synthesis gas generation. The relatively high, substantially uniform permeability may result in a relatively high recovery efficiency of synthesis gas, as compared to synthesis gas generation in a coal formation that has not been so treated.

Synthesis gas may be produced from the formation prior to or subsequent to producing a formation fluid from the formation. For example, synthesis gas generation may be commenced before and/or after formation fluid production decreases to an uneconomical level. In this manner, heat provided to pyrolyze hydrocarbons within the formation may also be used to generate synthesis gas. For example, if a portion of the formation is at a temperature from approximately 270° C. to approximately 375° C. (or 400° C. in some embodiments) after pyrolyzation, then less additional heat is generally required to heat such portion to a temperature sufficient to support synthesis gas generation.

Pyrolysis of at least some hydrocarbons may in some embodiments convert about 15% by weight or more of the carbon initially available. Synthesis gas generation may convert approximately up to an additional 80% by weight or more of carbon initially available within the portion. In this manner, in situ production of synthesis gas from a coal formation may allow conversion of larger amounts of carbon initially available within the portion. The amount of conversion achieved may, in some embodiments, be limited by subsidence concerns.

Certain embodiments may include providing heat from one or more heat sources to heat the formation to a temperature sufficient to allow synthesis gas generation (e.g., in a range of approximately 400° C. to approximately 1200° C. or higher). At a lower end of the temperature range, generated synthesis gas may have a high hydrogen ($H_2$) to carbon monoxide (CO) ratio. At an upper end of the temperature range, generated synthesis gas may include mostly $H_2$ and CO in lower ratios (e.g., approximately a 1:1 ratio).

Heat sources for synthesis gas production may include any of the heat sources as described in any of the embodiments set forth herein. Alternatively, heating may include transferring heat from a heat transfer fluid (e.g., steam or combustion products from a burner) flowing within a plurality of wellbores within the formation.

A synthesis gas generating fluid (e.g., liquid water, steam, carbon dioxide, air, oxygen, hydrocarbons, and mixtures thereof) may be provided to the formation. For example, the synthesis gas generating fluid mixture may include steam and oxygen. In an embodiment, a synthesis gas generating fluid may include aqueous fluid produced by pyrolysis of at least some hydrocarbons within one or more other portions of the formation. Providing the synthesis gas generating fluid may alternatively include raising a water table of the formation to allow water to flow into it. Synthesis gas generating fluid may also be provided through at least one injection wellbore. The synthesis gas generating fluid will generally react with carbon in the formation to form $H_2$, water, methane, $CO_2$, and/or CO. A portion of the carbon dioxide may react with carbon in the formation to generate carbon monoxide. Hydrocarbons such as ethane may be added to a synthesis gas generating fluid. When introduced into the formation, the hydrocarbons may crack to form hydrogen and/or methane. The presence of methane in produced synthesis gas may increase the heating value of the produced synthesis gas.

Synthesis gas generating reactions are typically endothermic reactions. In an embodiment, an oxidant may be added to a synthesis gas generating fluid. The oxidant may include, but is not limited to, air, oxygen enriched air, oxygen, hydrogen peroxide, other oxidizing fluids, or combinations thereof. The oxidant may react with carbon within the formation to exothermically generate heat. Reaction of an oxidant with carbon in the formation may result in production of $CO_2$ and/or CO. Introduction of an oxidant to react with carbon in the formation may economically allow raising the formation temperature high enough to result in generation of significant quantities of $H_2$ and CO from hydrocarbons within the formation.

Synthesis gas generation may be via a batch process or a continuous process, as is further described herein.

Synthesis gas may be produced from one or more producer wells that include one or more heat sources. Such heat sources may operate to promote production of the synthesis gas with a desired composition.

Certain embodiments may include monitoring a composition of the produced synthesis gas, and then controlling heating and/or controlling input of the synthesis gas generating fluid to maintain the composition of the produced synthesis gas within a desired range. For example, in some embodiments (e.g., such as when the synthesis gas will be used as a feedstock for a Fischer-Tropsch process) a desired composition of the produced synthesis gas may have a ratio of hydrogen to carbon monoxide of about 1.8:1 to 2.2:1

(e.g., about 2:1 or about 2.1:1). In some embodiments (such as when the synthesis gas will be used as a feedstock to make methanol) such ratio may be about 3:1 (e.g., about 2.8:1 to 3.2:1).

Certain embodiments may include blending a first synthesis gas with a second synthesis gas to produce synthesis gas of a desired composition. The first and the second synthesis gases may be produced from different portions of the formation.

Synthesis gases described herein may be converted to heavier condensable hydrocarbons. For example, a Fischer-Tropsch hydrocarbon synthesis process may be configured to convert synthesis gas to branched and unbranched paraffins. Paraffins produced from the Fischer-Tropsch process may be used to produce other products such as diesel, jet fuel, and naphtha products. The produced synthesis gas may also be used in a catalytic methanation process to produce methane. Alternatively, the produced synthesis gas may be used for production of methanol, gasoline and diesel fuel, ammonia, and middle distillates. Produced synthesis gas may be used to heat the formation as a combustion fuel. Hydrogen in produced synthesis gas may be used to upgrade oil.

Synthesis gas may also be used for other purposes. Synthesis gas may be combusted as fuel. Synthesis gas may also be used for synthesizing a wide range of organic and/or inorganic compounds such as hydrocarbons and ammonia. Synthesis gas may be used to generate electricity, by combusting it as a fuel, by reducing the pressure of the synthesis gas in turbines, and/or using the temperature of the synthesis gas to make steam (and then run turbines). Synthesis gas may also be used in an energy generation unit such as a molten carbonate fuel cell, a solid oxide fuel cell, or other type of fuel cell.

Certain embodiments may include separating a fuel cell feed stream from fluids produced from pyrolysis of at least some of the hydrocarbons within a formation. The fuel cell feed stream may include $H_2$, hydrocarbons, and/or carbon monoxide. In addition, certain embodiments may include directing the fuel cell feed stream to a fuel cell to produce electricity. The electricity generated from the synthesis gas or the pyrolyzation fluids in the fuel cell may be configured to power electrical heaters, which may be configured to heat at least a portion of the formation. Certain embodiments may include separating carbon dioxide from a fluid exiting the fuel cell. Carbon dioxide produced from a fuel cell or a formation may be used for a variety of purposes.

In an embodiment, a portion of a formation that has been pyrolyzed and/or subjected to synthesis gas generation may be allowed to cool or may be cooled to form a cooled, spent portion within the formation. For example, a heated portion of a formation may be allowed to cool by transference of heat to adjacent portion of the formation. The transference of heat may occur naturally or may be forced by the introduction of heat transfer fluids through the heated portion and into a cooler portion of the formation. Alternatively, introducing water to the first portion of the formation may cool the first portion. Water introduced into the first portion may be removed from the formation as steam. The removed steam or hot water may be injected into a hot portion of the formation to create synthesis gas.

Cooling the formation may provide certain benefits such as increasing the strength of the rock in the formation (thereby mitigating subsidence), increasing absorptive capacity of the formation, etc.

In an embodiment, a cooled, spent portion of a coal formation may be used to store and/or sequester other materials such as carbon dioxide. Carbon dioxide may be injected under pressure into the cooled, spent portion of the formation. The injected carbon dioxide may adsorb onto hydrocarbons in the formation and/or reside in void spaces such as pores in the formation. The carbon dioxide may be generated during pyrolysis, synthesis gas generation, and/or extraction of useful energy.

In an embodiment, produced formation fluids may be stored in a cooled, spent portion of the formation. In some embodiments carbon dioxide may be stored in relatively deep coal beds, and used to desorb coal bed methane.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIGS. 3a–3c depict embodiments of heater wells;

FIG. 83 depicts yields of paraffins versus vitrinite reflectance;

FIG. 84 depicts yields of cycloalkanes versus vitrinite reflectance;

FIG. 85 depicts yields of cycloalkanes and paraffins versus vitrinite reflectance;

FIG. 86 depicts yields of phenol versus vitrinite reflectance;

FIG. 121 depicts calculated equilibrium gas dry mole fractions for a reaction of coal with water;

Figure 1:
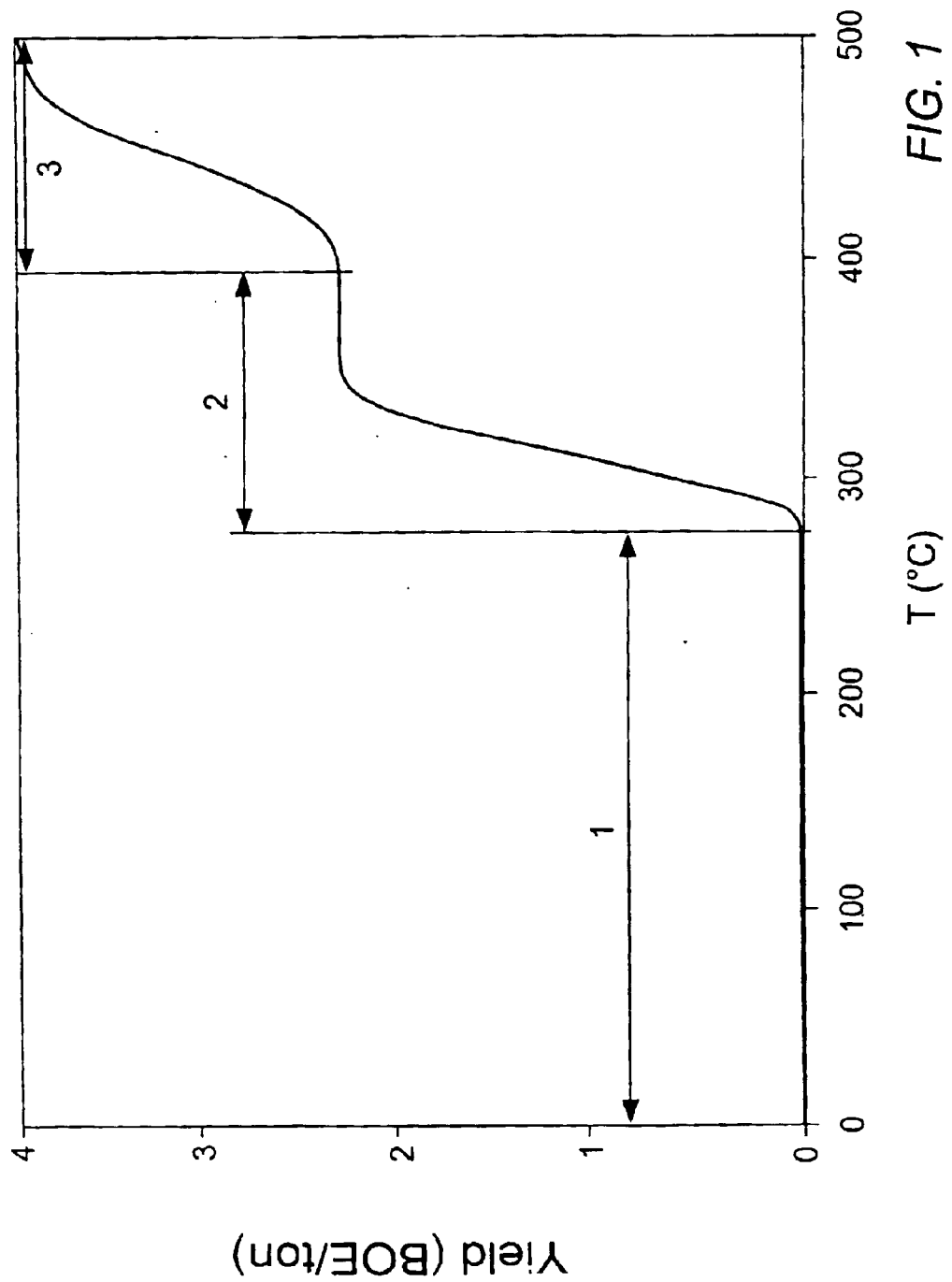
FIG. 1 depicts an illustration of stages of heating a coal formation.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The following description generally relates to systems and methods for treating a coal formation, which may include, but is not limited to, humic and/or sapropelic coal. Such formations may be treated to yield relatively high quality hydrocarbon products, hydrogen, and other products.

As used herein, the word "coal" is generally defined to include naturally formed sedimentary rock or other rock that contains at least about 70% by volume of organic matter.

As used herein, "a method of treating a coal formation" may be used interchangeably with "an in situ conversion process for coal."

"Hydrocarbons" are generally defined as molecules formed primarily by carbon and hydrogen atoms. Hydrocarbons may also include other elements, such as, but not limited to, halogens, metallic elements, nitrogen, oxygen, and/or sulfur.

"Kerogen" is generally defined as a solid, insoluble hydrocarbon that has been converted by natural degradation (e.g. by diagenesis) and that principally contains carbon, hydrogen, nitrogen, oxygen, and sulfur. Coal is a typical example of a material that contains kerogens. "Oil" is generally defined as a fluid containing a complex mixture of condensable hydrocarbons.

The terms "formation fluids" and "produced fluids" generally refer to fluids removed from a coal formation and may include pyrolyzation fluid, synthesis gas, and water (steam). Formation fluids may include hydrocarbon fluids as well as non-hydrocarbon fluids. As used herein, "hydrocarbon fluids" generally refer to compounds including primarily hydrogen and carbon. Hydrocarbon fluids may include other elements in addition to hydrogen and carbon such as, but not limited to, nitrogen, oxygen, and sulfur. Non-hydrocarbon fluids may include, but are not limited to, hydrogen ("$H_2$"), nitrogen ("$N_2$"), carbon monoxide, carbon dioxide, hydrogen sulfide, water, and ammonia.

A "carbon number" generally refers to a number of carbon atoms within a molecule. As described herein, carbon number distributions are determined by true boiling point distribution and gas liquid chromatography.

A "heat source" is generally defined as any system configured to provide heat to at least a portion of a formation. For example, a heat source may include electrical heaters such as an insulated conductor, an elongated member, and a conductor disposed within a conduit, as described in embodiments herein. A heat source may also include heat sources that generate heat by burning a fuel external to or within a formation such as surface burners, flameless distributed combustors, and natural distributed combustors, as described in embodiments herein. In addition, it is envisioned that in some embodiments heat provided to or generated in one or more heat sources may by supplied by other sources of energy. The other sources of energy may directly heat a formation, or the energy may be applied to a transfer media that directly or indirectly heats the formation. It is to be understood that one or more heat sources that are applying heat to a formation may use different sources of energy. Thus, for example, for a given formation some heat sources may supply heat from electric resistance heaters some heat sources may provide heat from combustion, and some heat sources may provide heat from one or more other energy sources (e.g., chemical reactions, solar energy, wind energy, or other sources of renewable energy). A chemical reaction may include an exothermic reaction such as, but not limited to, an oxidation reaction that may take place in at least a portion of a formation. A heat source may also include a heater that may be configured to provide heat to a zone proximate to and/or surrounding a heating location such as a heater well, Heaters may be, but are not limited to, electric heaters, burners, and natural distributed combustors.

A "heater" is generally defined as any system configured to generate heat in a well or a near wellbore region. A "unit of heat sources" refers to a minimal number of heat sources that form a template that is repeated to create a pattern of heat sources within a formation. For example, a heater may generate heat by burning a fuel external to or within a formation such as surface burners, flameless distributed combustors, and natural distributed combustors, as described in embodiments herein.

The term "wellbore" generally refers to a hole in a formation made by drilling. A wellbore may have a substantially circular cross-section, or a cross-section in other shapes as well (e.g., circles, ovals, squares, rectangles, triangles, slits, or other regular or irregular shapes). As used herein, the terms "well" and "opening," when referring to an opening in the formation, may also be used interchangeably with the term "wellbore."

As used herein, the phrase "natural distributed combustor" generally refers to a heater that uses an oxidant to oxidize at least a portion of the carbon in the formation to generate heat, and wherein the oxidation takes place in a vicinity proximate to a wellbore. Most of the combustion products produced in the natural distributed combustor are removed through the wellbore.

The term "orifices," as used herein, generally describes openings having a wide variety of sizes and cross-sectional shapes including, but not limited to, circles, ovals, squares, rectangles, triangles, slits, or other regular or irregular shapes.

As used herein, a "reaction zone" generally refers to a volume of a coal formation that is subjected to a chemical reaction such as an oxidation reaction.

As used herein, the term "insulated conductor" generally refers to any elongated material that may conduct electricity and that is covered, in whole or in part, by an electrically insulating material. The term "self-controls" generally refers to controlling an output of a heater without external control of any type.

"Pyrolysis" is generally defined as the breaking of chemical bonds due to the application of heat. For example, pyrolysis may include transforming a compound into one or more other substances by heat alone. In the context of this patent, heat for pyrolysis may originate in an oxidation reaction and then such heat may be transferred to a section of the formation to cause pyrolysis.

As used herein, a "pyrolyzation fluid" or "pyrolysis products" generally refers to a fluid produced substantially during pyrolysis of hydrocarbons. As used herein, a "pyrolysis zone" generally refers to a volume of coal formation that is reacted or reacting to form a pyrolyzation fluid.

"Cracking" generally refers to a process involving decomposition and molecular recombination of organic compounds wherein a number of molecules becomes larger. In cracking, a series of reactions take place accompanied by a transfer of hydrogen atoms between molecules. Cracking fundamentally changes the chemical structure of the molecules. For example, naphtha may undergo a thermal cracking reaction to form ethene and $H_2$.

The term "superposition of heat" is generally defined as providing heat from at least two heat sources to a selected section of the portion of the formation such that the temperature of the formation at least at one location between the two wells is influenced by at least two heat sources.

The term "fingering" generally refers to injected fluids bypassing portions of a formation because of variations in transport characteristics (e.g., permeability).

"Thermal conductivity" is generally defined as the property of a material that describes the rate at which heat flows, in steady state, between two surfaces of the material for a given temperature difference between the two surfaces.

"Fluid pressure" is generally defined as a pressure generated by a fluid within a formation. "Lithostatic pressure" is sometimes referred to as lithostatic stress and is generally defined as a pressure within a formation equal to a weight per unit area of an overlying rock mass. "Hydrostatic pressure" is generally defined as a pressure within a formation exerted by a column of water.

"Condensable hydrocarbons" means the hydrocarbons that condense at 25° C. at one atmosphere absolute pressure. Condensable hydrocarbons may include a mixture of hydrocarbons having carbon numbers greater than 4. "Non-condensable hydrocarbons" means the hydrocarbons that do not condense at 25° C. and one atmosphere absolute pressure. Non-condensable hydrocarbons may include hydrocarbons having carbon numbers less than 5.

"Olefins" are generally defined as unsaturated hydrocarbons having one or more non-aromatic carbon-to-carbon double bonds.

"Urea" is generally described by a molecular formula of $NH_2$—CO—$NH_2$. Urea can be used as a fertilizer.

"Synthesis gas" is generally defined as a mixture including hydrogen and carbon monoxide used for synthesizing a wide range of compounds. Additional components of synthesis gas may include water, carbon dioxide, nitrogen, methane and other gases. Synthesis gas may be generated by a variety of processes and feedstocks.

"Reforming" is generally defined as the reaction of hydrocarbons (such as methane or naphtha) with steam to produce CO and $H_2$ as major products. Generally it is conducted in the presence of a catalyst although it can be performed thermally without the presence of a catalyst.

"Sequestration" generally refers to storing a gas that is a by-product of a process rather than venting the gas to the atmosphere.

The term "dipping" is generally defined as sloping downward or inclining from a plane parallel to the earth's surface, assuming the plane is flat (i.e., a "horizontal" plane). A "dip" is generally defined as an angle that a stratum or similar feature may make with a horizontal plane. A "steeply dipping" coal formation generally refers to a coal formation lying at an angle of at least 20° from a horizontal plane. As used herein, "down dip" generally refers to downward along a direction parallel to a dip in a formation. As used herein. "up dip" generally refers to upward along a direction parallel to a dip of a formation. "Strike" refers to the course or bearing of hydrocarbon material that is normal to the direction of the dip.

The term "subsidence" is generally defined as downward movement of a portion of a formation relative to an initial elevation of the surface.

"Thickness" of a layer refers to the thickness of a cross-section of a layer, wherein the cross-section is normal to a face of the layer.

"Coring" is generally defined as a process that generally includes drilling a hole into a formation and removing a substantially solid mass of the formation from the hole.

A "surface unit" is generally defined as an ex situ treatment unit.

"Middle distillates" generally refers to hydrocarbon mixtures with a boiling point range that may correspond substantially with that of kerosene and gas oil fractions obtained in a conventional atmospheric distillation of crude oil material. The middle distillate boiling point range may include temperatures between about 150° C. and about 360° C., with a fraction boiling point between about 200° C. and about 360° C. Middle distillates may be referred to as gas oil.

A "boiling point cut" is generally defined as a hydrocarbon liquid fraction that may be separated from hydrocarbon liquids when the hydrocarbon liquids are heated to a boiling point range of the fraction.

The term "selected mobilized section" refers to a section of a relatively permeable formation that is at an average temperature within a mobilization temperature range. The term "selected pyrolyzation section" refers to a section of a relatively permeable formation that is at an average temperature within a pyrolyzation temperature range.

"Enriched air" generally refers to air having a larger mole fraction of oxygen than air in the atmosphere. Enrichment of air is typically done to increase its combustion-supporting ability.

The phrase "off peak" times generally refers to times of operation where utility energy is less commonly used and, therefore, less expensive.

"Thermal fracture" refers to fractures created in a formation caused by expansion or contraction of a formation and/or fluids within the formation, which is in turn caused by increasing/decreasing the temperature of the formation and/or fluids within the formation, and/or by increasing/decreasing a pressure of fluids within the formation due to heating.

Hydrocarbons in coal formations may be treated in various ways to produce many different products. In certain embodiments such formations may be treated in stages. FIG. 1 illustrates several stages of heating a coal formation. FIG. 1 also depicts an example of yield (barrels of oil equivalent per ton) (y axis) of formation fluids from a coal formation versus temperature (° C.) (x axis) of the formation.

Desorption of methane and vaporization of water occurs during stage 1 heating in FIG. 1. For example, when a coal formation is initially heated, hydrocarbons in the formation may desorb adsorbed methane. The desorbed methane may be produced from the formation. If the coal formation is heated further, water within the coal formation may be vaporized. In addition, the vaporized water may be produced from the formation. Heating of the formation through stage 1 is in many instances preferably performed as quickly as possible.

After stage 1 heating, the formation may be heated further such that a temperature within the formation reaches (at least) an initial pyrolyzation temperature (e.g., the temperature at the lower end of the temperature range shown as stage 2). A pyrolysis temperature range may vary depending on types of hydrocarbons within the formation. For example, a pyrolysis temperature range may include temperatures between about 250° C. and about 900° C. In an alternative embodiment, a pyrolysis temperature range may include temperatures between about 270° C. to about 400° C. Hydrocarbons within the formation may be pyrolyzed throughout stage 2.

Formation fluids including pyrolyzation fluids may be produce from the formation. The pyrolyzation fluids may include, but are not limited to, hydrocarbons, hydrogen, carbon dioxide, carbon monoxide, hydrogen sulfide, ammonia, nitrogen, water and mixtures thereof. As the temperature of the formation increases, the amount of condensable hydrocarbons in the produced formation fluid tends to decrease, and the formation will in many instances tend to produce mostly methane and hydrogen. If a coal formation is heated throughout an entire pyrolysis range, the formation may produce only small amounts of hydrogen towards an upper limit of the pyrolysis range. After all of the available hydrogen is depleted, a minimal amount of fluid production from the formation will typically occur.

After pyrolysis of hydrocarbons, a large amount of carbon and some hydrogen may still be present in the formation. A significant portion of remaining carbon in the formation can be produced from the formation in the form of synthesis gas. Synthesis gas generation may take place during stage 3 heating as shown in FIG. 1. Stage 3 may include heating a coal formation to a temperature sufficient to allow synthesis gas generation. For example, synthesis gas may be produced within a temperature range from about 400° C., to about 1200° C. The temperature of the formation when the synthesis gas generating fluid is introduced to the formation will in many instances determine the composition of synthesis gas produced within the formation. If a synthesis gas generating fluid is introduced into a formation at a temperature sufficient to allow synthesis gas generation, then synthesis gas may be generated within the formation. The generated synthesis gas may be removed from the formation. A large volume of synthesis gas may be produced during generation of synthesis gas.

Depending on the amounts of fluid produced, total energy content of fluids produced from a coal formation may in some instances stay relatively constant throughout pyrolysis and synthesis gas generation. For example, during pyrolysis, at relatively low formation temperatures, a significant portion of the produced fluid may be condensable hydrocarbons that have a high energy content. At higher pyrolysis temperatures, however, less of the formation fluid may include condensable hydrocarbons, and more non-condensable formation fluids may be produced. In this manner, energy content per unit volume of the produced fluid may decline slightly during generation of predominantly non-condensable formation fluids. During synthesis gas generation, energy content per unit volume of produced synthesis gas declines significantly compared to energy content of pyrolyzation fluid. The volume of the produced synthesis gas, however, will in many instance increase substantially, thereby compensating for the decreased energy content.

Figure 2:
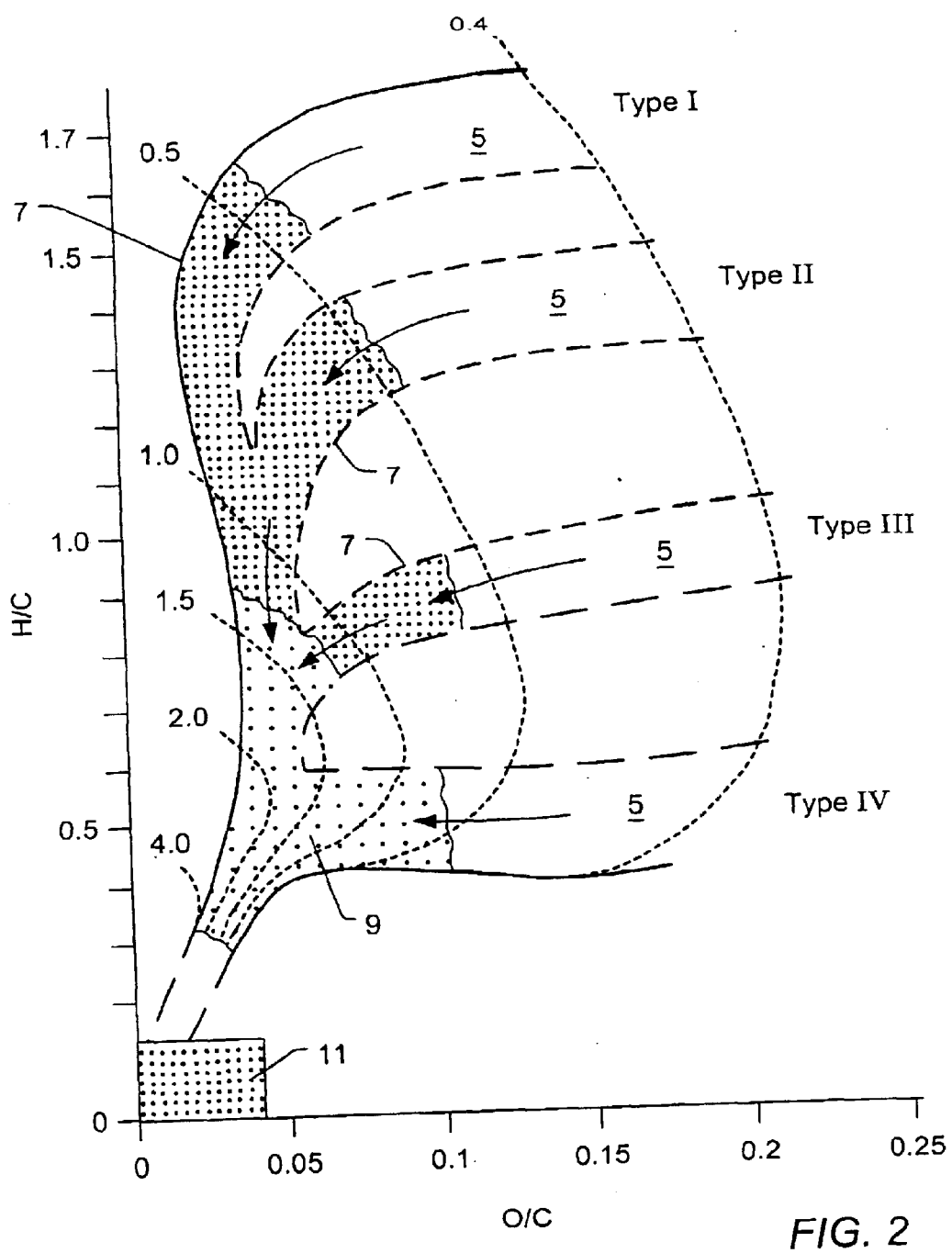
FIG. 2 depicts a diagram of properties of a coal formation.

As explained below, the van Krevelen diagram shown in FIG. 2 depicts a plot of atomic hydrogen to carbon ratio (y axis) versus atomic oxygen to carbon ratio (x axis) for various types of kerogen. This diagram shows the maturation sequence for various types of kerogen that typically occurs over geologic time due to temperature, pressure, and biochemical degradation. The maturation may be accelerated by heating in situ at a controlled rate and/or a controlled pressure.

A van Krevelen diagram may be useful for selecting a resource for practicing various embodiments described herein (see discussion below). Treating a formation containing kerogen in region 5 will in many instances produce, e.g., carbon dioxide, non-condensable hydrocarbons, hydrogen, and water, along with a relatively small amount of condensable hydrocarbons. Treating a formation containing kerogen in region 7 will in many instances produce, e.g., carbon, condensable and non-condensable hydrocarbons, carbon dioxide, hydrogen, and water. Treating a formation containing kerogen in region 9 will in many instances produce, e.g., methane and hydrogen. A formation containing kerogen in region 7, for example, may in many instances be selected for treatment because doing so will tend to produce larger quantities of valuable hydrocarbons, and lower quantities of undesirable products such as carbon dioxide and water, since the region 7 kerogen has already undergone dehydration and/or decarboxylation over geological time. In addition, region 7 kerogen can also be further treated to make other useful products (e.g., methane, hydrogen, and/or synthesis gas) as such kerogen transforms to region 9 kerogen.

If a formation containing kerogen in region 5 or 7 was selected for treatment, then treatment pursuant to certain embodiments described herein would cause such kerogen to transform during treatment (see arrows in FIG. 2) to a region having a higher number (e.g. region 5 kerogen could transform to region 7 kerogen and possibly then to region 9 kerogen, or region 7 kerogen could transform to region 9 kerogen). Thus, certain embodiments described herein cause expedited maturation of kerogen, thereby allowing production of valuable products.

If region 5 kerogen, for example, is treated, then substantial carbon dioxide may be produced due to decarboxylation of hydrocarbons in the formation. In addition, treating region 5 kerogen may also produce some hydrocarbons (e.g., primarily methane). Treating region 5 kerogen may also produce substantial amounts of water due to dehydration of kerogen in the formation. Production of such compounds from a formation may leave residual hydrocarbons relatively enriched in carbon. Oxygen content of the hydrocarbons will in many instances decrease faster than a hydrogen content of the hydrocarbons during production of such compounds. Therefore, as shown in FIG. 2, production of such compounds may result in a larger decrease in the atomic oxygen to carbon ratio than a decrease in the atomic hydrogen to carbon ratio (see region 5 arrows in FIG. 2 which depict more horizontal than vertical movement).

If region 7 kerogen is treated, then typically at least some of the hydrocarbons in the formation are pyrolyzed to produce condensable and non-condensable hydrocarbons. For example, treating region 7 kerogen may result in production of oil from hydrocarbons, as well as some carbon dioxide and water (albeit generally less carbon dioxide and water than is produced when the region 5 kerogen is treated). Therefore, the atomic hydrogen to carbon ratio of the kerogen will in many instances decrease rapidly as the kerogen in region 7 is treated. The atomic oxygen to carbon ratio of the region 7 kerogen, however, will in many instances decrease much slower than the atomic hydrogen to carbon ratio of the region 7 kerogen.

Kerogen in region 9 may be treated to generate methane and hydrogen. For example, if such kerogen was previously treated (e.g., it was previously region 7 kerogen), then after pyrolysis, longer hydrocarbon chains of the hydrocarbons may have already cracked and been produced from the formation. Carbon and hydrogen, however, may still be present in the formation.

If kerogen in region 9 were heated to a synthesis gas generating temperature and a synthesis gas generating fluid (e.g., steam) were added to the region 9 kerogen, then at least a portion of remaining hydrocarbons in the formation may be produced from the formation in the form of synthesis gas. For region 9 kerogen, the atomic hydrogen to carbon ratio and the atomic oxygen to carbon ratio in the hydrocarbons may significantly decrease as the temperature rises. In this manner, hydrocarbons in the formation may be transformed into relatively pure carbon in region 9. Heating region 9 kerogen to still higher temperatures will tend to transform such kerogen into graphite 11.

A coal formation may have a number of properties that will depend on, for example, a composition of at least some of the hydrocarbons within the formation. Such properties tend to affect the composition and amount of products that are produced from a coal formation. Therefore, properties of a coal formation can be used to determine if and/or how a coal formation could optimally be treated.

Coal formations typically contain kerogen. Kerogen is composed of organic matter that has been transformed due to a maturation process. The maturation process may include two stages: a biochemical stage and a geochemical stage. The biochemical stage typically involves degradation of organic material by both aerobic and anaerobic organisms. The geochemical stage typically involves conversion of organic matter due to temperature changes and significant pressures. During maturation, oil and gas may be produced as the organic matter of the kerogen is transformed.

The van Krevelen diagram shown in FIG. 2 classifies various natural deposits of kerogen. For example, kerogen may be classified into four distinct groups: type I, type II, type III, and type IV, which are illustrated by the four branches of the van Krevelen diagram. This drawing shows the maturation sequence for kerogen, which typically occurs over geological time due to temperature and pressure. The types depend upon precursor materials of the kerogen. The precursor materials transform over time into macerals, which are microscopic structures that have different structures and properties based on the precursor materials from which they are derived. Oil shale may be described as a kerogen type I or type II and may primarily contain macerals from the liptinite group. Type II kerogen may develop from organic matter that was deposited in marine environments.

Type III kerogen may generally include vitrinite macerals. Vitrinite is derived from cell walls and/or woody tissues (e.g., stems, branches, leaves and roots of plants). Type III kerogen may be present in most humic coals. Type III kerogen may develop from organic matter that was deposited in swamps. Type IV kerogen includes the inertinite maceral group. This group is composed of plant material such as leaves, bark and stems that have undergone oxidation during the early peat stages of burial diagenesis. It is chemically similar to vitrinite but has a high carbon and low hydrogen content. Thus, it is considered inert.

The dashed lines in FIG. 2 correspond to vitrinite reflectance. The vitrinite reflectance is a measure of maturation. As kerogen undergoes maturation, the composition of the kerogen usually changes. For example, as kerogen undergoes maturation, volatile matter of kerogen tends to decrease. Rank classifications of kerogen indicate the level to which kerogen has matured. For example, as kerogen undergoes maturation, the rank of kerogen increases. Therefore, as rank increases, the volatile matter of kerogen tends to decrease. In addition, the moisture content of kerogen generally decreases as the rank increases. At higher ranks, however, the moisture content may become relatively constant. For example, higher rank kerogens that have undergone significant maturation, such as semi-anthracite or anthracite coal, tend to have a higher carbon content and a lower volatile matter content than lower rank kerogens such as lignite. For example, rank stages of coal formations include the following classifications, which are listed in order of increasing rank and maturity for type III kerogen: wood, peat, lignite, sub-bituminous coal, high volatile bituminous coal, medium volatile bituminous coal, low volatile bituminous coal, semi-anthracite, and anthracite. In addition, as rank increases, kerogen tends to exhibit an increase in aromatic nature.

Coal formations may be selected for in situ treatment based on properties of at least a portion of the formation. For example, a formation may be selected based on richness, thickness, and depth (i.e., thickness of overburden) of the formation. In addition, a formation may be selected that will have relatively high quality fluids produced from the formation. In certain embodiments the quality of the fluids to be produced may be assessed in advance of treatment, thereby generating significant cost savings since only more optimal formations will be selected for treatment. Properties that may be used to assess hydrocarbons in a coal formation include, but are not limited to, an amount of hydrocarbon liquids that tend to be produced from the hydrocarbons, a likely API gravity of the produced hydrocarbon liquids, an amount of hydrocarbon gas that tend to be produced from the hydrocarbons and/or an amount of carbon dioxide and water that tend to be produced from the hydrocarbons.

Another property that may be used to assess the quality of fluids produced from certain coal formations is vitrinite reflectance. Coal formations that include kerogen can typically be assessed/selected for treatment based on a vitrinite reflectance of the kerogen. Vitrinite reflectance is often related to a hydrogen to carbon atomic ratio of a kerogen and an oxygen to carbon atomic ratio of the kerogen, as shown by the dashed lines in FIG. 2. For example, a van Krevelen diagram may be useful in selecting a resource for an in situ conversion process.

Vitrinite reflectance of a kerogen in a coal formation tends to indicate which fluids may be produced from a formation upon heating. For example, a vitrinite reflectance of approximately 0.5% to approximately 1.5% tends to indicate a kerogen that, upon heating, will produce fluids as described in region 7 above. Therefore, if a coal formation having such kerogen is heated, a significant amount (e.g., majority) of the fluid produced by such heating will often include oil and other such hydrocarbon fluids. In addition, a vitrinite reflectance of approximately 1.5% to 3.0% may indicate a kerogen in region 9 as described above. If a coal formation having such kerogen is heated, a significant amount (e.g., majority) of the fluid produced by such heating may include methane and hydrogen (and synthesis gas, if, for example, the temperature is sufficiently high and steam is injected). In an embodiment, at least a portion of a coal formation selected for treatment in situ has a vitrinite reflectance in a range between about 0.2% and about 3.0%. Alternatively, at least a portion of a coal formation selected for treatment has a vitrinite reflectance from about 0.5% to about 2.0%, and, in some circumstances, the vitrinite reflectance may range from about 0.5% to 1.0%. Such ranges of vitrinite reflectance tend to indicate that relatively higher quality formation fluids will be produced from the formation.

In an embodiment, a coal formation may be selected for treatment based on a hydrogen content within the hydrocarbons in the formation. For example, a method, of treating a coal formation may include selecting a portion of the coal formation for treatment having hydrocarbons with a hydrogen content greater than about 3 weight %, 3.5 weight %, or 4 weight % when measured on a dry, ash-free basis. In addition, a selected section of a coal formation may include hydrocarbons with an atomic hydrogen to carbon ratio that falls within a range from about 0.5 to about 2, and in many instances from about 0.70 to about 1.65.

Hydrogen content of a coal formation may significantly affect a composition of hydrocarbon fluids produced from a formation. For example, pyrolysis of at least some of the hydrocarbons within the heated portion may generate hydrocarbon fluids that may include a double bond or a radical. Hydrogen within the formation may reduce the double bond to a single bond. In this manner, reaction of generated hydrocarbon fluids with each other and/or with additional components in the formation may be substantially inhibited. For example, reduction of a double bond of the generated hydrocarbon fluids to a single bond may reduce polymerization of the generated hydrocarbons. Such polymerization tends to reduce the amount of fluids produced.

In addition, hydrogen within the formation may also neutralize radicals in the generated hydrocarbon fluids. In this manner, hydrogen present in the formation may substantially inhibit reaction of hydrocarbon fragments by transforming the hydrocarbon fragments into relatively short chain hydrocarbon fluids. The hydrocarbon fluids may enter a vapor phase and may be produced from the formation. The increase in the hydrocarbon fluids in the vapor phase may significantly reduce a potential for producing less desirable products within the selected section of the formation.

It is believed that if too little hydrogen is present in the formation, then the amount and quality of the produced fluids will be negatively affected. If too little hydrogen is naturally present, then in some embodiments hydrogen or other reducing fluids may be added to the formation.

When heating a portion of a coal formation, oxygen within the portion may form carbon dioxide. It may be desirable to reduce the production of carbon dioxide and other oxides. In an embodiment, production of carbon dioxide may be reduced by selecting and treating a portion of a coal formation having a vitrinite reflectance of greater than about 0.5%. In addition, an amount of carbon dioxide produced from a formation may vary depending on, for example, an oxygen content of a treated portion of the coal formation. Certain embodiments may thus include selecting and treating a portion of the formation having a kerogen with an atomic oxygen weight percentage of less than about 20%, 15%, and/or 10%. In addition, certain embodiments may include selecting and processing a formation containing kerogen with an atomic oxygen to carbon ratio of less than about 0.15. Alternatively, at least some of the hydrocarbons in a portion of a formation selected for treatment may have an atomic oxygen to carbon ratio of about 0.03 to about 0.12. In this manner, production of carbon dioxide and other oxides from an in situ conversion process for coal may be reduced.

Heating a coal formation may include providing a large amount of energy to heat sources located within the formation. Coal formations may contain water. Water present in the coal formation will tend to further increase the amount of energy required to heat a coal formation. In this manner, water tends to hinder efficient heating of the formation. For example, a large amount of energy may be required to evaporate water from a coal formation. Thus, an initial rate of temperature increase may be reduced by the presence of water in the formation. Therefore, excessive amounts of heat and/or time may be required to heat a formation having a high moisture content to a temperature sufficient to allow pyrolysis of at least some of the hydrocarbons in the formation. In an embodiment, an in situ conversion process for coal may include selecting a portion of the coal formation for treatment having an initial moisture content of less than about 15% by weight (in some embodiments dewatering wells may be used to reduce the water content of the formation). Alternatively, an in situ conversion process for coal may include selecting a portion of the coal formation for treatment having an initial moisture content of less than about 10% by weight.

In an embodiment, a coal formation may be selected for treatment based on additional factors such as a thickness of coal layer within the formation and assessed liquid production content. For example, a coal formation may include multiple layers. Such layers may include coal layers, and also layers that may be coal free or have substantially low amounts of coal. Each of the coal layers may have a thickness that may vary depending on, for example, conditions under which the coal layer was formed. Therefore, a coal formation will typically be selected for treatment if that formation includes at least one coal layer having a thickness sufficient for economical production of formation fluids. A formation may also be chosen if the thickness of several layers that are closely spaced together is sufficient for economical production of formation fluids.

In addition, a layer of a coal formation may be selected for treatment based on a thickness of the coal layer, and/or a total thickness of coal layers in a formation. For example, an in situ conversion process for coal may include selecting and treating a layer of a coal formation having a thickness of greater than about 2 m, 3 m, and/or 5 m. In this manner, heat losses (as a fraction of total injected heat) to layers formed above and below a layer of hydrocarbons may be less than such heat losses from a thin layer of coal. A process as described herein, however, may also include selecting and treating layers that may include layers substantially free of coal and thin layers of coal.

Each of the coal layers may also have a potential formation fluid yield that may vary depending on, for example, conditions under which the coal layer was formed, an amount of hydrocarbons in the layer, and/or a composition of hydrocarbons in the layer. A potential formation fluid yield may be measured, for example, by the Fischer Assay. The Fischer Assay is a standard method which involves heating a sample of a coal layer to approximately 500° C. in one hour, collecting products produced from the heated sample, and quantifying the amount of products produced. A sample of a coal layer may be obtained from a coal formation by a method such as coring or any other sample retrieval method.

Figure 3:
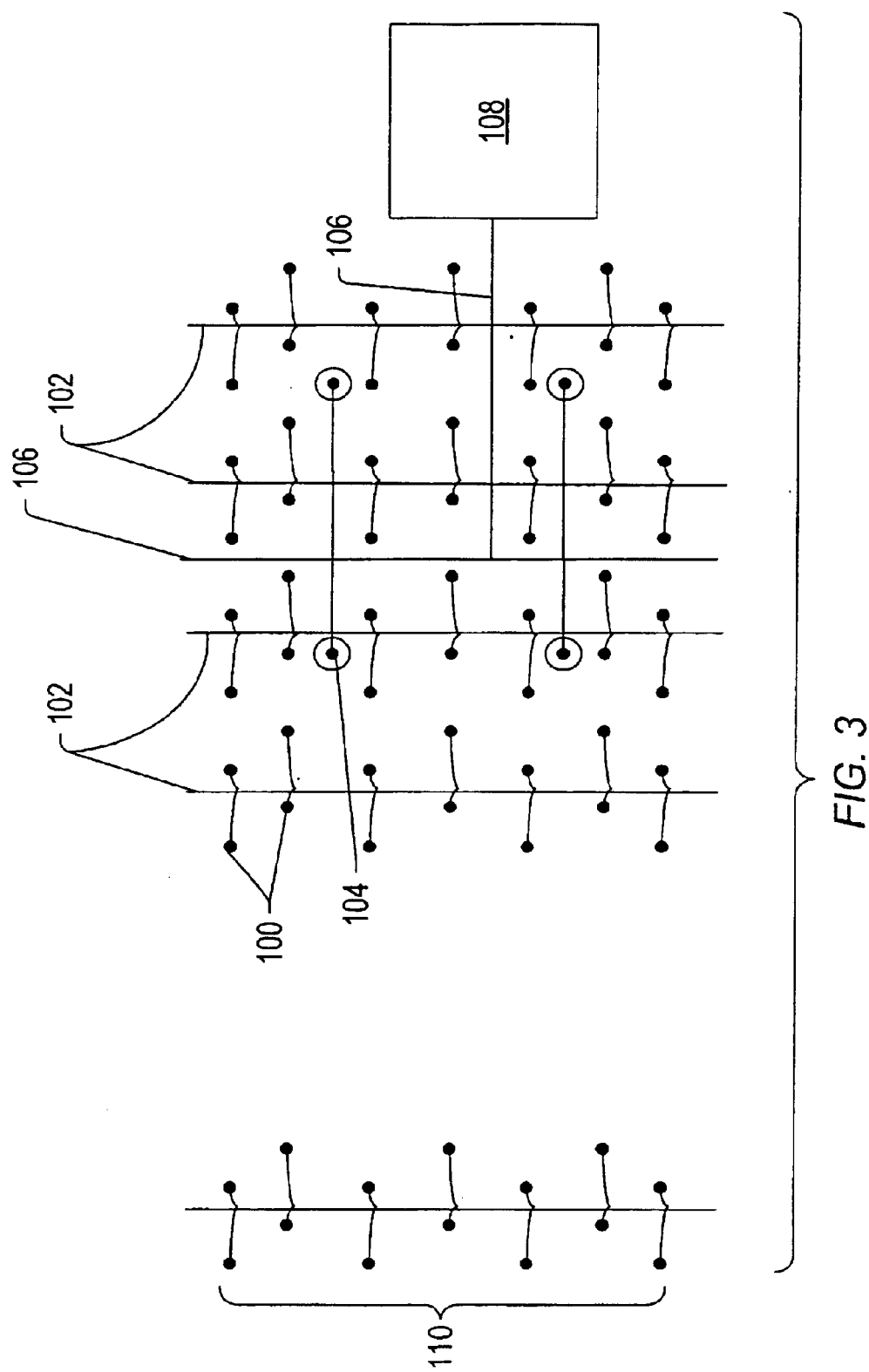
FIG. 3 depicts an embodiment of a heat source pattern.

FIG. 3 shows a schematic view of an embodiment of a portion of an in situ conversion system for treating a coal formation. Heat sources 100 may be placed within at least a portion of the coal formation. Heat sources 100 may include, for example, electrical heaters such as insulated conductors, conductor-in-conduit heaters, surface burners, flameless distributed combustors, and/or natural distributed combustors. Heat sources 100 may also include other types of heaters. Heat sources 100 are configured to provide heat to at least a portion of a coal formation. Energy may be supplied to the heat sources 100 through supply lines 102. The supply lines may be structurally different depending on the type of heat source or heat sources being used to heat the formation. Supply lines for heat sources may transmit electricity for electrical heaters, may transport fuel for combustors, or may transport heat exchange fluid that is circulated within the formation.

Production wells 104 may be used to remove formation fluid from the formation. Formation fluid produced from the production wells 104 may be transported through collection piping 106 to treatment facilities 108. Formation fluids may also be produced from heat sources 100. For example, fluid may be produced from heat sources 100 to control pressure within the formation adjacent to the heat sources. Fluid produced from heat sources 100 may be transported through tubing or piping to the collection piping 106 or the produced fluid may be transported through tubing or piping directly to the treatment facilities 108. The treatment facilities 108 may include separation units, reaction units, upgrading units, fuel cells, turbines, storage vessels, and other systems and units for processing produced formation fluids.

An in situ conversion system for treating coal may include dewatering wells 110 (wells shown with reference number 110 may, in some embodiments, be capture and/or isolation wells). Dewatering wells 110 or vacuum wells may be configured to remove and inhibit liquid water from entering a portion of a coal formation to be heated, or to a formation being heated. A plurality of water wells may surround all or a portion of a formation to be heated. In the embodiment depicted in FIG. 3, the dewatering wells 110 are shown extending only along one side of heat sources 100, but dewatering wells typically encircle all heat sources 100 used, or to be used, to heat the formation.

Dewatering wells 110 may be placed in one or more rings surrounding selected portions of the formation. New dewatering wells may need to be installed as an area being treated by the in situ conversion process expands. An outermost row of dewatering wells may inhibit a significant amount of water from flowing into the portion of formation that is heated or to be heated. Water produced from the outermost row of dewatering wells should be substantially clean, and may require little or no treatment before being released. An innermost row of dewatering wells may inhibit water that bypasses the outermost row from flowing into the portion of formation that is heated or to be heated. The innermost row of dewatering wells may also inhibit outward migration of vapor from a heated portion of the formation into surrounding portions of the formation. Water produced by the innermost row of dewatering wells may include some hydrocarbons. The water may need to be treated before being released. Alternately, water with hydrocarbons may be stored and used to produce synthesis gas from a portion of the formation during a synthesis gas phase of the in situ conversion process. The dewatering wells may reduce heat loss to surrounding portions of the formation, may increase production of vapors from the heated portion, and may inhibit contamination of a water table proximate the heated portion of the formation.

In an alternative embodiment, a fluid (e.g., liquid or gas) may be injected in the innermost row of wells, allowing a selected pressure to be maintained in or about the pyrolysis zone. Additionally, this fluid may act as an isolation barrier between the outermost wells and the pyrolysis fluids, thereby improving the efficiency of the dewatering wells.

The coal to be treated may be located under a large area. The in situ conversion system may be used to treat small portions of the formation, and other sections of the formation may be treated as time progresses. In an embodiment of a system for treating a coal formation, a field layout for 24 years of development may be divided into 24 individual plots that represent individual drilling years. Each plot may include 120 "tiles" (repeating matrix patterns) wherein each tile is made of 6 rows by 20 columns. Each tile may include 1 production well and 12 or 18 heater wells. The heater wells may be placed in an equilateral triangle pattern with, for example, a well spacing of about 12 m. Production wells may be located in centers of equilateral triangles of heater wells, or the production wells may be located approximately at a midpoint between two adjacent heater wells.

In certain embodiments, heat sources will be placed within a heater well formed within a coal formation. The heater well may include an opening through an overburden of the formation and into at least one section of the formation. Alternatively, as shown in FIG. 3a, heater well 224 may include an opening in formation 222 that may have a shape substantially similar to a helix or spiral. A spiral configuration for a heater well may in some embodiments increase the transfer of heat from the heat source and/or allow the heat source to expand when heated, without buckling or other modes of failure. In some embodiments, such a heater well may also include a substantially straight section through overburden 220. Use of a straight heater well through the overburden may decrease heat loss to the overburden.

In an alternative embodiment, as shown in FIG. 3b, heat sources may be placed into heater well 224 that may include an opening in formation 222 having a shape substantially similar to a "U" (the "legs" of the "U" may be wider or more narrow depending on the embodiments used). First portion 226 and third portion 228 of heater well 224 may be arranged substantially perpendicular to an upper surface of formation 222. In addition, the first and the third portion of the heater well may extend substantially vertically through overburden 220. Second portion 230 of heater well 224 may be substantially parallel to the upper surface of the formation.

In addition, multiple heat sources (e.g., 2, 3, 4, 5, 10 heat sources or more) may extend from a heater well in some situations. For example, as shown in FIG. 3c, heat sources 232, 234, and 236 may extend through overburden 220 into formation 222 from heater well 224. Such situations may occur when surface considerations (e.g., aesthetics, surface land use concerns, and/or unfavorable soil conditions near the surface) make it desirable to concentrate the surface facilities in fewer locations. For example, in areas where the soil is frozen and/or marshy it may be more cost-effective to have surface facilities located in a more centralized location.

In certain embodiments a first portion of a heater well may extend from a surface of the ground, through an overburden, and into a coal formation. A second portion of the heater well may include one or more heater wells in the coal formation. The one or more heater wells may be disposed within the coal formation at various angles. In some embodiments, at least one of the heater wells may be disposed substantially parallel to a boundary of the coal formation. In alternate embodiments, at least one of the heater wells may be substantially perpendicular to the coal formation. In addition, one of the one or more heater wells may be positioned at an angle between perpendicular and parallel to a layer in the formation.

Figure 4:
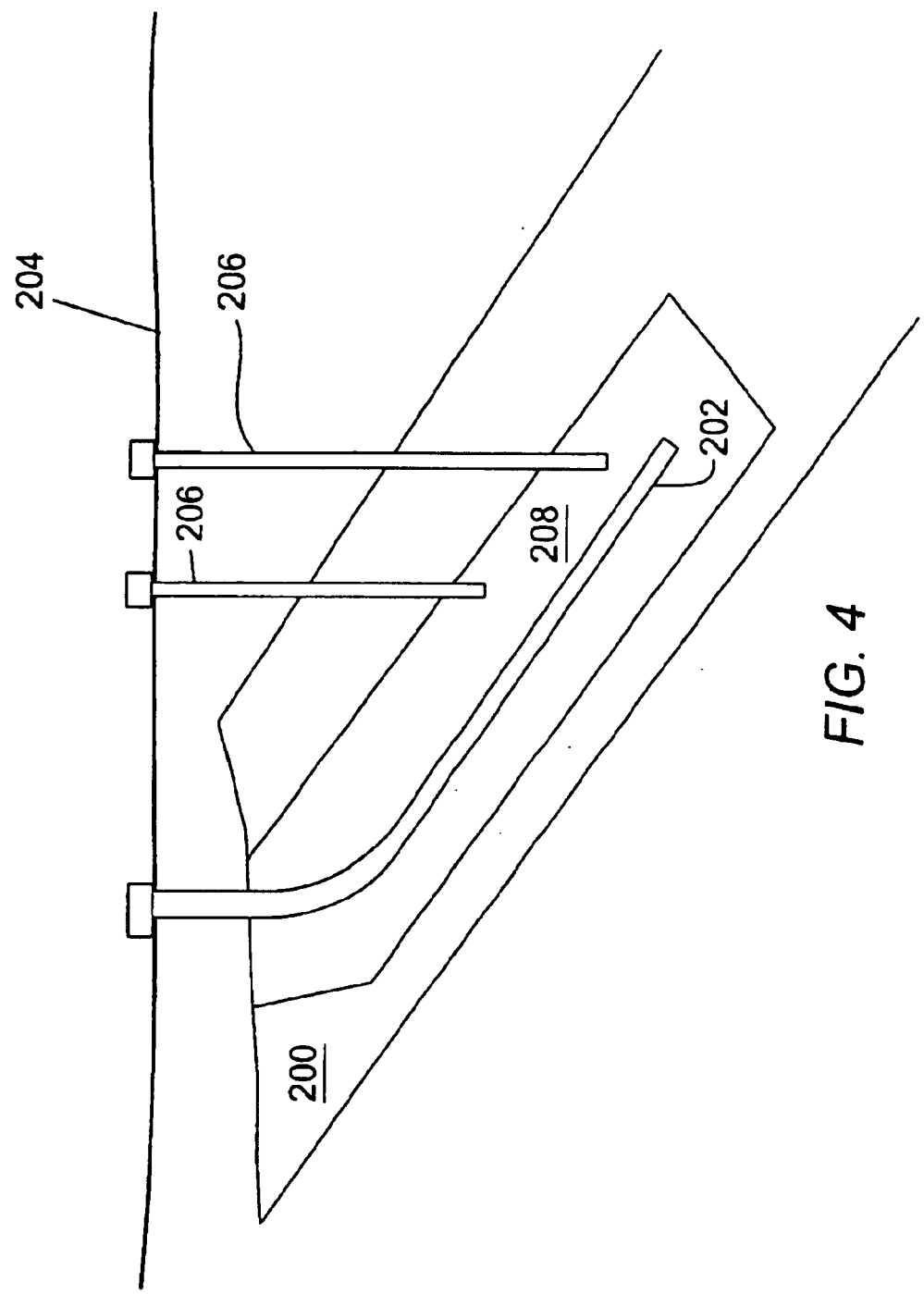
FIG. 4 depicts an embodiment of heater wells located in a coal formation.

FIG. 4 illustrates an embodiment of a coal formation 200 that may be at a substantially near-horizontal angle with respect to an upper surface of the ground 204. An angle of coal formation 200, however, may vary. For example, coal formation 200 may be steeply dipping. Economically viable production of a steeply dipping coal formation may not be possible using presently available mining methods. A relatively steeply dipping coal formation, however, may be subjected to an in situ conversion process as described herein. For example, a single set of gas producing wells may be disposed near a top of a steeply dipping coal formation. Such a formation may be heated by heating a portion of the formation proximate a top of the coal formation and sequentially heating lower sections of the coal formation. Gases may be produced from the coal formation by transporting gases through the previously pyrolyzed hydrocarbons with minimal pressure loss.

In an embodiment, an in situ conversion process for coal may include providing heat to at least a portion of a coal formation that dips in sections. For example, a portion of the formation may include a dip that may include a minimum depth of the portion. A production well may be located in the portion of the coal formation proximate the minimum depth. An additional production well may not be required in the portion. For example, as heat transfers through the coal formation and at least some hydrocarbons in the portion pyrolyze, pyrolyzation fluids formed in the portion may travel through pyrolyzed sections of the coal formation to the production well. As described herein, increased permeability due to in situ treatment of a coal formation may increase transfer of vapors through the treated portion of the formation. Therefore, a number of production wells required to produce a mixture from the formation may be reduced. Reducing the number of production wells required for production may increase economic viability of an in situ conversion process.

In steeply dipping formations, directional drilling may be used to form an opening for a heater well in the formation. Directional drilling may include drilling an opening in which the route/course of the opening may be planned before drilling. Such an opening may usually be drilled with rotary equipment. In directional drilling, a route/course of an opening may be controlled by deflection wedges, etc.

Drilling heater well 202 may also include drilling an opening in the formation with a drill equipped with a steerable motor and an accelerometer that may be configured to follow coal formation 200. For example, a steerable motor may be configured to maintain a substantially constant distance between heater well 202 and a boundary of coal formation 200 throughout drilling of the opening. Drilling of heater well 202 with the steerable motor and the accelerometer may be relatively economical.

Alternatively, geosteered drilling may be used to drill heater well 202 into coal formation 200. Geosteered drilling may include determining or estimating a distance from an edge of coal formation 200 to heater well 202 with a sensor. The sensor may include, but may not be limited to, sensors that may be configured to determine a distance from an edge of coal formation 200 to heater well 202. In addition, such a sensor may be configured to determine and monitor a variation in a characteristic of the coal formation 200. Such sensors may include, but may not be limited to, sensors that may be configured to measure a characteristic of a hydrocarbon seam using resistance, gamma rays, acoustic pulses, and/or other devices. Geosteered drilling may also include forming an opening for a heater well with a drilling apparatus that may include a steerable motor. The motor may be controlled to maintain a predetermined distance from an edge of a coal formation. In an additional embodiment, drilling of a heater well or any other well in a formation may also include sonic drilling.

Figure 5:
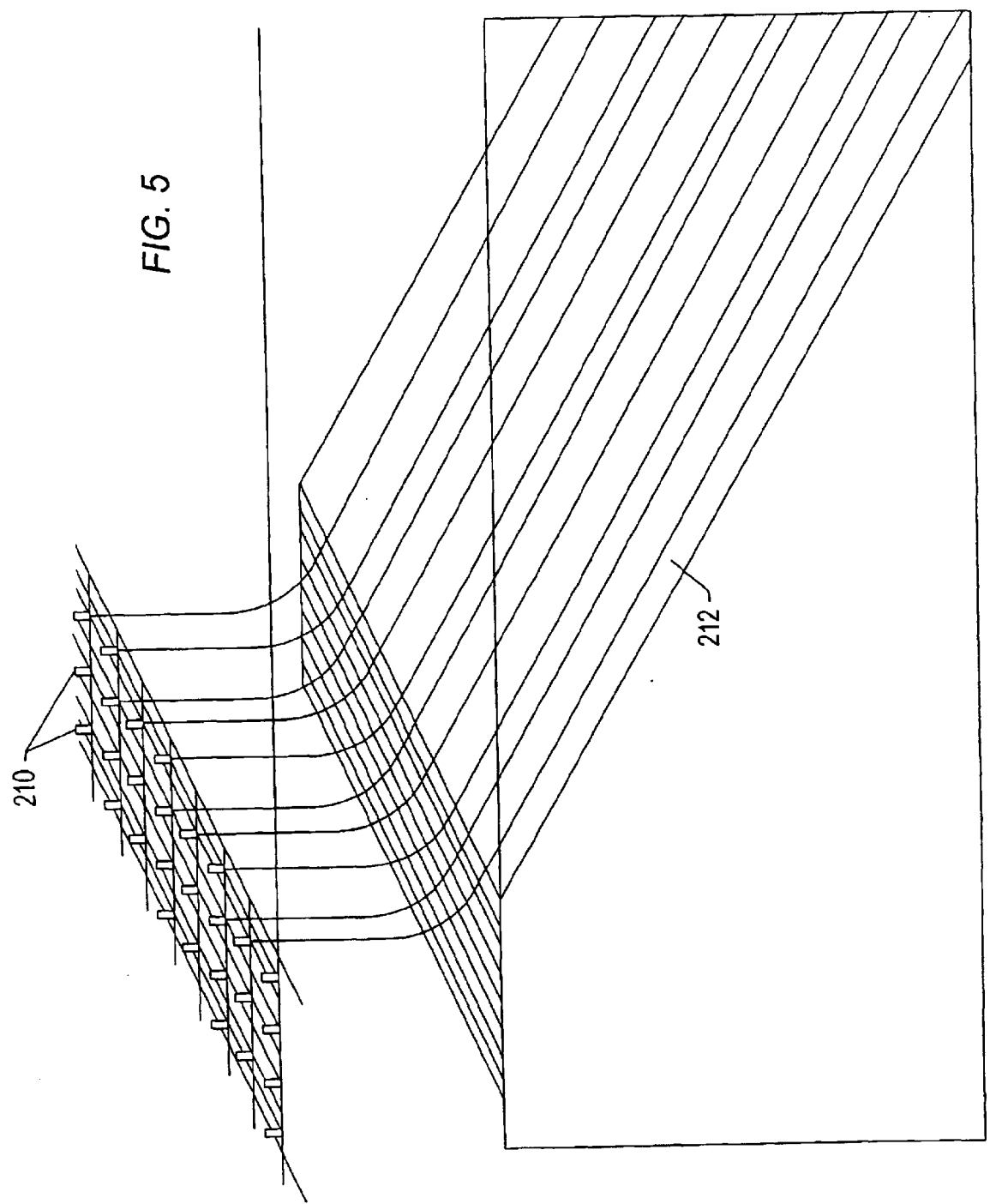
FIG. 5 depicts an embodiment of a pattern of heater wells in a coal formation.

FIG. 5 illustrates an embodiment of a plurality of heater wells 210 formed in coal formation 212. Coal formation 212 may be a steeply dipping formation. One or more of the heater wells 210 may be formed in the formation such that two or more of the heater wells are substantially parallel to each other, and/or such that at least one heater well is substantially parallel to coal formation 212. For example, one or more of the heater wells 210 may be formed in coal formation 212 by a magnetic steering method. An example of a magnetic steering method is illustrated in U.S. Pat. No. 5,676,212 to Kuckes, which is incorporated by reference as if fully set forth herein. Magnetic steering may include drilling heater well 210 parallel to an adjacent heater well. The adjacent well may have been previously drilled. In addition, magnetic steering may include directing the drilling by sensing and/or determining a magnetic field produced in an adjacent heater well. For example, the magnetic field may be produced in the adjacent heater well by flowing a current through an insulated current-carrying wireline disposed in the adjacent heater well. Alternatively, one or more of the heater wells 210 may be formed by a method as is otherwise described herein. A spacing between heater wells 210 may be determined according to any of the embodiments described herein.

Figure 6:
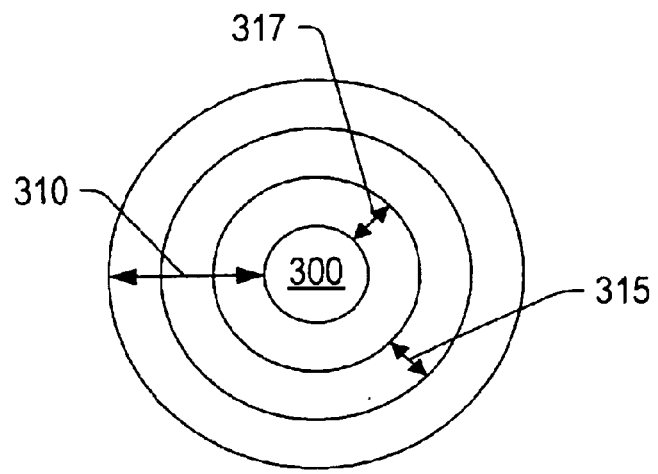
FIG. 6 depicts an embodiment of a heated portion of a coal formation.

In some embodiments, heated portion 310 may extend substantially radially from heat source 300, as shown in FIG. 6. For example, a width of heated portion 310, in a direction extending radially from heat source 300, may be about 0 m to about 10 m . A width of heated portion 310 may vary, however, depending upon, for example, heat provided by heat source 300 and the characteristics of the formation. Heat provided by heat source 300 will typically transfer through the heated portion to create a temperature gradient within the heated portion. For example, a temperature proximate the heater well will generally be higher than a temperature proximate an outer lateral boundary of the heated portion. A temperature gradient within the heated portion, however, may vary within the heated portion depending on, for example, the thermal conductivity of the formation.

As heat transfers through heated portion 310 of the coal formation, a temperature within at least a section of the heated portion may be within a pyrolysis temperature range. In this manner, as the heat transfers away from the heat source, a front at which pyrolysis occurs will in many instances travel outward from the heat source. For example, heat from the heat source may be allowed to transfer into a selected section of the heated portion such that heat from the heat source pyrolyzes at least some of the hydrocarbons within the selected section. As such, pyrolysis may occur within selected section 315 of the heated portion, and pyrolyzation fluids will be generated from hydrocarbons in the selected section. An inner lateral boundary of selected section 315 may be radially spaced from the heat source. For example, an inner lateral boundary of selected section 315 may be radially spaced from the heat source by about 0 m to about 1 m. In addition, selected section 315 may have a width radially extending from the inner lateral boundary of the selected section. For example, a width of the selected section may be at least approximately 1.5 m, at least approximately 2.4 m, or even at least approximately 3.0 m. A width of the selected section, however, may also be greater than approximately 1.5 m and less than approximately 10 m.

After pyrolyzation of hydrocarbons in a portion of the selected section is complete, a section of spent hydrocarbons 317 may be generated proximate to the heat source.

Figure 7:
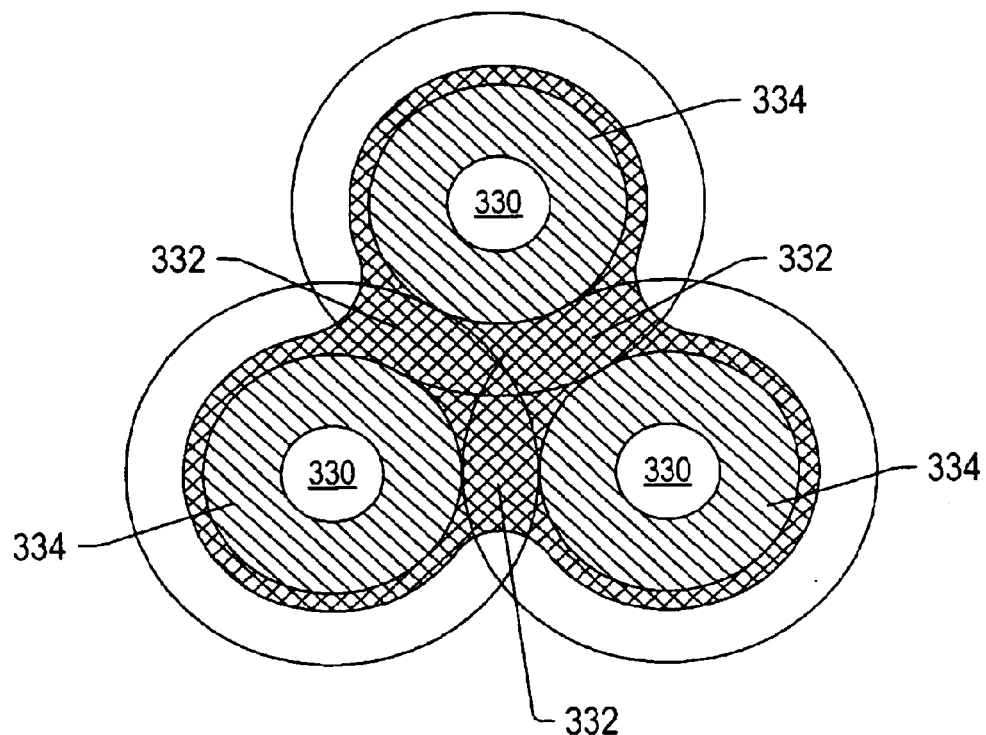
FIG. 7 depicts an embodiment of superposition of heat in a coal formation.

In some embodiments, a plurality of heated portions may exist within a unit of heat sources. A unit of heat sources refers to a minimal number of heat sources that form a template that may be repeated to create a pattern of heat sources within the formation. The heat sources may be located within the formation such that superposition (overlapping) of heat produced from the heat sources is effective. For example, as illustrated in FIG. 7, transfer of heat from two or more heat sources 330 results in superposition of heat 332 to be effective within an area defined by the unit of heat sources. Superposition may also be effective within an interior of a region defined by two, three, four, five, six, or more heat sources. For example, an area in which superposition of heat 332 is effective includes an area to which significant heat is transferred by two or more heat sources of the unit of heat sources. An area in which superposition of heat is effective may vary depending upon, for example, the spacings between heat sources.

Superposition of heat may increase a temperature in at least a portion of the formation to a temperature sufficient for pyrolysis of hydrocarbon within the portion. In this manner, superposition of heat 332 tends to increase the amount of hydrocarbons in a formation that may be pyrolyzed. As such, a plurality of areas that are within a pyrolysis temperature range may exist within the unit of heat sources. The selected sections 334 may include areas in a pyrolysis temperature range due to heat transfer from only one heat source, as well as areas in a pyrolysis temperature range due to superposition of heat.

In addition, a pattern of heat sources will often include a plurality of units of heat sources. There will typically be a plurality of heated portions, as well as selected sections within the pattern of heat sources. The plurality of heated portions and selected sections may be configured as described herein. Superposition of heat within a pattern of heat sources may decrease the time necessary to reach pyrolysis temperatures within the multitude of heated portions. Superposition of heat may allow for a relatively large spacing between adjacent heat sources, which may in turn provide a relatively slow rate of heating of the coal formation. In certain embodiments, superposition of heat will also generate fluids substantially uniformly from a heated portion of a coal formation.

In certain embodiments, a majority of pyrolysis fluids may be produced when the selected section is within a range from about 0 m to about 25 m from a heat source.

As shown in FIG. 3, in addition to heat sources 100, one or more production wells 104 will typically be disposed within the portion of the coal formation. Formation fluids may be produced through production well 104. Production well 104 may also include a heat source. In this manner, the formation fluids may be maintained at a selected temperature throughout production, thereby allowing more or all of the formation fluids to be produced as vapors. Therefore high temperature pumping of liquids from the production well may be reduced or substantially eliminated, which in turn decreases production costs. Providing heating at or through the production well tends to: (1) inhibit condensation and/or refluxing of production fluid when such production fluid is moving in the production well proximate to the overburden, (2) increase heat input into the formation, and/or (3) increase formation permeability at or proximate the production well.

Because permeability and/or porosity increases in the heated formation, produced vapors may flow considerable distances through the formation with relatively little pressure differential. Therefore, in some embodiments, production wells may be provided near an upper surface of the formation. Increases in permeability may result from a reduction of mass of the heated portion due to vaporization of water, removal of hydrocarbons, and/or creation of fractures. In this manner, fluids may more easily flow through the heated portion.

For example, fluid generated within a coal formation may move a considerable distance through the coal formation as a vapor. Such a considerable distance may include, for example, about 50 m to about 1000 m. The vapor may have a relatively small pressure drop across the considerable distance due to the permeability of the heated portion of the formation. In addition, due to such permeability, a production well may only need to be provided in every other unit of heat sources or every third, fourth, fifth, sixth units of heat sources. Furthermore, as shown in FIG. 4, production wells 206 may extend through a coal formation near the top of heated portion 208.

Embodiments of production well 102 may include valves configured to alter, maintain, and/or control a pressure of at least a portion of the formation. Production wells may be cased wells that may have production screens or perforated casings adjacent to production zones. In addition, the production wells may be surrounded by sand, gravel or other packing material adjacent to production zones. Furthermore, production wells 102 may be coupled to treatment section 108, as shown in FIG. 3. Treatment section 108 may include any of the surface facilities as described herein.

In addition, water pumping wells or vacuum wells may be configured to remove liquid water from a portion of a coal formation to be heated. Water removed from the formation may be used on the surface, and/or monitored for water quality. For example, a plurality of water wells may surround all or a portion of a formation to be heated. The plurality of water wells may be configured in one or more rings surrounding the portion of the formation. An outermost row of water wells may inhibit a significant amount of water from flowing into the portion to be heated. An innermost row of water wells may inhibit water that bypasses the outermost row from flowing into the portion to be heated. The innermost row of water wells may also inhibit outward migration of vapor from a heated portion of the formation into surrounding portions of the formation. In this manner, the water wells may reduce heat loss to surrounding portions of the formation, may increase production of vapors from the heated portion, and may inhibit contamination of a water table proximate to the heated portion of the formation. In some embodiments pressure differences between successive rows of dewatering wells may be minimized (e.g., maintained or near zero) to create a "no or low flow" boundary between rows.

In certain embodiments, wells initially used for one purpose may be later used for one or more other purposes, thereby lowering project costs and/or decreasing the time required to perform certain tasks. For instance, production wells (and in some circumstances heater wells) may initially be used as dewatering wells (e.g., before heating is begun and/or when heating is initially started). In addition, in some circumstances dewatering wells can later be used as production wells (and in some circumstances heater wells). As such, the dewatering wells may be placed and/or designed so that such wells can be later used as production wells and/or heater wells. The heater wells may be placed and/or designed so that such wells can be later used as production wells and/or dewatering wells. The production wells may be placed and/or designed so that such wells can be later used as dewatering wells and/or heater wells. Similarly, injection wells may be wells that initially were used for other purposes (e.g., heating, production, dewatering, monitoring, etc.), and injection wells may later be used for other purposes. Similarly, monitoring wells may be wells that initially were used for other purposes (e.g., heating, production, dewatering, injection, etc.), and monitoring wells may later be used for other purposes.

Figure 8:
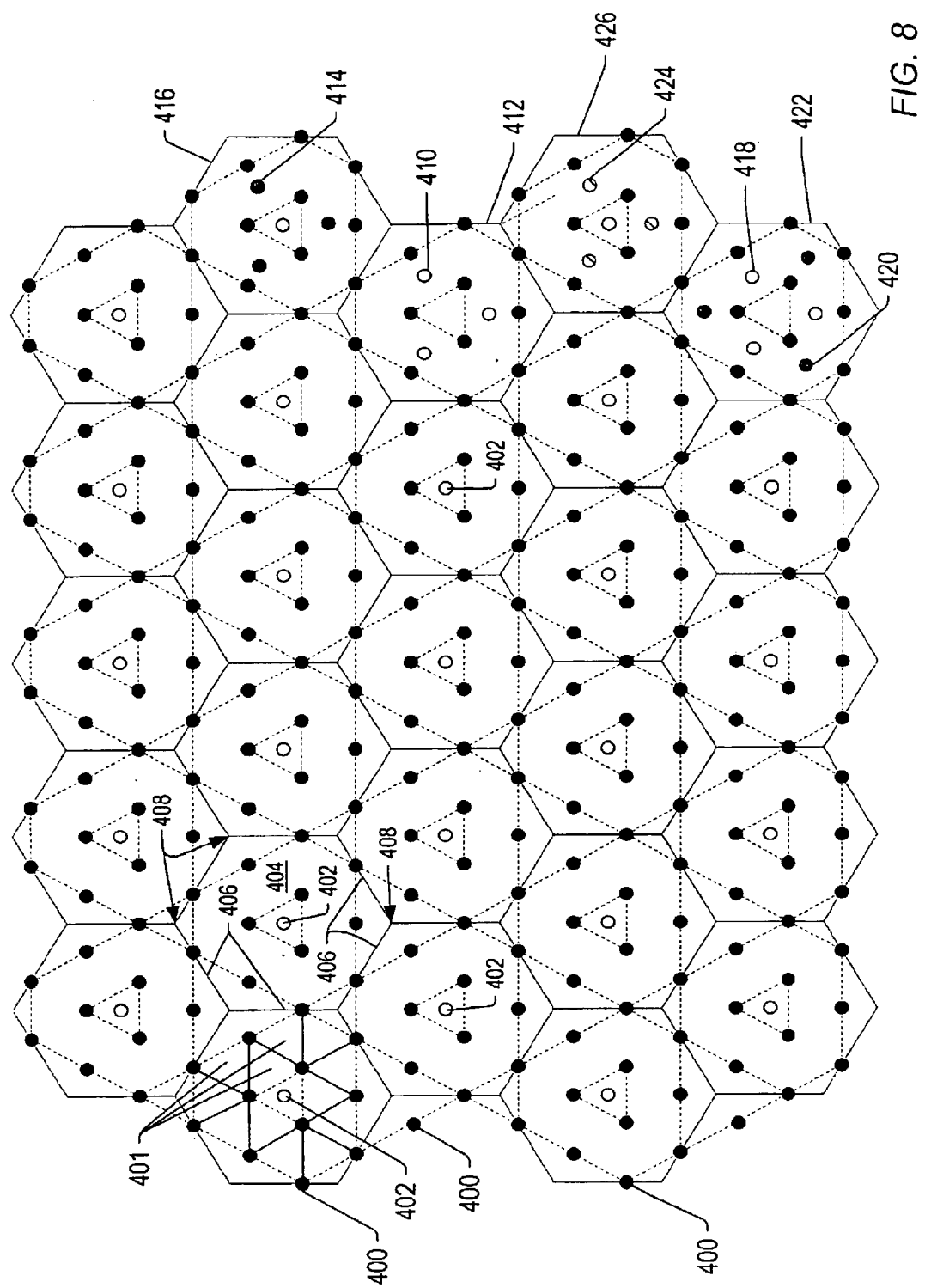
FIG. 8 and FIG. 9 depict embodiments of a pattern of heat sources and production wells in a coal formation.

FIG. 8 illustrates a pattern of heat sources 400 and production wells 402 that may be configured to treat a coal formation. Heat sources 400 may be arranged in a unit of heat sources such as triangular pattern 401. Heat sources 400, however, may be arranged in a variety of patterns including, but not limited to, squares, hexagons, and other polygons. The pattern may include a regular polygon to promote uniform heating through at least the portion of the formation in which the heat sources are placed. The pattern may also be a line drive pattern. A line drive pattern is defined to include at least one linear array of heater wells configured to heat at least a portion of a formation such that fluids may be produced from at least one production well. A line drive pattern may also include a first linear array of heater wells, a second linear array of heater wells, and a production well or a linear array of production wells between the first and second linear array of heater wells.

A distance from a node of a polygon to a centroid of the polygon is smallest for a 3 sided polygon and increases with increasing number of sides of the polygon. The distance from a node to the centroid for an equilateral triangle is (length/2)/(square root(3)/2) or 0.5774 times the length. For a square, the distance from a node to the centroid is (length/2)/(square root(2)/2) or 0.7071 times the length. For a hexagon, the distance from a node to the centroid is (length/2)/(½) or the length. The difference in distance between a heat source and a midpoint to a second heat source (length/2) and the distance from a heat source to the centroid for an equilateral pattern (0.5774 times the length) is significantly less for the equilateral triangle pattern than for any higher order polygon pattern. The small difference means that superposition of heat may develop more rapidly and that the formation between heat sources may rise to a substantially more uniform temperature using an equilateral triangle pattern rather than a higher order polygon pattern.

Triangular patterns tend to provide more uniform heating to a portion of the formation in comparison to other patterns such as squares and/or hexagons. Triangular patterns tend to provide faster heating to a predetermined temperature in comparison to other patterns such as squares and/or hexagons. Triangle patterns may also result in a small volume of the portion that is overheated. A plurality of units of heat sources such as triangular pattern 401 may be arranged substantially adjacent to each other to form a repetitive pattern of units over an area of the formation. For example, triangular patterns 401 may be arranged substantially adjacent to each other in a repetitive pattern of units by inverting an orientation of adjacent triangles 401. Other patterns of heat sources 400 may also be arranged such that smaller patterns may be disposed adjacent to each other to form larger patterns.

Production wells may be disposed in the formation in a repetitive pattern of units. In certain embodiments, production well 402 may be disposed proximate to a center of every third triangle 401 arranged in the pattern. Production well 402, however, may be disposed in every triangle 401 or within just a few triangles. A production well may be placed within every 13, 20, or 30 heater well triangles. For example, a ratio of heat sources in the repetitive pattern of units to production wells in the repetitive pattern of units may be more than approximately 5 (e.g., more than 6, 7, 8, or 9). In addition, the placement of production well 402 may vary depending on the heat generated by one or more heat sources 400 and the characteristics of the formation (such as permeability). Furthermore, three or more production wells may be located within an area defined by a repetitive pattern of units. For example, as shown in FIG. 8, production wells 410 may be located within an area defined by repetitive pattern of units 412. Production wells 410 may be located in the formation in a unit of production wells. For example, the unit of production wells may be a triangular pattern. Production wells 410, however, may be disposed in another pattern within repetitive pattern of units 412.

In addition, one or more injection wells may be disposed within a repetitive pattern of units. The injection wells may be configured as described herein. For example, as shown in FIG. 8, injection wells 414 may be located within an area defined by repetitive pattern of units 416. Injection wells 414 may also be located in the formation in a unit of injection wells. For example, the unit of injection wells may be a triangular pattern. Injection wells 414, however, may be disposed in any other pattern as described herein. In certain embodiments, one or more production wells and one or more injection wells may be disposed in a repetitive pattern of units. For example, as shown in FIG. 8, production wells 418 and injection wells 420 may be located within an area defined by repetitive pattern of units 422. Production wells 418 may be located in the formation in a unit of production wells, which may be arranged in a first triangular pattern. In addition, injection wells 420 may be located within the formation in a unit of production wells, which may be arranged in a second triangular pattern. The first triangular pattern may be substantially different than the second triangular pattern. For example, areas defined by the first and second triangular patterns may be substantially different.

In addition, one or more monitoring wells may be disposed within a repetitive pattern of units. The monitoring wells may be configured as described herein. For example, the wells may be configured with one or more devices that measure a temperature, a pressure, and/or a property of a fluid. In some embodiments, logging tools may be placed in monitoring well wellbores to measure properties within a formation. The logging tools may be moved to other monitoring well wellbores as needed. The monitoring well wellbores may be cased or uncased wellbores. As shown in FIG. 8, monitoring wells 424 may be located within an area defined by repetitive pattern of units 426. Monitoring wells 424 may be located in the formation in a unit of monitoring wells, which may be arranged in a triangular pattern. Monitoring wells 424, however, may be disposed in any of the other patterns as described herein within repetitive pattern of units 426.

It is to be understood that a geometrical pattern of heat sources 400 and production wells 402 is described herein by example. A pattern of heat sources and production wells will in many instances vary depending on, for example, the type of coal formation to be treated. For example, for relatively thin layers heating wells may be aligned along one or more layers along strike or along dip. For relatively thick layers, heat sources may be configured at an angle to one or more layers (e.g., orthogonally or diagonally).

A triangular pattern of heat sources may be configured to treat a coal formation having a thickness of about 10 meters or more. For a thinner coal formation, e.g., about 10 meters thick or less, a line and/or staggered line pattern of heat sources may be configured to treat the coal formation.

For certain thinner formations, heating wells may be placed closer to an edge of the formation (e.g., in a staggered line instead of a line placed in the center of the layer) of the formation to increase the amount of hydrocarbons produced per unit of energy input. A portion of input heating energy may heat non-hydrocarbon containing formation, but the staggered pattern may allow superposition of heat to heat a majority of the coal formation to pyrolysis temperatures. If the thin formation is heated by placing one or more heater wells in the formation along a center of the thickness, a significant portion of the coal formation may not be heated to pyrolysis temperatures. In some embodiments, placing heater wells closer to an edge of the formation may increase the volume of formation undergoing pyrolysis per unit of energy input.

In addition, the location of production well 402 within a pattern of heat sources 400 may be determined by, for example, a desired heating rate of the coal formation, a heating rate of the heat sources, the type of heat sources used, the type of coal formation (and its thickness), the composition of the coal formation, the desired composition to be produced from the formation, and/or a desired production rate. Exact placement of heater wells, production wells, etc. will depend on variables specific to the formation (e.g., thickness of the layer, composition of the layer, etc.), project economics, etc. In certain embodiments heater wells may be substantially horizontal while production wells may be vertical, or vice versa.

Any of the wells described herein may be aligned along dip or strike, or oriented at an angle between dip and strike.

The spacing between heat sources may also vary depending on a number of factors that may include, but are not limited to, the type of a coal formation, the selected heating rate, and/or the selected average temperature to be obtained within the heated portion. For example, the spacing between heat sources may be within a range of about 5 m to about 25 m. Alternatively, the spacing between heat sources may be within a range of about 8 m to about 15 m.

The spacing between heat sources may influence the composition of fluids produced from a coal formation. In an embodiment, a computer-implemented method may be used to determine optimum heat source spacings within a coal formation. For example, at least one property of a portion of coal formation can usually be measured. The measured property may include, but is not limited to, vitrinite reflectance, hydrogen content, atomic hydrogen to carbon ratio, oxygen content, atomic oxygen to carbon ratio, water content, thickness of the coal formation, and/or the amount of stratification of the coal formation into separate layers of rock and hydrocarbons.

In certain embodiments a computer-implemented method may include providing at least one measured property to a computer system. One or more sets of heat source spacings in the formation may also be provided to the computer system. For example, a spacing between heat sources may be less than about 30 m. Alternatively, a spacing between heat sources may be less than about 15 m. The method may also include determining properties of fluids produced from the portion as a function of time for each set of heat source spacings. The produced fluids include, but are not limited to, formation fluids such as pyrolyzation fluids and synthesis gas. The determined properties may include, but are not limited to, API gravity, carbon number distribution, olefin content, hydrogen content, carbon monoxide content, and/or carbon dioxide content. The determined set of properties of the produced fluid may be compared to a set of selected properties of a produced fluid. In this manner, sets of properties that match the set of selected properties may be determined. Furthermore, heat source spacings may be matched to heat source spacings associated with desired properties.

Unit cell 404 will often include a number of heat sources 400 disposed within a formation around each production well 402. An area of unit cell 404 may be determined by midlines 406 that may be equidistant and perpendicular to a line connecting two production wells 402. Vertices 408 of the unit cell may be at the intersection of two midlines 406 between production wells 402. Heat sources 400 may be disposed in any arrangement within the area of unit cell 404. For example, heat sources 400 may be located within the formation such that a distance between each heat source varies by less than approximately 10%, 20%, or 30%. In addition, heat sources 400 may be disposed such that an approximately equal space exists between each of the heat sources. Other arrangements of heat sources 400 within unit cell 404, however, may be used depending on, for example, a heating rate of each of the heat sources. A ratio of heat sources 400 to production wells 402 may be determined by counting the number of heat sources 400 and production wells 402 within unit cell 404, or over the total field.

Figure 9:
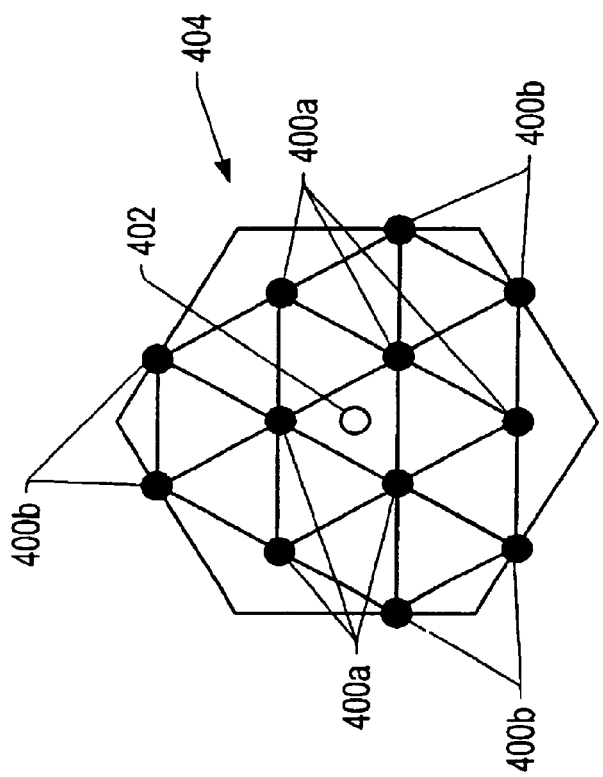

FIG. 9 illustrates an embodiment of unit cell 404. Unit cell 404 includes heat sources 400 and production wells 402. Unit cell 404 may have six full heat sources 400a and six partial heat sources 400b. Full heat sources 400a may be closer to production well 402 than partial heat sources 400b. In addition, an entirety of each of the full heat sources 400a may be located within unit cell 404. Partial heat sources 400b may be partially disposed within unit cell 404. Only a portion of heat source 400b disposed within unit cell 404 may be configured to provide heat to a portion of a coal formation disposed within unit cell 404. A remaining portion of heat source 400b disposed outside of unit cell 404 may be configured to provide heat to a remaining portion of the coal formation outside of unit cell 404. Therefore, to determine a number of heat sources within unit cell 404 partial heat source 400b may be counted as one-half of full heat source 400a. In other unit cell embodiments, fractions other than ½ (e.g. ⅓) may more accurately describe the amount of heat applied to a portion from a partial heat source.

The total number of heat sources 400 in unit cell 404 may include six full heat sources 400a that are each counted as one heat source, and six partial heat sources 400b that are each counted as one half of a heat source. Therefore, a ratio of heat sources 400 to production wells 402 in unit cell 404 may be determined as 9:1. A ratio of heat sources to production wells may vary, however, depending on, for example, the desired heating rate of the coal formation, the heating rate of the heat sources, the type of heat source, the type of coal formation, the composition of coal formation, the desired composition of the produced fluid, and/or the desired production rate. Providing more heat sources wells per unit area will allow faster heating of the selected portion and thus hastening the onset of production, however more heat sources will generally cost more money to install. An appropriate ratio of heat sources to production wells may also include ratios greater than about 5:1, and ratios greater than about 7:1. In some embodiments an appropriate ratio of heat sources to production wells may be about 10:1, 20:1, 50:1 or greater. If larger ratios are used, then project costs tend to decrease since less wells and equipment are needed.

A "selected section" would generally be the volume of formation that is within a perimeter defined by the location of the outermost heat sources (assuming that the formation is viewed from above). For example, if four heat sources were located in a single square pattern with an area of about 100 m$^2$ (with each source located at a corner of the square), and if the formation had an average thickness of approximately 5 m across this area, then the selected section would be a volume of about 500 m$^3$ (i.e., the area multiplied by the average formation thickness across the area). In many commercial applications, it is envisioned that many (e.g., hundreds or thousands) heat sources would be adjacent to each other to heat a selected section, and therefore in such cases only the outermost (i.e., the "edge") heat sources would define the perimeter of the selected section.

A heat source may include, but is not limited to, an electric heater or a combustion heater. The electric heater may include an insulated conductor, an elongated member disposed in the opening, and/or a conductor disposed in a conduit. Such an electric heater may be configured according to any of the embodiments described herein.

In an embodiment, a coal formation may be heated with a natural distributed combustor system located in the formation. The generated heat may be allowed to transfer to a selected section of the formation to heat it.

A temperature sufficient to support oxidation may be, for example, at least about 200° C. or 250° C. The temperature sufficient to support oxidation will tend to vary, however, depending on, for example, a composition of the hydrocarbons in the coal formation, water content of the formation, and/or type and amount of oxidant. Some water may be removed from the formation prior to heating. For example, the water may be pumped from the formation by dewatering wells. The heated portion of the formation may be near or substantially adjacent to an opening in the coal formation. The opening in the formation may be a heater well formed in the formation. The heater well may be formed as in any of the embodiments described herein. The heated portion of the coal formation may extend radially from the opening to a width of about 0.3 m to about 1.2 m. The width, however, may also be less than about 0.9 m. A width of the heated portion may vary. In certain embodiments the variance will depend on, for example, a width necessary to generate sufficient heat during oxidation of carbon to maintain the oxidation reaction without providing heat from an additional heat source.

After the portion of the formation reaches a temperature sufficient to support oxidation, an oxidizing fluid may be provided into the opening to oxidize at least a portion of the hydrocarbons at a reaction zone, or a heat source zone, within the formation. Oxidation of the hydrocarbons will generate heat at the reaction zone. The generated heat will in most embodiments transfer from the reaction zone to a pyrolysis zone in the formation. In certain embodiments the generated heat will transfer at a rate between about 650 watts per meter as measured along a depth of the reaction zone, and/or 1650 watts per meter as measured along a depth of the reaction zone. Upon oxidation of at least some of the hydrocarbons in the formation, energy supplied to the heater for initially heating may be reduced or may be turned off. As such, energy input costs may be significantly reduced, thereby providing a significantly more efficient system for heating the formation.

In an embodiment, a conduit may be disposed in the opening to provide the oxidizing fluid into the opening. The conduit may have flow orifices, or other flow control mechanisms (i.e., slits, venturi meters, valves, etc.) to allow the oxidizing fluid to enter the opening. The term "orifices" includes openings having a wide variety of cross-sectional shapes including, but not limited to, circles, ovals, squares, rectangles, triangles, slits, or other regular or irregular shapes. The flow orifices may be critical flow orifices in some embodiments. The flow orifices may be configured to provide a substantially constant flow of oxidizing fluid into the opening, regardless of the pressure in the opening.

In some embodiments, the number of flow orifices, which may be formed in or coupled to the conduit, may be limited by the diameter of the orifices and a desired spacing between orifices for a length of the conduit. For example, as the diameter of the orifices decreases, the number of flow orifices may increase, and vice versa. In addition, as the desired spacing increases, the number of flow orifices may decrease, and vice versa. The diameter of the orifices may be determined by, for example, a pressure in the conduit and/or a desired flow rate through the orifices. For example, for a flow rate of about 1.7 standard cubic meters per minute and a pressure of about 7 bar absolute, an orifice diameter may be about 1.3 mm with a spacing between orifices of about 2 m.

Smaller diameter orifices may plug more easily than larger diameter orifices due to, for example, contamination of fluid in the opening or solid deposition within or proximate to the orifices. In some embodiments, the number and diameter of the orifices can be chosen such that a more even or nearly uniform heating profile will be obtained along a depth of the formation within the opening. For example, a depth of a heated formation that is intended to have an approximately uniform heating profile may be greater than about 300 m, or even greater than about 600 m. Such a depth may vary, however, depending on, for example, a type of formation to be heated and/or a desired production rate.

In some embodiments, flow orifices may be disposed in a helical pattern around the conduit within the opening. The flow orifices may be spaced by about 0.3 m to about 3 m between orifices in the helical pattern. In some embodiments, the spacing may be about 1 m to about 2 m or, for example, about 1.5 m.

The flow of the oxidizing fluid into the opening may be controlled such that a rate of oxidation at the reaction zone is controlled. Transfer of heat between incoming oxidant and outgoing oxidation products may heat the oxidizing fluid. The transfer of heat may also maintain the conduit below a maximum operating temperature of the conduit.

Figure 10:
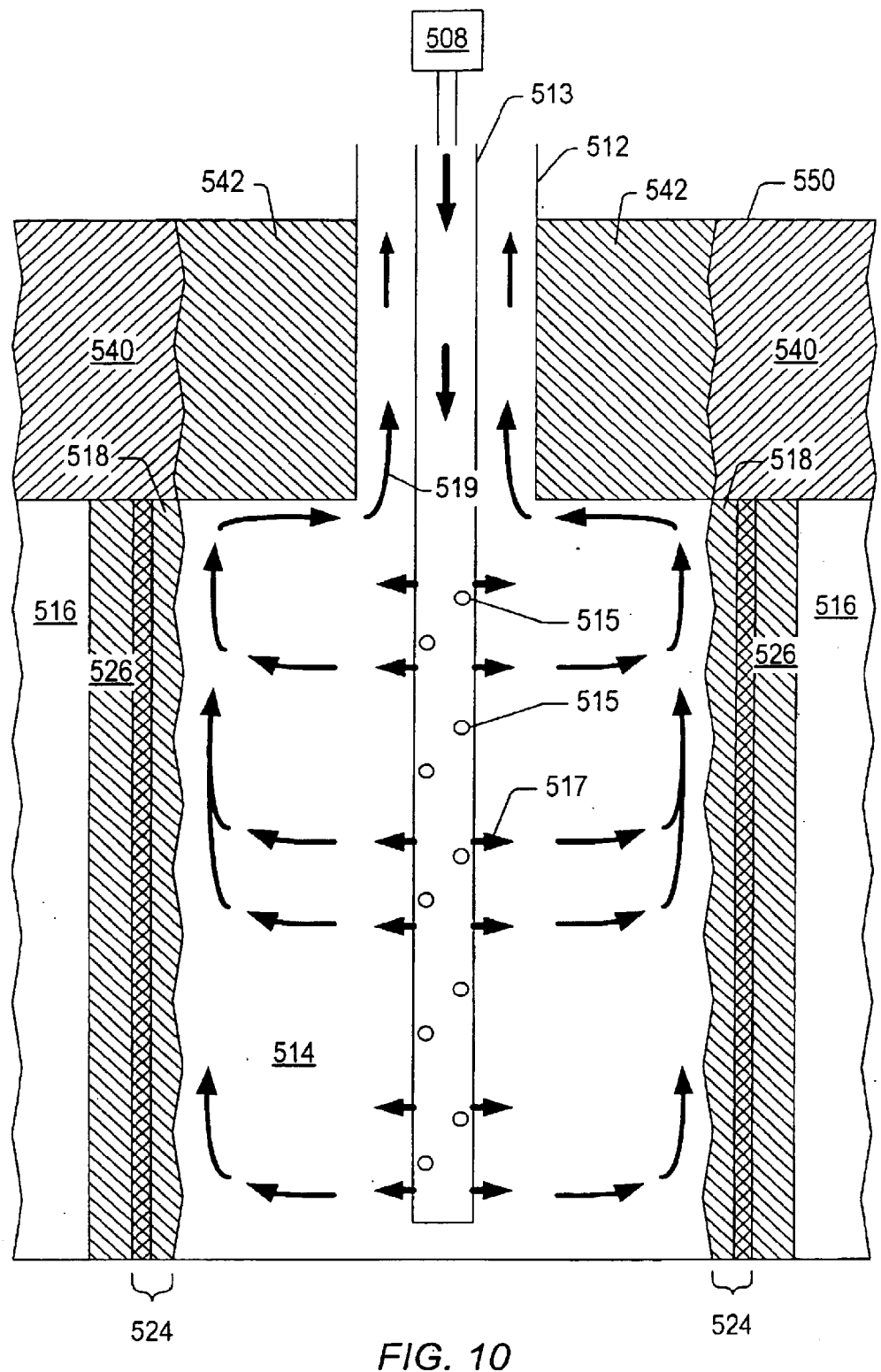

FIG. 10 illustrates an embodiment of a natural distributed combustor configured to heat a coal formation. Conduit 512 may be placed into opening 514 in formation 516. Conduit 512 may have inner conduit 513. Oxidizing fluid source 508 may provide oxidizing fluid 517 into inner conduit 513. Inner conduit 513 may have critical flow orifices 515 along its length. Critical flow orifices 515 may be disposed in a helical pattern (or any other pattern) along a length of inner conduit 513 in opening 514. For example, critical flow orifices 515 may be arranged in a helical pattern with a distance of about 1 m to about 2.5 m between adjacent orifices. Critical flow orifices 515 may be further configured as described herein. Inner conduit 513 may be sealed at the bottom. Oxidizing fluid 517 may be provided into opening 514 through critical flow orifices 515 of inner conduit 513.

Critical flow orifices 515 may be designed such that substantially the same flow rate of oxidizing fluid 517 may be provided through each critical flow orifice. Critical flow orifices 515 may also provide substantially uniform flow of oxidizing fluid 517 along a length of conduit 512. Such flow may provide substantially uniform heating of formation 516 along the length of conduit 512.

Packing material 542 may enclose conduit 512 in overburden 540 of the formation. Packing material 542 may substantially inhibit flow of fluids from opening 514 to surface 550. Packing material 542 may include any material configurable to inhibit flow of fluids to surface 550 such as cement, sand, and/or gravel. Typically a conduit or an opening in the packing remains to provide a path for oxidation products to reach the surface.

Oxidation products 519 typically enter conduit 512 from opening 514. Oxidation products 519 may include carbon dioxide, oxides of nitrogen, oxides of sulfur, carbon monoxide, and/or other products resulting from a reaction of oxygen with hydrocarbons and/or carbon. Oxidation products 519 may be removed through conduit 512 to surface 550. Oxidation product 519 may flow along a face of reaction zone 524 in opening 514 until proximate an upper end of opening 514 where oxidation product 519 may flow into conduit 512. Oxidation products 519 may also be removed through one or more conduits disposed in opening 514 and/or in formation 516. For example, oxidation products 519 may be removed through a second conduit disposed in opening 514. Removing oxidation products 519 through a conduit may substantially inhibit oxidation products 519 from flowing to a production well disposed in formation 516. Critical flow orifices 515 may also be configured to substantially inhibit oxidation products 519 from entering inner conduit 513.

Figure 14:
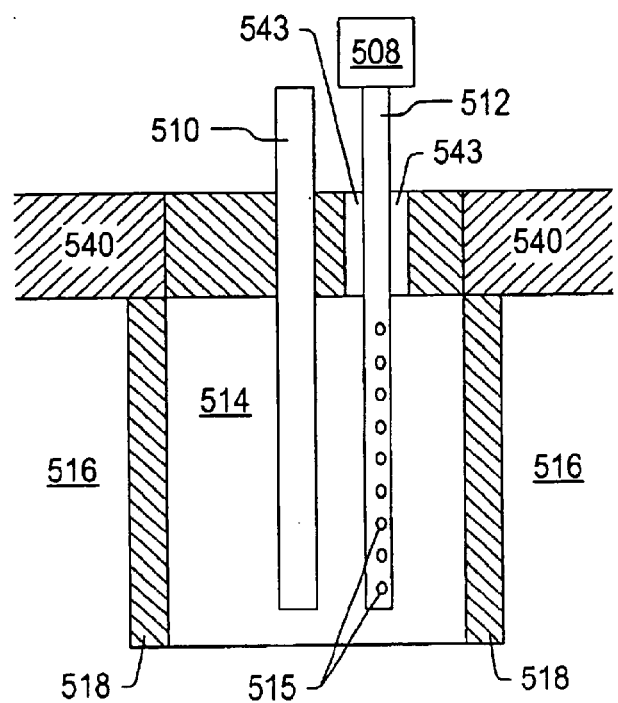
FIG. 14 and FIG. 15 depict embodiments of a natural distributed combustor system for heating a formation.

A flow rate of oxidation product 519 may be balanced with a flow rate of oxidizing fluid 517 such that a substantially constant pressure is maintained within opening 514. For a 100 m length of heated section, a flow rate of oxidizing fluid may be between about 0.5 standard cubic meters per minute to about 5 standard cubic meters per minute, or about 1.0 standard cubic meters per minute to about 4.0 standard cubic meters per minute, or, for example, about 1.7 standard cubic meters per minute. A flow rate of oxidizing fluid into the formation may be incrementally increased during use to accommodate expansion of the reaction zone. A pressure in the opening may be, for example, about 8 bar absolute. Oxidizing fluid 517 may oxidize at least a portion of the hydrocarbons in heated portion 518 of coal formation 516 at reaction zone 524. Heated portion 518 may have been initially heated to a temperature sufficient to support oxidation by an electric heater, as shown in FIG. 14, or by any other suitable system or method described herein. In some embodiments, an electric heater may be placed inside or strapped to the outside of conduit 513

In certain embodiments it is beneficial to control the pressure within the opening 514 such that oxidation product and/or oxidation fluids are inhibited from flowing into the pyrolysis zone of the formation. In some instances pressure within opening 514 will be balanced with pressure within the formation to do so.

Although the heat from the oxidation is transferred to the formation, oxidation product 519 (and excess oxidation fluid such as air) may be substantially inhibited from flowing through the formation and/or to a production well within formation 516. Instead oxidation product 519 (and excess oxidation fluid) is removed (e.g., through a conduit such as conduit 512) as is described herein. In this manner, heat is transferred to the formation from the oxidation but exposure of the pyrolysis zone with oxidation product 519 and/or oxidation fluid may be substantially inhibited and/or prevented.

In certain embodiments, some pyrolysis product near the reaction zone 524 may also be oxidized in reaction zone 524 in addition to the carbon. Oxidation of the pyrolysis product in reaction zone 524 may provide additional heating of formation 516. When such oxidation of pyrolysis product occurs, it is desirable that oxidation product from such oxidation be removed (e.g., through a conduit such as conduit 512) near the reaction zone as is described herein, thereby inhibiting contamination of other pyrolysis product in the formation with oxidation product.

Conduit 512 may be configured to remove oxidation product 519 from opening 514 in formation 516. As such, oxidizing fluid 517 in inner conduit 513 may be heated by heat exchange in overburden section 540 from oxidation product 519 in conduit 512. Oxidation product 519 may be cooled by transferring heat to oxidizing fluid 517. In this manner, oxidation of hydrocarbons within formation 516 may be more thermally efficient.

Oxidizing fluid 517 may transport through reaction zone 524, or heat source zone, by gas phase diffusion and/or convection. Diffusion of oxidizing fluid 517 through reaction zone 524 may be more efficient at the relatively high temperatures of oxidation. Diffusion of oxidizing fluid 517 may inhibit development of localized overheating and fingering in the formation. Diffusion of oxidizing fluid 517 through formation 516 is generally a mass transfer process. In the absence of an external force, a rate of diffusion for oxidizing fluid 517 may depend upon concentration, pressure, and/or temperature of oxidizing fluid 517 within formation 516. The rate of diffusion may also depend upon the diffusion coefficient of oxidizing fluid 517 through formation 516. The diffusion coefficient may be determined by measurement or calculation based on the kinetic theory of gases. In general, random motion of oxidizing fluid 517 may transfer oxidizing fluid 517 through formation 516 from a region of high concentration to a region of low concentration.

With time, reaction zone 524 may slowly extend radially to greater diameters from opening 514 as hydrocarbons are oxidized. Reaction zone 524 may, in many embodiments, maintain a relatively constant width. For example, reaction zone 524 may extend radially at a rate of less than about 0.91 m per year for a coal formation. For example, for a coal formation, reaction zone 524 may extend radially at a rate between about 0.5 m per year to about 1 m per year. Reaction zone 524 may extend at slower rates for hydrocarbon rich formations since more hydrocarbons per volume are available for combustion in the hydrocarbon rich formations.

A flow rate of oxidizing fluid 517 into opening 514 may be increased as a diameter of reaction zone 524 increases to maintain the rate of oxidation per unit volume at a substantially steady state. Thus, a temperature within reaction zone 524 may be maintained substantially constant in some embodiments. The temperature within reaction zone 524 may be between about 650° C. to about 900° C. or, for example, about 760° C. The temperature may be maintained below a temperature that results in production of oxides of nitrogen ($NO_x$).

The temperature within reaction zone 524 may vary depending on, for example, a desired heating rate of selected section 526. The temperature within reaction zone 524 may be increased or decreased by increasing or decreasing, respectively, a flow rate of oxidizing fluid 517 into opening 514. A temperature of conduit 512, inner conduit 513, and/or any metallurgical materials within opening 514 typically will not exceed a maximum operating temperature of the material. Maintaining the temperature below the maximum operating temperature of a material may inhibit excessive deformation and/or corrosion of the material.

An increase in the diameter of reaction zone 524 may allow for relatively rapid heating of the coal formation 516. As the diameter of reaction zone 524 increases, an amount of heat generated per time in reaction zone 524 may also increase. Increasing an amount of heat generated per time in the reaction zone will in many instances increase the heating rate of the formation 516 over a period of time, even without increasing the temperature in the reaction zone or the temperature at conduit 513. Thus, increased heating may be achieved over time without installing additional heat sources, and without increasing temperatures adjacent to wellbores. In some embodiments the heating rates may be increased while allowing the temperatures to decrease (allowing temperatures to decrease may often lengthen the life of the equipment used).

By utilizing the carbon in the formation as a fuel, the natural distributed combustor may save significantly on energy costs. Thus, an economical process may be provided for heating formations that may otherwise be economically unsuitable for heating by other methods. Also, fewer heaters may be placed over an extended area of formation 516. This may provide for a reduced equipment cost associated with heating the formation 516.

The heat generated at reaction zone 524 may transfer by thermal conduction to selected section 526 of formation 516. In addition, generated heat may transfer from a reaction zone to the selected section to a lesser extent by convection heat transfer. Selected section 526, sometimes referred to herein as the "pyrolysis zone," may be substantially adjacent to reaction zone 524. Since oxidation product (and excess oxidation fluid such as air) is typically removed from the reaction zone, the pyrolysis zone can receive heat from the reaction zone without being exposed to oxidation product, or oxidants, that are in the reaction zone. Oxidation product and/or oxidation fluids may cause the formation of undesirable formation products if they are present in the pyrolysis zone. For example, in certain embodiments it is desirable to conduct pyrolysis in a reducing environment. Thus, it is often useful to allow heat to transfer from the reaction zone to the pyrolysis zone while inhibiting or preventing oxidation product and/or oxidation fluid from reaching the pyrolysis zone.

Pyrolysis of hydrocarbons, or other heat-controlled processes, may take place in heated selected section 526. Selected section 526 may be at a temperature between about 270° C. to about 400° C. for pyrolysis. The temperature of selected section 526 may be increased by heat transfer from reaction zone 524. A rate of temperature increase may be selected as in any of the embodiments described herein. A temperature in formation 516, selected section 526, and/or reaction zone 524 may be controlled such that production of oxides of nitrogen may be substantially inhibited. Oxides of nitrogen are often produced at temperatures above about 1200° C.

A temperature within opening 514 may be monitored with a thermocouple disposed in opening 514. The temperature within opening 514 may be monitored such that a temperature may be maintained within a selected range. The selected range may vary, depending on, for example, a desired heating rate of formation 516. A temperature may be maintained within a selected range by increasing or decreasing a flow rate of oxidizing fluid 517. For example, if a temperature within opening 514 falls below a selected range of temperatures, the flow rate of oxidizing fluid 517 may be increased to increase the combustion and thereby increase the temperature within opening 514. Alternatively, a thermocouple may be disposed on conduit 512 and/or disposed on a face of reaction zone 524, and a temperature may be monitored accordingly.

In certain embodiments one or more natural distributed combustors may be placed along strike and/or horizontally.

Doing so tends to reduce pressure differentials along the heated length of the well, thereby tending to promote more uniform heating and improved control.

In some embodiments, a presence of air or molecular oxygen, $O_2$, in oxidation product 519 may be monitored. Alternatively, an amount of nitrogen, carbon monoxide, carbon dioxide, oxides of nitrogen, oxides of sulfur, etc. may be monitored in oxidation product 519. Monitoring the composition and/or quantity of oxidation product 519 may be useful for heat balances, for process diagnostics, process control, etc.

Figure 11:
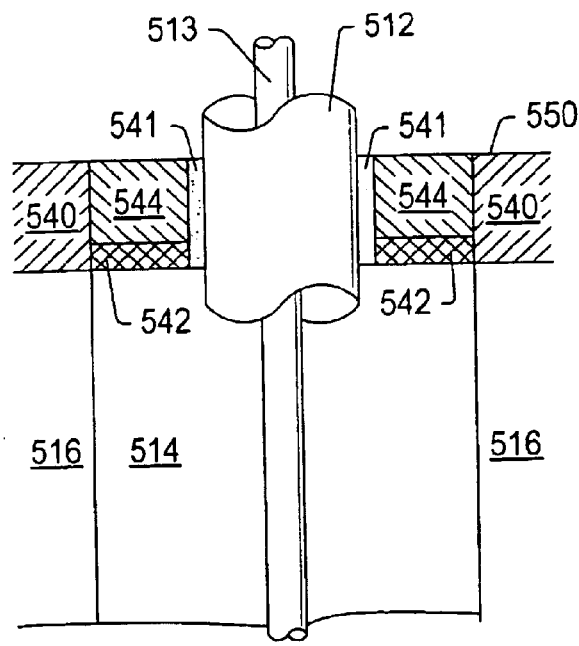
FIG. 11 depicts a portion of an overburden of a formation with a natural distributed combustor heat source.

FIG. 11 illustrates an embodiment of a section of overburden with a natural distributed combustor as described in FIG. 10. Overburden casing 541 may be disposed in overburden 540 of formation 516. Overburden casing 541 may be substantially surrounded by materials (e.g., an insulating material such as cement) that may substantially inhibit heating of overburden 540. Overburden casing 541 may be made of a metal material such as, but not limited to, carbon steel.

Overburden casing may be placed in reinforcing material 544 in overburden 540. Reinforcing material 544 may be, for example, cement, sand, concrete, etc. Packing material 542 may be disposed between overburden casing 541 and opening 514 in the formation. Packing material 542 may be any substantially non-porous material (e.g., cement, concrete, grout, etc.). Packing material 542 may inhibit flow of fluid outside of conduit 512 and between opening 514 and surface 550. Inner conduit 513 may provide a fluid into opening 514 in formation 516. Conduit 512 may remove a combustion product (or excess oxidation fluid) from opening 514 in formation 516. Diameter of conduit 512 may be determined by an amount of the combustion product produced by oxidation in the natural distributed combustor. For example, a larger diameter may be required for a greater amount of exhaust product produced by the natural distributed combustor heater.

In an alternative embodiment, at least a portion of the formation may be heated to a temperature such that at least a portion of the coal formation may be converted to coke and/or char. Coke and/or char may be formed at temperatures above about 400° C. and at a high heating rate (e.g., above about 10° C./day). In the presence of an oxidizing fluid, the coke or char will oxidize. Heat may be generated from the oxidation of coke or char as in any of the embodiments described herein.

Figure 12:
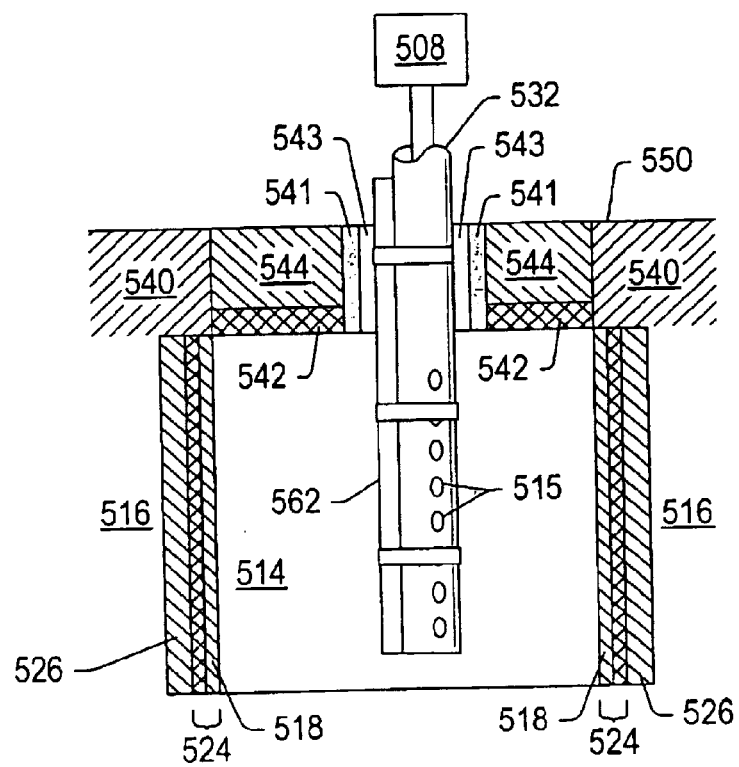
FIG. 12 and FIG. 13 depict alternate embodiments of a natural distributed combustor heat source.

FIG. 12 illustrates an embodiment of a natural distributed combustor heater. Insulated conductor 562 may be coupled to conduit 532 and placed in opening 514 in formation 516. Insulated conductor 562 may be disposed internal to conduit 532 (thereby allowing retrieval of the insulated conductor 562), or, alternately, coupled to an external surface of conduit 532. Such insulating material may include, for example, minerals, ceramics, etc. Conduit 532 may have critical flow orifices 515 disposed along its length within opening 514. Critical flow orifices 515 may be configured as described herein. Electrical current may be applied to insulated conductor 562 to generate radiant heat in opening 514. Conduit 532 may be configured to serve as a return for current. Insulated conductor 562 may be configured to heat portion 518 of the formation to a temperature sufficient to support oxidation of hydrocarbons. Portion 518, reaction zone 524, and selected section 526 may have characteristics as described herein. Such a temperature may include temperatures as described herein.

Oxidizing fluid source 508 may provide oxidizing fluid into conduit 532. Oxidizing fluid may be provided into opening 514 through critical flow orifices 515 in conduit 532. Oxidizing fluid may oxidize at least a portion of the coal formation in at reaction zone 524. Reaction zone 524 may have characteristics as described herein. Heat generated at reaction zone 524 may transfer heat to selected section 526, for example, by convection, radiation, and/or conduction. Oxidation product may be removed through a separate conduit placed in opening 514 or through an opening 543 in overburden casing 541. The separate conduit may be configured as described herein. Packing material 542 and reinforcing material 544 may be configured as described herein.

Figure 13:
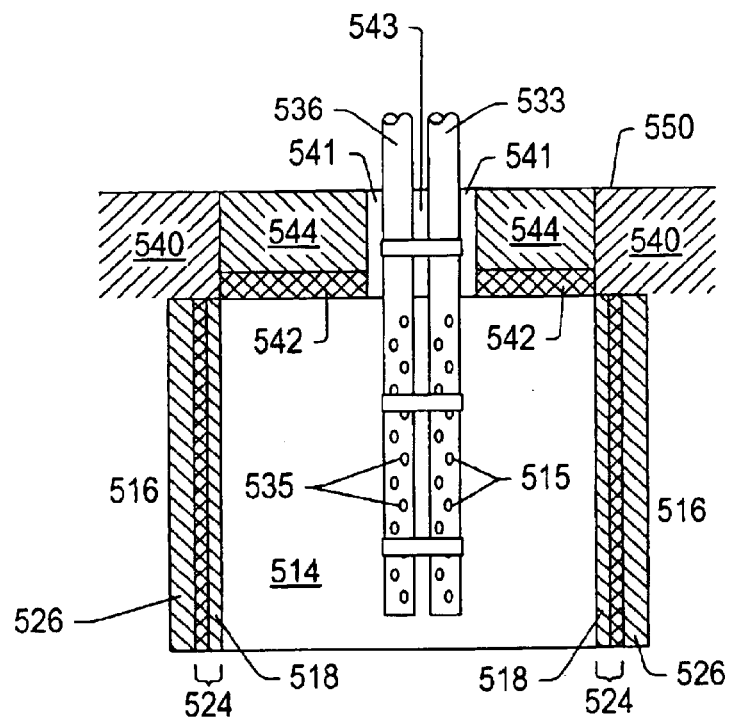

FIG. 13 illustrates an embodiment of a natural distributed combustor heater with an added fuel conduit. Fuel conduit 536 may be disposed into opening 514. It may be disposed substantially adjacent to conduit 533 in certain embodiments. Fuel conduit 536 may have critical flow orifices 535 along its length within opening 514. Conduit 533 may have critical flow orifices 515 along its length within opening 514. Critical flow orifices 515 may be configured as described herein. Critical flow orifices 535 and critical flow orifices 515 may be placed on fuel conduit 536 and conduit 533, respectively, such that a fuel fluid provided through fuel conduit 536 and an oxidizing fluid provided through conduit 533 may not substantially heat fuel conduit 536 and/or conduit 533 upon reaction. For example, the fuel fluid and the oxidizing fluid may react upon contact with each other, thereby producing heat from the reaction. The heat from this reaction may heat fuel conduit 536 and/or conduit 533 to a temperature sufficient to substantially begin melting metallurgical materials in fuel conduit 536 and/or conduit 533 if the reaction takes place proximate to fuel conduit 536 and/or conduit 533. Therefore, a design for disposing critical flow orifices 535 on fuel conduit 536 and critical flow orifices 515 on conduit 533 may be provided such that the fuel fluid and the oxidizing fluid may not substantially react proximate to the conduits. For example, conduits 536 and 533 may be mechanically coupled such that orifices are oriented in opposite directions, and such that the orifices face the formation 516.

Reaction of the fuel fluid and the oxidizing fluid may produce heat. The fuel fluid and the oxidizing fluid may have characteristics herein. The fuel fluid may be, for example, natural gas, ethane, hydrogen or synthesis gas that is generated in the in situ process in another part of the formation. The produced heat may be configured to heat portion 518 to a temperature sufficient to support oxidation of hydrocarbons. Upon heating of portion 518 to a temperature sufficient to support oxidation, a flow of fuel fluid into opening 514 may be turned down or may be turned off. Alternatively, the supply of fuel may be continued throughout the heating of the formation, thereby utilizing the stored heat in the carbon to maintain the temperature in opening 514 above the autoignition temperature of the fuel.

The oxidizing fluid may oxidize at least a portion of the hydrocarbons at reaction zone 524. Generated heat will transfer heat to selected section 526, for example, by radiation, convection, and/or conduction. An oxidation product may be removed through a separate conduit placed in opening 514 or through an opening 543 in overburden casing 541. Packing material 542 and reinforcing material 544 may be configured as herein.

FIG. 14 illustrates an embodiment of a system configured to heat a coal formation. Electric heater 510 may be disposed within opening 514 in coal formation 516. Opening 514 may be formed through overburden 540 into formation 516. Opening 514 may be at least about 5 cm in diameter. Opening 514 may, as an example, have a diameter of about 13 cm. Electric heater 510 may heat at least portion 518 of coal formation 516 to a temperature sufficient to support oxidation (e.g., about 260° C.). Portion 518 may have a width of about 1 m. An oxidizing fluid (e.g., liquid or gas) may be provided into the opening through conduit 512 or any other appropriate fluid transfer mechanism. Conduit 512 may have critical flow orifices 515 disposed along a length of the conduit. Critical flow orifices 515 may be configured as described herein.

For example, conduit 512 may be a pipe or tube configured to provide the oxidizing fluid into opening 514 from oxidizing fluid source 508. For example, conduit 512 may be a stainless steel tube. The oxidizing fluid may include air or any other oxygen containing fluid (e.g., hydrogen peroxide, oxides of nitrogen, ozone). Mixtures of oxidizing fluids may be used. An oxidizing fluid mixture may include, for example, a fluid including fifty percent oxygen and fifty percent nitrogen. The oxidizing fluid may also, in some embodiments, include compounds that release oxygen when heated as described herein such as hydrogen peroxide. The oxidizing fluid may oxidize at least a portion of the hydrocarbons in the formation.

In some embodiments, a heat exchanger disposed external to the formation may be configured to heat the oxidizing fluid. The heated oxidizing fluid may be provided into the opening from (directly or indirectly) the heat exchanger. For example, the heated oxidizing fluid may be provided from the heat exchanger into the opening through a conduit disposed in the opening and coupled to the heat exchanger. In some embodiments the conduit may be a stainless steel tube. The heated oxidizing fluid may be configured to heat, or at least contribute to the heating of, at least a portion of the formation to a temperature sufficient to support oxidation of hydrocarbons. After the heated portion reaches such a temperature, heating of the oxidizing fluid in the heat exchanger may be reduced or may be turned off.

Figure 15:
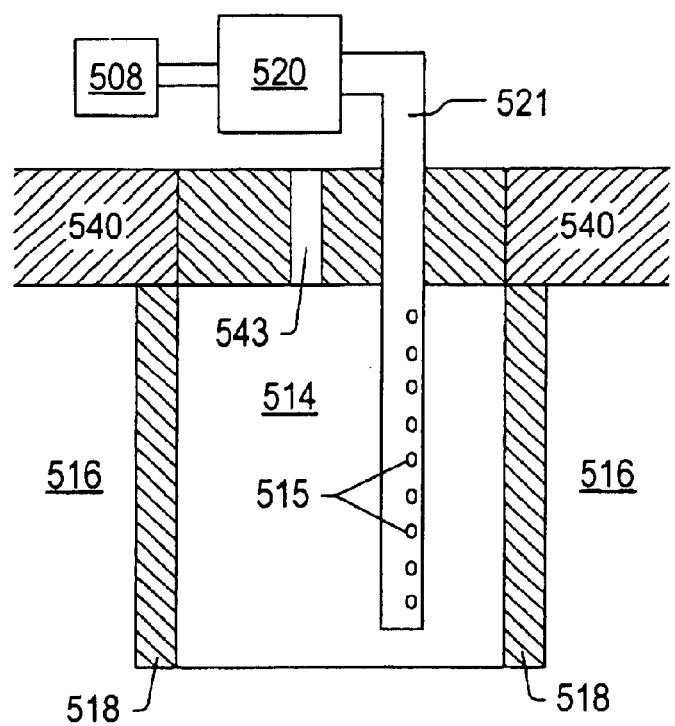

FIG. 15 illustrates another embodiment of a system configured to heat a coal formation. Heat exchanger 520 may be disposed external to opening 514 in coal formation 516. Opening 514 may be formed through overburden 540 into formation 516. Heat exchanger 520 may provide heat from another surface process, or it may include a heater (e.g., an electric or combustion heater). Oxidizing fluid source 508 may provide an oxidizing fluid to heat exchanger 520. Heat exchanger 520 may heat an oxidizing fluid (e.g., above 200° C. or a temperature sufficient to support oxidation of hydrocarbons). The heated oxidizing fluid may be provided into opening 514 through conduit 521. Conduit 521 may have critical flow orifices 515 disposed along a length of the conduit. Critical flow orifices 515 may be configured as described herein. The heated oxidizing fluid may heat, or at least contribute to the heating of, at least portion 518 of the formation to a temperature sufficient to support oxidation of hydrocarbons. The oxidizing fluid may oxidize at least a portion of the hydrocarbons in the formation.

In another embodiment, a fuel fluid may be oxidized in a heater located external to a coal formation. The fuel fluid may be oxidized with an oxidizing fluid in the heater. As an example, the heater may be a flame-ignited heater. A fuel fluid may include any fluid configured to react with oxygen. An example of a fuel fluid may be methane, ethane, propane, or any other hydrocarbon or hydrogen and synthesis gas. The oxidized fuel fluid may be provided into the opening from the heater through a conduit and return to the surface through another conduit in the overburden. The conduits may be coupled within the overburden. In some embodiments, the conduits may be concentrically placed. The oxidized fuel fluid may be configured to heat, or at least contribute to the heating of, at least a portion of the formation to a temperature sufficient to support oxidation of hydrocarbons. Upon reaching such a temperature, the oxidized fuel fluid may be replaced with an oxidizing fluid. The oxidizing fluid may oxidize at least a portion of the hydrocarbons at a reaction zone within the formation.

An electric heater may be configured to heat a portion of the coal formation to a temperature sufficient to support oxidation of hydrocarbons. The portion may be proximate to or substantially adjacent to the opening in the formation. The portion may also radially extend a width of less than approximately 1 m from the opening. A width of the portion may vary, however, depending on, for example, a power supplied to the heater. An oxidizing fluid may be provided to the opening for oxidation of hydrocarbons. Oxidation of the hydrocarbons may be configured to heat the coal formation in a process of natural distributed combustion. Electrical current applied to the electric heater may subsequently be reduced or may be turned off. Thus, natural distributed combustion may be configured, in conjunction with an electric heater, to provide a reduced input energy cost method to heat the coal formation compared to using an electric heater.

An insulated conductor heater may be a heater element of a heat source. In an embodiment of an insulated conductor heater, the insulated conductor heater is a mineral insulated cable or rod. An insulated conductor heater may be placed in an opening in a coal formation. The insulated conductor heater may be placed in an uncased opening in the coal formation. Placing the heater in an uncased opening in the coal formation may allow heat transfer from the heater to the formation by radiation, as well as, conduction. In addition, using an uncased opening may also allow retrieval of the heater from the well, if necessary, and may eliminate the cost of the casing. Alternately, the insulated conductor heater may be placed within a casing in the formation; may be cemented within the formation; or may be packed in an opening with sand, gravel, or other fill material. The insulated conductor heater may be supported on a support member positioned within the opening. The support member may be a cable, rod, or a conduit (e.g., a pipe). The support member may be made of a metal, ceramic, inorganic material, or combinations thereof. Portions of a support member may be exposed to formation fluids and heat during use, so the support member may be chemically resistant and thermally resistant.

Ties, spot welds and/or other types of connectors may be used to couple the insulated conductor heater to the support member at various locations along a length of the insulated conductor heater. The support member may be attached to a wellhead at an upper surface of the formation. In an alternate embodiment of an insulated conductor heater, the insulated conductor heater is designed to have sufficient structural strength so that a support member is not needed. The insulated conductor heater will in many instances have some flexibility to inhibit thermal expansion damage when heated or cooled.

In certain embodiments, insulated conductor heaters may be placed in wellbores without support members and/or centralizers. This can be accomplished for heaters if the insulated conductor has a suitable combination of temperature and corrosion resistance, creep strength, length, thickness (diameter) and metallurgy that will inhibit failure of the insulated conductor during use. In an embodiment, insulated conductors that are heated to a working temperature of about 700° C., are less than about 150 meters in length, are made of 310 stainless steel, and may be used without support members.

Figure 16:
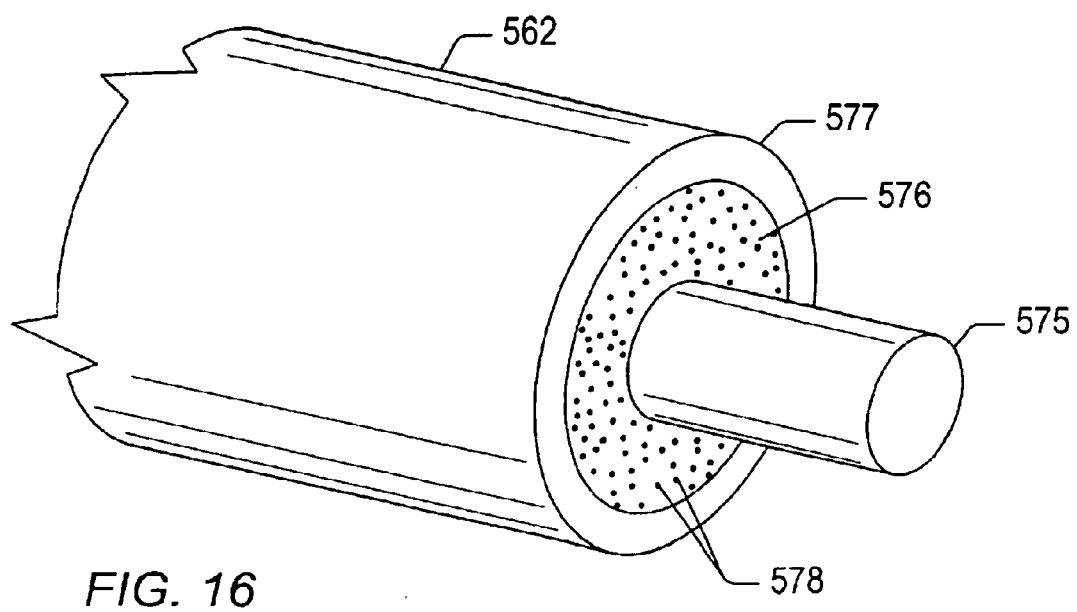
FIGS. 16–18 depict several embodiments of an insulated conductor heat source.

FIG. 16 depicts a perspective view of an end portion of an embodiment of an insulated conductor heater 562. An insulated conductor heater may have any desired cross sectional shape, such as, but not limited to round (as shown in FIG. 16), triangular, ellipsoidal, rectangular, hexagonal or irregular shape. An insulated conductor heater may include conductor 575, electrical insulation 576 and sheath 577. The conductor 575 may resistively heat when an electrical current passes through the conductor. An alternating or direct current may be used to heat the conductor 575. In an embodiment, a 60 cycle AC current may be used.

In some embodiments, the electrical insulation 576 may inhibit current leakage and may inhibit arcing to the sheath 577. The electrical insulation 576 may also thermally conduct heat generated in the conductor 575 to the sheath 577. The sheath 577 may radiate or conduct heat to the formation. An insulated conductor heater 562 may be 1000 m or more in length. In an embodiment of an insulated conductor heater, the insulated conductor heater 562 may have a length from about 15 m to about 950 m. Longer or shorter insulated conductors may also be used to meet specific application needs. In embodiments of insulated conductor heaters, purchased insulated conductor heaters have lengths of about 100 m to 500 m (e.g., 230 m). In certain embodiments, dimensions of sheaths and/or conductors of an insulated conductor may be formed so that the insulated conductors have enough strength to be self supporting even at upper working temperatures. Such insulated cables may be suspended from wellheads or supports positioned near an interface between an overburden and a coal formation without the need for support members extending into the hydrocarbon formation along with the insulated conductors.

In an embodiment, a higher frequency current may be used to take advantage of the skin effect in certain metals. In some embodiments, a 60 cycle AC current may be used in combination with conductors made of metals that exhibit pronounced skin effects. For example, ferromagnetic metals like iron alloys and nickel may exhibit a skin effect. The skin effect confines the current to a region close to the outer surface of the conductor, thereby effectively increasing the resistance of the conductor. A higher resistance may be desired to decrease the operating current, minimize ohmic losses in surface cables, and also minimize the cost of surface facilities.

Figure 17:
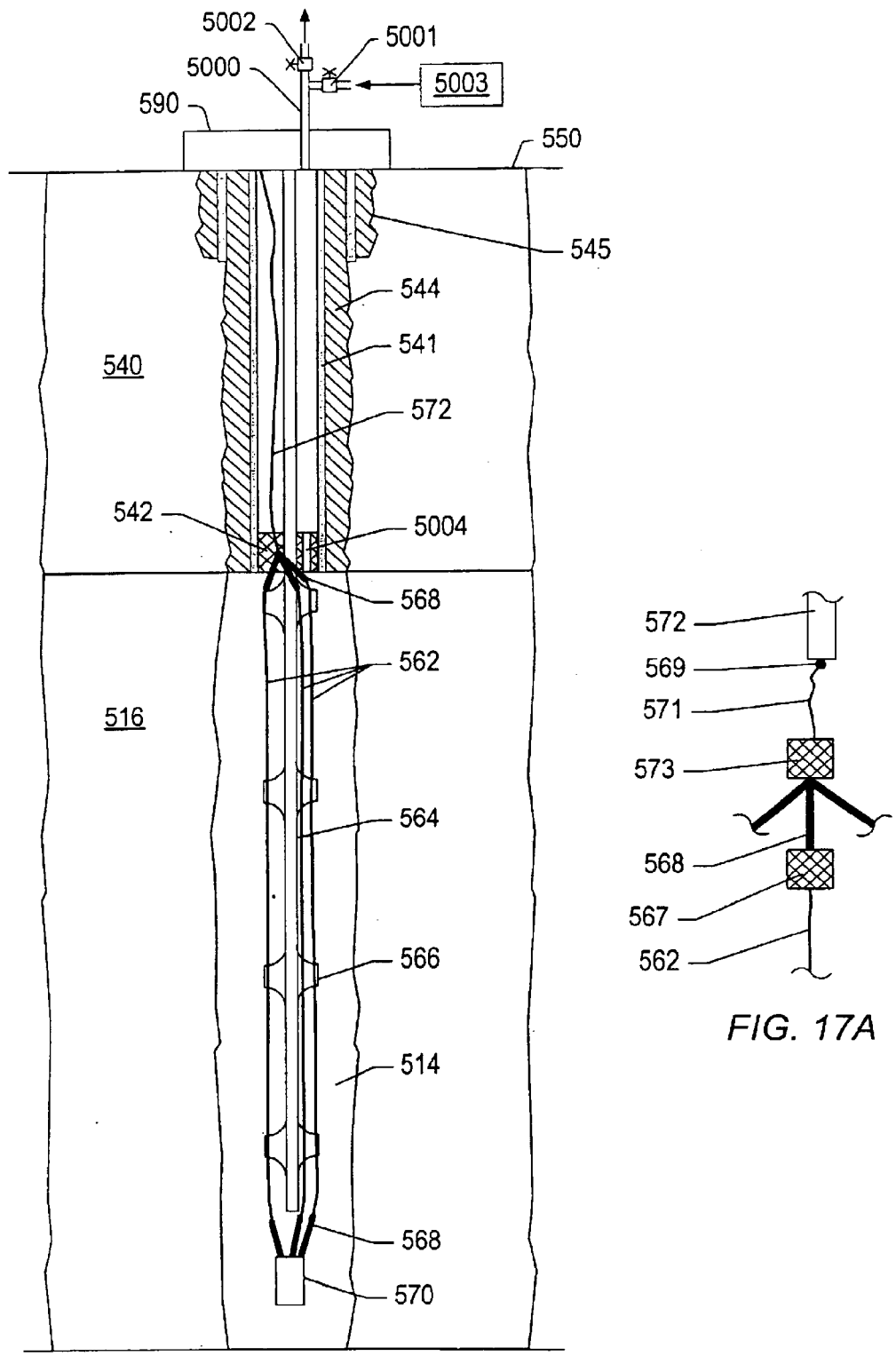

As illustrated in FIG. 17, an insulated conductor heater 562 will in many instances be designed to operate at a power level of up to about 1650 watts/meter. The insulated conductor heater 562 may typically operate at a power level between about 500 watts/meter and about 1150 watts/meter when heating a formation. The insulated conductor heater 562 may be designed so that a maximum voltage level at a typical operating temperature does not cause substantial thermal and/or electrical breakdown of electrical insulation 576. The insulated conductor heater 562 may be designed so that the sheath 577 does not exceed a temperature that will result in a significant reduction in corrosion resistance properties of the sheath material.

In an embodiment of an insulated conductor heater 562, the conductor 575 may be designed to reach temperatures within a range between about 650° C. to about 870° C., and the sheath 577 may be designed to reach temperatures within a range between about 535° C. to about 760° C. Insulated conductors having other operating ranges may be formed to meet specific operational requirements. In an embodiment of an insulated conductor heater 562, the conductor 575 is designed to operate at about 760° C., the sheath 577 is designed to operate at about 650° C., and the insulated conductor heater is designed to dissipate about 820 watts/meter.

An insulated conductor heater 562 may have one or more conductors 575. For example, a single insulated conductor heater may have three conductors within electrical insulation that are surrounded by a sheath. FIG. 16 depicts an insulated conductor heater 562 having a single conductor 575. The conductor may be made of metal. The material used to form a conductor may be, but is not limited to, nichrome, nickel, and a number of alloys made from copper and nickel in increasing nickel concentrations from pure copper to Alloy 30, Alloy 60, Alloy 180 and Monel. Alloys of copper and nickel may advantageously have better electrical resistance properties than substantially pure nickel or copper.

In an embodiment, the conductor may be chosen to have a diameter and a resistivity at operating temperatures such that its resistance, as derived from Ohm's law, makes it electrically and structurally stable for the chosen power dissipation per meter, the length of the heater, and/or the maximum voltage allowed to pass through the conductor. In an alternate embodiment, the conductor may be designed, using Maxwell's equations, to make use of skin effect heating in and/or on the conductor.

The conductor may be made of different material along a length of the insulated conductor heater. For example, a first section of the conductor may be made of a material that has a significantly lower resistance than a second section of the conductor. The first section may be placed adjacent to a formation layer that does not need to be heated to as high a temperature as a second formation layer that is adjacent to the second section. The resistivity of various sections of conductor may be adjusted by having a variable diameter and/or by having conductor sections made of different materials.

A diameter of a conductor 575 may typically be between about 1.3 mm to about 10.2 mm. Smaller or larger diameters may also be used to have conductors with desired resistivit, characteristics. In an embodiment of an insulated conductor heater, the conductor is made of Alloy 60 that has a diameter of about 5.8 mm.

As illustrated in FIG. 16, an electrical insulator 576 of an insulated conductor heater 562 may be made of a variety of materials. Pressure may be used to place electrical insulator powder between a conductor 575 and a sheath 577. Low flow characteristics and other properties of the powder and/or the sheaths and conductors may inhibit the powder from flowing out of the sheaths. Commonly used powders may include, but are not limited to, MgO, $AM_2O_3$, Zirconia, BeO, different chemical variations of Spinels, and combinations thereof. MgO may provide good thermal conductivity and electrical insulation properties. The desired electrical insulation properties include low leakage current and high dielectric strength. A low leakage current decreases the possibility of thermal breakdown and the high dielectric strength decreases the possibility of arcing across the insulator. Thermal breakdown can occur if the leakage current causes a progressive rise in the temperature of the insulator leading also to arcing across the insulator. An amount of impurities 578 in the electrical insulator powder may be tailored to provide required dielectric strength and a low level of leakage current. The impurities 578 added may be, but are not limited to, CaO, $Fe_2O_3$, $Al_2O_3$, and other metal oxides. Low porosity of the electrical insulation tends to reduce leakage current and increase dielectric strength. Low porosity may be achieved by increased packing of the MgO powder during fabrication or by filling of the pore space in the MgO powder with other granular materials, for example, $Al_2O_3$.

The impurities 578 added to the electrical insulator powder may have particle sizes that are smaller than the particle sizes of the powdered electrical insulator. The small particles may occupy pore space between the larger particles of the electrical insulator so that the porosity of the electrical insulator is reduced. Examples of powdered electrical insulators that may be used to form electrical insulation 576 are "H" mix manufactured by Idaho Laboratories Corporation (Idaho Falls, Id.), or Standard MgO used by Pyrotenax Cable Company (Trenton, Ontario) for high temperature applications. In addition, other powdered electrical insulators may be used.

A sheath 577 of an insulated conductor heater 562 may be an outer metallic layer. The sheath 577 may be in contact with hot formation fluids. The sheath 577 may need to be made of a material having a high resistance to corrosion at elevated temperatures. Alloys that may be used in a desired operating temperature range of the sheath include, but are not limited to, 304 stainless steel, 310 stainless steel, Incoloy 800, and Inconel 600. The thickness of the sheath has to be sufficient to last for three to ten years in a hot and corrosive environment. A thickness of the sheath may generally vary between about 1 mm and about 2.5 mm. For example, a 1.3 mm thick 310 stainless steel outer layer provides a sheath 577 that is able to provide good chemical resistance to sulfidation corrosion in a heated zone of a formation for a period of over 3 years. Larger or smaller sheath thicknesses may be used to meet specific application requirements.

An insulated conductor heater may be tested after fabrication. The insulated Iconductor heater may be required to withstand 2–3 times an operating voltage at a selected operating temperature. Also, selected samples of produced insulated conductor heaters may be required to withstand 1000 VAC at 760° C. for one month.

As illustrated in FIG. 17a, a short flexible transition conductor 571 may be connected to a lead-in conductor 572 using a connection 569 made during heater installation in the field. The transition conductor 571 may, for example, be a flexible, low resistivity, stranded copper cable that is surrounded by rubber or polymer insulation. A transition conductor 571 may typically be between about 1.5 m and about 3 m, although longer or shorter transition conductors may be used to accommodate particular needs. Temperature resistant cable may be used as transition conductor 571. The transition conductor 571 may also be connected to a short length of an insulated conductor heater that is less resistive than a primary heating section of the insulated conductor heater. The less resistive portion of the insulated conductor heater may be referred to as a "cold pin" 568.

A cold pin 568 may be designed to dissipate about one tenth to about one fifth of the power per unit length as is dissipated in a unit length of the primary heating section. Cold pins may typically be between about 1.5 m to about 15 m, although shorter or longer lengths may be used to accommodate specific application needs. In an embodiment, the conductor of a cold pin section is copper with a diameter of about 6.9 mm and a length of 9.1 m. The electrical insulation is the same type of insulation used in the primary heating section. A sheath of the cold pin may be made of Inconel 600. Chloride corrosion cracking in the cold pin region may occur, so a chloride corrosion resistant metal such as Inconel 600 may be used as the sheath.

As illustrated in FIG. 17a, a small, epoxy filled canister 573 may be used to create a connection between a transition conductor 571 and a cold pin 568. Cold pins 568 may be connected to the primary heating sections of insulated conductor 562 heaters by "splices" 567. The length of the cold pin 568 may be sufficient to significantly reduce a temperature of the insulated conductor heater 562. The heater section of the insulated conductor heater 562 may operate from about 530° C. to about 760° C., the splice 567 may be at a temperature from about 260° C. to about 370° C., and the temperature at the lead-in cable connection to the cold pin may be from about 40° C. to about 90° C. In addition to a cold pin at a top end of the insulated conductor heater, a cold pin may also be placed at a bottom end of the insulated conductor heater. The cold pin at the bottom end may in many instances make a bottom termination easier to manufacture.

Splice material may have to withstand a temperature equal to half of a target zone operating temperature. Density of electrical insulation in the splice should in many instances be high enough to withstand the required temperature and the operating voltage.

A splice 567 may be required to withstand 1000 VAC at 480° C. Splice material may be high temperature splices made by Idaho Laboratories Corporation or by Pyrotenax Cable Company. A splice may be an internal type of splice or an external splice. An internal splice is typically made without welds on the sheath of the insulated conductor heater. The lack of weld on the sheath may avoid potential weak spots (mechanical and/or electrical) on the insulated cable heater. An external splice is a weld made to couple sheaths of two insulated conductor heaters together. An external splice may need to be leak tested prior to insertion of the insulated cable heater into a formation. Laser welds or orbital TIG (tungsten inert gas) welds may be used to form external splices. An additional strain relief assembly may be placed around an external splice to improve the splice's resistance to bending and to protect the external splice against partial or total parting.

An insulated conductor assembly may include heating sections, cold pins, splices, and termination canisters and flexible transition conductors. The insulated conductor assembly may need to be examined and electrically tested before installation of the assembly into an opening in a formation. The assembly may need to be examined for competent welds and to make sure that there are no holes in the sheath anywhere along the whole heater (including the heated section, the cold-pins, the splices and the termination cans). Periodic X-ray spot checking of the commercial product may need to be made. The whole cable may be immersed in water prior to electrical testing. Electrical testing of the assembly may need to show more than 2000 megaohms at 500 VAC at room temperature after water immersion. In addition, the assembly may need to be connected to 1000 VAC and show less than about 10 microamps per meter of resistive leakage current at room temperature. Also, a check on leakage current at about 760° C. may need to show less than about 0.4 milliamps per meter.

There are a number of companies that manufacture insulated conductor heaters. Such manufacturers include, but are not limited to, MI Cable Technologies (Calgary, Alberta), Pyrotenax Cable Company (Trenton, Ontario), Idaho Laboratories Corporation (Idaho Falls, Id,), and Watlow (St. Louis, Mo.). As an example, an insulated conductor heater may be ordered from Idaho Laboratories as cable model 355-A90-310-"H" 30'/750'/30' with Inconel 600 sheath for the cold-pins, three phase Y configuration and bottom jointed conductors. The required specification for the heater should also include 1000 VAC, 1400° F. quality cable in addition to the preferred mode specifications described above. The designator 355 specifies the cable OD (0.355"), A90 specifies the conductor material, 310 specifies the heated zone sheath alloy (SS 310), "H" specifies the MgO mix, 30'/750'/30' specifies about a 230 m heated zone with cold-pins top and bottom having about 9 m lengths. A similar part number with the same specification using high temperature Standard purity MgO cable may be ordered from Pyrotenax Cable Company.

One or more insulated conductor heaters may be placed within an opening in a formation to form a heat source or heat sources. Electrical current may be passed through each insulated conductor heater in the opening to heat the formation. Alternately, electrical current may be passed through selected insulated conductor heaters in an opening. The unused conductors may be backup heaters. Insulated conductor heaters may be electrically coupled to a power source in any convenient manner. Each end of an insulated conductor heater may be coupled to lead-in cables that pass through a wellhead. Such a configuration typically has a 180° bend (a "hairpin" bend) or turn located near a bottom of the heat source. An insulated conductor heater that includes a 180° bend or turn may not require a bottom termination, but the 180° bend or turn may be an electrical and/or structural weakness in the heater. Insulated conductor heaters may be electrically coupled together in series, in parallel, or in series and parallel combinations. In some embodiments of heat sources, electrical current may pass into the conductor of an insulated conductor heater and may returned through the sheath of the insulated conductor heater by connecting the conductor 575 to the sheath 577 at the bottom of the heat source.

In an embodiment of a heat source depicted in FIG. 17, three insulated conductor heaters 562 are electrically coupled in a 3-phase Y configuration to a power supply. The power supply may provide a 60 cycle AC current to the electrical conductors. No bottom connection may be required for the insulated conductor heaters. Alternately, all three conductors of the three phase circuit may be connected together near the bottom of a heat source opening. The connection may be made directly at ends of heating sections of the insulated conductor heaters or at ends of cold pins coupled to the heating sections at the bottom of the insulated conductor heaters. The bottom connections may be made with insulator filled and sealed canisters or with epoxy filled canisters. The insulator may be the same composition as the insulator used as the electrical insulation.

The three insulated conductor heaters depicted in FIG. 17 may be coupled to support member 564 using centralizers 566. Alternatively, the three insulated conductor heaters may be strapped directly to the support tube using metal straps. Centralizers 566 may be configured to maintain a location of insulated conductor heaters 562 on support member 564. Centralizers 566 may be made of, for example, metal, ceramic or a combination thereof. The metal may be stainless steel or any other type of metal able to withstand a corrosive and hot environment. In some embodiments, centralizers 566 may be simple bowed metal strips welded to the support member at distances less than about 6 meters. A ceramic used in centralizer 566 may be, but is not limited to, $Al_2O_3$, MgO or other insulator. Centralizers 566 may be configured to maintain a location of insulated conductor heaters 562 on support member 564 such that movement of insulated conductor heaters may be substantially inhibited at operating temperatures of the insulated conductor heaters. Insulated conductor heaters 562 may also be somewhat flexible to withstand expansion of support member 564 during heating. Centralizers 566 may also be configured as described in any of the embodiments herein.

Support member 564, insulated conductor heater 562, and centralizers 566 may be placed in opening 514 in coal formation 516. Insulated conductor heaters 562 may be coupled to bottom conductor junction 570 using cold pin transition conductor 568. Bottom conductor junction 570 may electrically couple each insulated conductor heater 562 to each other. Bottom conductor junction 570 may include materials that are electrically conducting and do not melt at temperatures found in opening 514. Cold pin transition conductor 568 may be an insulated conductor heater having lower electrical resistance than insulated conductor heater 562. As illustrated in FIG. 17a, cold pin 568 may be coupled to transition conductor 571 and insulated conductor heater 562. Cold pin transition conductor 568 may provide a temperature transition between transition conductor 571 and insulated conductor heater 562.

Figure 18:
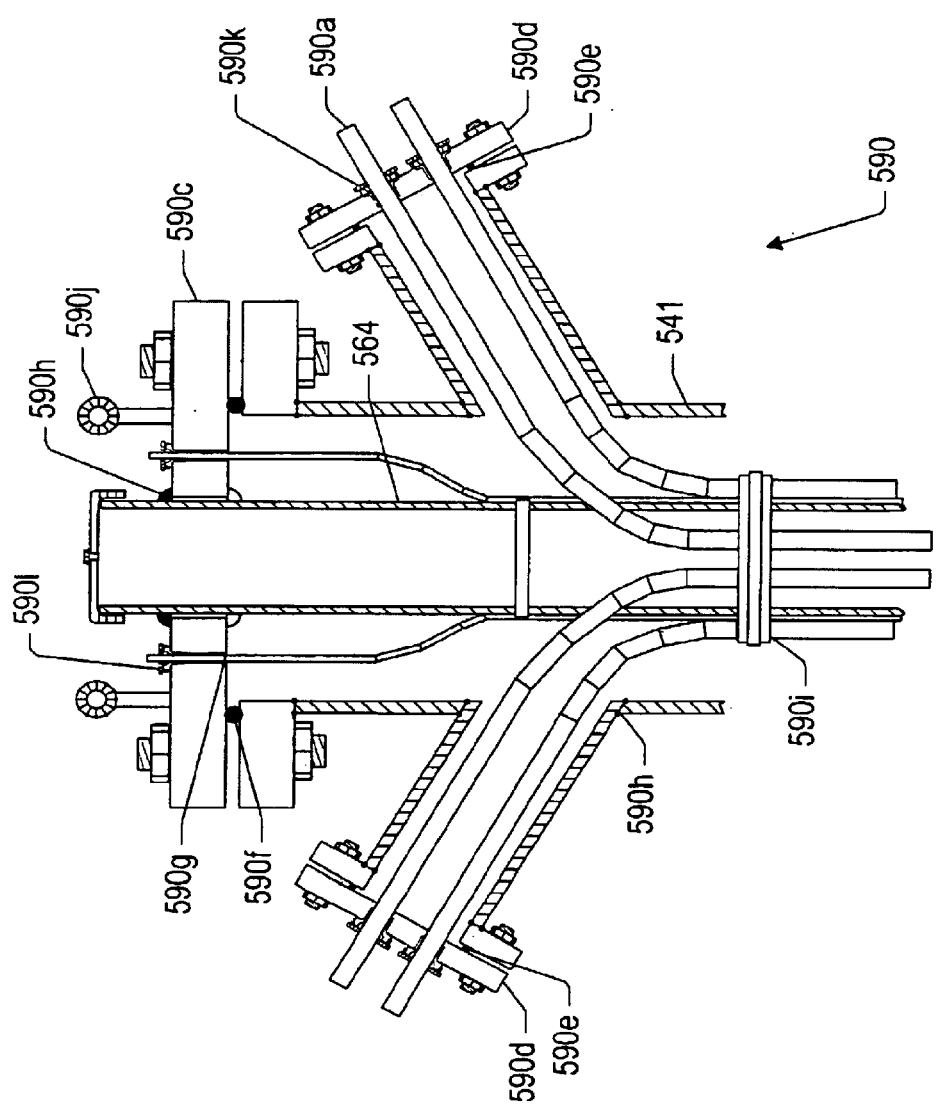

Lead-in conductor 572 may be coupled to wellhead 590 to provide electrical power to insulated conductor heater 562. Wellhead 590 may be configured as shown in FIG. 18 and as described in any of the embodiments herein. Lead-in conductor 572 may be made of a relatively low electrical resistance conductor such that relatively little or substantially no heat may be generated from electrical current passing through lead-in conductor 572. For example, the lead-in conductor may include, but may not be limited to, a rubber insulated stranded copper wire, but the lead-in conductor may also be a mineral-insulated conductor with a copper core. Lead-in conductor 572 may couple to a wellhead 590 at surface 550 through a sealing flange located between overburden 540 and surface 550. The sealing flange 590c may be configured as shown in FIG. 18 and as described in any of the embodiments herein. The sealing flange may substantially inhibit fluid from escaping from opening 514 to surface 550.

Packing material 542 (see FIG. 17) may optionally be placed between overburden casing 541 and opening 514. Overburden casing 541 may include any materials configured to substantially contain cement 544. In an embodiment of a heater source, overburden casing is a 7.6 cm (3 inch) diameter carbon steel, schedule 40 pipe. Packing material 542 may be configured to inhibit fluid from flowing from opening 514 to surface 550. Overburden casing 541 may be placed in cement 544 in overburden 540 of formation 516. Cement 544 may include, for example, Class G or Class H Portland cement mixed with silica flour for improved high temperature performance, slag or silica flour, and/or a mixture thereof (e.g., about 1.58 grams per cubic centimeter slag/silica flour). In selected heat source embodiments, cement 544 extends radially a width of from about 5 cm to about 25 cm. In some embodiments cement 544 may extend radially a width of about 10 cm to about 15 cm. In some other embodiments, cement 544 may be designed to inhibit heat transfer from conductor 564 into formation 540 within the overburden.

In certain embodiments one or more conduits may be provided to supply additional components (e.g., nitrogen, carbon dioxide, reducing agents such as gas containing hydrogen, etc.) to formation openings, to bleed off fluids, and/or to control pressure. Formation pressures tend to be highest near heating sources and thus it is often beneficial to have pressure control equipment proximate the heating source. In some embodiments adding a reducing agent proximate the heating source assists in providing a more favorable pyrolysis environment (e.g., a higher hydrogen partial pressure). Since permeability and porosity tend to increase more quickly proximate the heating source, it is often optimal to add a reducing agent proximate the heating source so that the reducing agent can more easily move into the formation.

Figure 19:
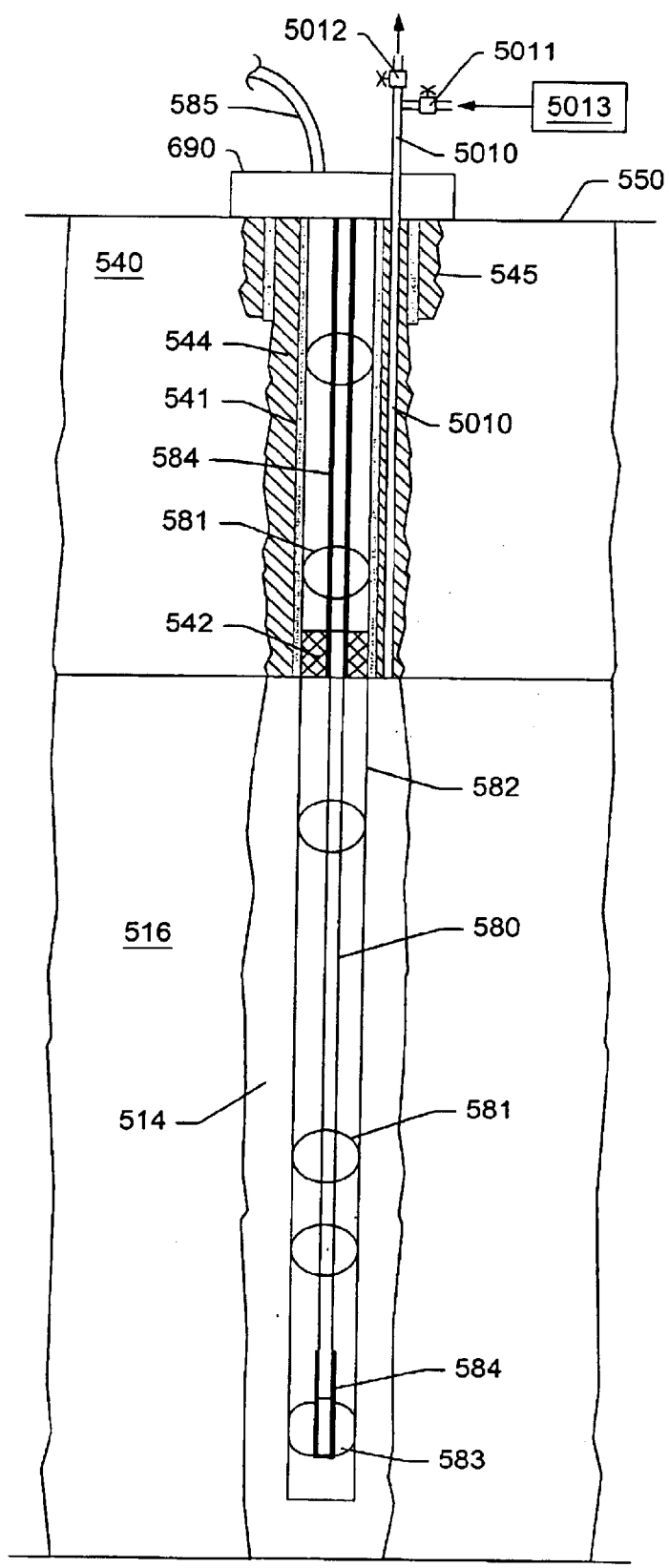
FIG. 19 depicts an embodiment of a conductor-in-conduit heat source in a formation.

In FIG. 17, for example, conduit 5000 may be provided to add gas from gas source 5003, through valve 5001, and into opening 514 (an opening 5004 is provided in packing material 542 to allow gas to pass into opening 514). Conduit 5000 and valve 5002 may also be used at different times to bleed off pressure and/or control pressure proximate to opening 514. In FIG. 19, for example, conduit 5010 may be provided to add gas from gas source 5013, through valve 5011, and into opening 514 (an opening is provided in cement 544 to allow gas to pass into opening 514). Conduit 5010 and valve 5012 may also be used at different times to bleed off pressure and/or control pressure proximate to opening 514. It is to be understood that any of the heating sources described herein may also be equipped with conduits to supply additional components, bleed off fluids, and/or to control pressure.

Support member 564 and lead-in conductor 572 may be coupled to wellhead 590 at surface 550 of formation 516. Surface conductor 545 may enclose cement 544 and may couple to wellhead 590. Embodiments of heater source surface conductor 545 may have a diameter of about 10.16 cm to about 30.48 cm or, for example, a diameter of about 22 cm. Embodiments of surface casings may extend to depths of approximately 3 m to approximately 515 m into an opening in the formation. Alternatively, the surface casing may extend to a depth of approximately 9 m into the opening. Electrical current may be supplied from a power source to insulated conductor heater 562 to generate heat due to the electrical resistance of conductor 575 as illustrated in FIG. 16. As an example, a voltage of about 330 volts and a current of about 266 amps are supplied to insulated conductors 562 to generate a heat of about 1150 watts/meter in insulated conductor heater 562. Heat generated from the three insulated conductor heaters 562 may transfer (e.g., by radiation) within opening 514 to heat at least a portion of the formation 516.

An appropriate configuration of an insulated conductor heater may be determined by optimizing a material cost of the heater based on a length of heater, a power required per meter of conductor, and a desired operating voltage. In addition, an operating current and voltage may be chosen to optimize the cost of input electrical energy in conjunction with a material cost of the insulated conductor heaters. For example, as input electrical energy increases, the cost of materials needed to withstand the higher voltage may also increase. The insulated conductor heaters may be configured to generate a radiant heat of approximately 650 watts/meter of conductor to approximately 1650 watts/meter of conductor. The insulated conductor heater may operate at a temperature between approximately 530° C. and approximately 760° C. within a formation.

Heat generated by an insulated conductor heater may heat at least a portion of a coal formation. In some embodiments heat may be transferred to the formation substantially by radiation of the generated heat to the formation. Some heat may be transferred by conduction or convection of heat due to gases present in the opening. The opening may be an uncased opening. An uncased opening eliminates cost associated with thermally cementing the heater to the formation, costs associated with a casing, and/or costs of packing a heater within an opening. In addition, the heat transfer by radiation is generally more efficient than by conduction so the heaters will operate at lower temperatures in an open wellbore. The conductive heat transfer may be enhanced by the addition of a gas in the opening at pressures up to about 27 bar absolute. The gas may include, but may not be limited to, carbon dioxide and/or helium. Still another advantage is that the heating assembly will be free to undergo thermal expansion. Yet another advantage is that the heaters may be replaceable.

The insulated conductor heater, as described in any of the embodiments herein, may be installed in opening 514 by any method known in the art. In an embodiment, more than one spooling assembly may be used to install both the electric heater and a support member simultaneously. U.S. Pat. No. 4,572,299 issued to Van Egmond et al., which is incorporated by reference as if fully set forth herein, describes spooling an electric heater into a well. Alternatively, the support member may be installed using a coiled tubing unit including any unit known in the art. The heaters may be un-spooled and connected to the support as the support is inserted into the well. The electric heater and the support member may be un-spooled from the spooling assemblies. Spacers may be coupled to the support member and the heater along a length of the support member. Additional spooling assemblies may be used for additional electric heater elements.

In an embodiment, the support member may be installed using standard oil field operations and welding different sections of support. Welding may be done by using orbital welding. For example, a first section of the support member may be disposed into the well. A second section (e.g., of substantially similar length) may be coupled to the first section in the well. The second section may be coupled by welding the second section to the first section. An orbital welder disposed at the wellhead may be configured to weld the second section to the first section. This process may be repeated with subsequent sections coupled to previous sections until a support of desired length is within the well.

FIG. 18 illustrates a cross-sectional view of one embodiment of a wellhead coupled, e.g., to overburden casing 541. Flange 590c may be coupled to, or may be a part of, wellhead 590. Flange 590c may be, for example, carbon steel, stainless steel or any other commercially available suitable sealing material. Flange 590c may be sealed with o-ring 590f, or any other sealing mechanism. Thermocouples 590g may be provided into wellhead 590 through flange 590c. Thermocouples 590g may measure a temperature on or proximate to support member 564 within the heated portion of the well. Support member 564 may be coupled to flange 590c. Support member 564 may be configured to support one or more insulated conductor heaters as described herein. Support member 564 may be sealed in flange 590c by welds 590h. Alternately, support member 564 may be sealed by any method known in the art.

Power conductor 590a may be coupled to a lead-in cable and/or an insulated conductor heater. Power conductor 590a may be configured to provide electrical energy to the insulated conductor heater. Power conductor 590a may be sealed in sealing flange 590d. Sealing flange 590d may be sealed by compression seals or O-rings 590e. Power conductor 590a may be coupled to support member 564 with band 590i. Band 590i may include a rigid and corrosion resistant material such as stainless steel. Wellhead 590 may be sealed with weld 590h such that fluid may be substantially inhibited from escaping the formation through wellhead 590. Lift bolt 590j may be configured to lift wellhead 590 and support member 564. Wellhead 590 may also include a pressure control valve. Compression fittings 590k may serve to seal power cable 590a and compression fittings 5901 may serve to seal thermocouple 590g. These seals inhibit fluids from escaping the formation. The pressure control valve may be configured to control a pressure within an opening in which support member 564 may be disposed.

In an embodiment, a control system may be configured to control electrical power supplied to an insulated conductor heater. Power supplied to the insulated conductor heater may be controlled with any appropriate type of controller. For alternating current, the controller may, for example, be a tapped transformer. Alternatively, the controller may be a zero crossover electrical heater firing SCR (silicon controlled rectifier) controller. Zero crossover electrical heater firing control may be achieved by allowing full supply voltage to the insulated conductor heater to pass through the insulated conductor heater for a specific number of cycles, starting at the "crossover," where an instantaneous voltage may be zero, continuing for a specific number of complete cycles, and discontinuing when the instantaneous voltage again may cross zero. A specific number of cycles may be blocked, allowing control of the heat output by the insulated conductor heater. For example, the control system may be arranged to block fifteen and/or twenty cycles out of each sixty cycles that may be supplied by a standard 60 Hz alternating current power supply. Zero crossover firing control may be advantageously used with materials having low temperature coefficient materials. Zero crossover firing control may substantially inhibit current spikes from occurring in an insulated conductor heater.

FIG. 19 illustrates an embodiment of a conductor-in-conduit heater configured to heat a section of a coal formation. Conductor 580 may be disposed in conduit 582. Conductor 580 may be a rod or conduit of electrically conductive material. A conductor 580 may have a low resistance section 584 at both the top and the bottom of the conductor 580 in order to generate less heating in these sections 584. The substantially low resistance section 584 may be due to a greater cross-sectional area of conductor 580 in that section. For example, conductor 580 may be a 304 or 310 stainless steel rod with a diameter of approximately 2.8 cm. The diameter and wall thickness of conductor 580 may vary, however, depending on, for example, a desired heating rate of the coal formation. Conduit 582 may include an electrically conductive material. For example, conduit 582 may be a 304 or 310 stainless steel pipe having a diameter of approximately 7.6 cm and a thickness of approximately schedule 40. Conduit 582 may be disposed in opening 514 in formation 516. Opening 514 may have a diameter of at least approximately 5 cm. The diameter of the opening may vary, however, depending on, for example, a desired heating rate in the formation and/or a diameter of conduit 582. For example, a diameter of the opening may be from about 10 cm to about 13 cm. Larger diameter openings may also be used. For example, a larger opening may be used if more than one conductor is to be placed within a conduit.

Figure 22:
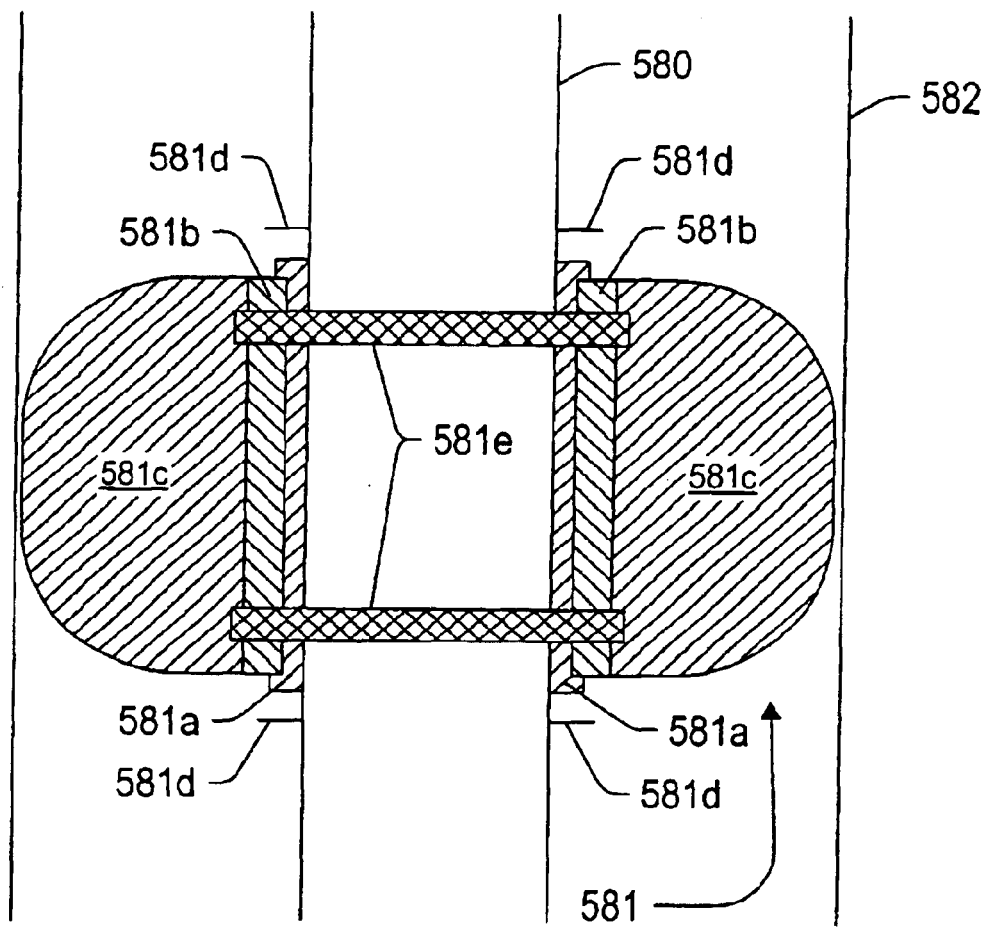
FIG. 22 and FIGS. 23a–23b depict several embodiments of a centralizer.

Conductor 580 may be centered in conduit 582 through centralizer 581. Centralizer 581 may electrically isolate conductor 580 from conduit 582. In addition, centralizer 581 may be configured to locate conductor 580 within conduit 582. Centralizer 581 may be made of a ceramic material or a combination of ceramic and metallic materials. More than one centralizer 581 may be configured to substantially inhibit deformation of conductor 580 in conduit 582 during use. More than one centralizer 581 may be spaced at intervals between approximately 0.5 m and approximately 3 m along conductor 580. Centralizer 581 may be made of ceramic, 304 stainless steel, 310 stainless steel, or other types of metal. Centralizer 581 may be configured as shown in FIG. 22 and/or FIGS. 23a and 23b.

Figure 20:
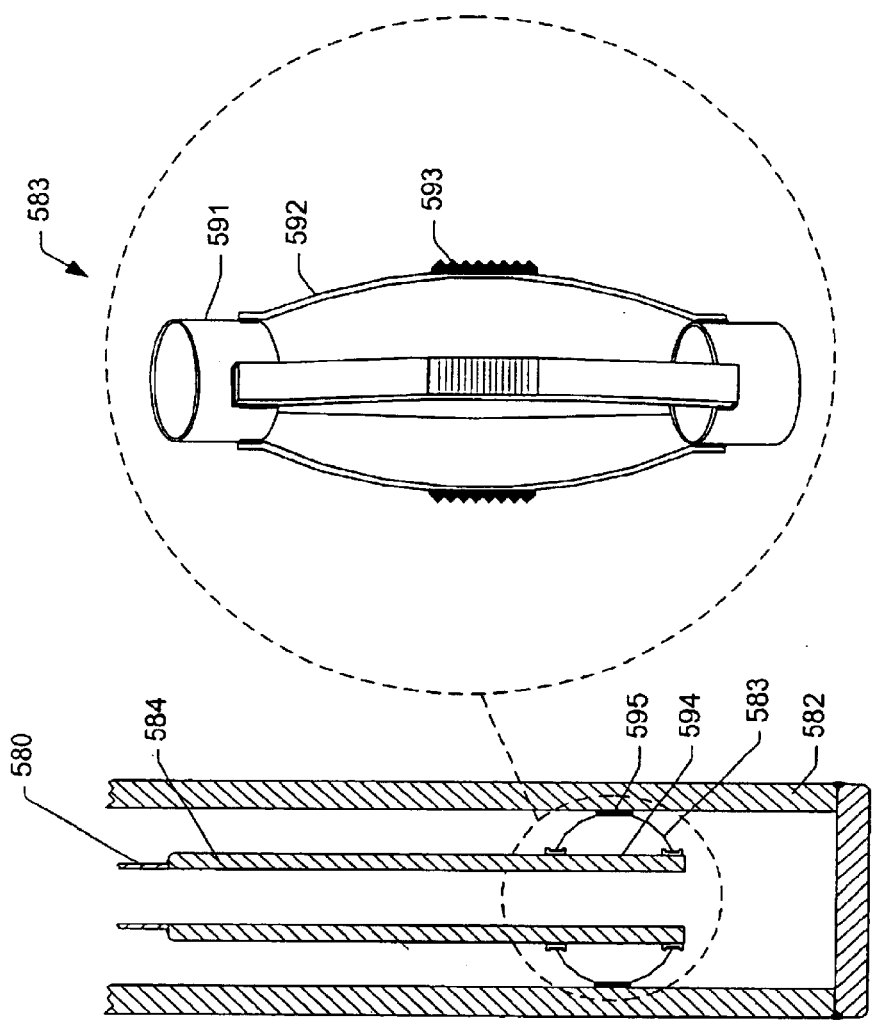
FIG. 20 depicts an embodiment of a sliding connector.
Figure 21:
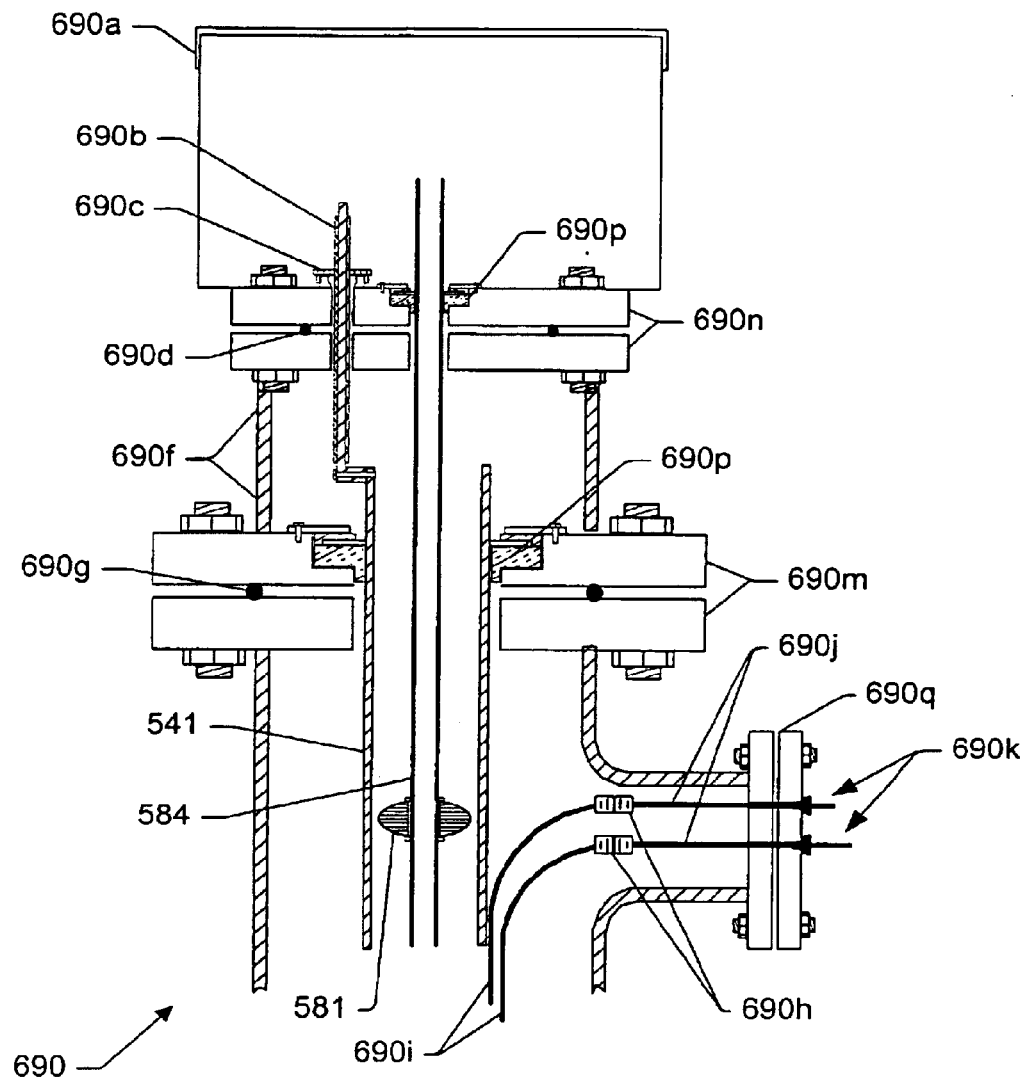
FIG. 21 depicts an embodiment of a wellhead with a conductor-in-conduit heat source.

As depicted in FIG. 20, sliding connector 583 may couple an end of conductor 580 disposed proximate a lowermost surface of conduit 582. Sliding connector 583 allows for differential thermal expansion between conductor 580 and conduit 582. Sliding connector 583 is go attached to a conductor 580 located at the bottom of the well at a low resistance section 584 which may have a greater cross-sectional area. The lower resistance of section 584 allows the sliding connector to operate at temperatures no greater than about 90° C. In this manner, corrosion of the sliding connector components is minimized and therefore contact resistance between sliding connector 583 and conduit 582 is also minimized. Sliding connector 583 may be configured as shown in FIG. 20 and as described in any of the embodiments herein. The substantially low resistance section 584 of the conductor 580 may couple conductor 580 to wellhead 690 as depicted in FIG. 19. Wellhead 690 may be configured as shown in FIG. 21 and as described in any of the embodiments herein. Electrical current may be applied to conductor 580 from power cable 585 through a low resistance section 584 of the conductor 580. As depicted in FIG. 19, electrical current may pass from conductor 580 through sliding connector 583 to conduit 582. Conduit 582 may be electrically insulated from overburden casing 541 and from wellhead 690 to return electrical current to power cable 585. Heat may be generated in conductor 580 and conduit 582. The generated heat may radiate within conduit 582 and opening 514 to heat at least a portion of formation 516. As an example, a voltage of about 330 volts and a current of about 795 amps may be supplied to conductor 580 and conduit 582 in a 229 m (750 ft) heated section to generate about 1150 watts/meter of conductor 580 and conduit 582.

Overburden conduit 541 may be disposed in overburden 540 of formation 516. Overburden conduit 541 may in some embodiments be surrounded by materials that may substantially inhibit heating of overburden 540. A substantially low resistance section 584 of a conductor 580 may be placed in overburden conduit 541. The substantially low resistance section 584 of conductor 580 may be made of, for example, carbon steel. The substantially low resistance section 584 may have a diameter between about 2 cm to about 5 cm or, for example, a diameter of about 4 cm. A substantially low resistance section 584 of conductor 580 may be centralized within overburden conduit 541 using centralizers 581. Centralizers 581 may be spaced at intervals of approximately 6 m to approximately 12 m or, for example, approximately 9 m along substantially low resistance section 584 of conductor 580. A substantially low resistance section 584 of conductor 580 may be coupled to conductor 580 using any method known in the art such as arc welding. A substantially low resistance section 584 may be configured to generate little and/or substantially no heat in overburden conduit 541. Packing material 542 may be placed between overburden casing 541 and opening 514. Packing material 542 may be configured to substantially inhibit fluid from flowing from opening 514 to surface 550 or to inhibit most heat carrying fluids from flowing from opening 514 to surface 550.

Overburden conduit may include, for example, a conduit of carbon steel having a diameter of about 7.6 cm and a thickness of about schedule 40 pipe. Cement 544 may include, for example, slag or silica flour, or a mixture thereof (e.g., about 1.58 grams per cubic centimeter slag/silica flour). Cement 544 may extend radially a width of about 5 cm to about 25 cm. Cement 544 may also be made of material designed to inhibit flow of heat into formation 516.

Surface conductor 545 and overburden casing 541 may enclose cement 544 and may couple to wellhead 690. Surface conductor 545 may have a diameter of about 10 cm to about 30 cm and more preferably a diameter of about 22 cm. Electrically insulating sealing flanges may be configured to mechanically couple substantially low resistance section 584 of conductor 580 to wellhead 690 and to electrically couple lower resistance section 584 to power cable 585. The electrically insulating sealing flanges may be configured to couple lead-in conductor 585 to wellhead 690. For example, lead-in conductor 585 may include a copper cable, wire, or other elongated member. Lead-in conductor 585 may include, however, any material having a substantially low resistance. The lead-in conductor may be clamped to the bottom of the low resistivity conductor to make electrical contact.

In an embodiment, heat may be generated in or by conduit 582. In this manner, about 10% to about 30%, or, for example, about 20%, of the total heat generated by the heater may be generated in or by conduit 582. Both conductor 580 and conduit 582 may be made of stainless steel. Dimensions of conductor 580 and conduit 582 may be chosen such that the conductor will dissipate heat in a range from approximately 650 watts per meter to 1650 watts per meter. A temperature in conduit 582 may be approximately 480° C. to approximately 815° C. and a temperature in conductor 580 may be approximately 500° C. to 840° C. Substantially uniform heating of a coal formation may be provided along a length of conduit 582 greater than about 300 m or, maybe, greater than about 600 m. A length of conduit 582 may vary, however, depending on, for example, a type of coal formation, a depth of an opening in the formation, and/or a length of the formation desired for treating.

The generated heat may be configured to heat at least a portion of a coal formation. Heating of at least the portion may occur substantially by radiation of the generated heat within an opening in the formation and to a lesser extent by gas conduction. In this manner, a cost associated with filling the opening with a filling material to provide conductive heat transfer between the insulated conductor and the formation may be eliminated. In addition, heat transfer by radiation is generally more efficient than by conduction so the heaters will generally operate at lower temperatures in an open wellbore. Still another advantage is that the heating assembly will be free to undergo thermal expansion. Yet another advantage is that the heater may be replaceable.

The conductor-in-conduit heater, as described in any of the embodiments herein, may be installed in opening 514. In an embodiment, the conductor-in-conduit heater may be installed into a well by sections. For example, a first section of the conductor-in-conduit heater may be disposed into the well. The section may be about 12 m in length. A second section (e.g., of substantially similar length) may be coupled to the first section in the well. The second section may be coupled by welding the second section to the first section and/or with threads disposed on the first and second section. An orbital welder disposed at the wellhead may be configured to weld the second section to the first section. This process may be repeated with subsequent sections coupled to previous sections until a heater of desired length may be disposed in the well. In some embodiments, three sections may be coupled prior to being disposed in the well. The three sections may be coupled by welding. The three sections may have a length of about 12.2 m each. The resulting 37 m section may be lifted vertically by a crane at the wellhead. The three sections may be coupled to three additional sections in the well as described herein. Welding the three sections prior to being disposed in the well may reduce a number of leaks and/or faulty welds and may decrease a time required for installation of the heater.

In an alternate embodiment, the conductor-in-conduit heater may be spooled onto a spooling assembly. The spooling assembly may be mounted on a transportable structure. The transportable structure may be transported to a well location. The conductor-in-conduit heater may be un-spooled from the spooling assembly into the well.

FIG. 20 illustrates an embodiment of a sliding connector. Sliding connector 583 may include scraper 593 that may abut an inner surface of conduit 582 at point 595. Scraper 593 may include any metal or electrically conducting material (e.g., steel or stainless steel). Centralizer 591 may couple to conductor 580. In some embodiments, conductor 580 may have a substantially low resistance section 584, due to an increased thickness, substantially around a location of sliding connector 583. Centralizer 591 may include any electrically conducting material (e.g., a metal or metal alloy). Centralizer 591 may be coupled to scraper 593 through spring bow 592. Spring bow 592 may include any metal or electrically conducting material (e.g., copper-beryllium alloy). Centralizer 591, spring bow 592, and/or scraper 593 may be coupled through any welding method known in the art. Sliding connector 583 may electrically couple the substantially low resistance section 584 of conductor 580 to conduit 582 through centralizer 591, spring bow 592, and/or scraper 593. During heating of conductor 580, conductor 580 may expand at a substantially different rate than conduit 582. For example, point 594 on conductor 580 may move relative to point 595 on conduit 582 during heating of conductor 580. Scraper 593 may maintain electrical contact with conduit 582 by sliding along surface of conduit 582. Several sliding connectors may be used for redundancy and to reduce the current at each scraper. In addition, a thickness of conduit 582 may be increased for a length substantially adjacent to sliding connector 583 to substantially reduce heat generated in that portion of the conduit 582. The length of conduit 582 with increased thickness may be, for example, approximately 6 m.

FIG. 21 illustrates another embodiment of a wellhead. Wellhead 690 may be coupled to electrical junction box 690*a* by flange 690*n* or any other suitable mechanical device. Electrical junction box 690*a* may be configured to control power (current and voltage) supplied to an electric heater. The electric heater may be a conductor-in-conduit heater as described herein. Flange 690*n* may include, for example, stainless steel or any other suitable sealing material. Conductor 690*b* may be disposed in flange 690*n* and may electrically couple overburden casing 541 to electrical junction box 690*a*. Conductor 690*b* may include any metal or electrically conductive material (e.g., copper). Compression seal 690*c* may seal conductor 690*b* at an inner surface of electrical junction box 690*a*.

Flange 690*n* may be sealed with metal o-ring 690*d*. Conduit 690*f*, which may be, e.g., a pipe, may couple flange 690*n* to flange 690*m*. Flange 690*m* may couple to overburden casing 541. Flange 690*m* may be sealed with o-ring 690*g* (e.g., metal o-ring or steel o-ring). The substantially low resistance section 584 of the conductor (e.g., conductor 580) may couple to electrical junction box 690*a*. The substantially low resistance section 584 may be passed through flange 690*n* and may be sealed in flange 690*n* with o-ring assembly 690*p*. Assemblies 690*p* are designed to insulate the substantially low resistance section 584 of conductor 580 from flange 690*n* and flange 690*m*. O-ring assembly 690*c* may be designed to electrically insulate conductor 690*b* from flange 690*m* and junction box 690*a*. Centralizer 581 may couple to low resistance section 584. Electrically insulating centralizer 581 may have characteristics as described in any of the embodiments herein. Thermocouples 690*i* may be coupled to thermocouple flange 690q with connectors 690h and wire 690j. Thermocouples 690i may be enclosed in an electrically insulated sheath (e.g., a metal sheath). Thermocouples 690i may be sealed in thermocouple flange 690q with compression seals 690k. Thermocouples 690i may be used to monitor temperatures in the heated portion downhole.

FIG. 22 illustrates a perspective view of an embodiment of a centralizer in, e.g., conduit 582. Electrical insulator 581a may be disposed on conductor 580. Insulator 581a may be made of, for example, aluminum oxide or any other electrically insulating material that may be configured for use at high temperatures. A location of insulator 581a on the conductor 580 may be maintained by disc 581d. Disc 581 d may be welded to conductor 580. Spring bow 581c may be coupled to insulator 581a by disc 581b. Spring bow 581c and disc 581b may be made of metals such as 310 stainless steel and any other thermally conducting material that may be configured for use at high temperatures. Centralizer 581 may be arranged as a single cylindrical member disposed on conductor 580. Centralizer 581 may be arranged as two half-cylindrical members disposed on conductor 580. The two half-cylindrical members may be coupled to conductor 580 by band 581e. Band 581e may be made of any material configured for use at high temperatures (e.g., steel).

Figure 23A:
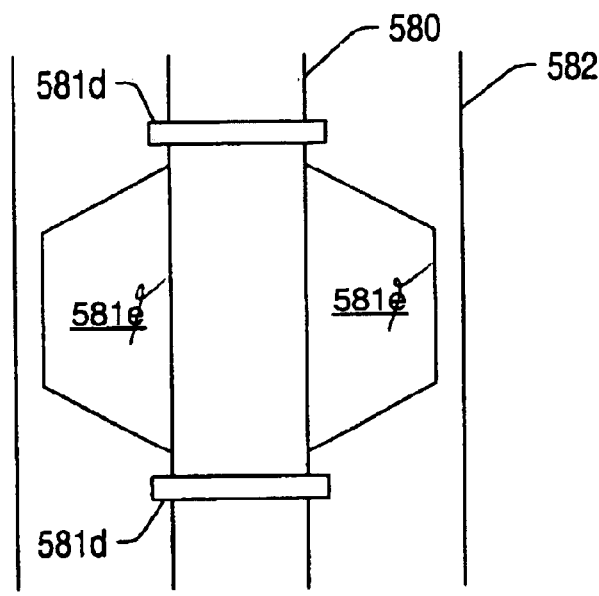
Figure 23B:
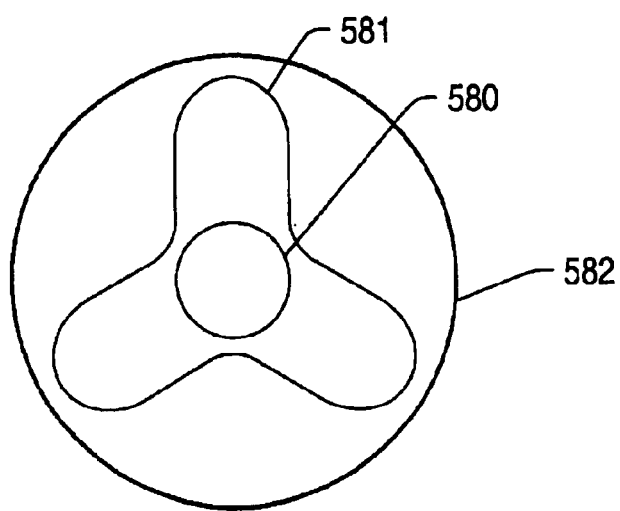

FIG. 23a illustrates a cross-sectional view of an embodiment of a centralizer 581 disposed on conductor 580. FIG. 23b illustrates a perspective view of the embodiment shown in FIG. 23a. Centralizer 581 may be made of any suitable electrically insulating material that may substantially withstand high voltage at high temperatures. Examples of such materials may be aluminum oxide and/or Macor. Discs 581d may maintain positions of centralizer 581 relative to conductor 580. Discs 581d may be metal discs welded to conductor 580. Discs 581d may be tack-welded to conductor 580. Centralizer 581 may substantially electrically insulate conductor 580 from conduit 582.

In an embodiment, a conduit may be pressurized with a fluid to balance a pressure in the conduit with a pressure in an opening. In this manner, deformation of the conduit may be substantially inhibited. A thermally conductive fluid may be configured to pressurize the conduit. The thermally conductive fluid may increase heat transfer within the conduit. The thermally conductive fluid may include a gas such as helium, nitrogen, air, or mixtures thereof. A pressurized fluid may also be configured to pressurize the conduit such that the pressurized fluid may inhibit arcing between the conductor and the conduit. If air and/or air mixtures are used to pressurize the conduit, the air and/or air mixtures may react with materials of the conductor and the conduit to form an oxide on a surface of the conductor and the conduit such that the conductor and the conduit are at least somewhat more resistant to corrosion.

An emissivity of a conductor and/or a conduit may be increased. For example, a surface of the conductor and/or the conduit may be roughened to increase the emissivity. Blackening the surface of the conductor and/or the conduit may also increase the emissivity. Alternatively, oxidation of the conductor and/or the conduit prior to installation may be configured to increase the emissivity. The conductor and/or the conduit may also be oxidized by heating the conductor and/or the conduit in the presence of an oxidizing fluid in the conduit and/or in an opening in a coal formation. Another alternative for increasing the emissivity may be to anodize the conductor and/or the conduit such that the surface may be roughened and/or blackened.

In another embodiment, a perforated tube may be placed in the opening formed in the coal formation proximate to and external the first conduit. The perforated tube may be configured to remove fluids formed in the opening. In this manner, a pressure may be maintained in the opening such that deformation of the first conduit may be substantially inhibited and the pressure in the formation near the heaters may be reduced. The perforated tube may also be used to increase or decrease pressure in the formation by addition or removal of a fluid or fluids from the formation. This may allow control of the pressure in the formation and control of quality of produced hydrocarbons. Perforated tubes may be used for pressure control in all described embodiments of heat sources using an open hole configuration. The perforated tube may also be configured to inject gases to upgrade hydrocarbon properties in situ; for example, hydrogen gas may be injected under elevated pressure.

Figure 24:
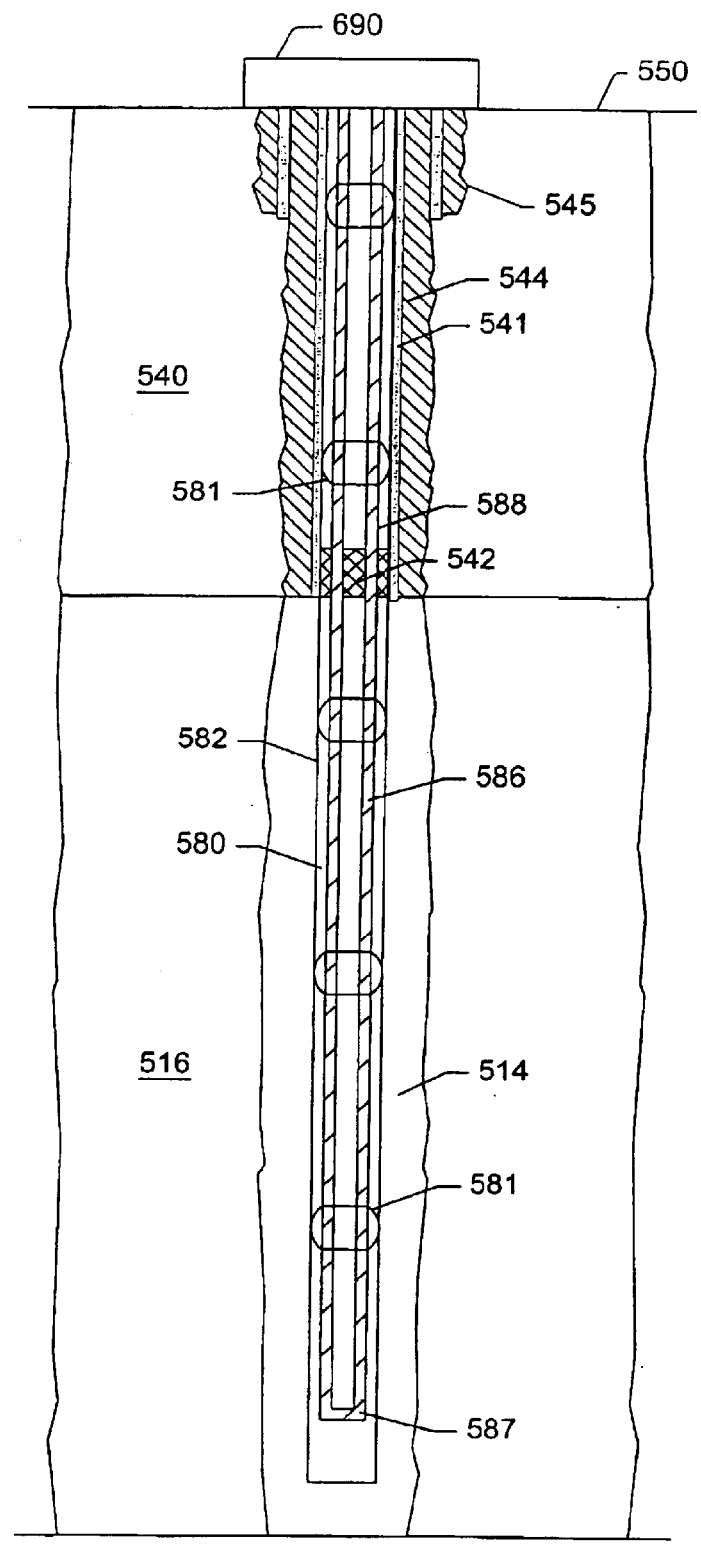
FIG. 24 depicts an alternate embodiment of a conductor in-conduit heat source in a formation.

FIG. 24 illustrates an alternative embodiment of a conductor-in-conduit heater configured to heat a section of a coal formation. Second conductor 586 may be disposed in conduit 582 in addition to conductor 580. Conductor 580 may be configured as described herein. Second conductor 586 may be coupled to conductor 580 using connector 587 located near a lowermost surface of conduit 582. Second conductor 586 may be configured as a return path for the electrical current supplied to conductor 580. For example, second conductor 586 may return electrical current to wellhead 690 through second substantially low resistance conductor 588 in overburden casing 541. Second conductor 586 and conductor 580 may be configured of an elongated conductive material. Second conductor 586 and conductor 580 may be, for example, a stainless steel rod having a diameter of approximately 2.4 cm. Connector 587 may be flexible. Conduit 582 may be electrically isolated from conductor 580 and second conductor 586 using centralizers 581. Overburden casing 541, cement 544, surface conductor 545, and packing material 542 may be configured as described in the embodiment shown in FIG. 19. Advantages of this embodiment include the absence of a sliding contactor, which may extend the life of the heater, and the isolation of all applied power from formation 516.

In another embodiment, a second conductor may be disposed in a second conduit, and a third conductor may be disposed in a third conduit. The second opening may be different from the opening for the first conduit. The third opening may be different from the opening for the first conduit and the second opening. For example, each of the first, second, and third openings may be disposed in substantially different well locations of the formation and may have substantially similar dimensions. The first, second, and third conductors may be configured as described herein. The first, second, and third conductors may be electrically coupled in a 3-phase Y electrical configuration. The outer conduits may be connected together or may be connected to the ground. The 3-phase Y electrical configuration may provide a safer, more efficient method to heat a coal formation than using a single conductor. The first, second, and/or third conduits may be electrically isolated from the first, second, and third conductors, respectively. Dimensions of each conductor and each conduit may be configured such that each conductor may generate heat of approximately 650 watts per meter of conductor to approximately 1650 watts per meter of conductor. In an embodiment, a first conductor and a second conductor in a conduit may be coupled by a flexible connecting cable. The bottom of the first and second conductor may be enlarged to create low resistance sections, and thus generate less heat. In this manner, the flexible connector may be made of, for example, stranded copper covered with rubber insulation.

In an embodiment, a first conductor and a second conductor may be coupled to at least one sliding connector within a conduit. The sliding connector may be configured as described herein. For example, such a sliding connector may be configured to generate less heat than the first conductor or the second conductor. The conduit may be electrically isolated from the first conductor, second conductor, and/or the sliding connector. The sliding connector may be placed in a location within the first conduit where substantially less heating of the coal formation may be required.

In an embodiment, a thickness of a section of a conduit may be increased such that substantially less heat may be transferred (e.g., radiated) along the section of increased thickness. The section with increased thickness may preferably be formed along a length of the conduit where less heating of the coal formation may be required.

In an embodiment, the conductor may be formed of sections of various metals that are welded together. The cross sectional area of the various metals may be selected to allow the resulting conductor to be long, to be creep resistant at high operating temperatures, and/or to dissipate substantially the same amount of heat per unit length along the entire length of the conductor. For example a first section may be made of a creep resistant metal (such as, but not limited to Inconel 617 or HR120) and a second section of the conductor may be made of 304 stainless steel. The creep resistant first section may help to support the second section. The cross sectional area of the first section may be larger than the cross sectional area of the second section. The larger cross sectional area of the first section may allow for greater strength of the first section. Higher resistivity properties of the first section may allow the first section to dissipate the same amount of heat per unit length as the smaller cross sectional area second section.

In some embodiments, the cross sectional area and/or the metal used for a particular section may be chosen so that a particular section provides greater (or lesser) heat dissipation per unit length than an adjacent section. More heat may be provided near an interface between a hydrocarbon layer and a non-hydrocarbon layer (e.g., the overburden and the coal formation) to counteract end effects and allow for more uniform heat dissipation into the coal formation. A higher heat dissipation may also be located at a lower end of an elongated member to counteract end effects and allow for more uniform heat dissipation.

In an embodiment, an elongated member may be disposed within an opening (e.g., an open wellbore) in a coal formation. The opening may preferably be an uncased opening in the coal formation. The opening may have a diameter of at least approximately 5 cm or, for example, approximately 8 cm. The diameter of the opening may vary, however, depending on, for example, a desired heating rate in the formation. The elongated member may be a length (e.g., a strip) of metal or any other elongated piece of metal (e.g., a rod). The elongated member may include stainless steel. The elongated member, however, may also include any conductive material configurable to generate heat to sufficiently heat a portion of the formation and to substantially withstand a corresponding temperature within the opening, for example, it may be configured to withstand corrosion at the temperature within the opening.

An elongated member may be a bare metal heater. "Bare metal" refers to a metal that does not include a layer of electrical insulation, such as mineral insulation, that is designed to provide electrical insulation for the metal throughout an operating temperature range of the elongated member. Bare metal may encompass a metal that includes a corrosion inhibiter such as a naturally occurring oxidation layer, an applied oxidation layer, and/or a film. Bare metal includes metal with polymeric or other types of electrical insulation that cannot retain electrical insulating properties at typical operating temperature of the elongated member. Such material may be placed on the metal and may be thermally degraded during use of the heater.

An elongated member may have a length of about 650 meters. Longer lengths may be achieved using sections of high strength alloys, but such elongated members may be expensive. In some embodiments, an elongated member may be supported by a plate in a wellhead. The elongated member may include sections of different conductive materials that are welded together end-to-end. A large amount of electrically conductive weld material may be used to couple the separate sections together to increase strength of the resulting member and to provide a path for electricity to flow that will not result in arcing and/or corrosion at the welded connections. The different conductive materials may include alloys with a high creep resistance. The sections of different conductive materials may have varying diameters to ensure uniform heating along the elongated member. A first metal that has a higher creep resistance than a second metal typically has a higher resistivity than the second metal. The difference in resistivities may allow a section of larger cross sectional area, more creep resistant, first metal to dissipate the same amount of heat as a section of smaller cross sectional area, second metal. The cross sectional areas of the two different metals may be tailored to result in substantially the same amount of heat dissipation in two welded together sections of the metals. The conductive materials may include, but are not limited to, 617 Inconel, HR-120, 316 stainless steel, and 304 stainless steel. For example, an elongated member may have a 60 meter section of 617 Inconel, 60 meter section of HR-120, and 150 meter section of 304 stainless steel. In addition, the elongated member may have a low resistance section that may run from the wellhead through the overburden. This low resistance section may decrease the heating within the formation from the wellhead through the overburden. The low resistance section may be the result of, for example, choosing a substantially electrically conductive material and/or increasing the cross-sectional area available for electrical conduction.

Alternately, a support member may extend through the overburden, and the bare metal elongated member or members may be coupled to a plate, a centralizer or other type of support member near an interface between the overburden and the hydrocarbon formation. A low resistivity cable, such as a stranded copper cable, may extend along the support member and may be coupled to the elongated member or members. The copper cable may be coupled to a power source that supplies electricity to the elongated member or members.

Figure 25:
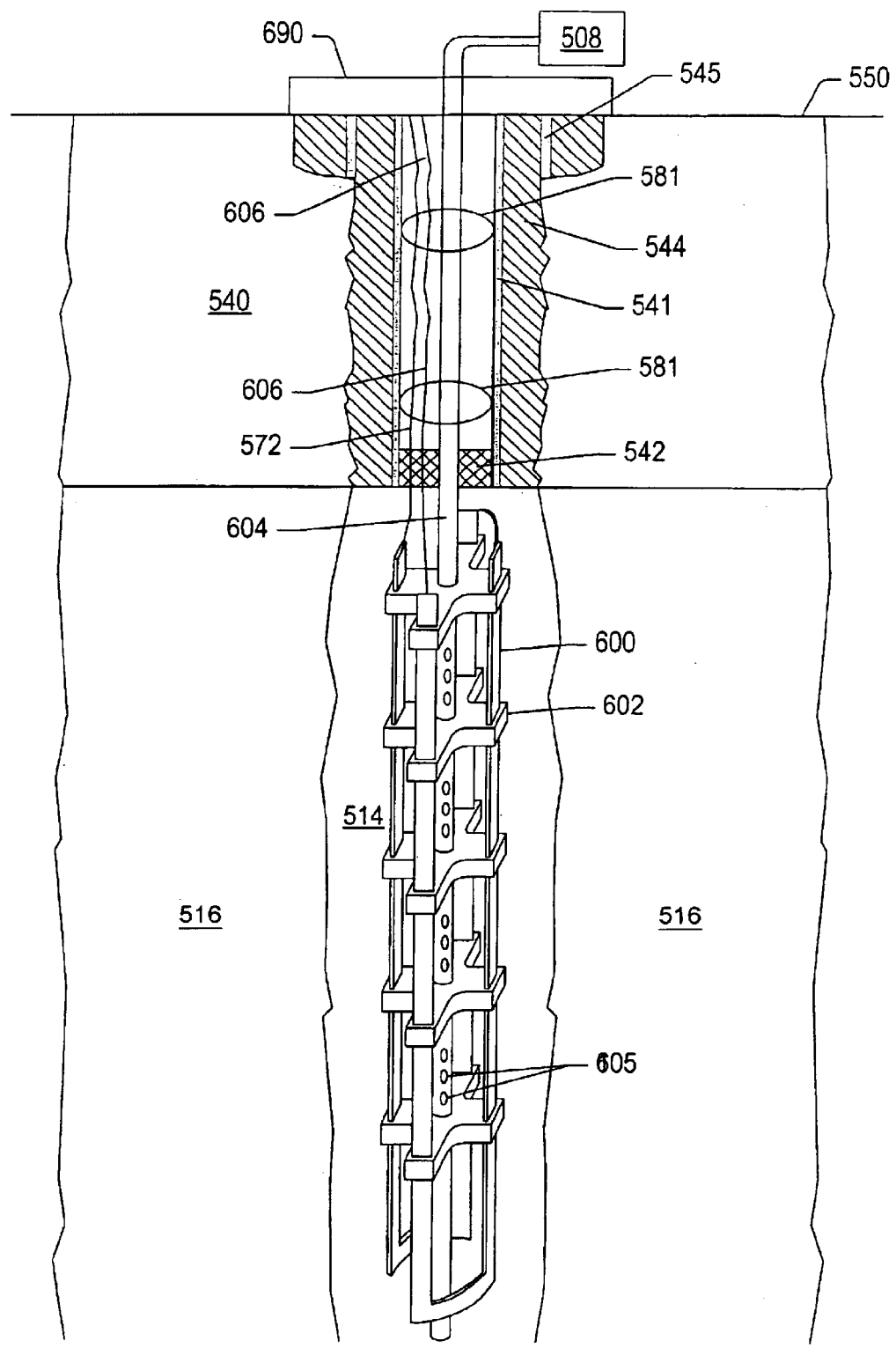
FIG. 25 depicts an embodiment of a heat source in a formation.

FIG. 25 illustrates an embodiment of a plurality of elongated members configured to heat a section of a coal formation. Two or more (e.g., four) elongated members 600 may be supported by support member 604. Elongated members 600 may be coupled to support member 604 using insulated centralizers 602. Support member 604 may be a tube or conduit. Support member 604 may also be a perforated tube. Support member 604 may be configured to provide a flow of an oxidizing fluid into opening 514. Support member 604 may have a diameter between about 1.2 cm to about 4 cm and more preferably about 2.5 cm. Support member 604, elongated members 600, and insulated centralizers 602 may be disposed in opening 514 in formation 516. Insulated centralizers 602 may be configured to maintain a location of elongated members 600 on support member 604 such that lateral movement of elongated members 600 may be substantially inhibited at temperatures high enough to deform support member 604 or elongated members 600. Insulated centralizers 602 may be a centralizer as described herein. Elongated members 600, in some embodiments, may be metal strips of about 2.5 cm wide and about 0.3 cm thick stainless steel. Elongated members 600, however, may also include a pipe or a rod formed of a conductive material. Electrical current may be applied to elongated members 600 such that elongated members 600 may generate heat due to electrical resistance.

Elongated members 600 may be configured to generate heat of approximately 650 watts per meter of elongated members 600 to approximately 1650 watts per meter of elongated members 600. In this manner, elongated members 600 may be at a temperature of approximately 480° C. to approximately 815° C. Substantially uniform heating of a coal formation may be provided along a length of elongated members 600 greater than about 305 m or, maybe, greater than about 610 m. A length of elongated members 600 may vary, however, depending on, for example, a type of coal formation, a depth of an opening in the formation, and/or a length of the formation desired for treating Elongated members 600 may be electrically coupled in series. Electrical current may be supplied to elongated members 600 using lead-in conductor 572. Lead-in conductor 572 may be further configured as described herein. Lead-in conductor 572 may be coupled to wellhead 690. Electrical current may be returned to wellhead 690 using lead-out conductor 606 coupled to elongated members 600. Lead-in conductor 572 and lead-out conductor 606 may be coupled to wellhead 690 at surface 550 through a sealing flange located between wellhead 690 and overburden 540. The sealing flange may substantially inhibit fluid from escaping from opening 514 to surface 550. Lead-in conductor 572 and lead-out conductor 606 may be coupled to elongated members using a cold pin transition conductor. The cold pin transition conductor may include an insulated conductor of substantially low resistance such that substantially no heat may be generated by the cold pin transition conductor. The cold pin transition conductor may be coupled to lead-in conductor 572, lead-out conductor 606, and/or elongated members 600 by any splicing or welding methods known in the art. The cold pin transition conductor may provide a temperature transition between lead-in conductor 572, lead-out conductor 606, and/or elongated members 600. The cold pin transition conductor may be further configured as described in any of the embodiments herein. Lead-in conductor 572 and lead-out conductor 606 may be made of low resistance conductors such that substantially no heat may be generated from electrical current passing through lead-in conductor 572 and lead-out conductor 606.

Weld beads may be placed beneath the centralizers 602 on the support member 604 to fix the position of the centralizers. Weld beads may be placed on the elongated members 600 above the uppermost centralizer to fix the position of the elongated members relative to the support member (other types of connecting mechanisms may also be used). When heated, the elongated member may thermally expand downwards. The elongated member may be formed of different metals at different locations along a length of the elongated member to allow relatively long lengths to be formed. For example, a "U" shaped elongated member may include a first length formed of 310 stainless steel, a second length formed of 304 stainless steel welded to the first length, and a third length formed of 310 stainless steel welded to the second length. 310 stainless steel is more resistive than 304 stainless steel and may dissipate approximately 25% more energy per unit length than 304 stainless steel of the same dimensions. 310 stainless steel may be more creep resistant than 304 stainless steel. The first length and the third length may be formed with cross sectional areas that allow the first length and third lengths to dissipate as much heat as a smaller cross area section of 304 stainless steel. The first and third lengths may be positioned close to the wellhead 690. The use of different types of metal may allow the formation of long elongated members. The different metals may be, but are not limited to, 617 Inconel, HR120, 316 stainless steel, 310 stainless steel, and 304 stainless steel.

Packing material 542 may be placed between overburden casing 541 and opening 514. Packing material 542 may be configured to inhibit fluid flowing from opening 514 to surface 550 and to inhibit corresponding heat losses towards the surface. Packing material 542 may be further configured as described herein. Overburden casing 541 may be placed in cement 544 in overburden 540 of formation 516. Overburden casing 541 may be further configured as described herein. Surface conductor 545 may be disposed in cement 544. Surface conductor 545 may be configured as described herein. Support member 604 may be coupled to wellhead 690 at surface 550 of formation 516. Centralizer 581 may be configured to maintain a location of support member 604 within overburden casing 541. Centralizer 581 may be further configured as described herein. Electrical current may be supplied to elongated members 600 to generate heat. Heat generated from elongated members 600 may radiate within opening 514 to heat at least a portion of formation 516.

The oxidizing fluid may be provided along a length of the elongated members 600 from oxidizing fluid source 508. The oxidizing fluid may inhibit carbon deposition on or proximate to the elongated members. For example, the oxidizing fluid may react with hydrocarbons to form carbon dioxide, which may be removed from the opening. Openings 605 in support member 604 may be configured to provide a flow of the oxidizing fluid along the length of elongated members 600. Openings 605 may be critical flow orifices as configured and described herein. Alternatively, a tube may be disposed proximate to elongated members 600 to control the pressure in the formation as described in above embodiments. In another embodiment, a tube may be disposed proximate to elongated members 600 to provide a flow of oxidizing fluid into opening 514. Also, at least one of elongated members 600 may include a tube having openings configured to provide the flow of oxidizing fluid. Without the flow of oxidizing fluid, carbon deposition may occur on or proximate to elongated members 600 or on insulated centralizers 602, thereby causing shorting between elongated members 600 and insulated centralizers 602 or hot spots along elongated members 600. The oxidizing fluid may be used to react with the carbon in the formation as described herein. The heat generated by reaction with the carbon may complement or supplement the heat generated electrically.

In an embodiment, a plurality of elongated members may be supported on a support member disposed in an opening. The plurality of elongated members may be electrically coupled in either a series or parallel configuration. A current and voltage applied to the plurality of elongated members may be selected such that the cost of the electrical supply of power at the surface in conjunction with the cost of the plurality of elongated members may be minimized. In addition, an operating current and voltage may be chosen to optimize a cost of input electrical energy in conjunction with a material cost of the elongated members. The elongated members may be configured to generate and radiate heat as described herein. The elongated members may be installed in opening 514 as described herein.

In an embodiment, a bare metal elongated member may be formed in a "U" shape (or hairpin) and the member may be suspended from a wellhead or from a positioner placed at or near an interface between the overburden and the formation to be heated. In certain embodiments, the bare metal heaters are formed of rod stock. Cylindrical, high alumina ceramic electrical insulators may be placed over legs of the elongated members. Tack welds along lengths of the legs may fix the position of the insulators. The insulators may inhibit the elongated member from contacting the formation or a well casing (if the elongated member is placed within a well casing). The insulators may also inhibit legs of the "U" shaped members from contacting each other. High alumina ceramic electrical insulators may be purchased from Cooper Industries (Houston, Tex.). In an embodiment, the "U" shaped member may be formed of different metals having different cross sectional areas so that the elongated members may be relatively long and may dissipate substantially the same amount of heat per unit length along the entire length of the elongated member. The use of different welded together sections may result in an elongated member that has large diameter sections near a top of the elongated member and a smaller diameter section or sections lower down a length of the elongated member. For example, an embodiment of an elongated member has two ⅞ inch (2.2 cm) diameter first sections, two ½ inch (1.3 cm) middle sections, and a ⅜ inch (0.95 cm) diameter bottom section that is bent into a "U" shape. The elongated member may be made of materials with other cross section shapes such as ovals, squares, rectangles, triangles, etc. The sections may be formed of alloys that will result in substantially the same heat dissipation per unit length for each section.

In some embodiments, the cross sectional area and/or the metal used for a particular section may be chosen so that a particular section provides greater (or lesser) heat dissipation per unit length than an adjacent section. More heat dissipation per unit length may be provided near an interface between a hydrocarbon layer and a non-hydrocarbon layer (e.g., the overburden and the coal formation) to counteract end effects and allow for more uniform heat dissipation into the coal formation. A higher heat dissipation may also be located at a lower end of an elongated member to counteract end effects and allow for more uniform heat dissipation.

Figure 26:
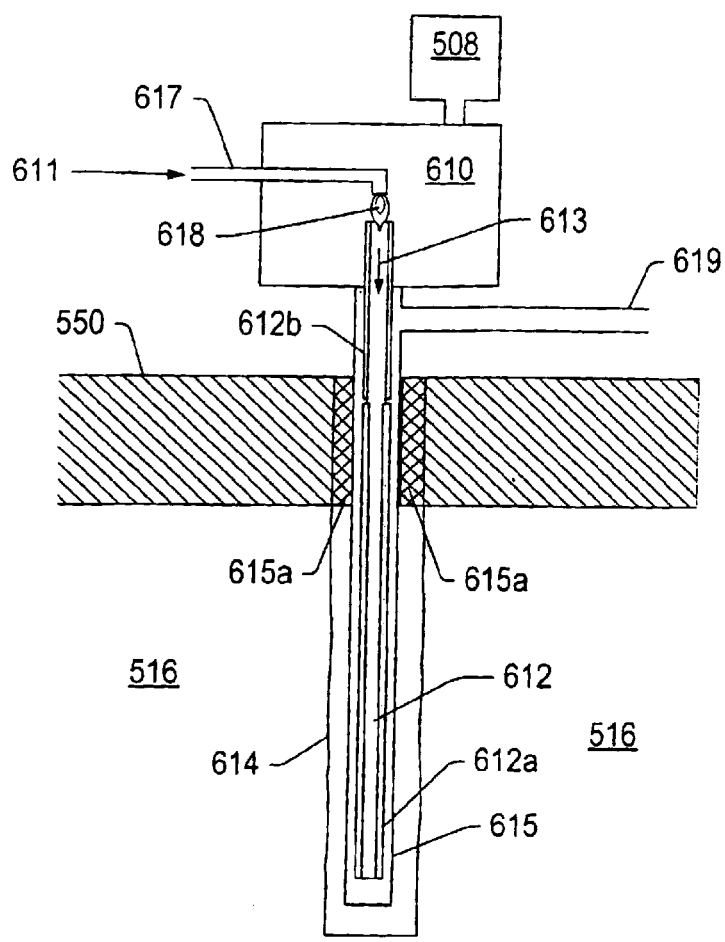
FIG. 26 depicts an embodiment of a surface combustor heat source.

FIG. 26 illustrates an embodiment of a surface combustor configured to heat a section of a coal formation. Fuel fluid 611 may be provided into burner 610 through conduit 617. An oxidizing fluid may be provided into burner 610 from oxidizing fluid source 508. Fuel fluid 611 may be oxidized with the oxidizing fluid in burner 610 to form oxidation products 613. Fuel fluid 611 may include, for example, hydrogen. Fuel fluid 611 may also include methane or any other hydrocarbon fluids. Burner 610 may be located external to formation 516 or within an opening 614 in the coal formation 516. Flame 618 may be configured to heat fuel fluid 611 to a temperature sufficient to support oxidation in burner 610. Flame 618 may be configured to heat fuel fluid 611 to a temperature of about 1425° C. Flame 618 may be coupled to an end of conduit 617. Flame 618 may be a pilot flame. The pilot flame may be configured to burn with a small flow of fuel fluid 611. Flame 618 may, however, be an electrical ignition source.

Oxidation products 613 may be provided into opening 614 within inner conduit 612 coupled to burner 610. Heat may be transferred from oxidation products 613 through outer conduit 615 into opening 614 and to formation 516 along a length of inner conduit 612. Therefore, oxidation products 613 may substantially cool along the length of inner conduit 612. For example, oxidation products 613 may have a temperature of about 870° C. proximate top of inner conduit 612 and a temperature of about 650° C. proximate bottom of inner conduit 612. A section of inner conduit 612 proximate to burner 610 may have ceramic insulator 612b disposed on an inner surface of inner conduit 612. Ceramic insulator 612b may be configured to substantially inhibit melting of inner conduit 612 and/or insulation 612a proximate to burner 610. Opening 614 may extend into the formation a length up to about 550 m below surface 550.

Figure 27:
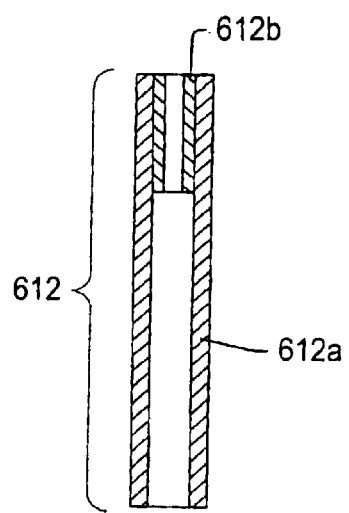
FIG. 27 depicts an embodiment of a conduit for a heat source.

Inner conduit 612 may be configured to provide oxidation products 613 into outer conduit 615 proximate a bottom of opening 614. Inner conduit 612 may have insulation 612a. FIG. 27 illustrates an embodiment of inner conduit 612 with insulation 612a and ceramic insulator 612b disposed on an inner surface of inner conduit 612. Insulation 612a may be configured to substantially inhibit heat transfer between fluids in inner conduit 612 and fluids in outer conduit 615. A thickness of insulation 612a may be varied along a length of inner conduit 612 such that heat transfer to formation 516 may vary along the length of inner conduit 612. For example, a thickness of insulation 612a may be tapered from a larger thickness to a lesser thickness from a top portion to a bottom portion, respectively, of inner conduit 612 in opening 614. Such a tapered thickness may provide substantially more uniform heating of formation 516 along the length of inner conduit 612 in opening 614. Insulation 612a may include ceramic and metal materials. Oxidation products 613 may return to surface 550 through outer conduit 615. Outer conduit may have insulation 615a as depicted in FIG. 26. Insulation 615a may be configured to substantially inhibit heat transfer from outer conduit 615 to overburden 540.

Oxidation products 613 may be provided to an additional burner through conduit 619 at surface 550. Oxidation products 613 may be configured as a portion of a fuel fluid in the additional burner. Doing so may increase an efficiency of energy output versus energy input for heating formation 516. The additional burner may be configured to provide heat through an additional opening in formation 516.

In some embodiments, an electric heater may be configured to provide heat in addition to heat provided from a surface combustor. The electric heater may be, for example, an insulated conductor heater or a conductor-in-conduit heater as described in any of the above embodiments. The electric heater may be configured to provide the additional heat to a coal formation such that the coal formation may be heated substantially uniformly along a depth of an opening in the formation.

Flameless combustors such as those described in U.S. Pat. No. 5,255,742 to Mikus et al., U.S. Pat. No. 5,404,952 to Vinegar et al., U.S. Pat. No. 5,862,858 to Wellington et al., and U.S. Pat. No. 5,899,269 to Wellington et al., which are incorporated by reference as if fully set forth herein, may be configured to heat a coal formation.

Figure 28:
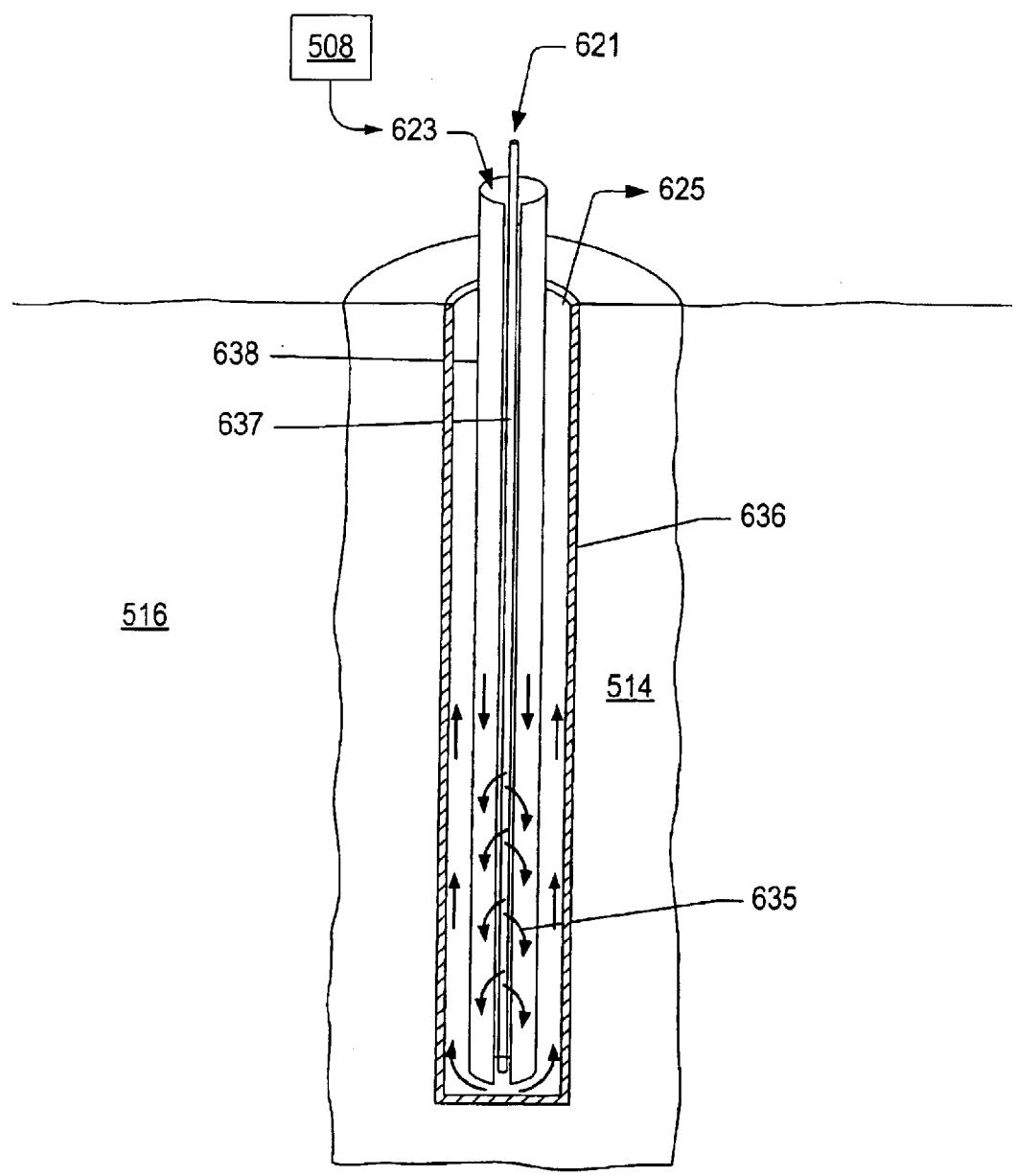
FIG. 28 depicts an embodiment of a flameless combustor heat source.

FIG. 28 illustrates an embodiment of a flameless combustor configured to heat a section of the coal formation. The flameless combustor may include center tube 637 disposed within inner conduit 638. Center tube 637 and inner conduit 638 may be placed within outer conduit 636. Outer conduit 636 may be disposed within opening 514 in formation 516. Fuel fluid 621 may be provided into the flameless combustor through center tube 637. Fuel fluid 621 may include any of the fuel fluids described herein. If a hydrocarbon fuel such as methane is utilized, it may be mixed with steam to prevent coking in center tube 637. If hydrogen is used as the fuel, no steam may be required.

Center tube 637 may include flow mechanisms 635 (e.g., flow orifices) disposed within an oxidation region to allow a flow of fuel fluid 621 into inner conduit 638. Flow mechanisms 635 may control a flow of fuel fluid 621 into inner conduit 638 such that the flow of fuel fluid 621 is not dependent on a pressure in inner conduit 638. Flow mechanisms 635 may have characteristics as described herein. Oxidizing fluid 623 may be provided into the combustor through inner conduit 638. Oxidizing fluid 623 may be provided from oxidizing fluid source 508. Oxidizing fluid 623 may include any of the oxidizing fluids as described in above embodiments. Flow mechanisms 635 on center tube 637 may be configured to inhibit flow of oxidizing fluid 623 into center tube 637.

Oxidizing fluid 623 may mix with fuel fluid 621 in the oxidation region of inner conduit 638. Either oxidizing fluid 623 or fuel fluid 621, or a combination of both, may be preheated external to the combustor to a temperature sufficient to support oxidation of fuel fluid 621. Oxidation of fuel fluid 621 may provide heat generation within outer conduit 636. The generated heat may provide heat to at least a portion of a coal formation proximate to the oxidation region of inner conduit 638. Products 625 from oxidation of fuel fluid 621 may be removed through outer conduit 636 outside inner conduit 638. Heat exchange between the downgoing oxidizing fluid and the upgoing combustion products in the overburden results in enhanced thermal efficiency. A flow of removed combustion products 625 may be balanced with a flow of fuel fluid 621 and oxidizing fluid 623 to maintain a temperature above autoignition temperature but below a temperature sufficient to produce substantial oxides of nitrogen. Also, a constant flow of fluids may provide a substantially uniform temperature distribution within the oxidation region of inner conduit 638. Outer conduit 636 may be, for example, a stainless steel tube. In this manner, heating of at least the portion of the coal formation may be substantially uniform. As described above, the lower operating temperature may also provide a less expensive metallurgical cost associated with the heating system.

Certain heat source embodiments may include an operating system that is coupled to any of heat sources such by insulated conductors or other types of wiring. The operating system may be configured to interface with the heat source. The operating system may receive a signal (e.g., an electromagnetic signal) from a heater that is representative of a temperature distribution of the heat source. Additionally, the operating system may be further configured to control the heat source, either locally or remotely. For example, the operating system may alter a temperature of the heat source by altering a parameter of equipment coupled to the heat source. Therefore, the operating system may monitor, alter, and/or control the heating of at least a portion of the formation.

In some embodiments, a heat source as described above may be configured to substantially operate without a control and/or operating system. The heat source may be configured to only require a power supply from a power source such as an electric transformer. For example, a conductor-in-conduit heater and/or an elongated member heater may include conductive materials that may be have a thermal property that self-controls a heat output of the heat source. In this manner, the conductor-in-conduit heater and/or the elongated member heater may be configured to operate throughout a temperature range without external control. A conductive material such as stainless steel may be used in the heat sources. Stainless steel may have a resistivity that increases with temperature, thus, providing a greater heat output at higher temperatures.

Leakage current of any of the heat sources described herein may be monitored. For example, an increase in leakage current may show deterioration in an insulated conductor heater. Voltage breakdown in the insulated conductor heater may cause failure of the heat source. Furthermore, a current and voltage applied to any of the heat sources may also be monitored. The current and voltage may be monitored to assess/indicate resistance in a heat source. The resistance in the heat source may be configured to represent a temperature in the heat source since the resistance of the heat source may be known as a function of temperature. Another alternative method may include monitoring a temperature of a heat source with at least one thermocouple placed in or proximate to the heat source. In some embodiments, a control system may monitor a parameter of the heat source. The control system may alter parameters of the heat source such that the heat source may provide a desired output such as heating rate and/or temperature increase.

In some embodiments, a thermowell may be disposed into an opening in a coal formation that includes a heat source. The thermowell may be disposed in an opening that may or may not have a casing. In the opening without a casing, the thermowell may include appropriate metallurgy and thickness such that corrosion of the thermowell is substantially inhibited. A thermowell and temperature logging process, such as that described in U.S. Pat. No. 4,616,705 issued to Stegemeier et al., which is incorporated by reference as if fully set forth herein, may be used to monitor temperature. Only selected wells may be equipped with thermowells to avoid expenses associated with installing and operating temperature monitors at each heat source.

In some embodiments, a heat source may be turned down and/or off after an average temperature in a formation may have reached a selected temperature. Turning down and/or off the heat source may reduce input energy costs, substantially inhibit overheating of the formation, and allow heat to substantially transfer into colder regions of the formation.

Certain embodiments include providing heat to a first portion of a coal formation from one or more heat sources. In addition, certain embodiments may include producing formation fluids from the first portion, and maintaining a second portion of the formation in a substantially unheated condition. The second portion may be substantially adjacent to the first portion of the formation. In this manner, the second portion may provide structural strength to the formation. Furthermore, heat may also be provided to a third portion of the formation. The third portion may be substantially adjacent to the second portion and/or laterally spaced from the first portion. In addition, formation fluids may be produced from the third portion of the formation. In this manner, a processed formation may have a pattern that may resemble, for example, a striped or checkerboard pattern with alternating heated and unheated portions.

Additional portions of the formation may also include such alternating heated and unheated portions. In this manner, such patterned heating of a coal formation may maintain structural strength within the formation. Maintaining structural strength within a coal formation may substantially inhibit subsidence. Subsidence of a portion of the formation being processed may decrease a permeability of the processed portion due to compaction. In addition, subsidence may decrease the flow of fluids in the formation, which may result in a lower production of formation fluids.

A pyrolysis temperature range may depend on specific types of hydrocarbons within the formation. A pyrolysis temperature range may include temperatures, for example, between approximately 250° C. and about 900° C. Alternatively, a pyrolysis temperature range may include temperatures between about 250° C. to about 400° C. For example, a majority of formation fluids may be produced within a pyrolysis temperature range from about 250° C. to about 400° C. If a coal formation is heated throughout the entire pyrolysis range, the formation may produce only small amounts of hydrogen towards the upper limit of the pyrolysis range. After all of the available hydrogen has been depleted, little fluid production from the formation would occur.

Temperature (and average temperatures) within a heated coal formation may vary, depending on, for example, proximity to a heat source, thermal conductivity and thermal diffusivity of the formation, type of reaction occurring, type of coal formation, and the presence of water within the coal formation. A temperature within the coal formation may be assessed using a numerical simulation model. The numerical simulation model may assess and/or calculate a subsurface temperature distribution. In addition, the numerical simulation model may include assessing various properties of a subsurface formation under the assessed temperature distribution.

For example, the various properties of the subsurface formation may include, but are not limited to, thermal conductivity of the subsurface portion of the formation and permeability of the subsurface portion of the formation. The numerical simulation model may also include assessing various properties of a fluid formed within a subsurface formation under the assessed temperature distribution. For example, the various properties of a formed fluid may include, but are not limited to, a cumulative volume of a fluid formed at a subsurface of the formation, fluid viscosity, fluid density, and a composition of the fluid formed at a subsurface of the formation. Such a simulation may be used to assess the performance of commercial-scale operation of a small-scale field experiment as described herein. For example, a performance of a commercial-scale development may be assessed based on, but not limited to, a total volume of product that may be produced from a commercial-scale operation.

In some embodiments, an in situ conversion process may increase a temperature or average temperature within a coal formation. A temperature or average temperature increase ($\Delta T$) in a specified volume (V) of the coal formation may be assessed for a given heat input rate (q) over time (t) by the following equation:

$$\Delta T = \frac{\sum (q*t)}{C_V * \rho_B * V}$$

In this equation, an average heat capacity of the formation ($C_v$) and an average bulk density of the formation $\rho_B$) may be estimated or determined using one or more samples taken from the coal formation.

In alternate embodiments, an in situ conversion process may include heating a specified volume to a pyrolysis temperature or average pyrolysis temperature. Heat input rate (q) during a time (t) required to heat the specified volume (V) to a desired temperature increase ($\Delta T$) may be determined or assessed using the following equation: $\Sigma q*t = \Delta T*C_V*\rho_B*V$. In this equation, an average heat capacity of the formation ($C_v$) and an average bulk density of the formation ($\rho_B$) may be estimated or determined using one or more samples taken from the coal formation.

It is to be understood that the above equations can be used to assess or estimate temperatures, average temperatures (e.g., over selected sections of the formation), heat input, etc. Such equations do not take into account other factors (such as heat losses) that would also have some effect on heating and temperatures assessments. However such factors can ordinarily be addressed with correction factors, as is commonly done in the art.

In some embodiments, a portion of a coal formation may be heated at a heating rate in a range from about 0.1° C./day to about 50° C./day. Alternatively, a portion of a coal formation may be heated at a heating rate in a range of about 0.1° C./day to about 10° C./day. For example, a majority of hydrocarbons may be produced from a formation at a heating rate within a range of about 0.1° C./day to about 10° C/day. In addition, a coal formation may be heated at a rate of less than about 0.7° C./day through a significant portion of a pyrolysis temperature range. The pyrolysis temperature range may include a range of temperatures as described in above embodiments. For example, the heated portion may be heated at such a rate for a time greater than 50% of the time needed to span the temperature range, more than 75% of the time needed to span the temperature range, or more than 90% of the time needed to span the temperature range.

A rate at which a coal formation is heated may affect the quantity and quality of the formation fluids produced from the coal formation. For example, heating at high heating rates, as is the case when a Fischer Assay is conducted, may produce a larger quantity of condensable hydrocarbons from a coal formation. The products of such a process, however, may be of a significantly lower quality than when heating using heating rates less than about 10° C./day. Heating at a rate of temperature increase less than approximately 10° C./day may allow pyrolysis to occur within a pyrolysis temperature range in which production of undesirable products and tars may be reduced. In addition, a rate of temperature increase of less than about 3° C./day may further increase the quality of the produced condensable hydrocarbons by further reducing the production of undesirable products and further reducing production of tars within a coal formation.

In some embodiments, controlling temperature within a coal formation may involve controlling a heating rate within the formation. For example, controlling the heating rate such that the heating rate may be less than approximately 3° C./day may provide better control of a temperature within the coal formation.

An in situ process for hydrocarbons may include monitoring a rate of temperature increase at a production well. A temperature within a portion of a coal formation, however, may be measured at various locations within the portion of the coal formation. For example, an in situ process may include monitoring a temperature of the portion at a midpoint between two adjacent heat sources. The temperature may be monitored over time. In this manner, a rate of temperature increase may also be monitored. A rate of temperature increase may affect a composition of formation fluids produced from the formation. As such, a rate of temperature increase may be monitored, altered and/or controlled, for example, to alter a composition of formation fluids produced from the formation.

In some embodiments, a power (Pwr) required to generate a heating rate (h) in a selected volume (V) of a coal formation may be determined by the following equation: $Pwr=h*V*C_V*\rho_B$. In this equation, an average heat capacity of the coal formation may be described as $C_V$. The average heat capacity of the coal formation may be a relatively constant value. Average heat capacity may be estimated or determined using one or more samples taken from a coal formation, or measured in situ using a thermal pulse test. Methods of determining average heat capacity based on a thermal pulse test are described by I. Berchenko, E. Detournay, N. Chandler, J. Martino, and E. Kozak, "In-situ measurement of some thermoporoelastic parameters of a granite" in *Poromechanics, A Tribute to Maurice A. Biot*. pages 545–550, Rotterdam, 1998 (Balkema), which is incorporated by reference as if fully set forth herein.

In addition, an average bulk density of the coal formation may be described as $\rho_B$. The average bulk density of the coal formation may be a relatively constant value. Average bulk density may be estimated or determined using one or more samples taken from a coal formation. In certain embodiments the product of average heat capacity and average bulk density of the coal formation may be a relatively constant value (such product can be assessed in situ using a thermal pulse test). A determined power may be used to determine heat provided from a heat source into the selected volume such that the selected volume may be heated at a heating rate, h. For example, a heating rate may be less than about 3° C./day, and even less than about 2° C./day. In this manner, a heating rate within a range of heating rates may be maintained within the selected volume. It is to be understood that in this context "power" is used to describe energy input per time. The form of such energy input may, however, vary as described herein (i.e., energy may be provided from electrical resistance heaters, combustion heaters, etc.).

The heating rate may be selected based on a number of factors including, but not limited to, the maximum temperature possible at the well, a predetermined quality of formation fluids that may be produced from the formation, etc. A quality of hydrocarbon fluids may be defined by an API gravity of condensable hydrocarbons, by olefin content, by the nitrogen, sulfur and/or oxygen content, etc. In an embodiment, heat may be provided to at least a portion of a coal formation to produce formation fluids having an API gravity of greater than about 20°. The API gravity may vary, however, depending on, for example, the heating rate and a pressure within the portion of the formation.

In some embodiments, subsurface pressure in a coal formation may correspond to the fluid pressure generated within the formation. Heating hydrocarbons within a coal formation may generate fluids, for example, by pyrolysis. The generated fluids may be vaporized within the formation. Fluids that contribute to the increase in pressure may include, but are not limited to, fluids produced during pyrolysis and water vaporized during heating. The produced pyrolysis fluids may include, but are not limited to, hydrocarbons, water, oxides of carbon, ammonia, molecular nitrogen, and molecular hydrogen. Therefore, as temperatures within a selected section of a heated portion of the formation increase, a pressure within the selected section may increase as a result of increased fluid generation and vaporization of water.

In some embodiments, pressure within a selected section of a heated portion of a coal formation may vary depending on, for example, depth, distance from a heat source, a richness of the hydrocarbons within the coal formation, and/or a distance from a producer well. Pressure within a formation may be determined at a number of different locations, which may include but may not be limited to, at a wellhead and at varying depths within a wellbore. In some embodiments, pressure may be measured at a producer well. In alternate embodiments, pressure may be measured at a heater well.

Heating of a coal formation to a pyrolysis temperature range may occur before substantial permeability has been generated within the coal formation. An initial lack of permeability may prevent the transport of generated fluids from a pyrolysis zone within the formation. In this manner, as heat is initially transferred from a heat source to a coal formation, a fluid pressure within the coal formation may increase proximate to a heat source. Such an increase in fluid pressure may be caused by, for example, generation of fluids during pyrolysis of at least some hydrocarbons in the formation. The increased fluid pressure may be released, monitored, altered, and/or controlled through such a heat source. For example, the heat source may include a valve as described in above embodiments. Such a valve may be configured to control a flow rate of fluids out of and into the heat source. In addition, the heat source may include an open hole configuration through which pressure may be released.

Alternatively, pressure generated by expansion of pyrolysis fluids or other fluids generated in the formation may be allowed to increase although an open path to the production well or any other pressure sink may not yet exist in the formation. In addition, a fluid pressure may be allowed to increase to a lithostatic pressure. Fractures in the coal formation may form when the fluid pressure equals or exceeds the lithostatic pressure. For example, fractures may form from a heat source to a production well. The generation of fractures within the heated portion may reduce pressure within the portion due to the production of formation fluids through a production well. To maintain a selected pressure within the heated portion, a back pressure may be maintained at the production well.

Fluid pressure within a coal formation may vary depending upon, for example, thermal expansion of hydrocarbons, generation of pyrolysis fluids, and withdrawal of generated fluids from the formation. For example, as fluids are generated within the formation a fluid pressure within the pores may increase. Removal of generated fluids from the formation may decrease a fluid pressure within the formation.

In an embodiment, a pressure may be increased within a selected section of a portion of a coal formation to a selected pressure during pyrolysis. A selected pressure may be within a range from about 2 bars absolute to about 72 bars absolute or, in some embodiments, 2 bars absolute to 36 bars absolute. Alternatively, a selected pressure may be within a range from about 2 bars absolute to about 18 bars absolute. For example, in certain embodiments, a majority of hydrocarbon fluids may be produced from a formation having a pressure within a range from about 2 bars absolute to about 18 bars absolute. The pressure during pyrolysis may vary or be varied. The pressure may be varied to alter and/or control a composition of a formation fluid produced, to control a percentage of condensable fluid as compared to non-condensable fluid, and/or to control an API gravity of fluid being produced. For example, decreasing pressure may result in production of a larger condensable fluid component, and the fluid may contain a larger percentage of olefins, and vice versa.

It is believed that pyrolyzing at reduced temperature and increased pressure may decrease an olefin to paraffin ratio in produced fluids. Pyrolyzing coal for a longer period of time, which may be accomplished by increasing pressure within the system, tends to result in a lower average molecular weight oil and higher API gravity. In addition, production of gas may increase and a non-volatile coke may be formed.

In addition, it is believed that operating at high pressure and a pyrolysis temperature at the lower end of the pyrolysis zone tends to decrease the fraction of fluids with carbon numbers greater than 25 produced from the coal.

It is believed that lower temperatures and/or increased partial pressure of hydrogen in the coal formation will tend to produce less olefins in the produced hydrocarbon fluids. In addition, lower temperatures and/or higher partial pressures of hydrogen also tend to increase the atomic hydrogen to atomic carbon ratio in the produced hydrocarbon fluids.

It is believed that at higher pyrolysis temperatures production of oil liquids tends to be higher than at the lower pyrolysis temperatures. In addition, high pressures tend to decrease the quantity of oil liquids produced from a coal formation. Operating an in situ conversion process at low pressures and high temperatures may produce a higher quantity of oil liquids than operating at low temperatures and high pressures.

In certain embodiments, pressure within a portion of a coal formation will increase due to fluid generation within the heated portion. In addition, such increased pressure may be maintained within the heated portion of the formation. For example, increased pressure within the formation may be maintained by bleeding off a generated formation fluid through heat sources and/or by controlling the amount of formation fluid produced from the formation through production wells. Maintaining increased pressure within a formation inhibits formation subsidence. In addition, maintaining increased pressure within a formation tends to reduce the required sizes of collection conduits that are used to transport condensable hydrocarbons. Furthermore, maintaining increased pressure within the heated portion may reduce and/or substantially eliminate the need to compress formation fluids at the surface because the formation products will usually be produced at higher pressure. Maintaining increased pressure within a formation may also facilitate generation of electricity from produced non-condensable fluid. For example, the produced non-condensable fluid may be passed through a turbine to generate electricity.

Increased pressure in the formation may also be maintained to produce more and/or improved formation fluids. In certain embodiments, significant amounts (e.g., a majority) of the formation fluids produced from a formation within the pyrolysis pressure range may include non-condensable hydrocarbons. Pressure may be selectively increased and/or maintained within the formation, and formation fluids can be produced at or near such increased and/or maintained pressures. As pressure within a formation is increased, formation fluids produced from the formation will, in many instances, include a larger portion of non-condensable hydrocarbons. In this manner, a significant amount (e.g., a majority) of the formation fluids produced at such a pressure may include a lighter and higher quality condensable hydrocarbons than formation fluids produced at a lower pressure.

In addition, a pressure may be maintained within a heated portion of a coal formation to substantially inhibit production of formation fluids having carbon numbers greater than, for example, about 25. For example, increasing a pressure within the portion of the coal formation may increase a boiling point of a fluid within the portion. Such an increase in the boiling point of a fluid may substantially inhibit production of formation fluids having relatively high carbon numbers, and/or production of multi-ring hydrocarbon compounds, because such formation fluids tend to remain in the formation as liquids until they crack.

In addition, increasing a pressure within a portion of a coal formation may result in an increase in API gravity of formation fluids produced from the formation. Higher pressures may increase production of shorter chain hydrocarbon fluids, which may have higher API gravity values.

In an embodiment, a pressure within a heated portion of the formation may surprisingly increase the quality of relatively high quality pyrolyzation fluids, the quantity of relatively high quality pyrolyzation fluids, and/or vapor phase transport of the pyrolyzation fluids within the formation. Increasing the pressure often permits production of lower molecular weight hydrocarbons since such lower molecular weight hydrocarbons will more readily transport in the vapor phase in the formation. Generation of lower molecular weight hydrocarbons (and corresponding increased vapor phase transport) is believed to be due, in part, to autogenous generation and reaction of hydrogen within a portion of the coal formation. For example, maintaining an increased pressure may force hydrogen generated in the heated portion into a liquid phase (e.g. by dissolving). In addition, heating the portion to a temperature within a pyrolysis temperature range may pyrolyze at least some of the hydrocarbons within the formation to generate pyrolyzation fluids in the liquid phase. The generated components may include a double bond and/or a radical. $H_2$ in the liquid phase may reduce the double bond of the generated pyrolyzation fluids, thereby reducing a potential for polymerization of the generated pyrolyzation fluids. In addition, hydrogen may also neutralize radicals in the generated pyrolyzation fluids. Therefore, $H_2$ in the liquid phase may substantially inhibit the generated pyrolyzation fluids from reacting with each other and/or with other compounds in the formation. In this manner, shorter chain hydrocarbons may enter the vapor phase and may be produced from the formation.

Increasing the formation pressure to increase the amount of pyrolyzation fluids in the vapor phase may significantly reduce the potential for coking within the selected section of the formation. A coking reaction may occur in the liquid phase. Since many of the generated components may be transformed into short chain hydrocarbons and may enter the vapor phase, coking within the selected section may decrease.

Increasing the formation pressure to increase the amount of pyrolyzation fluids in the vapor phase is also beneficial because doing so permits increased recovery of lighter (and relatively high quality) pyrolyzation fluids. In general, pyrolyzation fluids are more quickly produced, with less residuals, when such fluids are in the vapor phase rather than in the liquid phase. Undesirable polymerization reactions also tend to occur more frequently when the pyrolyzation fluids are in the liquid phase instead of the vapor phase. In addition, when pyrolyzation fluids are produced in the vapor phase, fewer production wells/area are needed, thereby reducing project costs.

In an embodiment, a portion of a coal formation may be heated to increase a partial pressure of $H_2$. In some embodiments, an increased $H_2$ partial pressure may include $H_2$ partial pressures in a range from about 1 bar absolute to about 7 bars absolute. Alternatively, an increased $H_2$ partial pressure range may include $H_2$ partial pressures in a range from about 5 bars absolute to about 7 bars absolute. For example, a majority of hydrocarbon fluids may be produced within a range of about 5 bars absolute to about 7 bars absolute. A range of $H_2$ partial pressures within the pyrolysis H$_2$ partial pressure range may vary, however, depending on, for example, a temperature and a pressure of the heated portion of the formation.

Maintaining a H$_2$ partial pressure within the formation of greater than atmospheric pressure may increase an API value of produced condensable hydrocarbon fluids. For example, maintaining such a H$_2$ partial pressure may increase an API value of produced condensable hydrocarbon fluids to greater than about 25 or, in some instances, greater than about 30. Maintaining such a H$_2$ partial pressure within a heated portion of a coal formation may increase a concentration of H$_2$ within the heated portion such that H$_2$ may be available to react with pyrolyzed components of the hydrocarbons. Reaction of H$_2$ with the pyrolyzed components of hydrocarbons may reduce polymerization of olefins into tars and other cross-linked, difficult to upgrade, products. Such products may have lower API gravity values. Therefore, production of hydrocarbon fluids having low API gravity values may be substantially inhibited.

A valve may be configured to maintain, alter, and/or control a pressure within a heated portion of a coal formation. For example, a heat source disposed within a coal formation may be coupled to a valve. The valve may be configured to release fluid from the formation through the heater source. In addition, a pressure valve may be coupled to a production well, which may be disposed within the coal formation. In some embodiments, fluids released by the valves may be collected and transported to a surface unit for further processing and/or treatment.

An in situ conversion process for coal may include providing heat to a portion of a coal formation, and controlling a temperature, rate of temperature increase, and/or a pressure within the heated portion. For example, a pressure within the heated portion may be controlled using pressure valves disposed within a heater well or a production well as described herein. A temperature and/or a rate of temperature increase of the heated portion may be controlled, for example, by altering an amount of energy supplied to one or more heat sources.

Controlling a pressure and a temperature within a coal formation will, in most instances, affect properties of the produced formation fluids. For example, a composition or a quality of formation fluids produced from the formation may be altered by altering an average pressure and/or an average temperature in the selected section of the heated portion. The quality of the produced fluids may be defined by a property which may include, but may not be limited to, API gravity, percent olefins in the produced formation fluids, ethene to ethane ratio, atomic hydrogen to carbon ratio, percent of hydrocarbons within produced formation fluids having carbon numbers greater than 25, total equivalent production (gas and liquid), total liquids production, and/or liquid yield as a percent of Fischer Assay. For example, controlling the quality of the produced formation fluids may include controlling average pressure and average temperature in the selected section such that the average assessed pressure in the selected section may be greater than the pressure (p) as set forth in the form of the following relationship for an assessed average temperature (T) in the selected section:

$$p = \exp\left[\frac{A}{T} + B\right]$$

where p is measured in psia (pounds per square inch absolute), T is measured in degrees Kelvin, A and B are parameters dependent on the value of the selected property. An assessed average temperature may be determined as described herein.

The relationship given above may be rewritten such that the natural log of pressure may be a linear function of an inverse of temperature. This form of the relationship may be rewritten: $\ln(p)=A/T+B$. In a plot of the absolute pressure as a function of the reciprocal of the absolute temperature, A is the slope and B is the intercept. The intercept B is defined to be the natural logarithm of the pressure as the reciprocal of the temperature approaches zero. Therefore, the slope and intercept values (A and B) of the pressure-temperature relationship may be determined from two pressure-temperature data points for a given value of a selected property. The pressure-temperature data points may include an average pressure within a formation and an average temperature within the formation at which the particular value of the property was, or may be, produced from the formation. For example, the pressure-temperature data points may be obtained from an experiment such as a laboratory experiment or a field experiment.

A relationship between the slope parameter, A, and a value of a property of formation fluids may be determined. For example, values of A may be plotted as a function of values of a formation fluid property. A cubic polynomial may be fitted to these data. For example, a cubic polynomial relationship such as $A=a_1*(\text{property})^3+a_2*(\text{property})^2+a_3*(\text{property})-a_4$ may be fitted to the data, where $a_1$, $a_2$, $a_3$, and $a_4$ are empirical constants that may describe a relationship between the first parameter, A, and a property of a formation fluid. Alternatively, relationships having other functional forms such as another order polynomial or a logarithmic function may be fitted to the data. In this manner, $a_1$, $a_2$, . . . may be estimated from the results of the data fitting. Similarly, a relationship between the second parameter, B, and a value of a property of formation fluids may be determined. For example, values of B may be plotted as a function of values of a property of a formation fluid. A cubic polynomial may also be fitted to the data. For example, a cubic polynomial relationship such as $B=b_1*(\text{Property})^3+b_2*(\text{property})^2+b_3*(\text{property})+b_4$ may be fitted to the data, where $b_1$, $b_2$, $b_3$, and $b_4$ are empirical constants that may describe a relationship between the parameter B, and the value of a property of a formation fluid. As such, $b_1$, $b_2$, $b_3$, and $b_4$ may be estimated from results of fitting the data. To determine an average pressure and an average temperature that may be used to produce a formation fluid having a selected property, the value of the selected property and the empirical constants as described above may be used to determine values for the first parameter A, and the second parameter B, according to the following relationships:

$$A=a_1*(\text{property})^3+a_2*(\text{property})^2+a_3*(\text{property})+a_4$$

$$B=b_1*(\text{property})^3+b_2*(\text{property})^2+b_3*(\text{property})+b_4$$

The determined values for the parameter A, and the parameter B, may be used to determine an average pressure in the selected section of the formation using an assessed average temperature, T, in the selected section. The assessed average temperature may be determined as described herein. For example, an average pressure of the selected section may be determined by the relationship: $p=\exp[(A/T)+B]$, in which p is measured in psia, and T is measured in degrees Kelvin. Alternatively, an average absolute pressure of the selected section, measured in bars, may be determined using the following relationship: $P_{bars}=\exp[(A/T)+B-2.6744]$. In this manner, an average pressure within the selected section may be controlled such that an average pressure within the selected section is adjusted to the average pressure as determined above, in order to produce a formation fluid from the selected section having a selected property.

Alternatively, the determined values for the parameter A, and the parameter B, may be used to determine an average temperature in the selected section of the formation using an assessed average pressure, p, in the selected section. The assessed average pressure may be determined as described herein. Therefore, using the relationship described above, an average temperature within the selected section may be controlled to approximate the calculated average temperature in order to produce hydrocarbon fluids having a selected property.

As described herein, a composition of formation fluids produced from a formation may be varied by altering at least one operating condition of an in situ conversion process for coal. In addition, at least one operating condition may be determined by using a computer-implemented method. For example, an operating condition may include, but is not limited to, a pressure in the formation, a temperature in the formation, a heating rate of the formation, a power supplied to a heat source, and/or a flow rate of a synthesis gas generating fluid. The computer-implemented method may include measuring at least one property of the formation. For example, measured properties may include a thickness of a layer containing coal, vitrinite reflectance, hydrogen content, oxygen content, moisture content, depth/width of the coal formation, and other properties otherwise described herein.

At least one measured property may be inputted into a computer executable program. The program may be operable to determine at least one operating condition from a measured property. In addition, at least one property of selected formation fluids may be input into the program. For example, properties of selected formation fluids may include, but are not limited to, API gravity, olefin content, carbon number distribution, ethene to ethane ratio, and atomic carbon to hydrogen ratio. The program may also be operable to determine at least one operating condition from a property of the selected formation fluids. In this manner, an operating condition of an in situ conversion process may be altered to be approximate at least one determined operating condition such that production of selected formation fluids from the formation may increase.

In an embodiment, a computer-implemented method may be used to determine at least one property of a formation fluid that may be produced from a coal formation for a set of operating conditions as a function of time. The method may include measuring at least one property of the formation and providing at least the one measured property to a computer program as described herein. In addition, one or more sets of operating conditions may also be provided to the computer program. At least one of the operating conditions may include, for example, a heating rate or a pressure. One or more sets of operating conditions may include currently used operating conditions (in an in situ conversion process) or operating conditions being considered for an in situ conversion process. The computer program may be operable to determine at least one property of a formation fluid that may be produced by an in situ conversion process for coal as a function of time using at least one set of operating conditions and at least one measured property, of the formation. Furthermore, the method may include comparing a determined property of the fluid to a selected property. In this manner, if multiple determined properties are generated by the computer program, then the determined property that differs least from a selected property may be determined.

Formation fluid properties may vary depending on a location of a production well in the formation. For example, a location of a production well with respect to a location of a heat source in the formation may affect the composition of formation fluid produced from a formation. In addition, a distance between a production well and a heat source in a formation may be varied to alter the composition of formation fluid produced from a formation. Decreasing a distance between a production well and a heat source may increase a temperature at the production well. In this manner, a substantial portion of pyrolyzation fluids flowing through a production well may in some instances crack to non-condensable compounds due to increased temperature at a production well. Therefore, a location of a production well with respect to a heat source may be selected to increase a non-condensable gas fraction of the produced formation fluids. In addition, a location of a production well with respect to a heat source may be selected such that a non-condensable gas fraction of produced formation fluids may be larger than a condensable gas fraction of the produced formation fluids.

A carbon number distribution of a produced formation fluid may indicate a quality of the produced formation fluid. In general, condensable hydrocarbons with low carbon numbers are considered to be more valuable than condensable hydrocarbons having higher carbon numbers. Low carbon numbers may include, for example, carbon numbers less than about 25. High carbon numbers may include carbon numbers greater than about 25. In an embodiment, an in situ conversion process for coal may include providing heat to at least a portion of a formation and allowing heat to transfer such that heat may produce pyrolyzation fluids such that a majority of the pyrolyzation fluids have carbon numbers of less than approximately 25.

In an embodiment, an in situ conversion process for coal may include providing heat to at least a portion of a coal formation at a rate sufficient to alter and/or control production of olefins. For example, the process may include heating the portion at a rate to produce formation fluids having an olefin content of less than about 10% by weight of condensable hydrocarbons of the formation fluids. Reducing olefin production may substantially reduce coating of a pipe surface by such olefins, thereby reducing difficulty associated with transporting hydrocarbons through such piping. Reducing olefin production may also tend to inhibit polymerization of hydrocarbons during pyrolysis, thereby increasing permeability in the formation and/or enhancing the quality of produced fluids (e.g., by lowering the carbon number distribution, increasing API gravity, etc.).

In some embodiments, however, the portion may be heated at a rate to selectively increase the olefin content of condensable hydrocarbons in the produced fluids. For example, olefins may be separated from such condensable hydrocarbons and may be used to produce additional products.

In some embodiments, the portion may be heated at a rate to selectively increase the content of phenol and substituted phenols of condensable hydrocarbons in the produced fluids. For example, phenol and/or substituted phenols may be separated from such condensable hydrocarbons and may be used to produce additional products. The resource may, in some embodiments, be selected to enhance production of phenol and/or substituted phenols.

Hydrocarbons in the produced fluids may include a mixture of a number of different components, some of which are condensable and some of which are not. The fraction of non-condensable hydrocarbons within the produced fluid may be altered and/or controlled by altering, controlling, and/or maintaining a temperature within a pyrolysis temperature range in a heated portion of the coal formation. Additionally, the fraction of non-condensable hydrocarbons within the produced fluids may be altered and/or controlled by altering, controlling, and/or maintaining a pressure within the heated portion. In some embodiments. surface facilities may be configured to separate condensable and non-condensable hydrocarbons of a produced fluid.

In some embodiments, the non-condensable hydrocarbons may include, but are not limited to, hydrocarbons having less than about 5 carbon atoms, $H_2$, $CO_2$, ammonia, $H_2S$, $N_2$ and/or CO. In certain embodiments, non-condensable hydrocarbons of a fluid produced from a portion of a coal formation may have a weight ratio of hydrocarbons having carbon numbers from 2 through 4 ("$C_{2-4}$" hydrocarbons) to methane of greater than about 0.3, greater than about 0.75, or greater than about 1 in some circumstances. For example, non-condensable hydrocarbons of a fluid produced from a portion of a coal formation may have a weight ratio of hydrocarbons having carbon numbers from 2 through 4, to methane, of greater than approximately 0.3.

Such weight ratios of $C_{2-4}$ hydrocarbons to methane are believed to be beneficial as compared to similar weight ratios produced from other formations. Such weight ratios indicate higher amounts of hydrocarbons with 2, 3, and/or 4 carbons (e.g., ethane, propane, and butane) than is normally present in gases produced from formations. Such hydrocarbons are often more valuable. Production of hydrocarbons with such weight ratios is believed to be due to the conditions applied to the formation during pyrolysis (e.g., controlled heating and/or pressure used in reducing environments, or at least non-oxidizing environments). It is believed that in such conditions longer chain hydrocarbons can be more easily broken down to form substantially smaller (and in many cases more saturated) compounds such as $C_{2-4}$ hydrocarbons. The $C_{2-4}$ hydrocarbons to methane weight ratio may vary depending on, for example, a temperature of the heated portion and a heating rate of the heated portion.

In certain embodiments, the API gravity of the hydrocarbons in a fluid produced from a coal formation may be approximately 20 or above (e.g., 25, 30, 35, 40, 50, etc.).

Methane and at least a portion of ethane may be separated from non-condensable hydrocarbons in the produced fluid and may be utilized as natural gas. A portion of propane and butane may be separated from non-condensable hydrocarbons of the produced fluid. In addition, the separated propane and butane may be utilized as fuels or as feedstocks for producing other hydrocarbons. A portion of the produced fluid having carbon numbers less than 4 may be reformed, as described herein, in the formation to produce additional $H_2$ and/or methane. In addition, ethane, propane, and butane may be separated from the non-condensable hydrocarbons and may be used to generate olefins.

The non-condensable hydrocarbons of fluid produced from a coal formation may have a $H_2$ content of greater than about 5% by weight, greater than about 10% by weight, or even greater than about 15% by weight. The $H_2$ may be used, for example, as a fuel for a fuel cell, to hydrogenate hydrocarbon fluids in situ, and/or to hydrogenate hydrocarbon fluids ex situ. In addition, presence of $H_2$ within a formation fluid in a heated section of a coal formation is believed to increase the quality of produced fluids. In certain embodiments, the hydrogen to carbon atomic ratio of a produced fluid may be at least approximately 1.7 or above. For example, the hydrogen to carbon atomic ratio of a produced fluid may be approximately 1.8, approximately 1.9, or greater.

The non-condensable hydrocarbons may include some hydrogen sulfide. The non-condensable hydrocarbons may be treated to separate the hydrogen sulfide from other compounds in the non-condensable hydrocarbons. The separated hydrogen sulfide may be used to produce, for example, sulfuric acid, fertilizer, and/or elemental sulfur.

In certain embodiments, fluid produced from a coal formation by an in situ conversion process may include carbon dioxide. Carbon dioxide produced from the formation may be used, for example, for enhanced oil recovery, as at least a portion of a feedstock for production of urea, and/or may be reinjected into a coal formation for synthesis gas production and/or coal bed methane production.

Fluid produced from a coal formation by an in situ conversion process may include carbon monoxide. Carbon monoxide produced from the formation may be used, for example, as a feedstock for a fuel cell, as a feedstock for a Fischer Tropsch process, as a feedstock for production of methanol, and/or as a feedstock for production of methane.

The condensable hydrocarbons of the produced fluids may be separated from the fluids. In an embodiment, a condensable component may include condensable hydrocarbons and compounds found in an aqueous phase. The aqueous phase may be separated from the condensable component. The ammonia content of the total produced fluids may be greater than about 0.1% by weight of the fluid, greater than about 0.5% by weight of the fluid, and, in some embodiments, up to about 10% by weight of the produced fluids. The ammonia may be used to produce, for example, urea.

Certain embodiments of a fluid may be produced in which a majority of hydrocarbons in the produced fluid have a carbon number of less than approximately 25. Alternatively, less than about 15% by weight of the hydrocarbons in the condensable hydrocarbons have a carbon number greater than approximately 25. In some embodiments, less than about 5% by weight of hydrocarbons in the condensable hydrocarbons have a carbon number greater than approximately 25, and/or less than about 2% by weight of hydrocarbons in the condensable hydrocarbons have a carbon number greater than approximately 25.

In certain embodiments, a fluid produced from a formation (e.g., a coal formation) may include oxygenated hydrocarbons. For example, condensable hydrocarbons of the produced fluid may include an amount of oxygenated hydrocarbons greater than about 5% by weight of the condensable hydrocarbons. Alternatively, the condensable hydrocarbons may include an amount of oxygenated hydrocarbons greater than about 1.0% by weight of the condensable hydrocarbons. Furthermore, the condensable hydrocarbons may include an amount of oxygenated hydrocarbons greater than about 1.5% by weight of the condensable hydrocarbons or greater than about 2.0% by weight of the condensable hydrocarbons. In an embodiment, the oxygenated hydrocarbons may include, but are not limited to, phenol and/or substituted phenols. In some embodiments, phenol and substituted phenols may have more economic value than other products produced from an in situ conversion process. Therefore, an in situ conversion process may be utilized to produce phenol and/or substituted phenols. For example, generation of phenol and/or substituted phenols may increase when a fluid pressure within the formation is maintained at a lower pressure.

In some embodiments, condensable hydrocarbons of a fluid produced from a coal formation may also include olefins. For example, an olefin content of the condensable hydrocarbons may be in a range from about 0.1% by weight to about 15% by weight. Alternatively, an olefin content of the condensable hydrocarbons may also be within a range from about 0.1% by weight to about 5% by weight. Furthermore, an olefin content of the condensable hydrocarbons may also be within a range from about 0.1% by weight to about 2.5% by weight. An olefin content of the condensable hydrocarbons may be altered and/or controlled by controlling a pressure and/or a temperature within the formation. For example, olefin content of the condensable hydrocarbons may be reduced by selectively increasing pressure within the formation, by selectively decreasing temperature within the formation, by selectively reducing heating rates within the formation, and/or by selectively increasing hydrogen partial pressures in the formation. In some embodiments, a reduced olefin content of the condensable hydrocarbons may be preferred. For example, if a portion of the produced fluids is used to produce motor fuels, a reduced olefin content may be desired.

In alternate embodiments, a higher olefin content may be preferred. For example, if a portion of the condensable hydrocarbons may be sold, a higher olefin content may be preferred due to a high economic value of olefin products. In some embodiments, olefins may be separated from the produced fluids and then sold and/or used as a feedstock for the production of other compounds.

Non-condensable hydrocarbons of a produced fluid may also include olefins. For example, an olefin content of the non-condensable hydrocarbons may be gauged using an ethene/ethane molar ratio. In certain embodiments, the ethene/ethane molar ratio may range from about 0.001 to about 0.15.

Fluid produced from a coal formation may include aromatic compounds. For example, the condensable hydrocarbons may include an amount of aromatic compounds greater than about 20% by weight or about 25% by weight of the condensable hydrocarbons. Alternatively, the condensable hydrocarbons may include an amount of aromatic compounds greater than about 30% by weight of the condensable hydrocarbons. The condensable hydrocarbons may also include relatively low amounts of compounds with more than two rings in them (e.g., tri-aromatics or above). For example, the condensable hydrocarbons may include less than about 1% by weight or less than about 2% by weight of tri-aromatics or above in the condensable hydrocarbons. Alternatively, the condensable hydrocarbons may include less than about 5% by weight of tri-aromatics or above in the condensable hydrocarbons.

In particular, in certain embodiments, asphaltenes (i.e., large multi-ring aromatics that may be substantially soluble in hydrocarbons) make up less than about 0.1% by weight of the condensable hydrocarbons. For example, the condensable hydrocarbons may include an asphaltene component of from about 0.0% by weight to about 0.1% by weight or, in some embodiments, less than about 0.3% by weight.

Condensable hydrocarbons of a produced fluid may also include relatively large amounts of cycloalkanes. For example, the condensable hydrocarbons may include a cycloalkane component of from about 5% by weight to about 30% by weight of the condensable hydrocarbons.

In certain embodiments, the condensable hydrocarbons of a fluid produced from a formation may include compounds containing nitrogen. For example, less than about 1% by weight (when calculated on an elemental basis) of the condensable hydrocarbons may be nitrogen (e.g., typically the nitrogen may be in nitrogen containing compounds such as pyridines, amines, amides, carbazoles, etc.).

In certain embodiments, the condensable hydrocarbons of a fluid produced from a formation may include compounds containing oxygen. For example, in an embodiments, in a fluid produced from a coal formation between about 5% by weight and about 30% by weight of the condensable hydrocarbons may typically include oxygen containing compounds such as phenols, substituted phenols, ketones, etc. In some instances, certain compounds containing oxygen (e.g., phenols) may be valuable and, as such, may be economically separated from the produced fluid.

In certain embodiments, condensable hydrocarbons of the fluid produced from a formation may include compounds containing sulfur. For example, less than about 1% by weight (when calculated on an elemental basis) of the condensable hydrocarbons may be sulfur (e.g., typically the sulfur containing compounds may include compounds such as thiophenes, mercaptans, etc.).

Furthermore, the fluid produced from the formation may include ammonia (typically the ammonia may condense with water, if any, produced from the formation). For example, the fluid produced from the formation may in certain embodiments include about 0.05% or more by weight of ammonia. In some embodiments coal formations may produce larger amounts of ammonia (e.g., up to about 10% by weight of the total fluid produced may be ammonia).

In addition, a produced fluid from the formation may also include molecular hydrogen ($H_2$). For example, the fluid may include a $H_2$ content between about 10% to about 80% by volume of the non-condensable hydrocarbons.

In some embodiments, at least about 15% by weight of a total organic carbon content of hydrocarbons in the portion may be transformed into hydrocarbon fluids.

A total potential amount of products that may be produced from hydrocarbons may be determined by a Fischer Assay. The Fischer Assay is a standard method that involves heating a sample of hydrocarbons to approximately 500° C. in one hour, collecting products produced from the heated sample, and quantifying the products. In an embodiment, a method for treating a coal formation in situ may include heating a section of the formation to yield greater than about 60% by weight of the potential amount of products from the hydrocarbons as measured by the Fischer Assay.

In certain embodiments, heating of the selected section of the formation may be controlled to pyrolyze at least about 20% by weight (or in some embodiments about 25% by weight) of the hydrocarbons within the selected section of the formation. Conversion of hydrocarbons within a formation may be limited to inhibit subsidence of the formation.

Heating at least a portion of a formation may cause at least some of the hydrocarbons within the portion to pyrolyze, thereby forming hydrocarbon fragments. The hydrocarbon fragments may be reactive and may react with other compounds in the formation and/or with other hydrocarbon fragments produced by pyrolysis. Reaction of the hydrocarbon fragments with other compounds and/or with each other, however, may reduce production of a selected product. A reducing agent in or provided to the portion of the formation during heating, however, may increase production of the selected product. An example of a reducing agent may include, but may not be limited to, $H_2$. For example, the reducing agent may react with the hydrocarbon fragments to form a selected product.

In an embodiment, molecular hydrogen may be provided to the formation to create a reducing environment. A hydrogenation reaction between the molecular hydrogen and at least some of the hydrocarbons within a portion of the formation may generate heat. The generated heat may be used to heat the portion of the formation. Molecular hydrogen may also be generated within the portion of the formation. In this manner, the generated $H_2$ may be used to hydrogenate hydrocarbon fluids within a portion of a formation.

For example, $H_2$ may be produced from a first portion of the coal formation. The $H_2$ may be produced as a component of a fluid produced from a first portion. For example, at least a portion of fluids produced from a first portion of the formation may be provided to a second portion of the formation to create a reducing environment within the second portion. The second portion of the formation may be heated as described herein. In addition, produced $H_2$ may be provided to a second portion of the formation. For example, a partial pressure of $H_2$ within the produced fluid may be greater than a pyrolysis $H_2$ partial pressure, as measured at a well from which the produced fluid may be produced.

For example, a portion of a coal formation may be heated in a reducing environment. The presence of a reducing agent during pyrolysis of at least some of the hydrocarbons in the heated portion may reduce (e.g., at least partially saturate) at least some of the pyrolyzed product. Reducing the pyrolyzed product may decrease a concentration of olefins in hydrocarbon fluids. Reducing the pyrolysis products may improve the product quality of the hydrocarbon fluids.

An embodiment of a method for treating a coal formation in situ may include generating $H_2$ and hydrocarbon fluids within the formation. In addition, the method may include hydrogenating the generated hydrocarbon fluids using the $H_2$ within the formation. In some embodiments, the method may also include providing the generated $H_2$ to a portion of the formation.

In an embodiment, a method of treating a portion of a coal formation may include heating the portion such that a thermal conductivity of a selected section of the heated portion increases. For example, porosity and permeability within a selected section of the portion may increase substantially during heating such that heat may be transferred through the formation not only by conduction but also by convection and/or by radiation from a heat source. In this manner, such radiant and convective transfer of heat may increase an apparent thermal conductivity of the selected section and, consequently, the thermal diffusivity. The large apparent thermal diffusivity may make heating at least a portion of a coal formation from heat sources feasible. For example, a combination of conductive, radiant, and/or convective heating may accelerate heating. Such accelerated heating may significantly decrease a time required for producing hydrocarbons and may significantly increase the economic feasibility of commercialization of an in situ conversion process. In a further embodiment, the in situ conversion process for a coal formation may also include providing heat to the heated portion to increase a thermal conductivity of a selected section to greater than about 0.5 W/(m° C.) or about 0.6 W/(m° C.).

In some embodiments, an in situ conversion process for a coal formation may increase the rank level of coal within a heated portion of the coal. The increase in rank level, as assessed by the vitrinite reflectance, of the coal may coincide with a substantial change of the structure (e.g., molecular changes in the carbon structure) of the coal. The changed structure of the coal may have a higher thermal conductivity.

Thermal diffusivity within a coal formation may vary depending on, for example, a density of the coal formation, a heat capacity of the formation, and a thermal conductivity of the formation. As pyrolysis occurs within a selected section, the coal mass may be removed from the selected section. The removal of mass may include, but is not limited to, removal of water and a transformation of hydrocarbons to formation fluids. For example, a lower thermal conductivity may be expected as water is removed from a coal formation. This effect may vary significantly at different depths. At greater depths a lithostatic pressure may be higher, and may close certain openings (e.g., cleats and/or fractures) in the coal. The closure of the coal openings may increase a thermal conductivity of the coal. In some embodiments, a higher thermal conductivity may be observed due to a higher lithostatic pressure.

In some embodiments, an in situ conversion process may generate molecular hydrogen during the pyrolysis process. In addition, pyrolysis tends to increase the porosity/void spaces in the formation. Void spaces in the formation may contain hydrogen gas generated by the pyrolysis process. Hydrogen gas may have about six times the thermal conductivity of nitrogen or air. This may raise the thermal conductivity of the formation.

Certain embodiments described herein will in many instances be able to economically treat formations that were previously believed to be uneconomical. Such treatment will be possible because of the surprising increases in thermal conductivity and thermal diffusivity that can be achieved with such embodiments. These surprising results are illustrated by the fact that prior literature indicated that certain coal formations exhibited relatively low values for thermal conductivity and thermal diffusivity when heated. For example, in government report No. 8364 by J. M. Singer and R. P. Tye entitled "Thermal, Mechanical, and Physical Properties of Selected Bituminous Coals and Cokes," U.S. Department of the Interior, Bureau of Mines (1979), the authors report the thermal conductivity and thermal diffusivity for four bituminous coals. This government report includes graphs of thermal conductivity and diffusivity that show relatively low values up to about 400° C. (e.g., thermal conductivity is about 0.2 W/(m° C.) or below, and thermal diffusivity is below about $1.7 \times 10^{-3}$ cm²/s). This government report states that "coals and cokes are excellent thermal insulators."

In contrast, in certain embodiments described herein coal may be treated such that the thermal conductivity and thermal diffusivity are significantly higher (e.g., thermal conductivity at or above about 0.5 W/(m° C.) and thermal diffusivity at or above $4.1 \times 10^{-3}$ cm²/s) than would be expected based on previous literature such as government report No. 8364. If treated as described in certain embodiments herein, coal does not act as "an excellent thermal insulator." Instead, heat can and does transfer and/or diffuse into the formation at significantly higher (and better) rates than would be expected according to the literature, thereby significantly enhancing economic viability of treating the formation.

In an embodiment, heating a portion of a coal formation in situ to a temperature less than an upper pyrolysis temperature may increase permeability of the heated portion. For example, permeability may increase due to formation of fractures within the heated portion caused by application of heat. As a temperature of the heated portion increases, water may be removed due to vaporization. The vaporized water may escape and/or be removed from the formation. Removal of water may also increase the permeability of the heated portion. In addition, permeability of the heated portion may also increase as a result of production of hydrocarbons from pyrolysis of at least some of the hydrocarbons within the heated portion on a macroscopic scale. In an embodiment, a permeability of a selected section within a heated portion of a coal formation may be substantially uniform. For example, heating by conduction may be substantially uniform, and thus a permeability created by conductive heating may also be substantially uniform. In the context of this patent "substantially uniform permeability" means that the assessed (e.g., calculated or estimated) permeability of any selected portion in the formation does not vary by more than a factor of 10 from the assessed average permeability of such selected portion.

Permeability of a selected section within the heated portion of the coal formation may also rapidly increase while the selected section is heated by conduction. For example, permeability of an impermeable coal formation may be less than about 1 millidarcy before treatment. In some embodiments, pyrolyzing at least a portion of a coal formation may increase a permeability within a selected section of the portion to greater than about 10 millidarcy, 100 millidarcy, 1 Darcy, 10 Darcy, 20 Darcy, or 50 Darcy. Therefore, a permeability of a selected section of the portion may increase by a factor of more than about 10, 100, 1,000, or 10,000.

In some embodiments, superposition (e.g., overlapping) of heat from one or more heat sources may result in substantially uniform heating of a portion of a coal formation. Since formations during heating will typically have temperature profiles throughout them, in the context of this patent "substantially uniform" heating means heating such that the temperatures in a majority of the section do not vary by more than 100° C. from the assessed average temperature in the majority of the selected section (volume) being treated.

Substantially uniform heating of the coal formation may result in a substantially uniform increase in permeability. For example, uniformly heating may generate a series of substantially uniform fractures within the heated portion due to thermal stresses generated in the formation. Heating substantially uniformly may generate pyrolysis fluids from the portion in a substantially homogeneous manner. Water removed due to vaporization and production may result in increased permeability of the heated portion. In addition to creating fractures due to thermal stresses, fractures may also be generated due to fluid pressure increase. As fluids are generated within the heated portion, a fluid pressure within the heated portion may also increase. As the fluid pressure approaches a lithostatic pressure of the heated portion, fractures may be generated. Substantially uniform heating and homogeneous generation of fluids may generate substantially uniform fractures within the heated portion. In some embodiments, a permeability of a heated section of a coal formation may not vary by more than a factor of about 10.

Removal of hydrocarbons due to treating at least a portion of a coal formation, as described in any of the above embodiments, may also occur on a microscopic scale. Hydrocarbons may be removed from micropores within the portion due to heating. Micropores may be generally defined as pores having a cross-sectional dimension of less than about 1000 Å. In this manner, removal of solid hydrocarbons may result in a substantially uniform increase in porosity within at least a selected section of the heated portion. Heating the portion of a coal formation, as described in any of the above embodiments, may substantially uniformly increase a porosity of a selected section within the heated portion. In the context of this patent "substantially uniform porosity" means that the assessed (e.g., calculated or estimated) porosity of any selected portion in the formation does not vary by more than about 25% from the assessed average porosity of such selected portion.

Physical characteristics of a portion of a coal formation after pyrolysis may be similar to those of a porous bed. For example, a portion of a coal formation after pyrolysis may include particles having sizes of about several millimeters. Such physical characteristics may differ from physical characteristics of a coal formation that may be subjected to injection of gases that burn hydrocarbons in order to heat the hydrocarbons. Such gases injected, into virgin or fractured formations may tend to channel and may not be uniformly distributed throughout the formation. In contrast, a gas injected into a pyrolyzed portion of a coal formation may readily and substantially uniformly contact the carbon and/or hydrocarbons remaining in the formation. In addition, gases produced by heating the hydrocarbons may be transferred a significant distance within the heated portion of the formation with a minimal pressure loss. Such transfer of gases may be particularly advantageous, for example, in treating a steeply dipping coal formation.

Synthesis gas may be produced from a portion of a coal formation. The coal formation may be heated prior to synthesis gas generation to produce a substantially uniform, relatively high permeability formation. In an embodiment, synthesis gas production may be commenced after production of pyrolysis fluids has been substantially exhausted or becomes uneconomical. Alternately, synthesis gas generation may be commenced before substantial exhaustion or uneconomical pyrolysis fluid production has been achieved if production of synthesis gas will be more economically favorable. Formation temperatures will usually be higher than pyrolysis temperatures during synthesis gas generation. Raising the formation temperature from pyrolysis temperatures to synthesis gas generation temperatures allows further utilization of heat applied to the formation to pyrolyze the formation. While raising a temperature of a formation from pyrolysis temperatures to synthesis gas temperatures, methane and/or $H_2$ may be produced from the formation.

Producing synthesis gas from a formation from which pyrolyzation fluids have been previously removed allows a synthesis gas to be produced that includes mostly $H_2$, CO, water and/or $CO_2$. Produced synthesis gas, in certain embodiments, may have substantially no hydrocarbon component unless a separate source hydrocarbon stream is introduced into the formation with or in addition to the synthesis gas producing fluid. Producing synthesis gas from a substantially uniform, relatively high permeability formation that was formed by slowly heating a formation through pyrolysis temperatures may allow for easy introduction of a synthesis gas generating fluid into the formation, and may allow the synthesis gas generating fluid to contact a relatively large portion of the formation. The synthesis gas generating fluid can do so because the permeability of the formation has been increased during pyrolysis and/or because the surface area per volume in the formation has increased during pyrolysis. The relatively large surface area (e.g., "contact area") in the post-pyrolysis formation tends to allow synthesis gas generating reactions to be substantially at equilibrium conditions for C, $H_2$, CO, water and $CO_2$. Reactions in which methane is formed may, however, not be at equilibrium because they are kinetically limited. The relatively high, substantially uniform formation permeability may allow production wells to be spaced farther apart than production wells used during pyrolysis of the formation.

A temperature of at least a portion of a formation that is used to generate synthesis gas may be raised to a synthesis gas generating temperature (e.g., between about 400° C. and about 1200° C.). In some embodiments composition of produced synthesis gas may be affected by formation temperature, by the temperature of the formation adjacent to synthesis gas production wells, and/or by residence time of the synthesis gas components. A relatively low synthesis gas generation temperature may produce a synthesis gas having a high $H_2$ to CO ratio, but the produced synthesis gas may also include a large portion of other gases such as water, $CO_2$, and methane. A relatively high formation temperature may produce a synthesis gas having a $H_2$ to CO ratio that approaches 1, and the stream may include mostly (and in some cases substantially only) $H_2$ and CO. If the synthesis gas generating fluid is substantially pure steam, then the $H_2$ to CO ratio may approach 1 at relatively high temperatures. At a formation temperature of about 700° C., the formation may produce a synthesis gas with a $H_2$ to CO ratio of about 2 at a certain pressure. The composition of the synthesis gas tends to depend on the nature of the synthesis gas generating fluid.

Synthesis gas generation is generally an endothermic process. Heat may be added to a portion of a formation during synthesis gas production to keep formation temperature at a desired synthesis gas generating temperature or above a minimum synthesis gas generating temperature. Heat may be added to the formation from heat sources, from oxidation reactions within the portion, and/or from introducing synthesis gas generating fluid into the formation at a higher temperature than the temperature of the formation.

An oxidant may be introduced into a portion of the formation with synthesis gas generating fluid. The oxidant may exothermically react with carbon within the portion of the formation to heat the formation. Oxidation of carbon within a formation may allow a portion of a formation to be economically heated to relatively high synthesis gas generating temperatures. The oxidant may also be introduced into the formation without synthesis gas generating fluid to heat the portion. Using an oxidant, or an oxidant and heat sources, to heat the portion of the formation may be significantly more favorable than heating the portion of the formation with only the heat sources. The oxidant may be, but is not limited to, air, oxygen, or oxygen enriched air. The oxidant may react with carbon in the formation to produce $CO_2$ and/or CO. The use of air, or oxygen enriched air (i.e., air with an oxygen content greater than 21% by volume), to generate heat within the formation may cause a significant portion of $N_2$ to be present in produced synthesis gas. Temperatures in the formation may be maintained below temperatures needed to generate oxides of nitrogen ($NO_x$), so that little or no $NO_x$ compounds may be present in produced synthesis gas.

A mixture of steam and oxygen, or steam and air, may be substantially continuously injected into a formation. If injection of steam and oxygen is used for synthesis gas production, the oxygen may be produced on site by electrolysis of water utilizing direct current output of a fuel cell. $H_2$ produced by the electrolysis of water may be used as a fuel stream for the fuel cell. $O_2$ produced by the electrolysis of water may be injected into the hot formation to raise a temperature of the formation.

Heat sources and/or production wells within a formation for pyrolyzing and producing pyrolysis fluids from the formation may be utilized for different purposes during synthesis gas production. A well that was used as a heat source or a production well during pyrolysis may be used as an injection well to introduce synthesis gas producing fluid into the formation. A well that was used as a heat source or a production well during pyrolysis may be used as a production well during synthesis gas generation. A well that was used as a heat source or a production well during pyrolysis may be used as a heat source to heat the formation during synthesis gas generation. Synthesis gas production wells may be spaced further apart than pyrolysis production wells because of the relatively high, substantially uniform permeability of the formation. Synthesis gas production wells may be heated to relatively high temperatures so that a portion of the formation adjacent to the production well is at a temperature that will produce a desired synthesis gas composition. Comparatively, pyrolysis fluid production wells may not be heated at all, or may only be heated to a temperature that will inhibit condensation of pyrolysis fluid within the production well.

Synthesis gas may be produced from a dipping formation from wells used during pyrolysis of the formation. As shown in FIG. 4, synthesis gas production wells 206 may be located above and down dip from an injection well 202. Hot synthesis gas producing fluid may be introduced into injection well 202. Hot synthesis gas fluid that moves down dip may generate synthesis gas that is produced through synthesis gas production wells 206. Synthesis gas generating fluid that moves up dip may generate synthesis gas in a portion of the formation that is at synthesis gas generating temperatures. A portion of the synthesis gas generating fluid and generated synthesis gas that moves up dip above the portion of the formation at synthesis gas generating temperatures may heat adjacent portions of the formation. The synthesis gas generating fluid that moves up dip may condense, heat adjacent portions of formation, and flow downwards towards or into a portion of the formation at synthesis gas generating temperature. The synthesis gas generating fluid may then generate additional synthesis gas.

Synthesis gas generating fluid may be any fluid capable of generating $H_2$ and CO within a heated portion of a formation. Synthesis gas generating fluid may include water, $O_2$, air, $CO_2$, hydrocarbon fluids, or combinations thereof. Water may be introduced into a formation as a liquid or as steam. Water may react with carbon in a formation to produce $H_2$, CO, and $CO_2$. $CO_2$ may react with hot carbon to form CO. Air and $O_2$ may be oxidants that react with carbon in a formation to generate heat and form $CO_2$, CO, and other compounds. Hydrocarbon fluids may react within a formation to form $H_2$, CO, $CO_2$, $H_2O$, coke, methane and/or other light hydrocarbons. Introducing low carbon number hydrocarbons (i.e., compounds with carbon numbers less than 5) may produce additional $H_2$ within the formation. Adding higher carbon number hydrocarbons to the formation may increase an energy content of generated synthesis gas by having a significant methane and other low carbon number compounds fraction within the synthesis gas.

Water provided as a synthesis gas generating fluid may be derived from numerous different sources. Water may be produced during a pyrolysis stage of treating a formation. The water may include some entrained hydrocarbon fluids. Such fluid may be used as synthesis gas generating fluid. Water that includes hydrocarbons may advantageously generate additional $H_2$ when used as a synthesis gas generating fluid. Water produced from water pumps that inhibit water flow into a portion of formation being subjected to an in situ conversion process may provide water for synthesis gas generation. A low rank kerogen resource or hydrocarbons having a relatively high water content (i.e. greater than about 20% $H_2O$ by weight) may generate a large amount of water and/or $CO_2$ if subjected to an in situ conversion process. The water and $CO_2$ produced by subjecting a low rank kerogen resource to an in situ conversion process may be used as a synthesis gas generating fluid.

Reactions involved in the formation of synthesis gas may include, but are not limited to:

$$C + H_2O \rightleftharpoons H_2 + CO \quad (1)$$

$$C + 2H_2O \rightleftharpoons 2H_2 + CO_2 \quad (2)$$

$$C + CO_2 \rightleftharpoons 2CO \quad (3)$$

Thermodynamics allows the following reactions to proceed:

$$2C + 2H_2O \rightleftharpoons CH_4 + CO_2 \quad (4)$$

$$C + 2H_2 \rightleftharpoons CH_4 \quad (5)$$

However, kinetics of the reactions are slow in certain embodiments so that relatively low amounts of methane are formed at formation conditions from Reactions (4) and (5).

In the presence of oxygen, the following reaction may take place to generate carbon dioxide and heat:

$$C + O_2 \rightarrow CO_2 \quad (6)$$

Equilibrium gas phase compositions of coal in contact with steam may provide an indication of the compositions of components produced in a formation during synthesis gas generation. Equilibrium composition data for $H_2$, carbon monoxide, and carbon dioxide may be used to determine appropriate operating conditions such as temperature that may be used to produce a synthesis gas having a selected composition. Equilibrium conditions may be approached within a formation due to a high, substantially uniform permeability of the formation. Composition data obtained from synthesis gas production may in many instances deviate by less than 10% from equilibrium values.

In one embodiment, a composition of the produced synthesis gas can be changed by injecting additional components into the formation along with steam. Carbon dioxide may be provided in the synthesis gas generating fluid to substantially inhibit production of carbon dioxide produced from the formation during synthesis gas generation. The carbon dioxide may shift the equilibrium of reaction (2) to the left, thus reducing the amount of carbon dioxide generated from formation carbon. The carbon dioxide may also react with carbon in the formation to generate carbon monoxide. Carbon dioxide may be separated from the synthesis gas and may be re-injected into the formation with the synthesis gas generating fluid. Addition of carbon dioxide in the synthesis gas generating fluid may, however, reduce the production of hydrogen.

Figure 29:
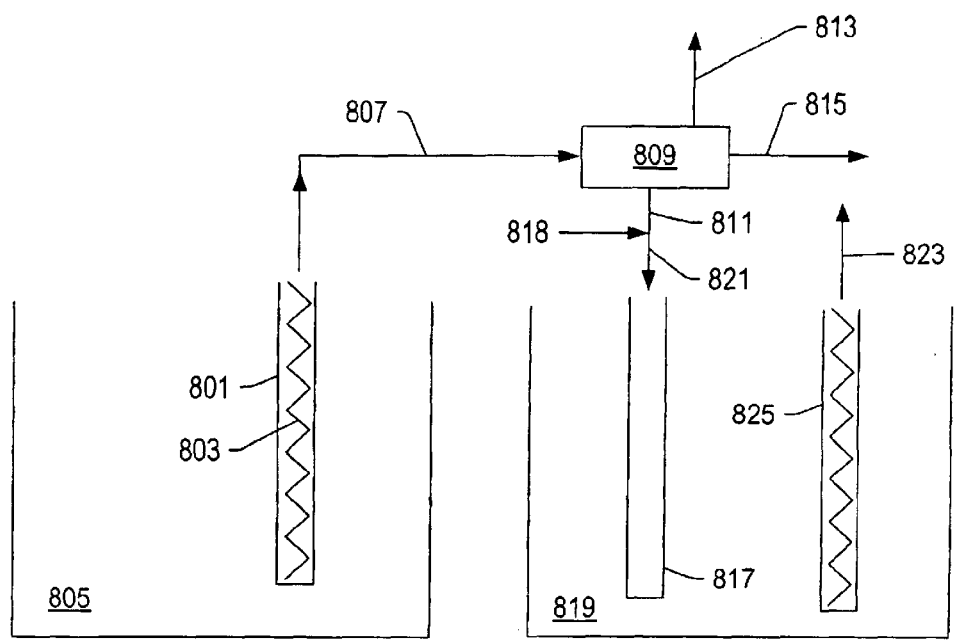
FIG. 29 depicts an embodiment of using pyrolysis water to generate synthesis gas in a formation.

FIG. 29 depicts a schematic diagram of use of water recovered from pyrolysis fluid production being used to generate synthesis gas. Heat source 801 with electric heater 803 produces pyrolysis fluid 807 from first section 805 of the formation. Produced pyrolysis fluid 807 may be sent to separator 809. Separator 809 may include a number of individual separation units and processing units that produce aqueous stream 811, vapor stream 813, and hydrocarbon condensate stream 815. Aqueous stream 811 from the separator 809 may be combined with synthesis gas generating fluid 818 to form synthesis gas generating fluid 821. Synthesis gas generating fluid 821 may be provided to injection well 817 and introduced to second portion 819 of the formation. Synthesis gas 823 may be produced from synthesis gas production well 825.

Figure 30:
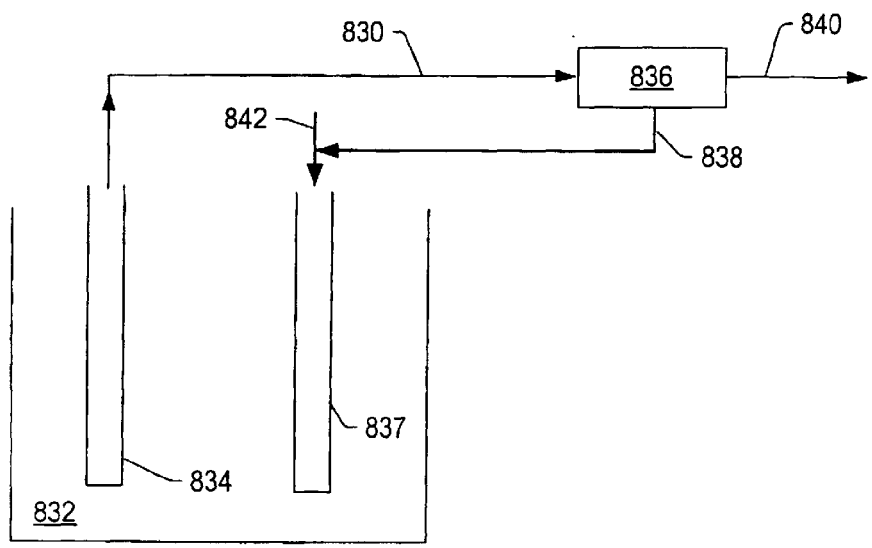
FIG. 30 depicts an embodiment of synthesis gas production in a formation.

FIG. 30 depicts a schematic diagram of an embodiment of a system for synthesis gas production in which carbon dioxide from produced synthesis gas is injected into a formation. Synthesis gas 830 may be produced from formation 832 through production well 834. Gas separation unit 836 may separate a portion of carbon dioxide from the synthesis gas 830 to produce $CO_2$ stream 838 and remaining synthesis gas stream 840. The $CO_2$ stream 838 may be mixed with synthesis gas producing fluid stream 842 that is introduced into the formation 832 through injection well 837, and/or the $CO_2$ may be separately introduced into the formation. This may limit conversion of carbon within the formation to $CO_2$ and/or may increase an amount of CO generated within the formation.

Synthesis gas generating fluid may be introduced into a formation in a variety of different ways. Steam may be injected into a heated coal formation at a lowermost portion of the heated formation. Alternatively, in a steeply dipping formation, steam may be injected up dip with synthesis gas production down dip. The injected steam may pass through the remaining coal formation to a production well. In addition, endothermic heat of reaction may be provided to the formation with heat sources disposed along a path of the injected steam. In alternate embodiments, steam may be injected at a plurality of locations along the coal formation to increase penetration of the steam throughout the formation. A line drive pattern of locations may also be utilized. The line drive pattern may include alternating rows of steam injection wells and synthesis gas production wells.

At relatively low pressures, and temperatures below about 400° C., synthesis gas reactions are relatively slow. At relatively low pressures, and temperatures between about 400° C. and about 700° C., Reaction (2) tends to be the predominate reaction and the synthesis gas composition is primarily hydrogen and carbon dioxide. At relatively low pressures, and temperatures greater than about 700° C., Reaction (1) tends to be the predominate reaction and the synthesis gas composition is primarily hydrogen and carbon monoxide.

Advantages of a lower temperature synthesis gas reaction may include lower heat requirements, cheaper metallurgy and less endothermic reactions (especially when methane formation takes place). An advantage of a higher temperature synthesis gas reaction is that hydrogen and carbon monoxide may be used as feedstock for other processes (e.g., Fischer-Tropsch processes).

A pressure of the coal formation may be maintained at relatively high pressures during synthesis gas production. The pressure may range from atmospheric pressure to a lithostatic pressure of the formation. Higher formation pressures may allow generation of electricity by passing produced synthesis gas through a turbine. Higher formation pressures may allow for smaller collection conduits to transport produced synthesis gas, and reduced downstream compression requirements on the surface.

In some embodiments, synthesis gas may be produced from a portion of a formation in a substantially continuous manner. The portion may be heated to a desired synthesis gas generating temperature. A synthesis gas generating fluid may be introduced into the portion. Heat may be added to, or generated within, the portion of the formation during introduction of the synthesis gas generating fluid to the portion. The added heat compensates for the loss of heat due to the endothermic synthesis gas reactions as well as heat losses to the top and bottom layers, etc. In other embodiments, synthesis gas may be produced in a substantially batch manner. The portion of the formation may be heated, or heat may be generated within the portion, to raise a temperature of the portion to a high synthesis gas generating temperature. Synthesis gas generating fluid may then be added to the portion until generation of synthesis gas reduces the temperature of the formation below a temperature that produces a desired synthesis gas composition. Introduction of the synthesis gas generating fluid may then be stopped. The cycle may be repeated by reheating the portion of the formation to the high synthesis gas generating temperature and adding synthesis gas generating fluid after obtaining the high synthesis gas generating temperature. Composition of generated synthesis gas may be monitored to determine when addition of synthesis gas generating fluid to the formation should be stopped.

Figure 31:
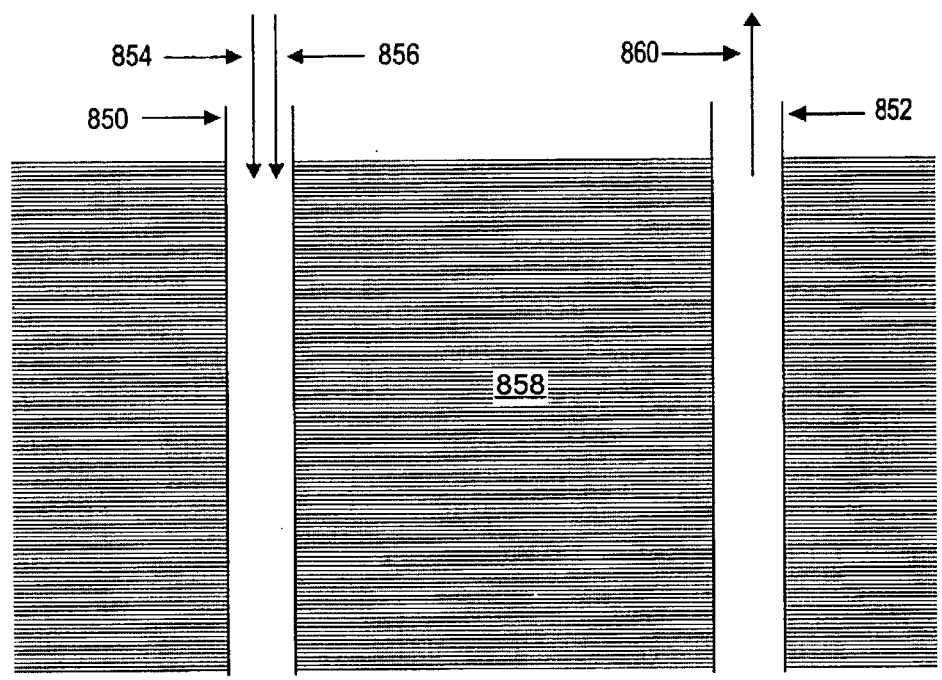
FIG. 31 depicts an embodiment of continuous synthesis gas production in a formation.

FIG. 31 illustrates a schematic of an embodiment of a continuous synthesis gas production system. FIG. 31 includes a formation with heat injection wellbore 850 and heat injection wellbore 852. The wellbores may be members of a larger pattern of wellbores placed throughout a portion of the formation. A portion of a formation may be heated to synthesis gas generating temperatures by heating the formation with heat sources, by injecting an oxidizing fluid, or by a combination thereof. Oxidizing fluid 854, such as air or oxygen, and synthesis gas generating fluid 856, such as steam, may be injected into wellbore 850. In one embodiment, the ratio of oxygen to steam may be approximately 1:2 to approximately 1:10, or approximately 1:3 to approximately 1:7 (e.g., about 1:4).

In situ combustion of hydrocarbons may heat region 858 of the formation between wellbores 850 and 852. Injection of the oxidizing fluid may heat region 858 to a particular temperature range, for example, between about 600° C. and about 700° C. The temperature may vary, however, depending on a desired composition of the synthesis gas. An advantage of the continuous production method may be that the temperature across region 858 may be substantially uniform and substantially constant with time once the formation has reached substantial thermal equilibrium. Continuous production may also eliminate a need for use of valves to reverse injection directions on a substantially frequent basis. Further, continuous production may reduce temperatures near the injections wells due to endothermic cooling from the synthesis gas reaction that may occur in the same region as oxidative heating. The substantially constant temperature may allow for control of synthesis gas composition. Produced synthesis gas 860 may exit continuously from wellbore 852.

In an embodiment, it may be desirable to use oxygen rather than air as oxidizing fluid 854 in continuous production. If air is used, nitrogen may need to be separated from the synthesis gas. The use of oxygen as oxidizing fluid 854 may increase a cost of production due to the cost of obtaining substantially pure oxygen. The cryogenic nitrogen by-product obtained from an air separation plant used to produce the required oxygen may, however, be used in a heat exchanger to condense hydrocarbons from a hot vapor stream produced during pyrolysis of hydrocarbons. The pure nitrogen may also be used for ammonia production.

Figure 32:
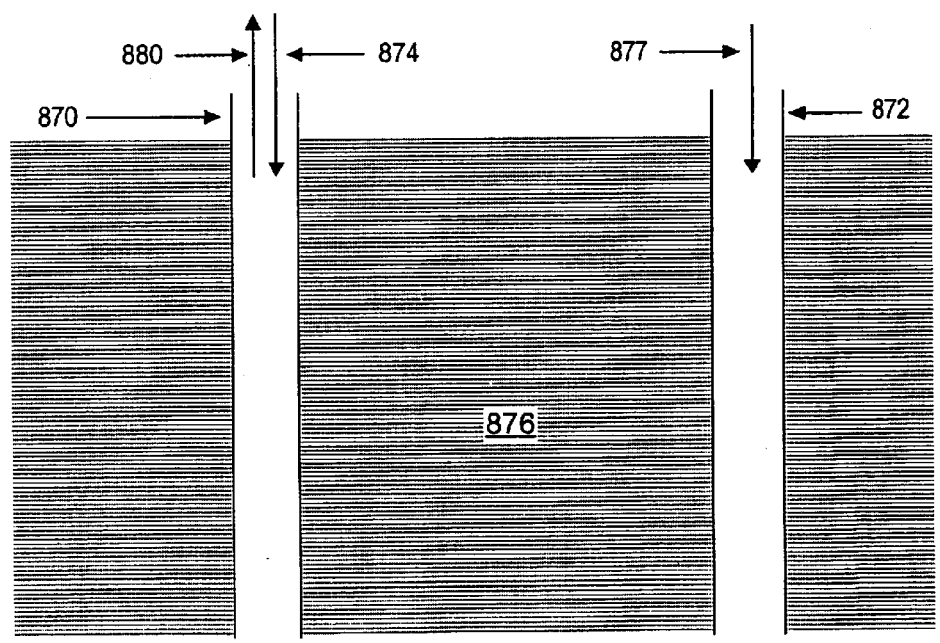
FIG. 32 depicts an embodiment of batch synthesis gas production in a formation.

FIG. 32 illustrates a schematic of an embodiment of a batch production of synthesis gas in a coal formation. Wellbore 870 and wellbore 872 may be located within a portion of the formation. The wellbores may be members of a larger pattern of wellbores throughout the portion of the formation. Oxidizing fluid 874, such as air or oxygen, may be injected into wellbore 870. Oxidation of hydrocarbons may heat region 876 of a formation between wellbores 870 and 872. Injection of air or oxygen may continue until an average temperature of region 876 is at a desired temperature (e.g., between about 900° C. and about 1000° C.). Higher or lower temperatures may also be developed. A temperature gradient may be formed in region 876 between wellbore 870 and wellbore 872. The highest temperature of the gradient may be located proximate to the injection wellbore 870.

When a desired temperature has been reached, or when oxidizing fluid has been injected for a desired period of time, oxidizing fluid injection may be lessened and/or ceased. A synthesis gas generating fluid 877, such as steam or water, may be injected into the injection wellbore 872 to produce synthesis gas. A back pressure of the injected steam or water in the injection wellbore may force the synthesis gas produced and un-reacted steam across region 876. A decrease in average temperature of region 876 caused by the endothermic synthesis gas reaction may be partially offset by the temperature gradient in region 876 in a direction indicated by arrow 878. Product stream 880 may be produced through heat source wellbore 870. If the composition of the product deviates substantially from a desired composition, then steam injection may cease, and air or oxygen injection may be reinitiated.

In one embodiment, synthesis gas of a selected composition may be produced by blending synthesis gas produced from different portions of the formation. A first portion of a formation may be heated by one or more heat sources to a first temperature sufficient to allow generation of synthesis gas having a $H_2$ to carbon monoxide ratio of less than the selected $H_2$ to carbon monoxide ratio (e.g., about 1 or 2). A first synthesis gas generating fluid may be provided to the first portion to generate a first synthesis gas. The first synthesis gas may be produced from the formation. A second portion of the formation may be heated by one or more heat sources to a second temperature sufficient to allow generation of synthesis gas having a $H_2$ to carbon monoxide ratio of greater than the selected $H_2$ to carbon monoxide ratio (e.g., a ratio of 3 or more). A second synthesis gas generating fluid may be provided to the second portion to generate a second synthesis gas. The second synthesis gas may be produced from the formation. The first synthesis gas may be blended with the second synthesis gas to produce a blend synthesis gas having a desired $H_2$ to carbon monoxide ratio.

The first temperature may be substantially different than the second temperature. Alternatively, the first and second temperatures may be approximately the same temperature. For example, a temperature sufficient to allow generation of synthesis gas having different compositions may vary depending on compositions of the first and second portions and/or prior pyrolysis of hydrocarbons within the first and second portions. The first synthesis gas generating fluid may have substantially the same composition as the second synthesis gas generating fluid. Alternatively, the first synthesis gas generating fluid may have a different composition than the second synthesis gas generating fluid. Appropriate first and second synthesis gas generating fluids may vary depending upon, for example, temperatures of the first and second portions, compositions of the first and second portions, and prior pyrolysis of hydrocarbons within the first and second portions.

In addition, synthesis gas having a selected ratio of $H_2$ to carbon monoxide may be obtained by controlling the temperature of the formation. In one embodiment, the temperature of an entire portion or section of the formation may be controlled to yield synthesis gas with a selected ratio. Alternatively, the temperature in or proximate to a synthesis gas production well may be controlled to yield synthesis gas with the selected ratio.

In one embodiment, synthesis gas having a selected ratio of $H_2$ to carbon monoxide may be obtained by treating produced synthesis gas at the surface. First, the temperature of the formation may be controlled to yield synthesis gas with a ratio different than a selected ratio. For example, the formation may be maintained at a relatively high temperature to generate a synthesis gas with a relatively low $H_2$ to carbon monoxide ratio (e.g., the ratio may approach 1 under certain conditions). Some or all of the produced synthesis gas may then be provided to a shift reactor (shift process) at the surface. Carbon monoxide reacts with water in the shift process to produce $H_2$ and carbon dioxide. Therefore, the shift process increases the $H_2$ to carbon monoxide ratio. The carbon dioxide may then be separated to obtain a synthesis gas having a selected $H_2$ to carbon monoxide ratio.

Figure 33:
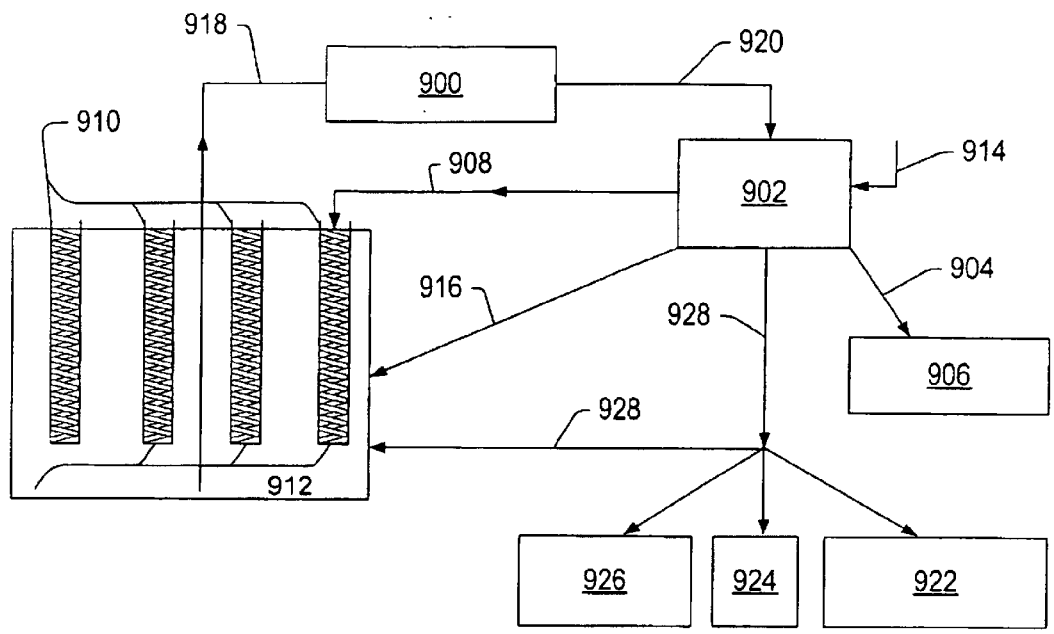
FIG. 33 depicts an embodiment of producing energy with synthesis gas produced from a coal formation.

In one embodiment, produced synthesis gas 918 may be used for production of energy. In FIG. 33, treated gases 920 may be routed from treatment section 900 to energy generation unit 902 for extraction of useful energy. Energy may be extracted from the combustible gases generally by oxidizing the gases to produce heat and converting a portion of the heat into mechanical and/or electrical energy. Alternatively, energy generation unit 902 may include a fuel cell that produces electrical energy. In addition, energy generation unit 902 may include, for example, a molten carbonate fuel cell or another type of fuel cell, a turbine, a boiler firebox, or a down hole gas heater. Produced electrical energy 904 may be supplied to power grid 906. A portion of the produced electricity 908 may be used to supply energy to electrical heating elements 910 that heat formation 912.

In one embodiment, energy generation unit 902 may be a boiler firebox. A firebox may include a small refractory-lined chamber, built wholly or partly in the wall of a kiln, for combustion of fuel. Air or oxygen 914 may be supplied to energy generation unit 902 to oxidize the produced synthesis gas. Water 916 produced by oxidation of the synthesis gas may be recycled to the formation to produce additional synthesis gas.

The produced synthesis gas may also be used as a fuel in down hole gas heaters. Down hole gas heaters, such as a flameless combustor as disclosed herein, may be configured to heat a coal formation. In this manner, a thermal conduction process may be substantially self-reliant and/or may substantially reduce or eliminate a need for electricity. Because flameless combustors may have a thermal efficiency approaching 90%, an amount of carbon dioxide released to the environment may be less than an amount of carbon dioxide released to the environment from a process using fossil-fuel generated electricity to heat the coal formation.

Carbon dioxide may be produced by both pyrolysis and synthesis gas generation. Carbon dioxide may also be produced by energy generation processes and/or combustion processes. Net release of carbon dioxide to the atmosphere from an in situ conversion process for coal may be reduced by utilizing the produced carbon dioxide and/or by storing carbon dioxide within the formation. For example, a portion of carbon dioxide produced from the formation may be utilized as a flooding agent or as a feedstock for producing chemicals.

In one embodiment, the energy generation process may produce a reduced amount of emissions by sequestering carbon dioxide produced during extraction of useful energy. For example, emissions from an energy generation process may be reduced by storing an amount of carbon dioxide within a coal formation. The amount of stored carbon dioxide may be approximately equivalent to that in an exit stream from the formation.

FIG. 33 illustrates a reduced emission energy process. Carbon dioxide 928 produced by energy generation unit 902 may be separated from fluids exiting the energy generation unit. Carbon dioxide may be separated from $H_2$ at high temperatures by using a hot palladium film supported on porous stainless steel or a ceramic substrate, or high temperature pressure swing adsorption. The carbon dioxide may be sequestered in spent coal formation 922, injected into oil producing fields 924 for enhanced oil recovery by improving mobility and production of oil in such fields, sequestered into a deep coal formation 926 containing methane by adsorption and subsequent desorption of methane, or re-injected 928 into a section of the formation through a synthesis gas production well to produce carbon monoxide. Carbon dioxide leaving the energy generation unit may be sequestered in a dewatered coal bed methane reservoir. The water for synthesis gas generation may come from dewatering a coal bed methane reservoir. Additional methane can also be produced by alternating carbon dioxide and nitrogen. An example of a method for sequestering carbon dioxide is illustrated in U.S. Pat. No. 5,566,756 to Chaback et al., which is incorporated by reference as if fully set forth herein. Additional energy may be utilized by removing heat from the carbon dioxide stream leaving the energy generation unit.

In one embodiment, it may be desirable to cool a hot spent formation before sequestration of carbon dioxide. For example, a higher quantity of carbon dioxide may be adsorbed in a coal formation at lower temperatures. In addition, cooling a formation may strengthen a formation. The spent formation may be cooled by introducing water into the formation. The steam produced may be removed from the formation. The generated steam may be used for any desired process. For example, the steam may be provided to an adjacent portion of a formation to heat the adjacent portion or to generate synthesis gas.

In one embodiment, a spent coal formation may be mined. The mined material may in some embodiments be used for metallurgical purposes such as a fuel for generating high temperatures during production of steel. Pyrolysis of a coal formation may substantially increase a rank of the coal. After pyrolysis, the coal may be substantially transformed to a coal having characteristics of anthracite. A spent coal formation may have a thickness of 30 m or more. Anthracite coal seams, which are typically mined for metallurgical uses, may be, only about one meter in thickness.

Figure 34:
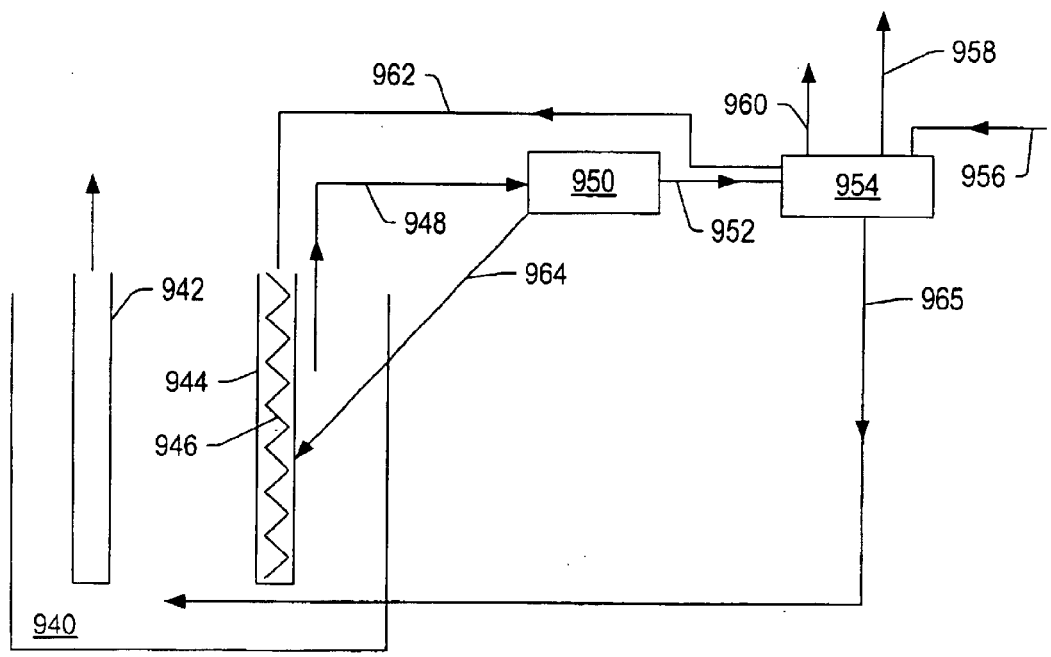
FIG. 34 depicts an embodiment of producing energy with pyrolyzation fluid produced from a coal formation.

FIG. 34 illustrates an embodiment in which fluid produced from pyrolysis may be separated into a fuel cell feed stream and fed into a fuel cell to produce electricity. The embodiment may include carbon containing formation 940 with producing well 942 configured to produce synthesis gas and heater well 944 with electric heater 946 configured to produced pyrolysis fluid 948. In one embodiment, pyrolysis fluid may include $H_2$ and hydrocarbons with carbon numbers less than 5. Pyrolysis fluid 948 produced from heater well 944 may be fed to gas membrane separation system 950 to separate $H_2$ and hydrocarbons with carbon numbers less than 5. Fuel cell feed stream 952, which may be substantially composed of $H_2$, may be fed into fuel cell 954. Air feed stream 956 may be fed into fuel cell 954. Nitrogen stream 958 may be vented from fuel cell 954. Electricity 960 produced from the fuel cell may be routed to a power grid. Electricity 962 may also be used to power electric heaters 946 in heater wells 944. Carbon dioxide 965 may be injected into formation 940.

Hydrocarbons having carbon numbers of 4, 3, and 1 typically have fairly high market values. Separation and selling of these hydrocarbons may be desirable. Typically ethane may not be sufficiently valuable to separate and sell in some markets. Ethane may be sent as part of a fuel stream to a fuel cell or ethane may be used as a hydrocarbon fluid component of a synthesis gas generating fluid. Ethane may also be used as a feedstock to produce ethene. In some markets, there may be no market for any hydrocarbons having carbon numbers less than 5. In such a situation, all of the hydrocarbon gases produced during pyrolysis may be sent to fuel cells or be used as hydrocarbon fluid components of a synthesis gas generating fluid.

Pyrolysis fluid 964, which may be substantially composed of hydrocarbons with carbon numbers less than 5, may be injected into formation 940. When the hydrocarbons contact the formation, hydrocarbons may crack within the formation to produce methane, $H_2$, coke, and olefins such as ethene and propylene. In one embodiment, the production of olefins may be increased by heating the temperature of the formation to the upper end of the pyrolysis temperature range and by injecting hydrocarbon fluid at a relatively high rate. In this manner, residence time of the hydrocarbons in the formation may be reduced and dehydrogenated hydrocarbons may tend to form olefins rather than cracking to form $H_2$ and coke. Olefin production may also be increased by reducing formation pressure.

In one embodiment, electric heater 946 may be a flameless distributed combustor. At least a portion of $H_2$ produced from the formation may be used as fuel for the flameless distributed combustor.

In addition, in some embodiments, heater well 944 may heat the formation to a synthesis gas generating temperature range. Pyrolysis fluid 964, which may be substantially composed of hydrocarbons with carbon numbers less than 5, may be injected into the formation 940. When the hydrocarbons contact the formation, the hydrocarbons may crack within the formation to produce methane, $H_2$, and coke.

Figure 35:
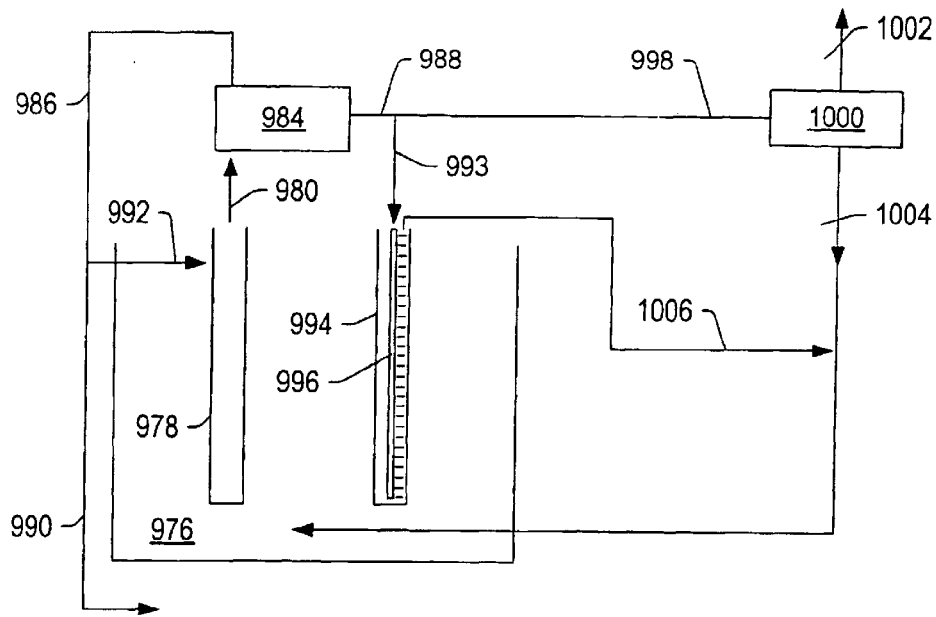
FIG. 35 depicts an embodiment of synthesis gas production from a formation.

FIG. 35 depicts an embodiment of a synthesis gas generating process from coal formation 976 with flameless distributed combustor 996. Synthesis gas 980 produced from production well 978 may be fed into gas separation plant 984 where carbon dioxide 986 may be separated from synthesis gas 980. First portion 990 of carbon dioxide may be routed to a formation for sequestration. Second portion 992 of carbon dioxide may also be injected into the formation with synthesis gas generating fluid. Portion 993 of synthesis gas 988 may be fed to heater well 994 for combustion in distributed burner 996 to produce heat for the formation. Portion 998 of synthesis gas 988 may be fed to fuel cell 1000 for the production of electricity. Electricity 1002 may be routed to a power grid. Steam 1004 produced in the fuel cell and steam 1006 produced from combustion in the distributed burner may be fed to the formation for generation of synthesis gas.

Figure 36:
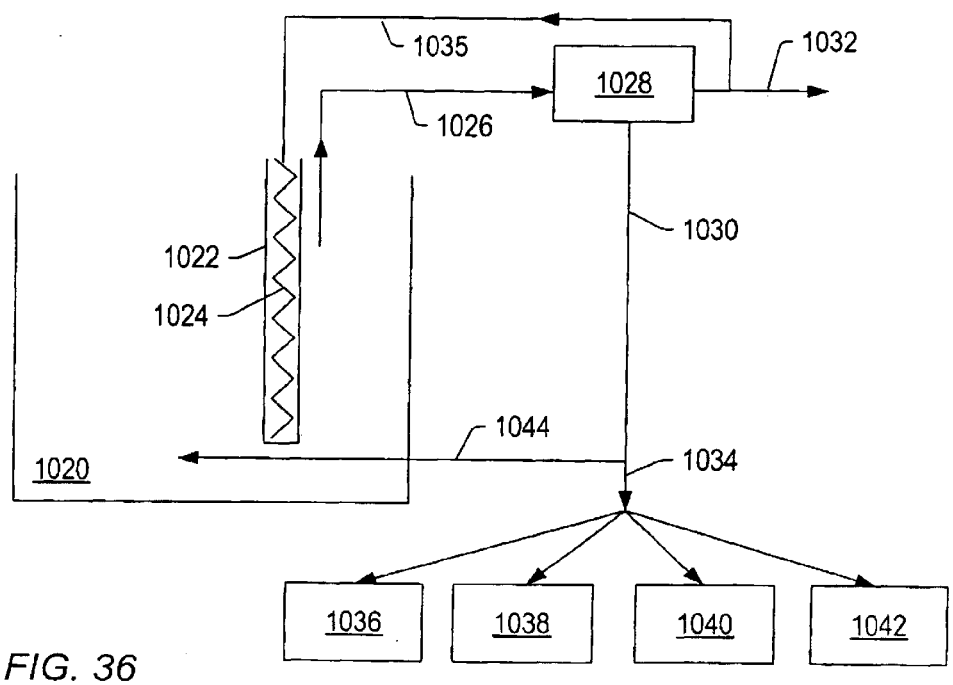
FIG. 36 depicts an embodiment of sequestration of carbon dioxide produced during pyrolysis in a coal formation.

In one embodiment, carbon dioxide generated with pyrolysis fluids as described herein may be sequestered in a coal formation. FIG. 36 illustrates in situ pyrolysis in coal formation 1020. Heater well 1022 with electric heater 1024 may be disposed in formation 1020. Pyrolysis fluids 1026 may be produced from formation 1020 and fed into gas separation unit 1028 where carbon dioxide 1030 may be separated from pyrolysis fluids 1032. Portion 1034 of carbon dioxide 1030 may be stored in formation 1036. The carbon dioxide may be sequestered in spent coal formation 1038, injected into oil producing fields 1040 for enhanced oil recovery, or sequestered into coal bed 1042. Alternatively, carbon dioxide may also be re-injected 1044 into a section of formation 1020 through a synthesis gas production well to produce carbon monoxide. At least a portion of electricity 1035 may be used to power one or more electric heaters.

In one embodiment, fluid produced from pyrolysis of at least some hydrocarbons in a formation may be fed into a reformer to produce synthesis gas. The synthesis gas may be fed into a fuel cell to produce electricity. In addition, carbon dioxide generated by the fuel cell may be sequestered to reduce an amount of emissions generated by the process.

Figure 37:
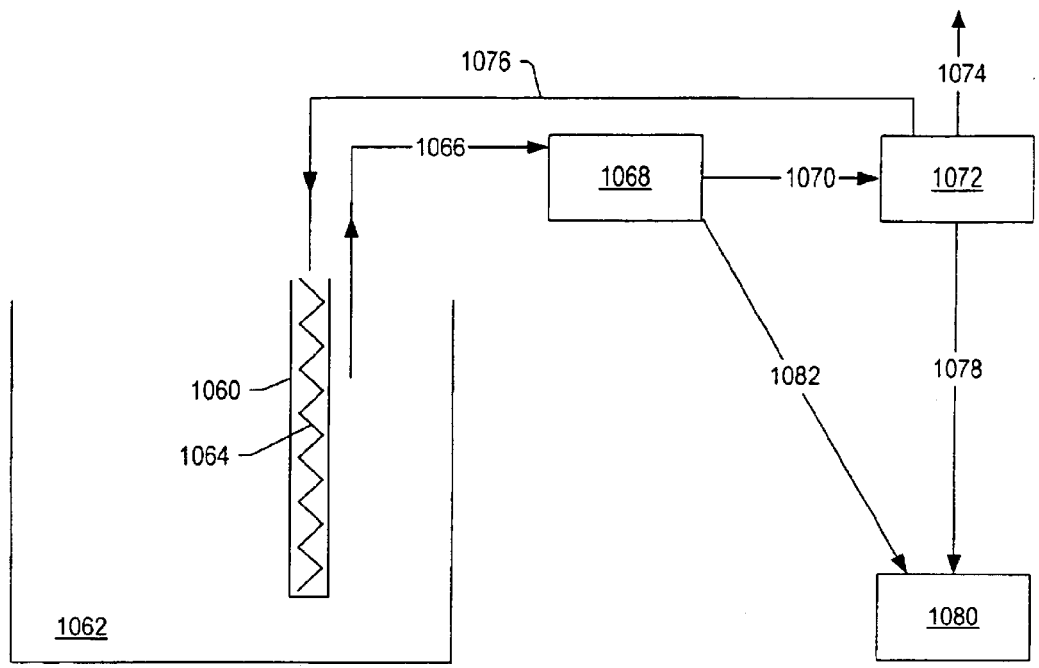
FIG. 37 depicts an embodiment of producing energy with synthesis gas produced from a coal formation.

As shown in FIG. 37, heater well 1060 may be located within coal formation 1062. Additional heater wells may also be located within the formation. Heater well 1060 may include electric heater 1064. Pyrolysis fluid 1066 produced from the formation may be fed to a reformer, such as steam reformer 1068, to produce synthesis gas 1070. A portion of the pyrolysis products may be used as fuel in the reformer. Steam reformer 1068 may include a catalyst material that promotes the reforming reaction and a burner to supply heat for the endothermic reforming reaction. A steam source may be connected to the reformer section to provide steam for the reforming reaction. The burner may operate at temperatures well above that required by the reforming reaction and well above the operating temperatures of fuel cells. As such, it may be desirable to operate the burner as a separate unit independent of the fuel cell.

Alternatively, a reformer may include multiple tubes that may be made of refractory metal alloys. Each tube may include a packed granular or pelletized material having a reforming catalyst as a surface coating. A diameter of the tubes may vary from between about 9 cm and about 16 cm, and the heated length of the tube may normally be between about 6 m and about 12 m. A combustion zone may be provided external to the tubes, and may be formed in the burner. A surface temperature of the tubes may be maintained by the burner at a temperature of about 900° C. to ensure that the hydrocarbon fluid flowing inside the tube is properly catalyzed with steam at a temperature between about 500° C. and about 700° C. A traditional tube reformer may rely upon conduction and convection heat transfer within the tube to distribute heat for reforming.

In addition, hydrocarbon fluids, such as pyrolysis fluids, may be pre-processed prior to being fed to a reformer. The reformer may be configured to transform the pyrolysis fluids into simpler reactants prior to introduction to a fuel cell. For example, pyrolysis fluids may be pre-processed in a desulfurization unit. Subsequent to pre-processing, the pyrolysis fluids may be provided to a reformer and a shift reactor to produce a suitable fuel stock for a $H_2$ fueled fuel cell.

The synthesis gas produced by the reformer may include any of the components described above, such as methane. The produced synthesis gas 1070 may be fed to fuel cell 1072. A portion of electricity 1074 produced by the fuel cell may be sent to a power grid. In addition, a portion of electricity 1076 may be used to power electric heater 1064. Carbon dioxide 1078 exiting the fuel cell may be routed to sequestration area 1080.

Alternatively, in one embodiment, pyrolysis fluids 1066 produced from the formation may be fed to reformer 1068 that produces carbon dioxide stream 1082 and $H_2$ stream 1070. For example, the reformer may include a flameless distributed combustor for a core, and a membrane. The membrane may allow only $H_2$ to pass through the membrane resulting in separation of the $H_2$ and carbon dioxide. The carbon dioxide may be routed to sequestration area 1080.

Synthesis gas produced from a formation may be converted to heavier condensable hydrocarbons. For example, a Fischer-Tropsch hydrocarbon synthesis process may be used for conversion of synthesis gas. A Fischer-Tropsch process may include converting synthesis gas to hydrocarbons. The process may use elevated temperatures, normal or elevated pressures, and a catalyst, such as magnetic iron oxide or a cobalt catalyst. Products produced from a Fischer-Tropsch process may include hydrocarbons having a broad molecular weight distribution and may include branched and unbranched paraffins. Products from a Fischer-Tropsch process may also include considerable quantities of olefins and oxygen-containing organic compounds. An example of a Fischer-Tropsch reaction may be illustrated by the following:

$$(n+2)CO+(2n+5)H_2 \rightleftharpoons CH_3(-CH_2-)nCH_3+(n+2)H_2O \qquad (7)$$

A hydrogen to carbon monoxide ratio for synthesis gas used as a feed gas for a Fischer-Tropsch reaction may be about 2:1. In certain embodiments the ratio may range from approximately 1.8:1 to 2.2:1. Higher or lower ratios may be accommodated by certain Fischer-Tropsch systems.

Figure 38:
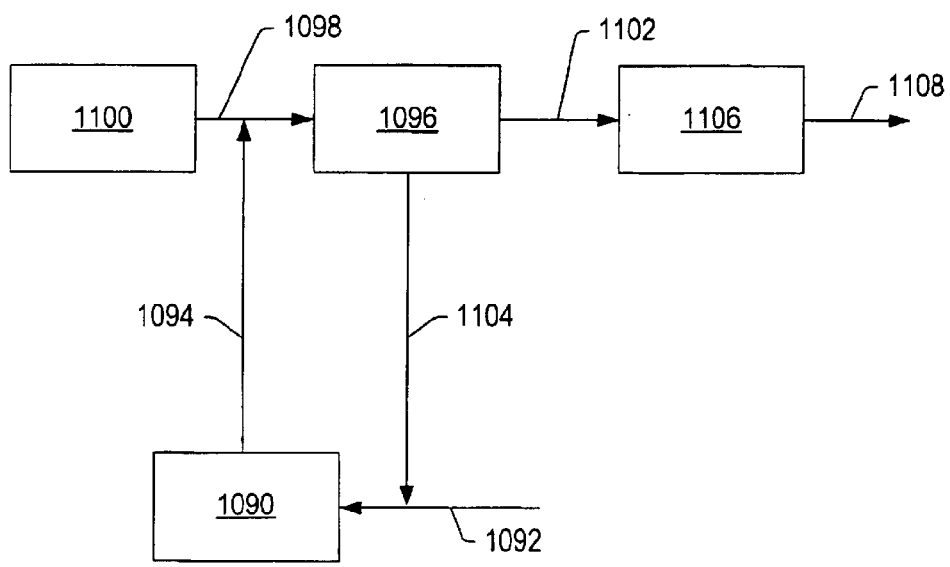
FIG. 38 depicts an embodiment of a Fischer-Tropsch process using synthesis gas produced from a coal formation.

FIG. 38 illustrates a flowchart of a Fischer-Tropsch process that uses synthesis gas produced from a coal formation as a feed stream. Hot formation 1090 may be used to produce synthesis gas having a $H_2$ to CO ratio of approximately 2:1. The proper ratio may be produced by operating synthesis production wells at approximately 700° C., or by blending synthesis gas produced from different sections of formation to obtain a synthesis gas having approximately a 2:1 $H_2$ to CO ratio. Synthesis gas generating fluid 1092 may be fed into the hot formation 1090 to generate synthesis gas. $H_2$ and CO may be separated from the synthesis gas produced from the hot formation 1090 to form feed stream 1094. Feed stream 1094 may be sent to Fischer-Tropsch plant 1096. Feed stream 1094 may supplement or replace synthesis gas 1098 produced from catalytic methane reformer 1100.

Fischer-Tropsch plant 1096 may produce wax feed stream 1102. The Fischer-Tropsch synthesis process that produces wax feed stream 1102 is an exothermic process. Steam 1104 may be generated during the Fischer-Tropsch process. Steam 1104 may be used as a portion of synthesis gas generating fluid 1092.

Wax feed stream 1102 produced from Fischer-Tropsch plant 1096 may be sent to hydrocracker 1106. The hydrocracker may produce product stream 1108. The product stream may include diesel, jet fuel, and/or naphtha products. Examples of methods for conversion of synthesis gas to hydrocarbons in a Fischer-Tropsch process are illustrated in U.S. Pat. No. 4,096,163 to Chang et al., U.S. Pat. No. 6,085,512 to Agee et al., and U.S. Pat. No. 6,172,124 to Wolflick et al., which are incorporated by reference as if fully set forth herein.

Figure 39:
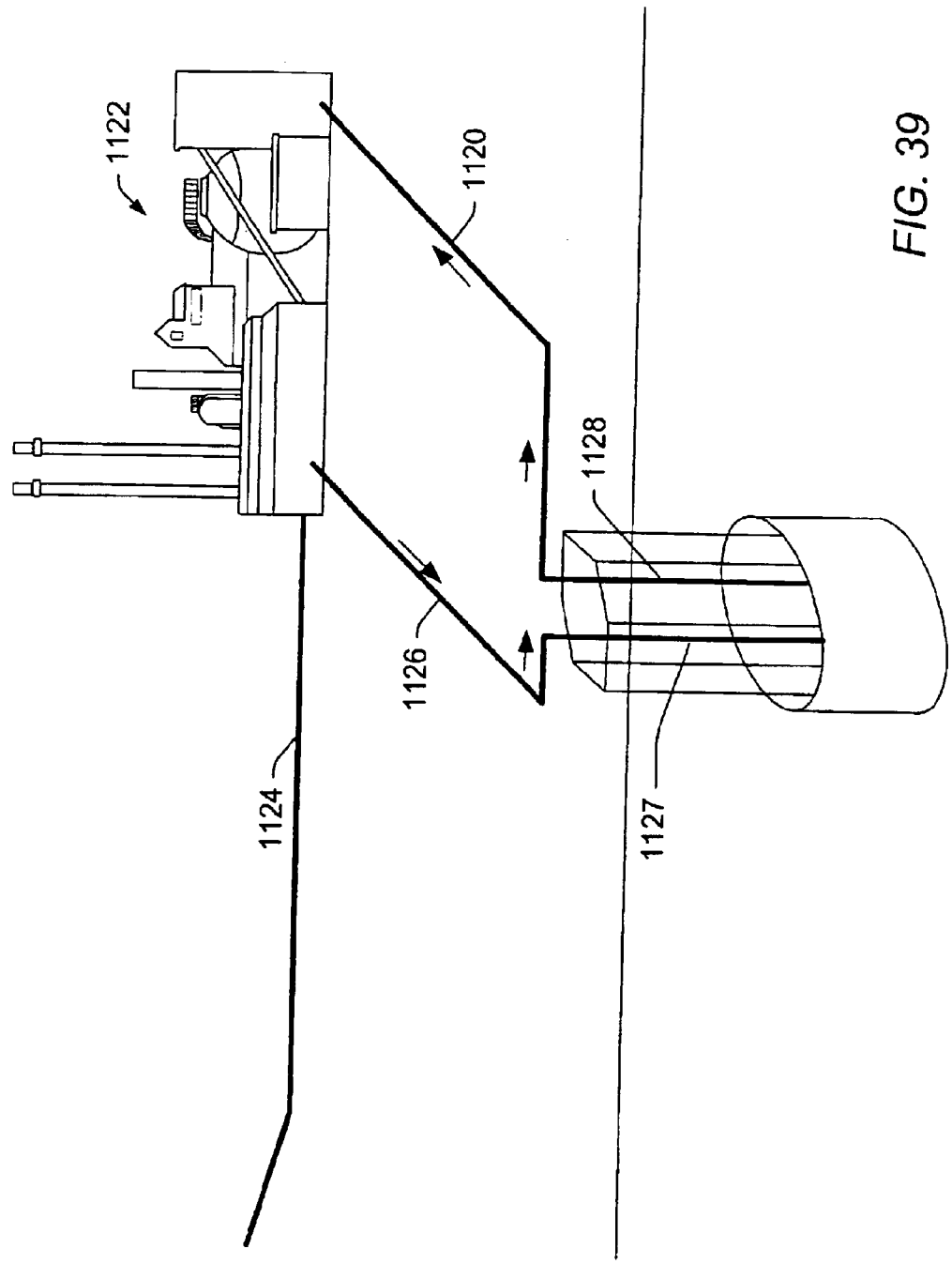
FIG. 39 depicts an embodiment of a Shell Middle Distillates process using synthesis gas produced from a coal formation.

FIG. 39 depicts an embodiment of in situ synthesis gas production integrated with a Shell Middle Distillates Synthesis (SMDS) Fischer-Tropsch and wax cracking process. An example of a SMDS process is illustrated in U.S. Pat. No. 4,594,468 to Minderhoud, and is incorporated by reference as if fully set forth herein. A middle distillates hydrocarbon mixture may also be produced from produced synthesis gas using the SMDS process as illustrated in FIG. 39. Middle distillates may designate hydrocarbon mixtures with a boiling point range that may correspond substantially with that of kerosene and gas oil fractions obtained in a conventional atmospheric distillation of crude oil material. The middle distillate boiling point range may include temperatures between about 150° C. and about 360° C., with a fractions boiling point between about 200° C. and about 360° C., and may be referred to as gas oil. FIG. 39 depicts synthesis gas 1120, having a $H_2$ to carbon monoxide ratio of about 2:1, that may exit production well 1128 and may be fed into SMDS plant 1122. In certain embodiments the ratio may range from approximately 1.8:1 to 2.2:1. Products of the SMDS plant include organic liquid product 1124 and steam 1126. Steam 1126 may be supplied to injection wells 1127. In this manner, steam may be used as a feed for synthesis gas production. Hydrocarbon vapors may in some circumstances be added to the steam.

Figure 40:
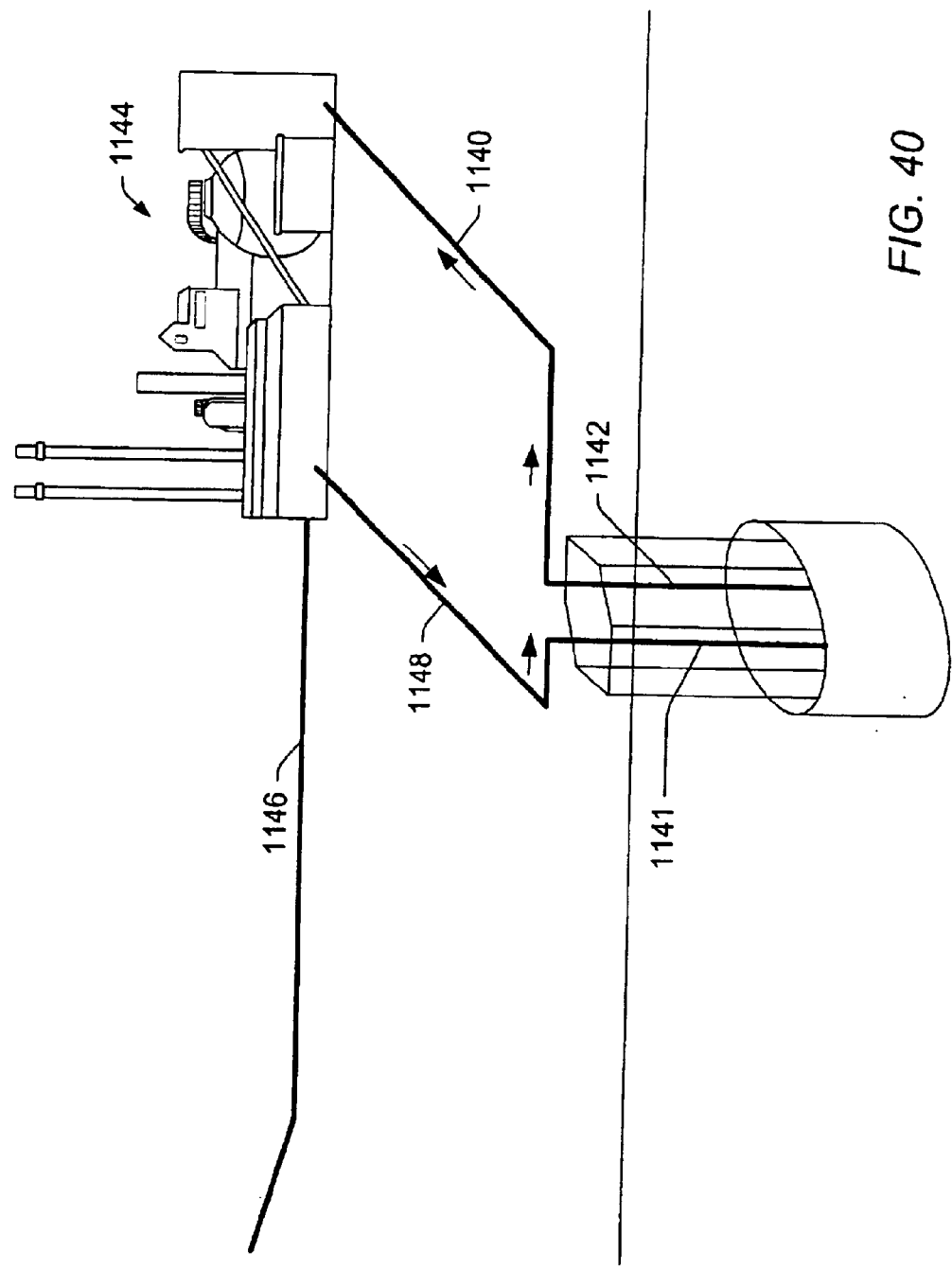
FIG. 40 depicts an embodiment of a catalytic methanation process using synthesis gas produced from a coal formation.

FIG. 40 depicts an embodiment of in situ synthesis gas production integrated with a catalytic methanation process. For example, synthesis gas 1140 exiting production well 1142 may be supplied to catalytic methanation plant 1144. In some embodiments, it may be desirable for the composition of produced synthesis gas, which may be used as a feed gas for a catalytic methanation process, to have a $H_2$ to carbon monoxide ratio of about three to one. Methane 1146 may be produced by catalytic methanation plant 1144. Steam 1148 produced by plant 1144 may be supplied to injection well 1141 for production of synthesis gas. Examples of a catalytic methanation process are illustrated in U.S. Pat. No. 3,922,148 to Child; U.S. Pat. No. 4,130,575 to Jorn et al.; and U.S. Pat. No. 4,133,825 to Stroud et al., which are incorporated by reference as if fully set forth herein.

The synthesis gas produced may also be used as a feed for a process for production of methanol. Examples of processes for production of methanol are illustrated in U.S. Pat. No. 4,407,973 to van Dijk et al., U.S. Pat. No. 4,927,857 to McShea, III et al., and U.S. Pat. No. 4,994,093 to Wetzel et al., which are incorporated by reference as if fully set forth herein. The produced synthesis gas may also be used as a feed gas for a process that may convert synthesis gas to gasoline and a process that may convert synthesis gas to diesel fuel. Examples of process for producing engine fuels are illustrated in U.S. Pat. No. 4,076,761 to Chang et al., U.S. Pat. No. 4,138,442 to Chang et al., and U.S. Pat. No. 4,605,680 to Beuther et al., which are incorporated by reference as if fully set forth herein.

Figure 41:
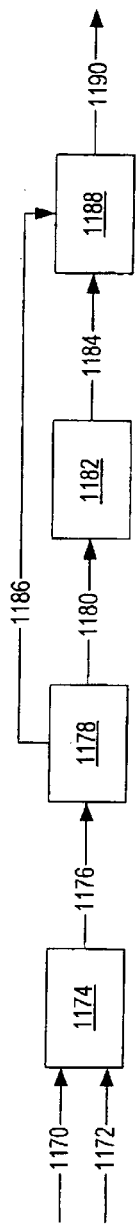
FIG. 41 depicts an embodiment of production of ammonia and urea using synthesis gas produced from a coal formation.
Figure 42:
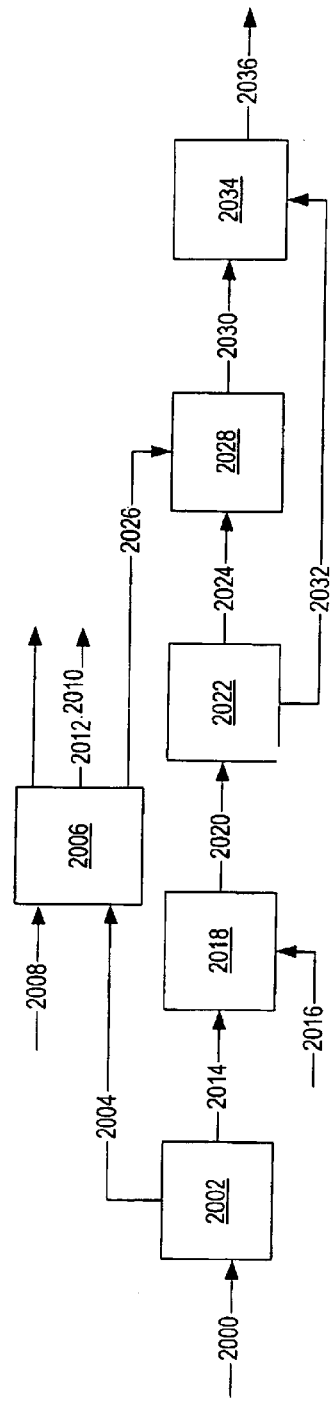
FIG. 42 depicts an embodiment of production of ammonia using synthesis gas produced from a coal formation.

In one embodiment, produced synthesis gas may be used as a feed gas for production of ammonia and urea as illustrated by FIGS. 41 and 42. Ammonia may be synthesized by the Haber-Bosch process, which involves synthesis directly from $N_2$ and $H_2$ according to the reaction:

$$N_2+3H_2 \rightleftharpoons 2NH_3 \qquad (8)$$

The $N_2$ and $H_2$ may be combined, compressed to high pressure (e.g., from about 80 bars to about 220 bars) and heated to a relatively high temperature. The reaction mixture may be passed over a catalyst composed substantially of iron, where ammonia production may occur. During ammonia synthesis, the reactants (i.e., $N_2$ and $H_2$) and the product (i.e., ammonia) may be in equilibrium. In this manner, the total amount of ammonia produced may be increased by shifting the equilibrium towards product formation. Equilibrium may be shifted to product formation by removing ammonia from the reaction mixture as it is produced.

Removal of the ammonia may be accomplished by cooling the gas mixture to a temperature between about (−5)° C. to about 25° C. In this temperature range, a two-phase mixture may be formed with ammonia in the liquid phase and $N_2$ and $H_2$ in the gas phase. The ammonia may be separated from other components of the mixture. The nitrogen and hydrogen may be subsequently reheated to the operating temperature for ammonia conversion and passed through the reactor again.

Urea may be prepared by introducing ammonia and carbon dioxide into a reactor at a suitable pressure (e.g., from about 125 bars absolute to about 350 bars absolute) and at a suitable temperature (e.g., from about 160° C. to about 250° C.). Ammonium carbamate may be formed according to the following reaction:

$$2NH_3 + CO_2 \rightarrow NH_2(CO_2)NH_4 \quad (9)$$

Urea may be subsequently formed by dehydrating the ammonium carbamate according to the following equilibrium reaction:

$$NH_2(CO_2)NH_4 \leftrightarrows NH_2(CO)NH_2 + H_2O \quad (10)$$

The degree to which the ammonia conversion takes place may depend on, for example, the temperature and the amount of excess ammonia. The solution obtained as the reaction product may substantially include urea, water, ammonium carbamate and unbound ammonia. The ammonium carbamate and the ammonia may need to be removed from the solution. Once removed, they may be returned to the reactor. The reactor may include separate zones for the formation of ammonium carbamate and urea. However, these zones may also be combined into one piece of equipment.

According to one embodiment, a high pressure urea plant may operate such that the decomposition of the ammonium carbamate that has not been converted into urea and the expulsion of the excess ammonia may be conducted at a pressure between bars absolute and 100 bars absolute. This may be considerably lower than the pressure in the urea synthesis reactor. The synthesis reactor may be operated at a temperature of about 180° C. to about 210° C. and at a pressure of about 180 bars absolute to about 300 bars absolute. Ammonia and carbon dioxide may be directly fed to the urea reactor. The $NH_3/CO_2$ molar ratio (N/C molar ratio) in the urea synthesis may generally be between about 3 and about 5. The unconverted reactants may be recycled to the urea synthesis reactor following expansion, dissociation, and/or condensation.

In one embodiment, an ammonia feed stream having a selected ratio of $H_2$ to $N_2$ may be generated from a formation using enriched air. A synthesis gas generating fluid and an enriched air stream may be provided to the formation. The composition of the enriched air may be selected to generate synthesis gas having the selected ratio of $H_2$ to $N_2$. In one embodiment, the temperature of the formation may be controlled to generate synthesis gas having the selected ratio.

In one embodiment, the $H_2$ to $N_2$ ratio of the feed stream provided to the ammonia synthesis process may be approximately 3:1. In other embodiments, the ratio may range from approximately 2.8:1 to 3.2:1. An ammonia synthesis feed stream having a selected $H_2$ to $N_2$ ratio may be obtained by blending feed streams produced from different portions of the formation.

In one embodiment, ammonia from the ammonia synthesis process may be provided to a urea synthesis process to generate urea. Ammonia produced during pyrolysis may be added to the ammonia generated from the ammonia synthesis process. In another embodiment, ammonia produced during hydrotreating may be added to the ammonia generated from the ammonia synthesis process. Some of the carbon monoxide in the synthesis gas may be converted to carbon dioxide in a shift process. The carbon dioxide from the shift process may be fed to the urea synthesis process. Carbon dioxide generated from treatment of the formation may also be fed, in some instances, to the urea synthesis process.

FIG. 41 illustrates an embodiment of a method for production of ammonia and urea from synthesis gas using membrane-enriched air. Enriched air 1170 and steam, or water, 1172 may be fed into hot carbon containing formation 1174 to produce synthesis gas 1176 in a wet oxidation mode as described herein.

In certain embodiments, enriched air 1170 is blended from air and oxygen streams such that the nitrogen to hydrogen ratio in the produced synthesis gas is about 1:3. The synthesis gas may be at a correct ratio of nitrogen and hydrogen to form ammonia. For example, it has been calculated that for a formation temperature of 700° C. and a pressure of 3 bar absolute, and with 13,231 tons/day of char that will be converted into synthesis gas, one could inject 14.7 kilotons/day of air, 6.2 kilotons/day of oxygen, and 21.2 kilotons/day of steam. This would result in production of 2 billion cubic feet/day of synthesis gas including 5689 tons/day of steam, 16,778 tons/day of carbon monoxide, 1406 tons/day of hydrogen, 18,689 tons/day of carbon dioxide, 1258 tons/day of methane, and 11,398 tons/day of nitrogen. After a shift reaction (to shift the carbon monoxide to carbon dioxide, and to produce additional hydrogen), the carbon dioxide may be removed, the product stream may be methanated (to remove residual carbon monoxide), and then one can theoretically produce 13.840 tons/day of ammonia and 1258 tons/day of methane. This calculation includes the products produced from Reactions (4) and (5) above.

Enriched air may be produced from a membrane separation unit. Membrane separation of air may be primarily a physical process. Based upon specific characteristics of each molecule, such as size and permeation rate, the molecules in air may be separated to form substantially pure forms of nitrogen, oxygen, or combinations thereof.

In one embodiment, a membrane system may include a hollow tube filled with a plurality of very thin membrane fibers. Each membrane fiber may be another hollow tube in which air flows. The walls of the membrane fiber may be porous and may be configured such that oxygen may permeate through the wall at a faster rate than nitrogen. In this manner, a nitrogen rich stream may be allowed to flow out the other end of the fiber. Air outside the fiber and in the hollow tube may be oxygen enriched. Such air may be separated for subsequent uses such as production of synthesis gas from a formation.

In one embodiment, the purity of the nitrogen generated may be controlled by variation of the flow rate and/or pressure of air through the membrane. Increasing air pressure may increase permeation of oxygen molecules through a fiber wall. Decreasing flow rate may increase the residence time of oxygen in the membrane and, thus, may increase permeation through the fiber wall. Air pressure and flow rate may be adjusted to allow a system operator to vary the amount and purity of the nitrogen generated in a relatively short amount of time.

The amount of $N_2$ in the enriched air may be adjusted to provide a N:H ratio of about 3:1 for ammonia production. It may be desirable to generate synthesis gas at a temperature that may favor the production of carbon dioxide over carbon monoxide. It may be advantageous for the temperature of the formation to be between about 400° C. and about 550° C. In another embodiment, it may be desirable for the temperature of the formation to be between about 400° C. and about 450° C. Synthesis gas produced at such low temperatures may be substantially composed of $N_2$, $H_2$, and carbon dioxide with little carbon monoxide.

As illustrated in FIG. 41, a feed stream for ammonia production may be prepared by first feeding synthesis gas stream 1176 into ammonia feed stream gas processing unit 1178.

In ammonia feed stream gas processing unit 1178 the feed stream may undergo a shift reaction (to shift the carbon monoxide to carbon dioxide, and to produce additional hydrogen). Carbon dioxide can also be removed from the feed stream, and the feed stream can be methanated (to remove residual carbon monoxide).

In certain embodiments carbon dioxide may be separated from the feed stream (or any gas stream) by absorption in an amine unit. Membranes or other carbon dioxide separation techniques/equipment may also be used to separate carbon dioxide from a feed stream.

Ammonia feed stream 1180 may be fed to ammonia production facility 1182 to produce ammonia 1184. Carbon dioxide 1186 exiting the gas separation unit 1178 (and/or carbon dioxide from other sources) may be fed, with ammonia 1184, into urea production facility 1188 to produce urea 1190.

Ammonia and urea may be produced using a carbon containing formation, and using an $O_2$ rich stream and a $N_2$ rich stream. The $O_2$ rich stream and synthesis gas generating fluid may be provided to a formation. The formation may be heated, or partially heated, by oxidation of carbon in the formation with the $O_2$ rich stream. $H_2$ in the synthesis gas, and $N_2$ from the $N_2$ rich stream, may be provided to an ammonia synthesis process to generate ammonia.

FIG. 42 illustrates a flowchart of an embodiment for production of ammonia and urea from synthesis gas using cryogenically separated air. Air 2000 may be fed into cryogenic air separation unit 2002. Cryogenic separation involves a distillation process that may occur at temperatures between about (−168)° C. and (−172)° C. In other embodiments, the distillation process may occur at temperatures between about (−165)° C. and (−175)° C. Air may liquefy in these temperature ranges. The distillation process may be operated at a pressure between about 8 bars absolute and about 10 bars absolute. High pressures may be achieved by compressing air and exchanging heat with cold air exiting the column. Nitrogen is more volatile than oxygen and may come off as a distillate product. $N_2$ 2004 exiting the separator may be utilized in heat exchanger 2006 to condense higher molecular weight hydrocarbons from pyrolysis stream 2008 to remove lower molecular weight hydrocarbons from the gas phase into a liquid oil phase. Upgraded gas stream 2010 containing a higher composition of lower molecular weight hydrocarbons than stream 2008 and liquid stream 2012, which includes condensed hydrocarbons, may exit heat exchanger 2006.

Oxygen 2014 from cryogenic separation unit 2002 and steam 2016, or water, may be fed into hot carbon containing formation 2018 to produce synthesis gas 2020 in a continuous process as described herein. It is desirable to generate synthesis gas at a temperature that favors the formation of carbon dioxide over carbon monoxide. It may be advantageous for the temperature of the formation to be between about 400° C. and about 550° C. In another embodiment, it may be desirable for the temperature of the formation to be between about 400° C. and about 450° C. Synthesis gas 2020 may be substantially composed of $H_2$ and carbon dioxide. Carbon dioxide may be removed from synthesis gas 2020 to prepare a feed stream for ammonia production using amine gas separation unit 2022. $H_2$ stream 2024 from the gas separation unit and $N_2$ stream 2026 from the heat exchanger may be fed into ammonia production facility 2028 to produce ammonia 2030. Carbon dioxide 2032 exiting the gas separation unit and ammonia 2030 may be fed into urea production facility 2034 to produce urea 2036.

In one embodiment, an ammonia synthesis process feed stream may be generated by feeding a gas containing $N_2$ and carbon dioxide to a carbon containing formation. The gas may be flue gas or it may be gas generated by an oxidation reaction of $O_2$ with carbon in another portion of the formation. The gas containing $N_2$ and carbon dioxide may be provided to a carbon containing formation. The carbon dioxide in the gas may adsorb in the formation and be sequestered therein. An exit stream may be produced from the formation. The exit stream may have a substantially lower percentage of carbon dioxide than the gas entering the formation. The nitrogen in the exit gas may be provided to an ammonia synthesis process. $H_2$ in synthesis gas from another portion of the formation may be provided to the ammonia synthesis process.

Figure 43:
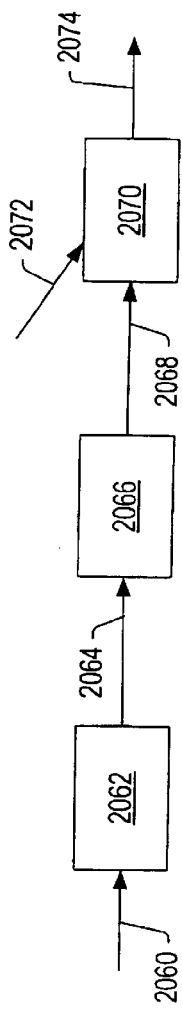
FIG. 43 depicts an embodiment of preparation of a feed stream for an ammonia process.

FIG. 43 illustrates an embodiment of a method for preparing a nitrogen stream for an ammonia and urea process. Air 2060 may be injected into hot carbon containing formation 2062 to produce carbon dioxide by oxidation of carbon in the formation. In an embodiment, a heater may be configured to heat at least a portion of the carbon containing formation to a temperature sufficient to support oxidation of the carbon. The temperature sufficient to support oxidation may be, for example, about 260° C., for coal. Stream 2064 exiting the hot formation may be composed substantially of carbon dioxide and nitrogen. Nitrogen may be separated from carbon dioxide by passing the stream through cold spent carbon containing formation 2066. Carbon dioxide may be preferentially adsorbed versus nitrogen in the cold spent formation 2066. For example, at 50° C., and 0.35 bars, the adsorption of carbon dioxide on a spent portion of coal may be about 72 m³/metric ton compared to about 15.4 m³/metric ton for nitrogen. Nitrogen 2068 exiting the cold spent portion 2066 may be supplied to ammonia production facility 2070 with $H_2$ stream 2072 to produce ammonia 2074. The $H_2$ stream may be obtained by methods disclosed herein, for example, the methods described in FIGS. 41 and 42.

Figure 44:
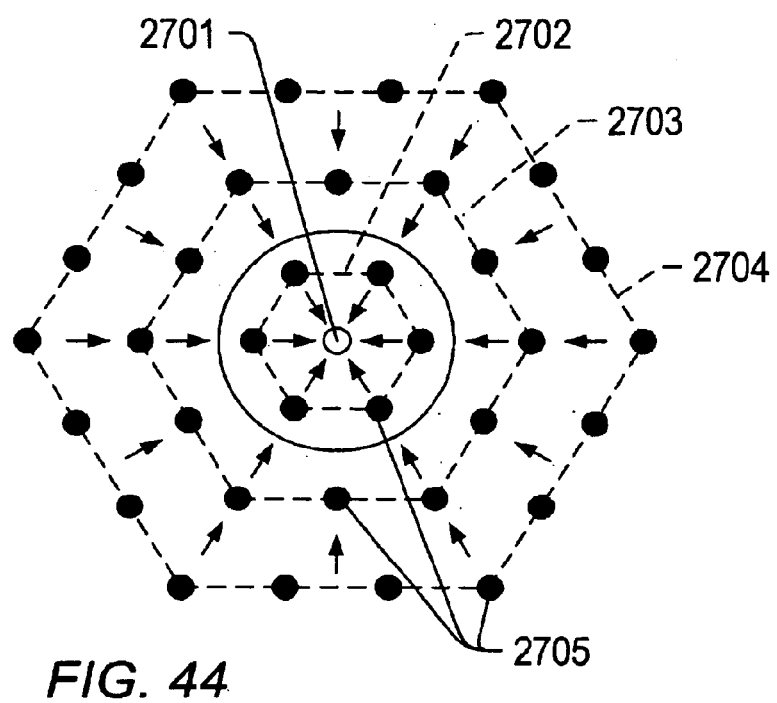
FIGS. 44–57 depict several embodiments of a heat source and production well pattern.

Several patterns of heat sources arranged in rings around production wells may be utilized to create a radial pyrolysis region in coal formations. Various patterns shown in FIGS. 44–57 are described herein. FIG. 44 illustrates an embodiment of a pattern of heat sources 2705 that may create a radial pyrolysis zone. Production well 2701 may be surrounded by concentric rings 2702, 2703, and 2704 of heat sources 2705. Heat sources 2705 in ring 2702 may heat the formation to create radial pyrolysis zone 2710. Fluids may be produced through production well 2701. In one embodiment, an average distance between heat sources may be between about 2 m and about 20 m. Alternatively, the average distance may be between about 10 m and about 30 m.

As in other embodiments, it may be desirable to create pyrolysis zones sequentially. Heat sources 2705 nearest production well 2701 may be activated first, for example, heat sources 2705 in ring 2702. A substantially uniform temperature pyrolysis zone may be established after a period of time. Fluids that flow through the pyrolysis zone may undergo pyrolysis and vaporization. Fluid may flow inward towards production well 2701 due to a pressure differential between a zone around the production well and the pyrolysis zone, as indicated by the arrows.

A larger low viscosity zone may be developed by repeatedly activating heat sources farther away from the fracture, for example, heat sources 2705 in ring 2704.

Several patterns of heat sources and production wells may be utilized in embodiments of radial heating zones. The heat sources may be arranged in rings around the production wells. The pattern around each production well may be a hexagon that may contain a number of heat sources.

Figure 45:
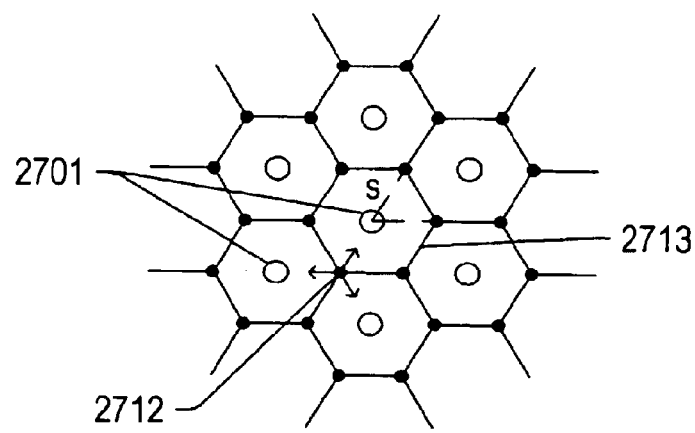

In FIG. 45, production well 2701 and heat source 2712 may be located at the apices of a triangular grid. The triangular grid may be an equilateral triangular grid with sides of length s. Production wells 2701 may be spaced at a distance of about 1.732(s). Production well 2701 may be disposed at a center of a hexagonal pattern with one ring 2713 of six heat sources 2712. Each heat source 2712 may provide substantially equal amounts of heat to three production wells. Therefore, each ring 2713 of six heat sources 2712 may contribute approximately two equivalent heat sources per production well 2701.

Figure 46:
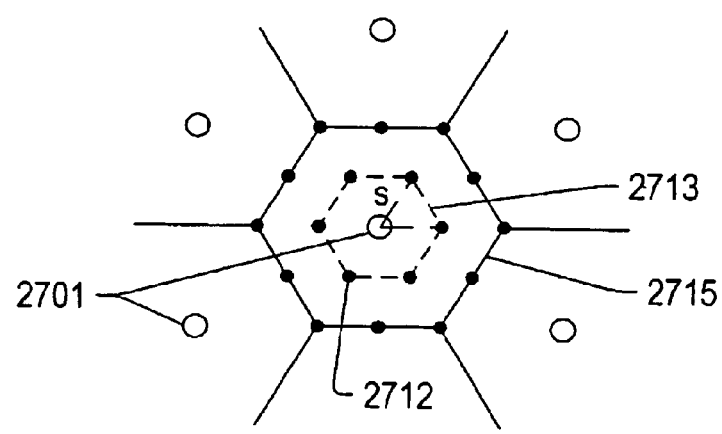

FIG. 46 illustrates a pattern of production wells 2701 with an inner hexagonal ring 2713 and an outer hexagonal ring 2715 of heat sources 2712. In this pattern, production wells 2701 may be spaced at a distance of about 2(1.732)s. Heat sources 2712 may be located at all other grid positions. This pattern may result in a ratio of equivalent heat sources to production wells that may approach eleven.

Figure 47:
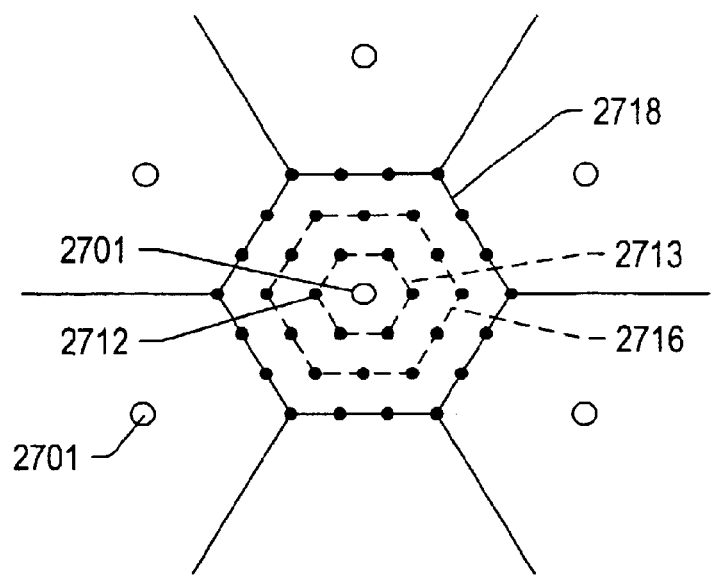
Figure 48:
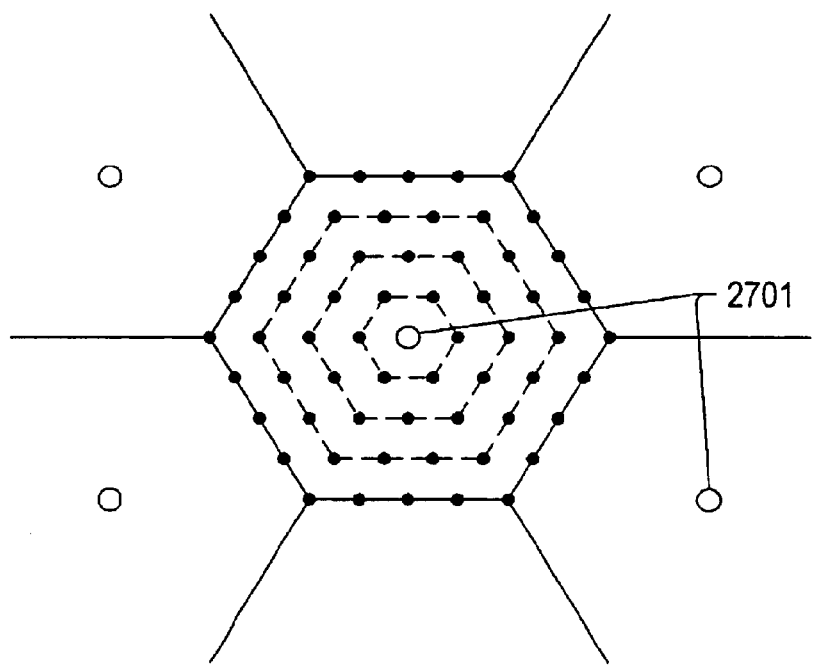

FIG. 47 illustrates three rings of heat sources 2712 surrounding production well 2701. Production well 2701 may be surrounded by ring 2713 of six heat sources 2712. Second hexagonally shaped ring 2716 of twelve heat sources 2712 may surround ring 2713. Third ring 2718 of heat sources 2712 may include twelve heat sources that may provide substantially equal amounts of heat to two production wells and six heat sources that may provide substantially equal amounts of heat to three production wells. Therefore, a total of eight equivalent heat sources may be disposed on third ring 2718. Production well 2701 may be provided heat from an equivalent of about twenty-six heat sources. FIG. 48 illustrates an even larger pattern that may have a greater spacing between production wells 2701.

Alternatively, square patterns may be provided with production wells placed, for example, in the center of each third square, resulting in nine heat sources for each production well. Production wells may be placed within each fifth square in a square pattern, which may result in twenty-five heat sources for each production well.

Figure 49:
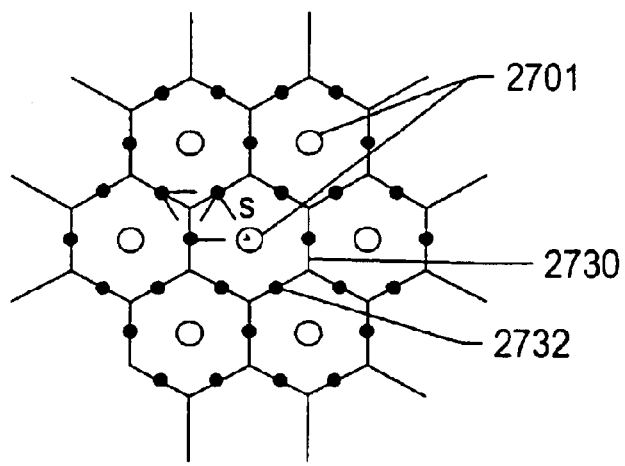

FIGS. 49, 50, 51, and 52 illustrate alternate embodiments in which both production wells and heat sources may be located at the apices of a triangular grid. In FIG. 49, a triangular grid, with a spacing of s, may have production wells 2701 spaced at a distance of 2s. A hexagonal pattern may include one ring 2730 of six heat sources 2732. Each heat source 2732 may provide substantially equal amounts of heat to two production wells 2701. Therefore, each ring 2730 of six heat sources 2732 contributes approximately three equivalent heat sources per production well 2701.

Figure 50:
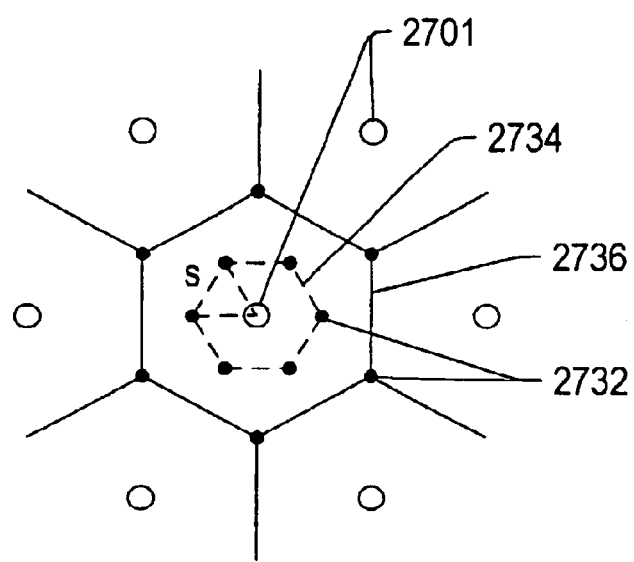

FIG. 50 illustrates a pattern of production wells 2701 with inner hexagonal ring 2734 and outer hexagonal ring 2736. Production wells 2701 may be spaced at a distance of 3s. Heat sources 2732 may be located at apices of hexagonal ring 2734 and hexagonal ring 2736. Hexagonal ring 2734 and hexagonal ring 2736 may include six heat sources each. The pattern in FIG. 50 may result in a ratio of heat sources 2732 to production well 2701 of eight.

Figure 51:
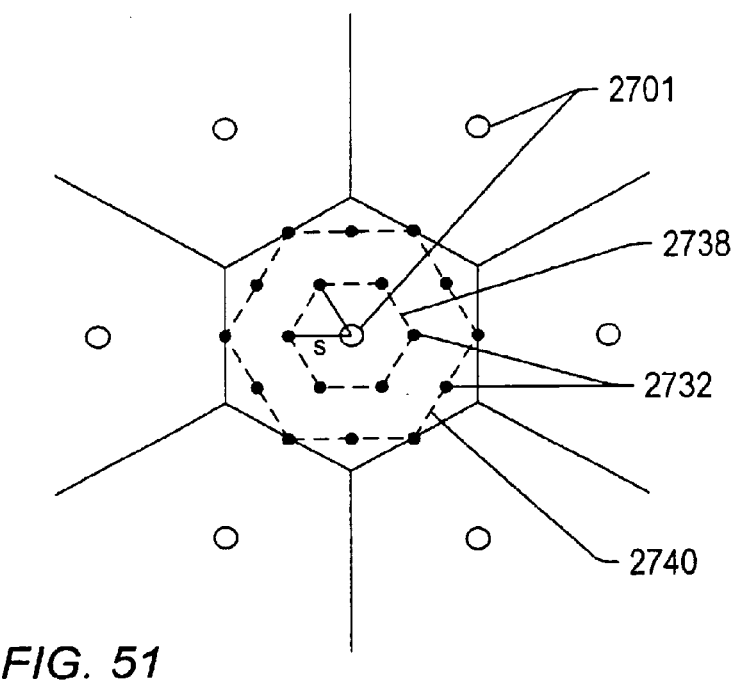

FIG. 51 illustrates a pattern of production wells 2701 also with two hexagonal rings of heat sources surrounding each production well. Production well 2701 may be surrounded by ring 2738 of six heat sources 2732. Production wells 2701 may be spaced at a distance of 4s. Second hexagonally shaped ring 2740 may surround ring 2738. Second hexagonally shaped ring 2740 may include twelve heat sources 2732. This pattern may result in a ratio of heat sources 2732 to production wells 2701 that may approach fifteen.

Figure 52:
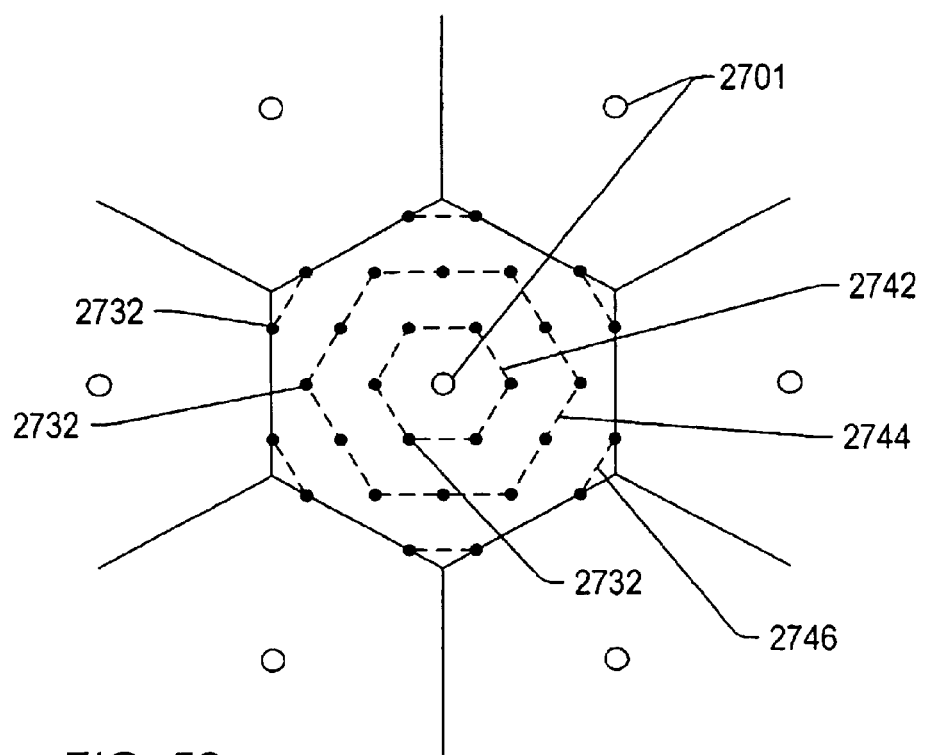

FIG. 52 illustrates a pattern of heat sources 2732 with three rings of heat sources 2732 surrounding each production well 2701. Production wells 2701 may be surrounded by ring 2742 of six heat sources 2732. Second ring 2744 of twelve heat sources 2732 may surround ring 2742. Third ring 2746 of heat sources 2732 may surround second ring 2744. Third ring 2746 may include 6 equivalent heat sources. This pattern may result in a ratio of heat sources 2732 to production wells 2701 that is about 24:1.

Figure 53:
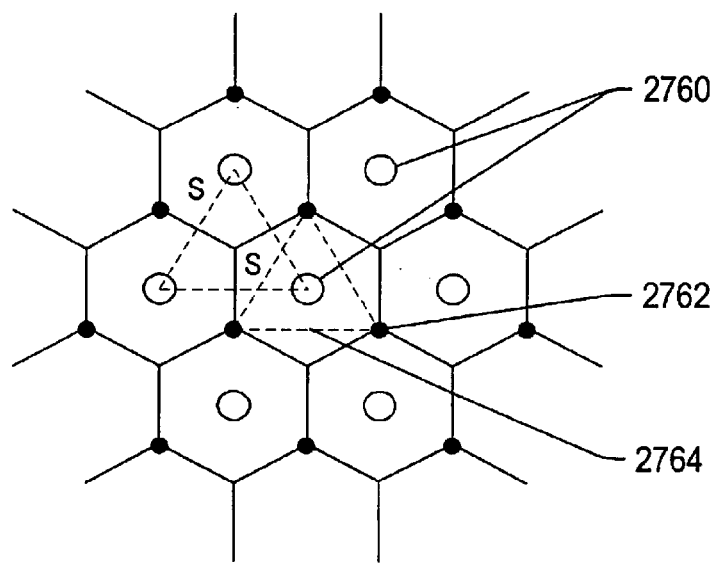

FIGS. 53, 54, 55, and 56 illustrate patterns in which the production well may be disposed at a center of a triangular grid such that the production well may be equidistant from the apices of the triangular grid. In FIG. 53, the triangular grid of heater wells with a spacing of s may include production wells 2760 spaced at a distance of s. Each production well 2760 may be surrounded by ring 2764 of three heat sources 2762. Each heat source 2762 may provide substantially equal amounts of heat to three production wells 2760. Therefore, each ring 2764 of three heat sources 2762 may contribute one equivalent heat source per production well 2760.

Figure 54:
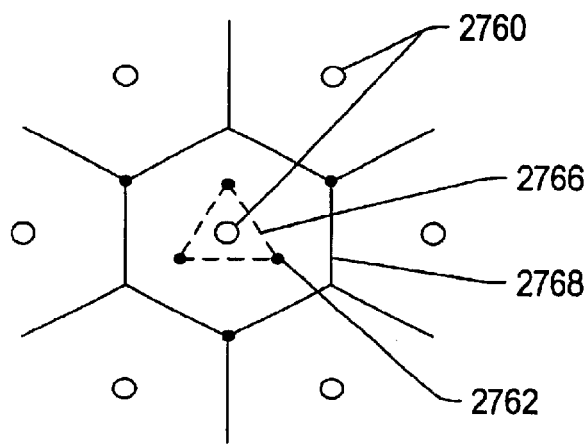

FIG. 54 illustrates a pattern of production wells 2760 with inner triangular ring 2766 and outer hexagonal ring 2768. In this pattern, production wells 2760 may be spaced at a distance of 2s. Heat sources 2762 may be located at apices of inner ring 2766 and outer ring 2768. Inner triangular ring 2766 may contribute three equivalent heat sources per production well 2760. Outer hexagonal ring 2768 containing three heater wells may contribute one equivalent heat source per production well 2760. Thus, a total of four equivalent heat sources may provide heat to production well 2760.

Figure 55:
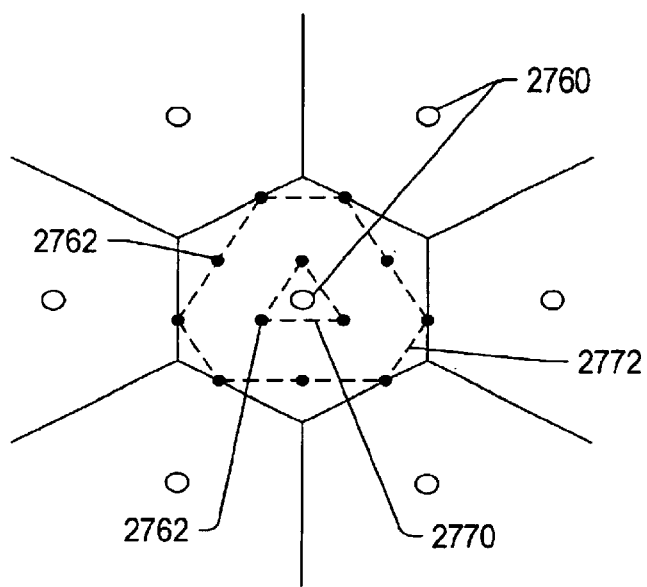

FIG. 55 illustrates a pattern of production wells with one inner triangular ring of heat sources surrounding each production well and one irregular hexagonal outer ring. Production wells 2760 may be surrounded by ring 2770 of three heat sources 2762. Production wells 2760 may be spaced at a distance of 3s. Irregular hexagonally shaped ring 2772 of nine heat sources 2762 may surround ring 2770. This pattern may result in a ratio of heat sources 2762 to production wells 2760 of nine.

Figure 56:
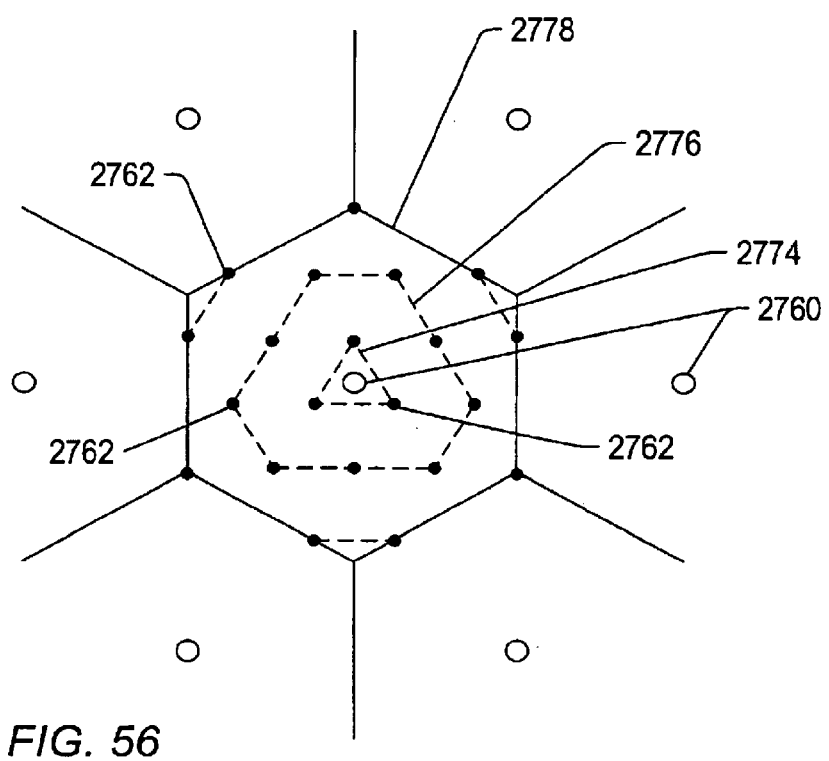

FIG. 56 illustrates triangular patterns of heat sources with three rings of heat sources surrounding each production well. Production wells 2760 may be surrounded by ring 2774 of three heat sources 2762. Irregular hexagon pattern 2776 of nine heat sources 2762 may surround ring 2774. Third set 2778 of heat sources 2762 may surround hexagonal pattern 2776. Third set 2778 may contribute four equivalent heat sources to production well 2760. A ratio of equivalent heat sources to production well 2760 may be sixteen.

One embodiment for treating at least a portion of a coal formation may include heating the formation from three or more heat sources. At least three of the heat sources may be arranged in a substantially triangular pattern. At least some hydrocarbons in a selected section of the formation may be pyrolyzed by the heat from the three or more heat sources. Pyrolyzation fluids generated by pyrolysis of hydrocarbons in the formation may be produced from the formation. In one embodiment, fluids may be produced through at least one production well disposed in the formation.

Figure 57:
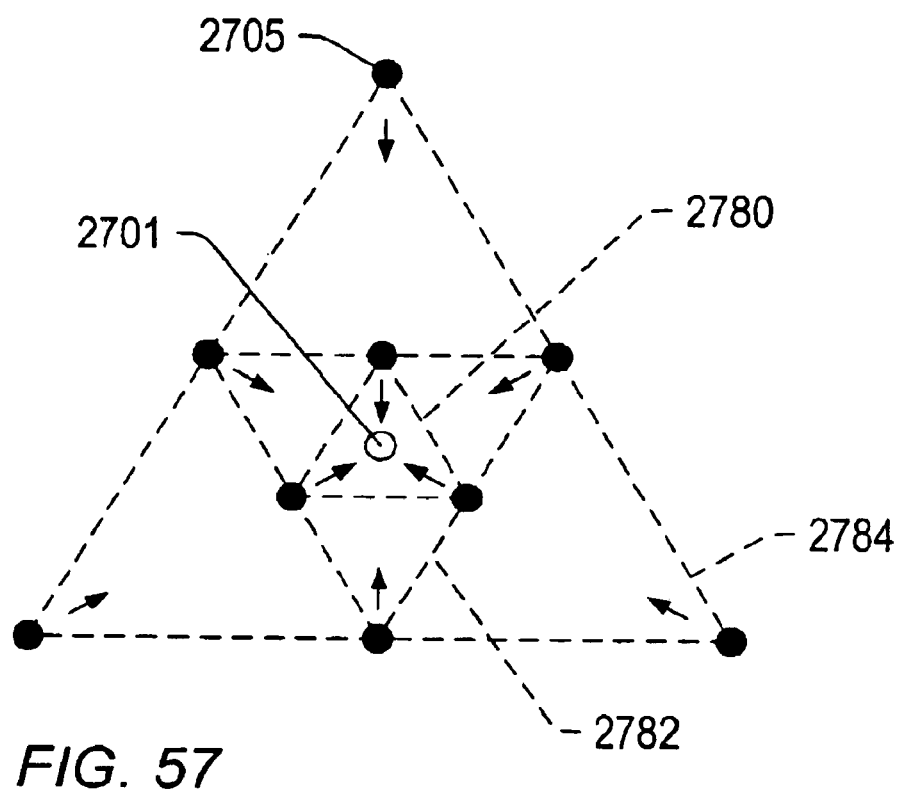

FIG. 57 depicts an embodiment of a pattern of heat sources 2705 arranged in a triangular pattern. Production well 2701 may be surrounded by triangles 2780, 2782, and 2784 of heat sources 2705. Heat sources 2705 in triangles 2780, 2782, and 2784 may provide heat to the formation. The provided heat may raise an average temperature of the formation to a pyrolysis temperature. Pyrolyzation fluids may flow to production well 2701. Formation fluids may be produced in production well 2701.

Figure 58:
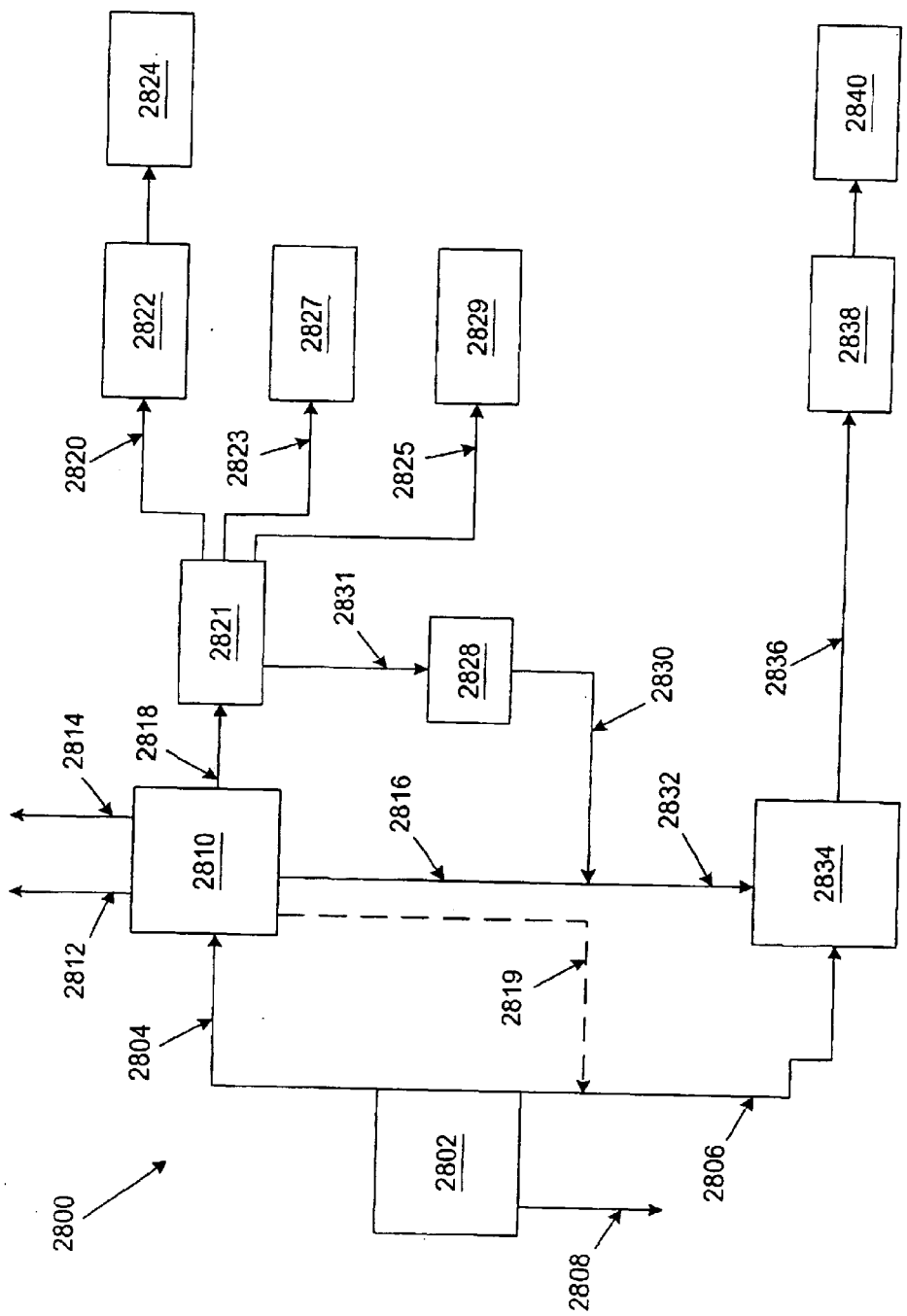
FIG. 58 depicts an embodiment of surface facilities for treating a formation fluid.

FIG. 58 illustrates a schematic diagram of an embodiment of surface facilities 2800 that may be configured to treat a formation fluid. The formation fluid may be produced though a production well as described herein. The formation fluid may include any of a formation fluid produced by any of the methods as described herein. As shown in FIG. 58, surface facilities 2800 may be coupled to well head 2802. Well head 2802 may also be coupled to a production well formed in a formation. For example, the well head may be coupled to a production well by various mechanical devices proximate an upper surface of the formation. Therefore, a formation fluid produced through a production well may also flow through well head 2802. Well head 2802 may be configured to separate the formation fluid into gas stream 2804, liquid hydrocarbon condensate stream 2806, and water stream 2808.

Surface facilities 2800 may be configured such that water stream 2808 may flow from well head 2802 to a portion of a formation, to a containment system, or to a processing unit. For example, water stream 2808 may flow from well head 2802 to an ammonia production unit. The surface facilities may be configured such that ammonia produced in the ammonia production unit may flow to an ammonium sulfate unit. The ammonium sulfate unit may be configured to combine the ammonia with $H_2SO_4$ or $SO_2/SO_3$ to produce ammonium sulfate. In addition, the surface facilities may be configured such that ammonia produced in the ammonia production unit may flow to a urea production unit. The urea production unit may be configured to combine carbon dioxide with the ammonia to produce urea.

Surface facilities 2800 may be configured such that gas stream 2804 may flow through a conduit from well head 2802 to gas treatment unit 2810. The conduit may include a pipe or any other fluid communication mechanism known in the art. The gas treatment unit may be configured to separate various components of gas stream 2804. For example, the gas treatment unit may be configured to separate gas stream 2804 into carbon dioxide stream 2812, hydrogen sulfide stream 2814, hydrogen stream 2816, and stream 2818 that may include, but may not be limited to, methane, ethane, propane, butanes (including n-butane or iso-butane), pentane, ethene, propene, butene, pentene, water or combinations thereof.

Surface facilities 2800 may be configured such that the carbon dioxide stream may flow through a conduit to a formation, to a containment system, to a disposal unit, and/or to another processing unit. In addition, the facilities may be configured such that the hydrogen sulfide stream may also flow through a conduit to a containment system and/or to another processing unit. For example, the hydrogen sulfide stream may be converted into elemental sulfur in a Claus process unit. The gas treatment unit may also be configured to separate gas stream 2804 into stream 2819 that may include heavier hydrocarbon components from gas stream 2804. Heavier hydrocarbon components may include, for example, hydrocarbons having a carbon number of greater than about 5. Surface facilities 2800 may be configured such that heavier hydrocarbon components in stream 2819 may be provided to liquid hydrocarbon condensate stream 2806.

Surface facilities 2800 may also include processing unit 2821. Processing unit 2821 may be configured to separate stream 2818 into a number of streams. Each of the number of streams may be rich in a predetermined component or a predetermined number of compounds. For example, processing unit 2821 may separate stream 2818 into first portion 2820 of stream 2818, second portion 2823 of stream 2818, third portion 2825 of stream 2818, and fourth portion 2831 of stream 2848. First portion 2820 of stream 2818 may include lighter hydrocarbon components such as methane and ethane. The surface facilities may be configured such that first portion 2820 of stream 2818 may flow from gas treatment unit 2810 to power generation unit 2822.

Power generation unit 2822 may be configured for extracting useable energy from the first portion of stream 2818. For example, stream 2818 may be produced under pressure. In this manner, power generation unit 2822 may include a turbine configured to generate electricity from the first portion of stream 2818. The power generation unit may also include, for example, a molten carbonate fuel cell, a solid oxide fuel cell, or other type of fuel cell. The facilities may be further configured such that the extracted useable energy may be provided to user 2824. User 2824 may include, for example, surface facilities 2800, a heat source disposed within a formation, and/or a consumer of useable energy.

Second portion 2823 of stream 2818 may also include light hydrocarbon components. For example, second portion 2823 of stream 2818 may include, but may not be limited to, methane and ethane. Surface facilities 2800 may also be configured such that second portion 2823 of stream 2818 may be provided to natural gas grid 2827. Alternatively, surface facilities may also be configured such that second portion 2823 of stream 2818 may be provided to a local market. The local market may include a consumer market or a commercial market. In this manner, the second portion 2823 of stream 2818 may be used as an end product or an intermediate product depending on, for example, a composition of the light hydrocarbon components.

Third portion 2825 of stream 2818 may include liquefied petroleum gas ("LPG"). Major constituents of LPG may include hydrocarbons containing three or four carbon atoms such as propane and butane. Butane may include n-butane or iso-butane. LPG may also include relatively small concentrations of other hydrocarbons such as ethene, propene, butene, and pentene. Depending on the source of LPG and how it has been produced, however, LPG may also include additional components. LPG may be a gas at atmospheric pressure and normal ambient temperatures. LPG may be liquefied, however, when moderate pressure is applied or when the temperature is sufficiently reduced. When such moderate pressure is released, LPG gas may have about 250 times a volume of LPG liquid. Therefore, large amounts of energy may be stored and transported compactly as LPG.

Surface facilities 2800 may also be configured such that third portion 2825 of stream 2818 may be provided to local market 2829. The local market may include a consumer market or a commercial market. In this manner, the third portion 2825 of stream 2818 may be used as an end product or an intermediate product depending on, for example, a composition of the LPG. For example, LPG may be used in applications, such as food processing, aerosol propellants, and automotive fuel. LPG may usually be available in one or two forms for standard heating and cooking purposes: commercial propane and commercial butane. Propane may be more versatile for general use than butane because, for example, propane has a lower boiling point than butane.

Figure 59:
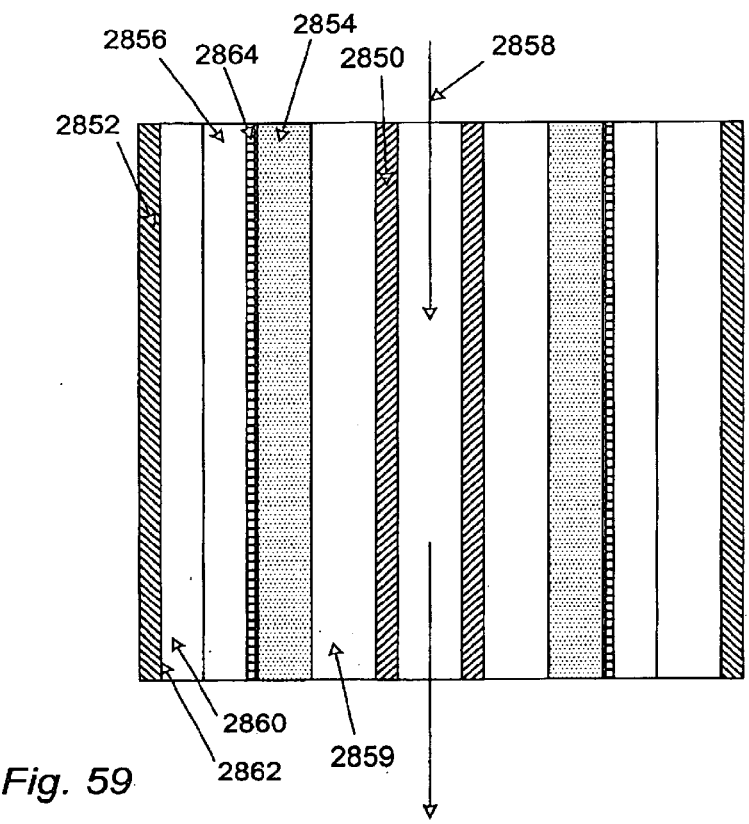
FIG. 59 depicts an embodiment of a catalytic flameless distributed combustor.

Surface facilities 2800 may also be configured such that fourth portion 2831 of stream 2818 may flow from the gas treatment unit to hydrogen manufacturing unit 2828. Hydrogen containing stream 2830 is shown exiting hydrogen manufacturing unit 2828. Examples of hydrogen manufacturing unit 2828 may include a steam reformer and a catalytic flameless distributed combustor with a hydrogen separation membrane. FIG. 59 illustrates an embodiment of a catalytic flameless distributed combustor. An example of a catalytic flameless distributed combustor with a hydrogen separation membrane is illustrated in U.S. patent application Ser. No. 60/273,354, filed on Mar. 5, 2001, which is incorporated by reference as if fully set forth herein. A catalytic flameless distributed combustor may include fuel line 2850, oxidant line 2852, catalyst 2854, and membrane 2856. Fourth portion 2831 of stream 2818 may be provided to hydrogen manufacturing unit 2828 as fuel 2858. Fuel 2858 within fuel line 2850 may mix within reaction zone in annular space 2859 between the fuel line and the oxidant line. Reaction of the fuel with the oxidant in the presence of catalyst 2854 may produce reaction products that include $H_2$. Membrane 2856 may allow a portion of the generated $H_2$ to pass into annular space 2860 between outer wall 2862 of oxidant line 2852 and membrane 2856. Excess fuel passing out of fuel line 2850 may be circulated back to entrance of hydrogen manufacturing unit 2828. Combustion products leaving oxidant line 2852 may include carbon dioxide and other reactions products as well as some fuel and oxidant. The fuel and oxidant may be separated and recirculated back to the hydrogen manufacturing unit. Carbon dioxide may be separated from the exit stream. The carbon dioxide may be sequestered within a portion of a formation or used for an alternate purpose.

Fuel line 2850 may be concentrically positioned within oxidant line 2852. Critical flow orifices within fuel line 2850 may be configured to allow fuel to enter into a reaction zone in annular space 2859 between the fuel line and oxidant line 2852. The fuel line may carry a mixture of water and vaporized hydrocarbons such as, but not limited to, methane, ethane, propane, butane, methanol, ethanol, or combinations thereof. The oxidant line may carry an oxidant such as, but not limited to, air, oxygen enriched air, oxygen, hydrogen peroxide, or combinations thereof.

Catalyst 2854 may be located in the reaction zone to allow reactions that produce $H_2$ to proceed at relatively low temperatures. Without a catalyst and without membrane separation of $H_2$, a steam reformation reaction may need to be conducted in a series of reactors with temperatures for a shift reaction occurring in excess of 980° C. With a catalyst and with separation of $H_2$ from the reaction stream, the reaction may occur at temperatures within a range from about 300° C. to about 600° C., or within a range from about 400° C. to about 500° C. Catalyst 2854 may be any steam reforming catalyst. In selected embodiments, catalyst 2854 is a group VIII transition metal, such as nickel. The catalyst may be supported on porous substrate 2864. The substrate may include group III or group IV elements, such as, but not limited to, aluminum, silicon, titanium, or zirconium. In an embodiment, the substrate is alumina ($Al_2O_3$).

Membrane 2856 may remove $H_2$ from a reaction stream within a reaction zone of a hydrogen manufacturing unit 2828. When $H_2$ is removed from the reaction stream, reactions within the reaction zone may generate additional $H_2$. A vacuum may draw $H_2$ from an annular region between membrane 2856 and wall 2862 of oxidant line 2852. Alternately, $H_2$ may be removed from the annular region in a carrier gas. Membrane 2856 may separate $H_2$ from other components within the reaction stream. The other components may include, but are not limited to, reaction products, fuel, water, and hydrogen sulfide. The membrane may be a hydrogen-permeable and hydrogen selective material such as, but not limited to, a ceramic, carbon, metal, or combination thereof. The membrane may include, but is not limited to, metals of group VIII, V, III, or I such as palladium, platinum, nickel, silver, tantalum, vanadium, yttrium, and/or niobium. The membrane may be supported on a porous substrate such as alumina. The support may separate the membrane 2856 from catalyst 2854. The separation distance and insulation properties of the support may help to maintain the membrane within a desired temperature range. In this manner, hydrogen manufacturing unit 2828 may be configured to produce hydrogen-rich stream 2830 from the second portion stream 2818. The surface facilities may also be configured such that hydrogen-rich stream 2830 may flow into hydrogen stream 2816 to form stream 2832. In this manner, stream 2832 may include a larger volume of hydrogen than either hydrogen-rich stream 2830 or hydrogen stream 2816.

Surface facilities 2800 may be configured such that hydrocarbon condensate stream 2806 may flow through a conduit from well head 2802 to hydrotreating unit 2834. Hydrotreating unit 2834 may be configured to hydrogenate hydrocarbon condensate stream 2806 to form hydrogenated hydrocarbon condensate stream 2836. The hydrotreater may be configured to upgrade and swell the hydrocarbon condensate. For example, surface facilities 2800 may also be configured to provide stream 2832 (which includes a relatively high concentration of hydrogen) to hydrotreating unit 2834. In this manner, $H_2$ in stream 2832 may hydrogenate a double bond of the hydrocarbon condensate, thereby reducing a potential for polymerization of the hydrocarbon condensate. In addition, hydrogen may also neutralize radicals in the hydrocarbon condensate. In this manner, the hydrogenated hydrocarbon condensate may include relatively short chain hydrocarbon fluids. Furthermore. hydrotreating unit 2834 may be configured to reduce sulfur, nitrogen, and aromatic hydrocarbons in hydrocarbon condensate stream 2806. Hydrotreating unit 2834 may be a deep hydrotreating unit or a mild hydrotreating unit. An appropriate hydrotreating unit may vary depending on, for example, a composition of stream 2832, a composition of the hydrocarbon condensate stream, and/or a selected composition of the hydrogenated hydrocarbon condensate stream.

Surface facilities 2800 may be configured such that hydrogenated hydrocarbon condensate stream 2836 may flow from hydrotreating unit 2834 to transportation unit 2838. Transportation unit 2838 may be configured to collect a volume of the hydrogenated hydrocarbon condensate and/or to transport the hydrogenated hydrocarbon condensate to market center 2840. For example, market center 2840 may include, but may not be limited to, a consumer marketplace or a commercial marketplace. A commercial marketplace may include, but may not be limited to, a refinery. In this manner, the hydrogenated hydrocarbon condensate may be used as an end product or an intermediate product depending on, for example, a composition of the hydrogenated hydrocarbon condensate.

Alternatively, surface facilities 2800 may be configured such that hydrogenated hydrocarbon condensate stream 2836 may flow to a splitter or an ethene production unit. The splitter may be configured to separate the hydrogenated hydrocarbon condensate stream into a hydrocarbon stream including components having carbon numbers of 5 or 6, a naphtha stream, a kerosene stream, and a diesel stream. Streams exiting the splitter may be fed to the ethene production unit. In addition, the hydrocarbon condensate stream and the hydrogenated hydrocarbon condensate stream may be fed to the ethene production unit. Ethene produced by the ethene production unit may be fed to a petrochemical complex to produce base and industrial chemicals and polymers. Alternatively, the streams exiting the splitter may be fed to a hydrogen conversion unit. A recycle stream may be configured to flow from the hydrogen conversion unit to the splitter. The hydrocarbon stream exiting the splitter and the naphtha stream may be fed to a mogas production unit. The kerosene stream and the diesel stream may be distributed as product.

Figure 60:
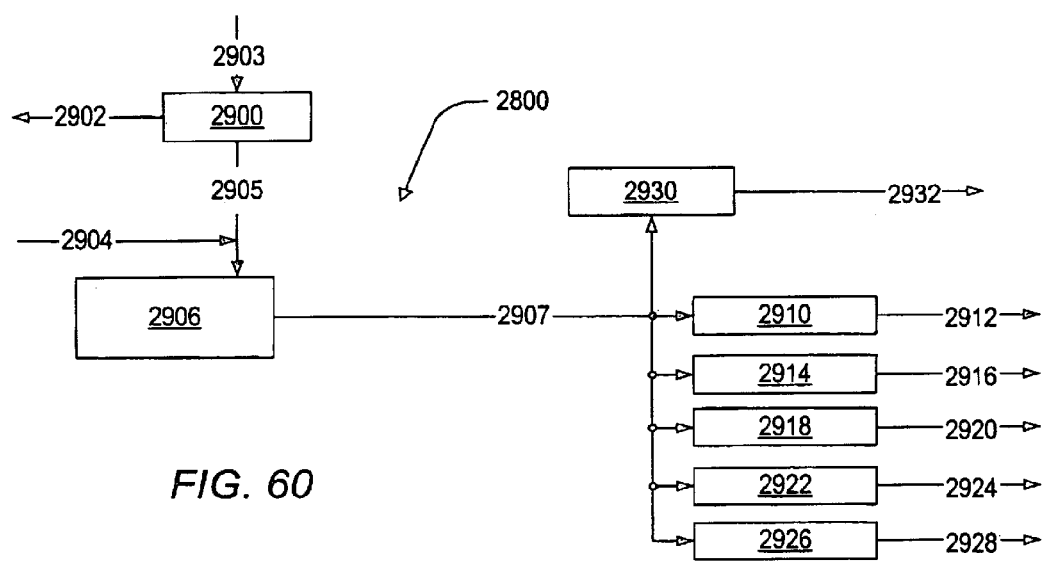
FIG. 60 depicts an embodiment of surface facilities for treating a formation fluid.

FIG. 60 illustrates an embodiment of an additional processing unit that may be included in surface facilities 2800 such as the facilities depicted in FIG. 58. Air 2903 may be fed to air separation unit 2900. Air separation unit 2900 may be configured to generate nitrogen stream 2902 and oxygen stream 2905. Oxygen stream 2905 and steam 2904 may be injected into exhausted coal resource 2906 to generate synthesis gas 2907. Produced synthesis gas 2907 may be provided to Shell Middle Distillates process unit 2910 that may be configured to produce middle distillates 2912. In addition, produced synthesis gas 2907 may be provided to catalytic methanation process unit 2914 that may be configured to produce natural gas 2916. Produced synthesis gas 2907 may also be provided to methanol production unit 2918 to produce methanol 2920. Furthermore, produced synthesis gas 2907 may be provided to process unit 2922 for production of ammonia and/or urea 2924, and fuel cell 2926 that may be configured to produce electricity 2928. Synthesis gas 2907 may also be routed to power generation unit 2930, such as a turbine or combustor, to produce electricity 2932.

Figure 61:
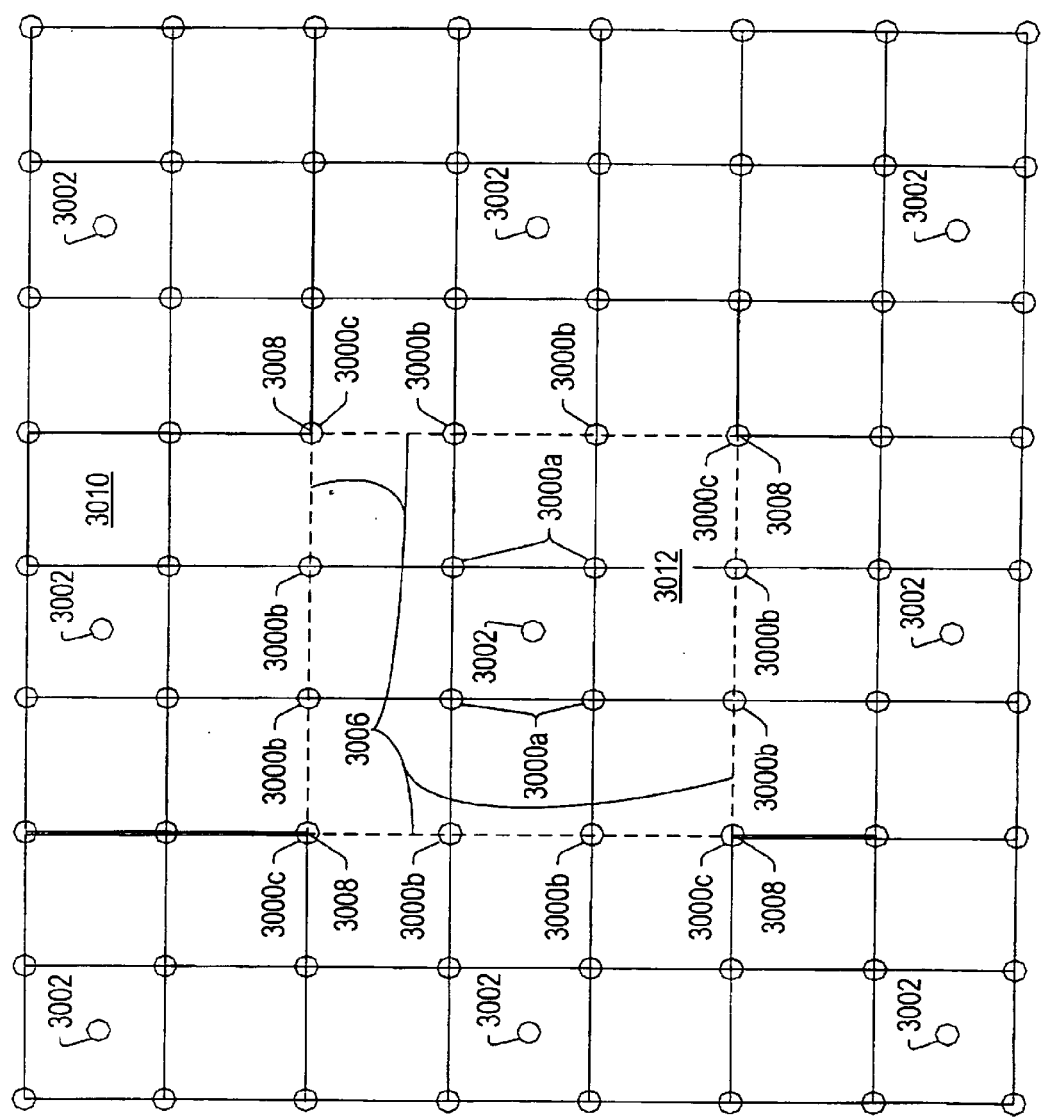
FIG. 61 depicts an embodiment of a square pattern of heat sources and production wells.

FIG. 61 illustrates an example of a square pattern of heat sources 3000 and production wells 3002. Heat sources 3000 are disposed at vertices of squares 3010. Production well 3002 is placed in a center of every third square in both x- and y-directions. Midlines 3006 are formed equidistant to two production wells 3002, and perpendicular to a line connecting such production wells. Intersections of midlines 3006 at vertices 3008 form unit cell 3012. Heat source 3000b and heat source 3000c are only partially within unit cell 3012. Only the one-half fraction of heat source 3000b and the one-quarter fraction of heat source 3000c within unit cell 3012 are configured to provide heat within unit cell 3012. The fraction of heat source 3000 outside of unit cell 3012 is configured to provide heat outside of unit cell 3012. The number of heat sources 3000 within one unit cell 3012 is a ratio of heat sources 3000 per production well 3002 within the formation.

The total number of heat sources inside unit cell 3012 is determined by the following method:

(a) 4 heat sources 3000a inside unit cell 3012 are counted as one heat source each;
(b) 8 heat sources 3000b on midlines 3006 are counted as one-half heat source each; and
(c) 4 heat sources 3000c at vertices 3008 are counted as one-quarter heat source each.

The total number of heat sources is determined from adding the heat sources counted by, (a) 4, (b) 8/2=4, and (c) 4/4=1, for a total number of 9 heat sources 3000 in unit cell 3012. Therefore, a ratio of heat sources 3000 to production wells 3002 is determined as 9:1 for the pattern illustrated in FIG. 61.

Figure 62:
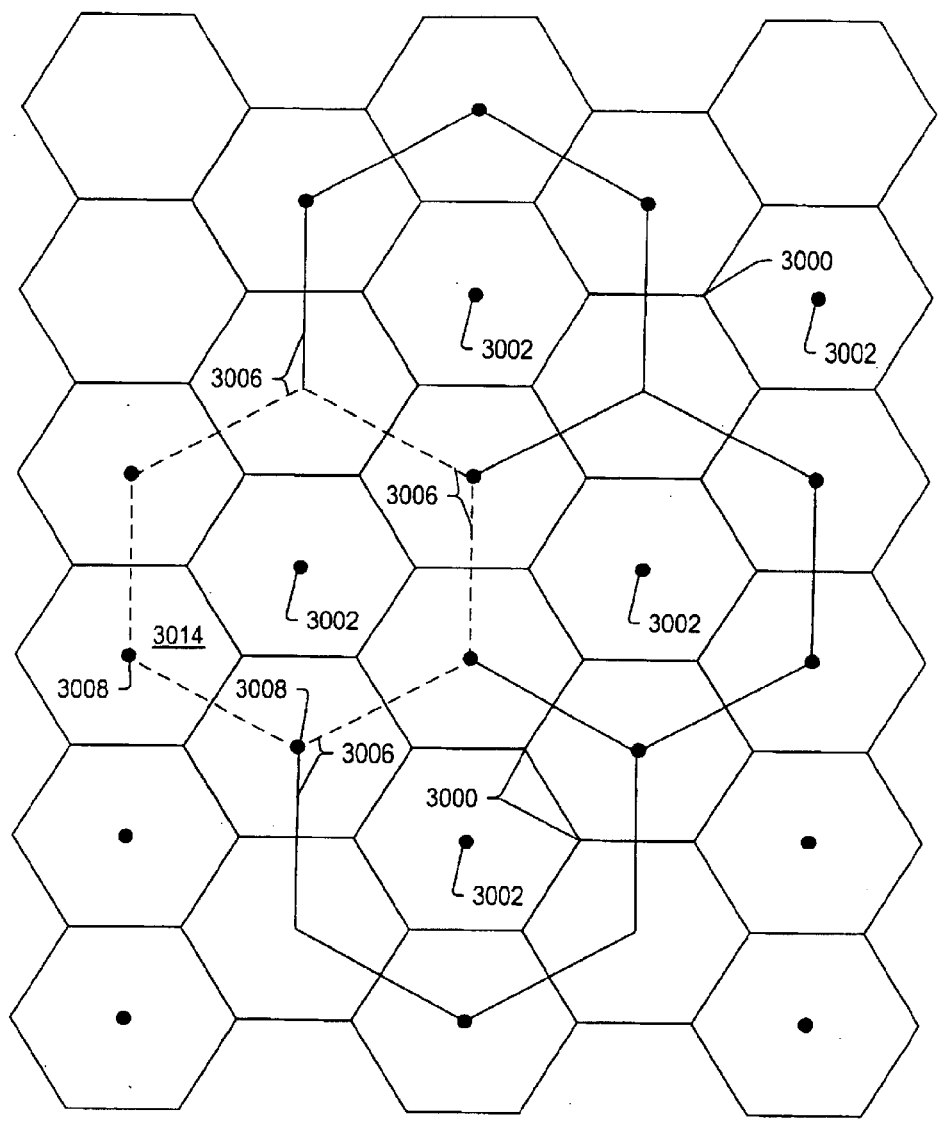
FIG. 62 depicts an embodiment of a heat source and production well pattern.

FIG. 62 illustrates an example of another pattern of heat sources 3000 and production wells 3002. Midlines 3006 are formed equidistant from the two production wells 3002, and perpendicular to a line connecting such production wells. Unit cell 3014 is determined by intersection of midlines 3006 at vertices 3008. Twelve heat sources 3000 are counted in unit cell 3014 by a method as described in the above embodiments, of which six are whole sources of heat, and six are one third sources of heat (with the other two thirds of heat from such six wells going to other patterns). Thus, a ratio of heat sources 3000 to production wells 3002 is determined as 8:1 for the pattern illustrated in FIG. 62. An example of a pattern of heat sources is illustrated in U.S. Pat. No. 2,923,535 issued to Ljungstrom, which is incorporated by reference as if fully set forth herein.

In certain embodiments, a triangular pattern of heat sources may provide advantages when compared to alternative patterns of heat sources, such as squares, hexagons, and hexagons with additional heaters installed halfway between the hexagon corners (12 to 1 pattern). Squares, hexagons, and the 12:1 patterns are disclosed in U.S. Pat. No. 2,923,535 and/or in U.S. Pat. No. 4,886,118. For example, a triangular pattern of heat sources may provide more uniform heating of a coal formation resulting from a more uniform temperature distribution of an area of a formation heated by the pattern of heat sources.

Figure 63:
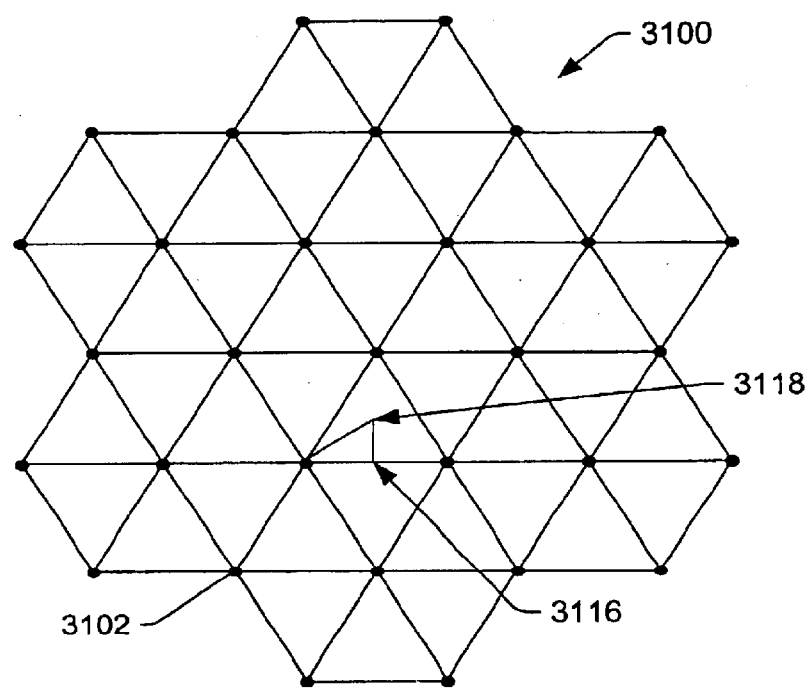
FIG. 63 depicts an embodiment of a triangular pattern of heat sources.
Figure 64:
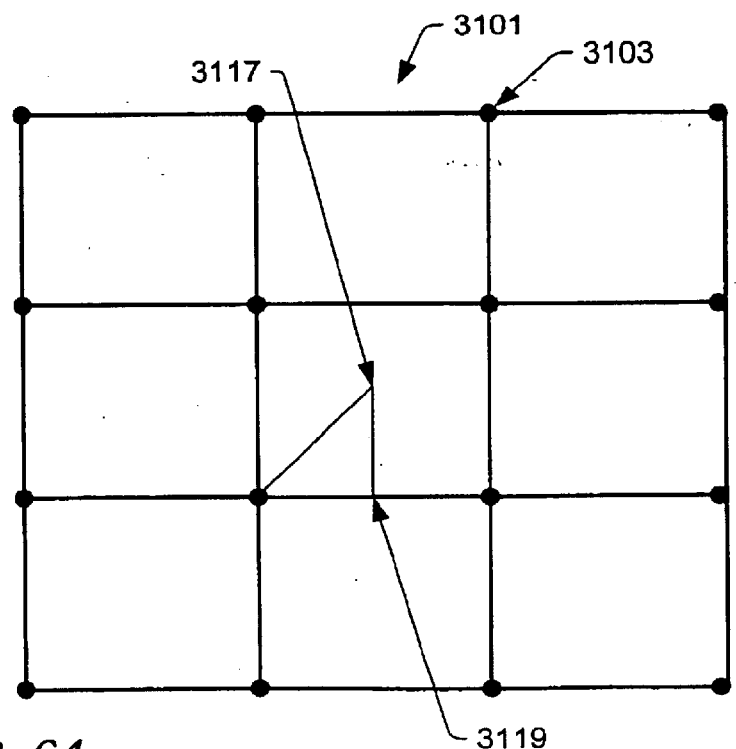
FIG. 64 depicts an embodiment of a square pattern of heat sources.
Figure 65:
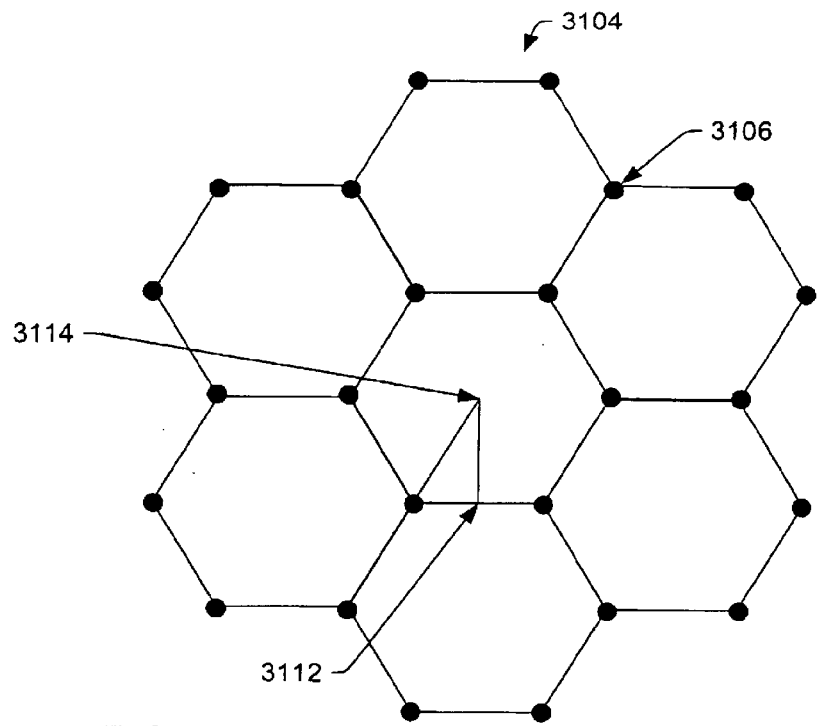
FIG. 65 depicts an embodiment of a hexagonal pattern of heat sources.
Figure 66:
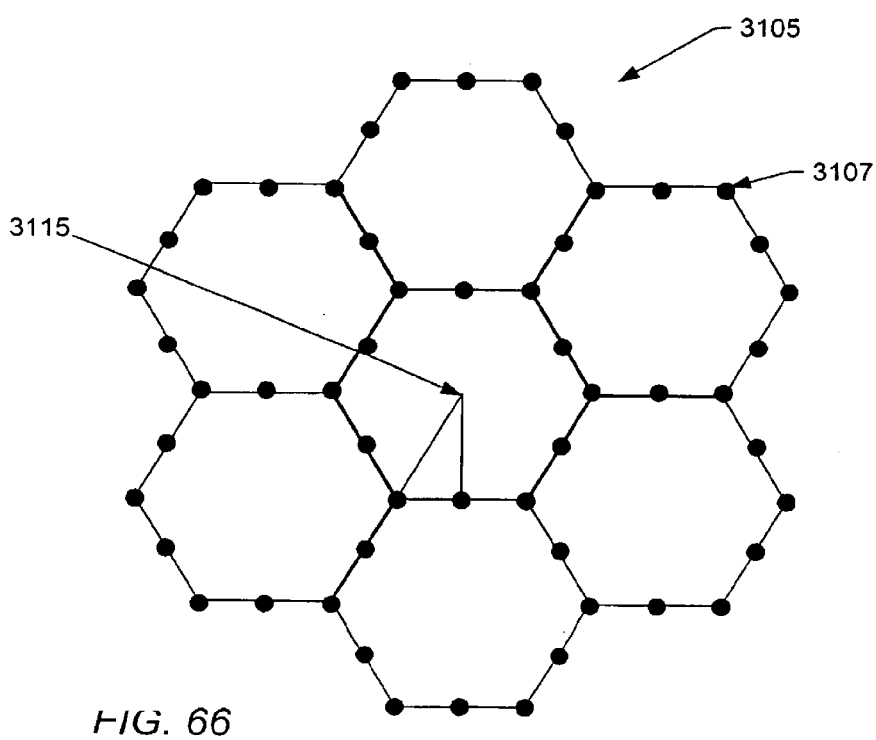
FIG. 66 depicts an embodiment of a 12 to 1 pattern of heat sources.

FIG. 63 illustrates an embodiment of triangular pattern 3100 of heat sources 3102. FIG. 64 illustrates an embodiment of square pattern 3101 of heat sources 3103. FIG. 65 illustrates an embodiment of hexagonal pattern 3104 of heat sources 3106. FIG. 66 illustrates an embodiment of 12 to 1 pattern 3105 of heat sources 3107. A temperature distribution for all patterns may be determined by an analytical method. The analytical method may be simplified by analyzing only temperature fields within "confined" patterns (e.g., hexagons), i.e., completely surrounded by others. In addition, the temperature field may be estimated to be a superposition of analytical solutions corresponding to a single heat source.

The comparisons of patterns of heat sources were evaluated for the same heater well density and the same heating input regime. For example, a number of heat sources per unit area in a triangular pattern is the same as the number of heat sources per unit area in the 10 m hexagonal pattern if the space between heat sources is increased to about 12.2 m in the triangular pattern. The equivalent spacing for a square pattern would be 11.3 m, while the equivalent spacing for a 12 to 1 pattern would be 15.7 m.

A triangular pattern of heat sources may have, for example, a shorter total process time than a square, hexagonal or 12 to 1 pattern of heat sources for the same heater well density. A total process time may include a time required for an average temperature of a heated portion of a formation to reach a target temperature and a time required for a temperature at a coldest spot within the heated portion to reach the target temperature. For example, heat may be provided to the portion of the formation until an average temperature of the heated portion reaches the target temperature. After the average temperature of the heated portion reaches the target temperature, an energy supply to the heat sources may be reduced such that less or minimal heat may be provided to the heated portion. An example of a target temperature may be approximately 340° C. The target temperature, however, may vary depending on, for example, formation composition and/or formation conditions such as pressure.

A spacing of heat sources in a triangular pattern, which may yield the same process time as a hexagonal pattern having about a 10.0 m space between heat sources, may be equal to approximately 14.3 m. In this manner, the total process time of a hexagonal pattern may be achieved by using about 26% less heat sources than may be included in such a hexagonal pattern. In this manner, such a triangular pattern may have substantially lower capital and operating costs. As such, this triangular pattern may also be more economical than a hexagonal pattern.

Figure 92:
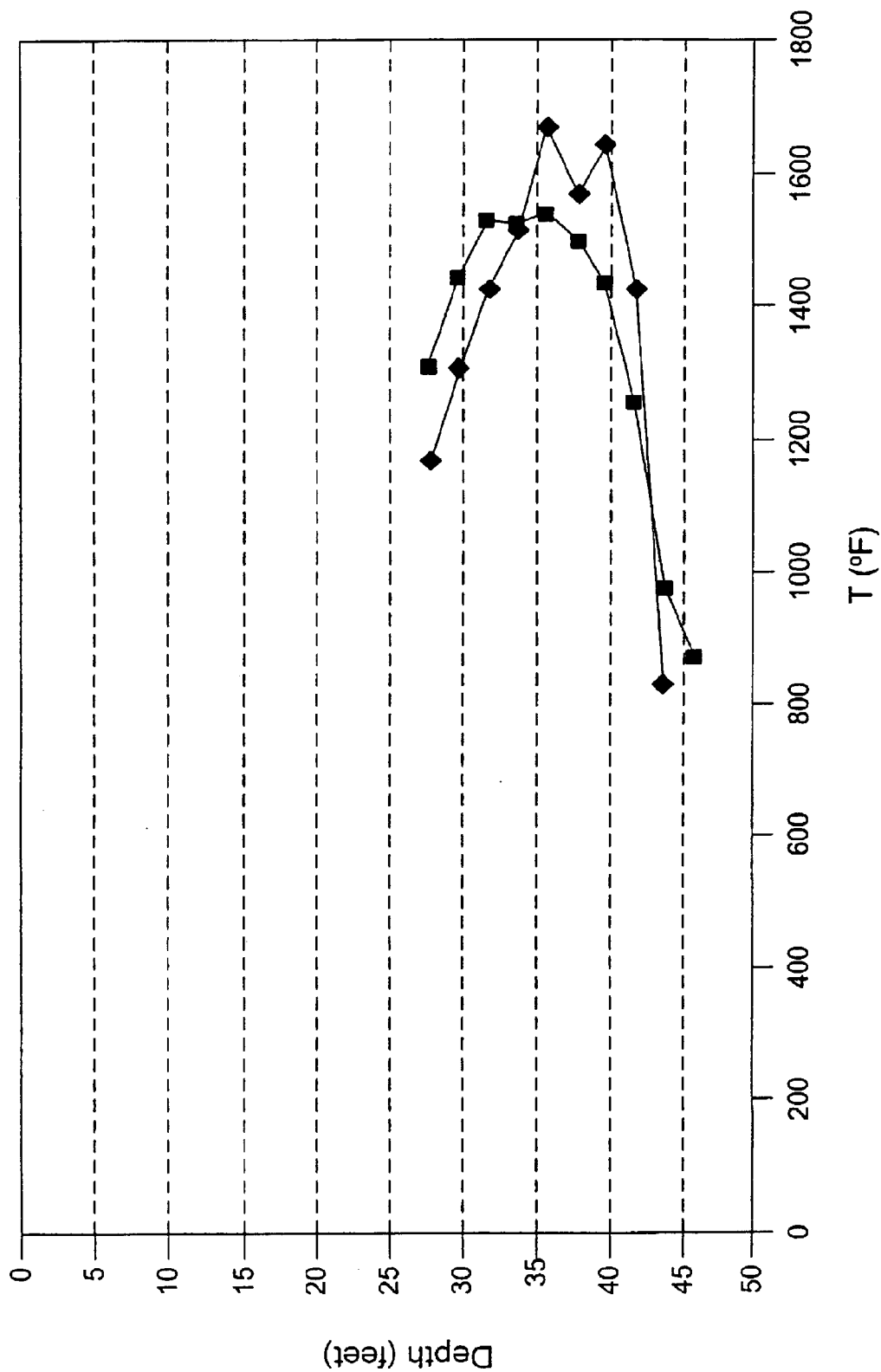
FIG. 92 depicts in situ temperature profiles for electrical resistance heaters, and natural distributed combustion heaters.

FIG. 12 depicts an embodiment of a natural distributed combustor. In one experiment the embodiment schematically shown in FIG. 12 was used to heat high volatile bituminous C coal in situ. A heating well was configured to be heated with electrical resistance heaters and/or a natural distributed combustor such as is schematically shown in FIG. 12. Thermocouples were located every 2 feet along the length of the natural distributed combustor (along conduit 532 as is schematically shown in FIG. 12). The coal was first heated with electrical resistance heaters until pyrolysis was complete proximate the well. FIG. 92 depicts square data points measured during electrical resistance heating at various depths in the coal after the temperature profile had stabilized (the coal seam was about 16 feet thick starting at about 28 feet of depth). At this point heat energy was being supplied at about 300 Watts per foot. Air was subsequently injected via conduit 532 at gradually increasing rates, and electric power was substantially simultaneously decreased. Combustion products were removed from the reaction zone in an annulus surrounding conduit 532 and the electrical resistance heater. The electric power was decreased at rates that would approximately offset heating provided by the combustion of the coal caused by the natural distributed combustor. Air rates were increased, and power rates were decreased, over a period of about 2 hours until no electric power was being supplied. FIG. 92 depicts diamond data points measured during natural distributed combustion heating (without any electrical resistance heating) at various depths in the coal after the temperature profile had stabilized. As can be seen in FIG. 92, the natural distributed combustion heating provided a temperature profile that is comparable to the electrical resistance temperature profile. This experiment demonstrated that natural distributed combustors can provide formation heating that is comparable to the formation heating provided by electrical resistance heaters. This experiment was repeated at different temperatures, and in two other wells, all with similar results.

Numerical calculations have been made for a natural distributed combustor system configured to heat a coal formation. A commercially available program called PRO-II was used to make example calculations based on a conduit of diameter 6.03 cm with a wall thickness of 0.39 cm. The conduit was disposed in an opening in the formation with a diameter of 14.4 cm. The conduit had critical flow orifices of 1.27 mm diameter spaced 183 cm apart. The conduit was configured to heat a formation of 91.4 meters thick. A flow rate of air was 1.70 standard cubic meters per minute through the critical flow orifices. A pressure of air at the inlet of the conduit was 7 bars absolute. Exhaust gases had a pressure of 3.3 bars absolute. A heating output of 1066 watts per meter was used. A temperature in the opening was set at 760° C. The calculations determined a minimal pressure drop within the conduit of about 0.023 bar. The pressure drop within the opening was less than 0.0013 bar.

Figure 67:
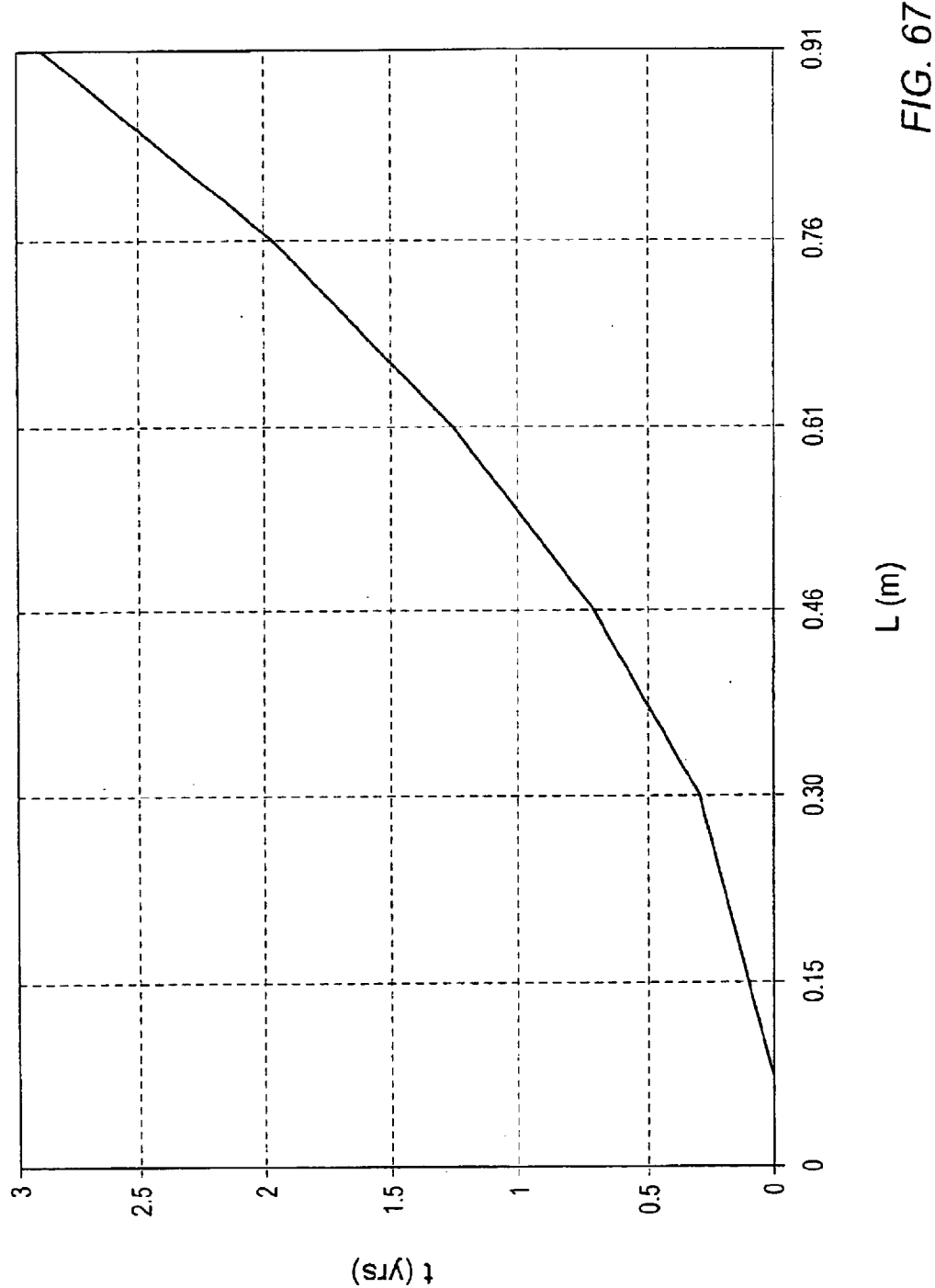
FIG. 67 depicts extension of a reaction zone in a heated formation over time.

FIG. 67 illustrates extension (in meters) of a reaction zone within a coal formation over time (in years) according to the parameters set in the calculations. The width of the reaction zone increases with time as the carbon was oxidized proximate to the center.

Numerical calculations have been made for heat transfer using a conductor-in-conduit heater. Calculations were made for a conductor having a diameter of about 1 inch (2.54 cm) disposed in a conduit having a diameter of about 3 inches (7.62 cm). The conductor-in-conduit heater was disposed in an opening of a carbon containing formation having a diameter of about 6 inches (15.24 cm). An emissivity of the carbon containing formation was maintained at a value of 0.9, which is expected for geological materials. The conductor and the conduit were given alternate emissivity values of high emissivity (0.86), which is common for oxidized metal surfaces, and low emissivity (0.1), which is for polished and/or un-oxidized metal surfaces. The conduit was filled with either air or helium. Helium is known to be a more thermally conductive gas than air. The space between the conduit and the opening was filled with a gas mixture of methane, carbon dioxide, and hydrogen gases. Two different gas mixtures were used. The first gas mixture had mole fractions of 0.5 for methane, 0.3 for carbon dioxide, and 0.2 for hydrogen. The second gas mixture had mole fractions of 0.2 for methane, 0.2 for carbon dioxide, and 0.6 for hydrogen.

Figure 68:
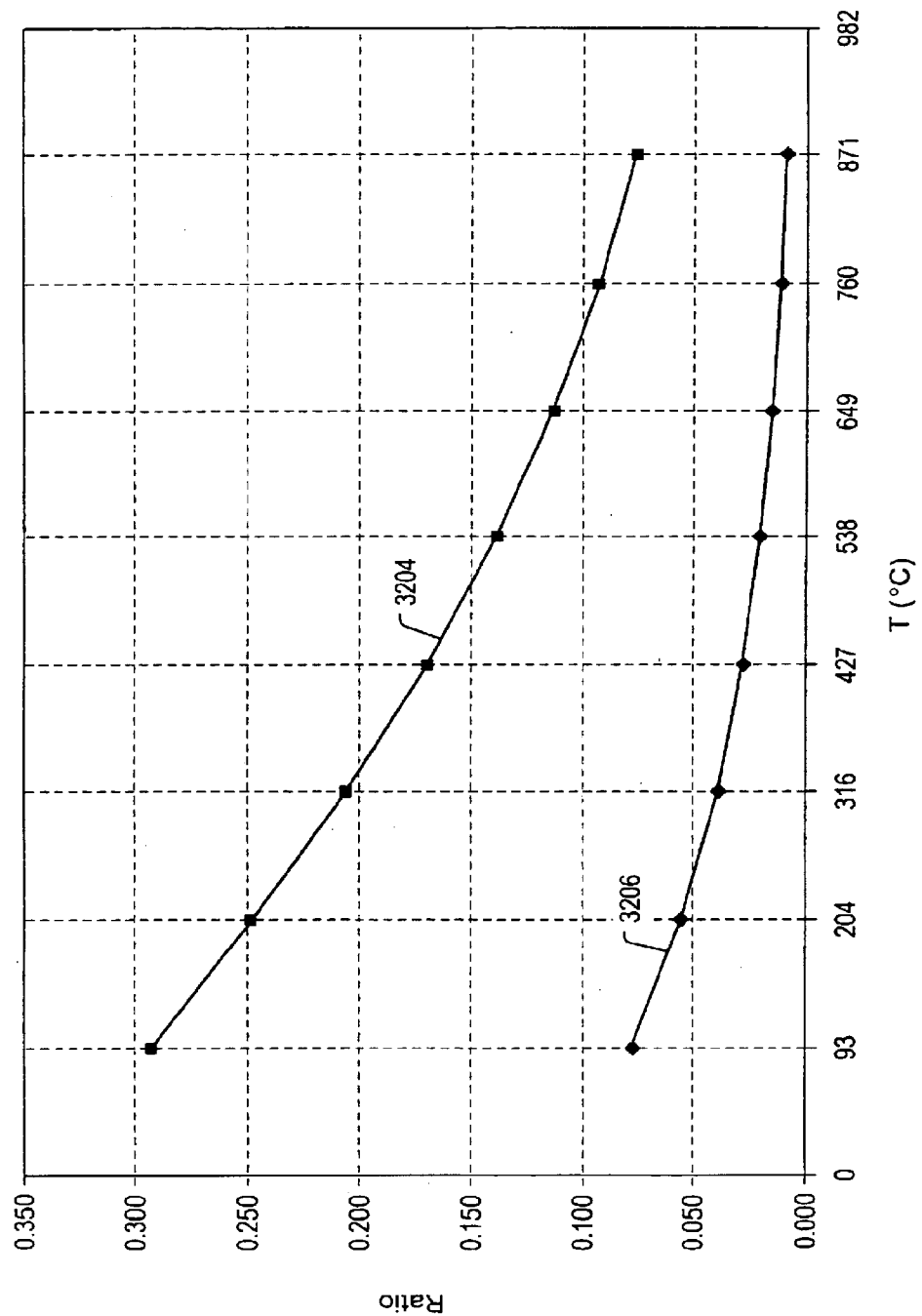
FIG. 68 and FIG. 69 depict the ratio of conductive heat transfer to radiative heat transfer in a formation.

FIG. 68 illustrates a calculated ratio of conductive heat transfer to radiative heat transfer versus a temperature of a face of the coal formation in the opening for an air filled conduit. The temperature of the conduit was increased linearly from 93° C. to 871° C. The ratio of conductive to radiative heat transfer was calculated based on emissivity values, thermal conductivities, dimensions of the conductor, conduit, and opening, and the temperature of the conduit. Line 3204 is calculated for the low emissivity value (0.1). Line 3206 is calculated for the high emissivity value (0.86). A lower emissivity for the conductor and the conduit provides for a higher ratio of conductive to radiative heat transfer to the formation. The decrease in the ratio with an increase in temperature may be due to a reduction of conductive heat transfer with increasing temperature. As the temperature on the face of the formation increases, a temperature difference between the face and the heater is reduced, thus reducing a temperature gradient that drives conductive heat transfer.

Figure 69:
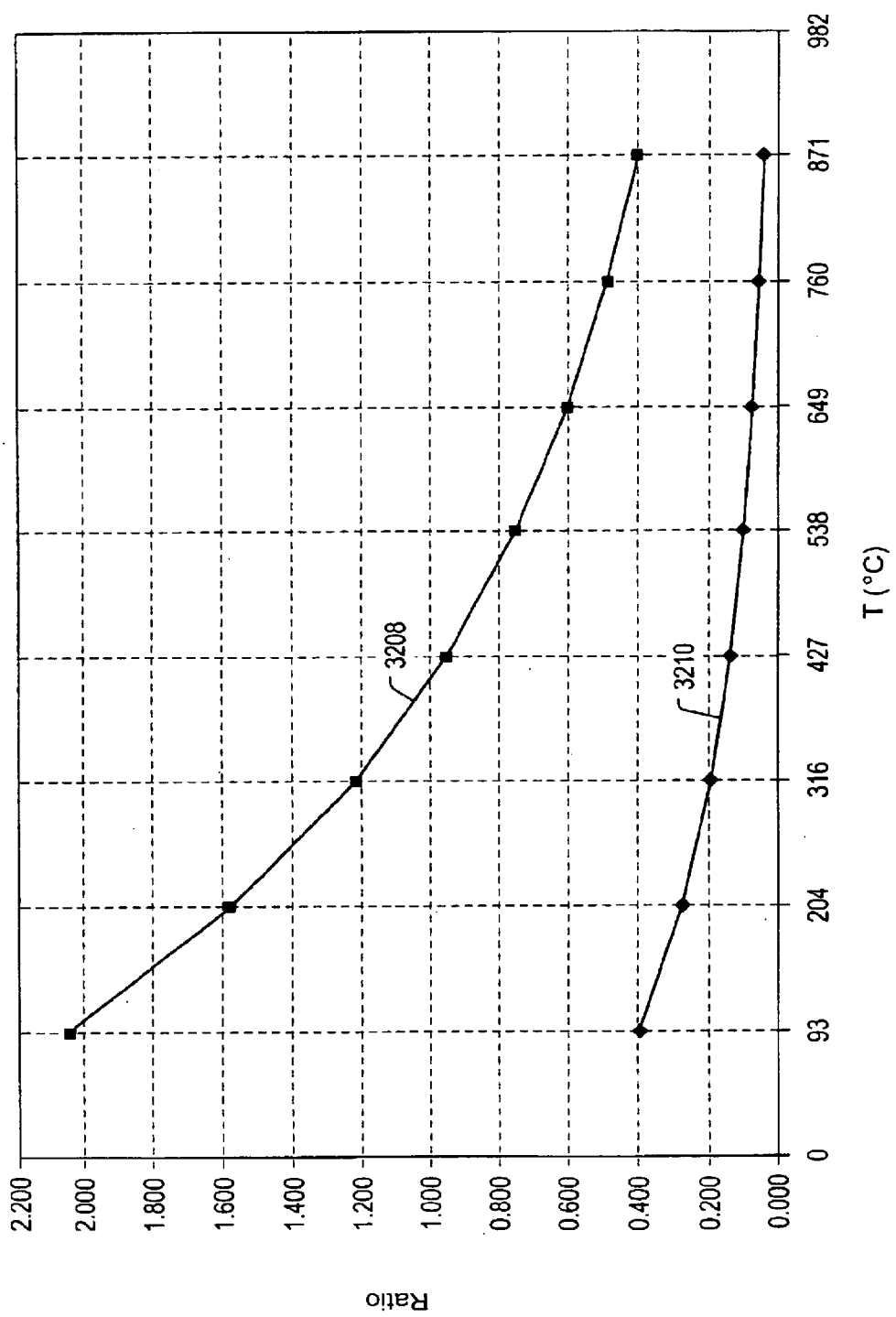

FIG. 69 illustrates a calculated ratio of conductive heat transfer to radiative heat transfer versus a temperature at a face of the coal formation in the opening for a helium filled conduit. The temperature of the conduit was increased linearly from 93° C. to 871° C. The ratio of conductive to radiative heat transfer was calculated based on emissivity values: thermal conductivities; dimensions of the conductor, conduit, and opening; and the temperature of the conduit. Line 3208 is calculated for the low emissivity value (0.1). Line 3210 is calculated for the high emissivity value (0.86). A lower emissivity for the conductor and the conduit again provides for a higher ratio of conductive to radiative heat transfer to the formation. The use of helium instead of air in the conduit significantly increases the ratio of conductive heat transfer to radiative heat transfer. This may be due to a thermal conductivity of helium being about 5.2 to about 5.3 times greater than a thermal conductivity of air.

Figure 70:
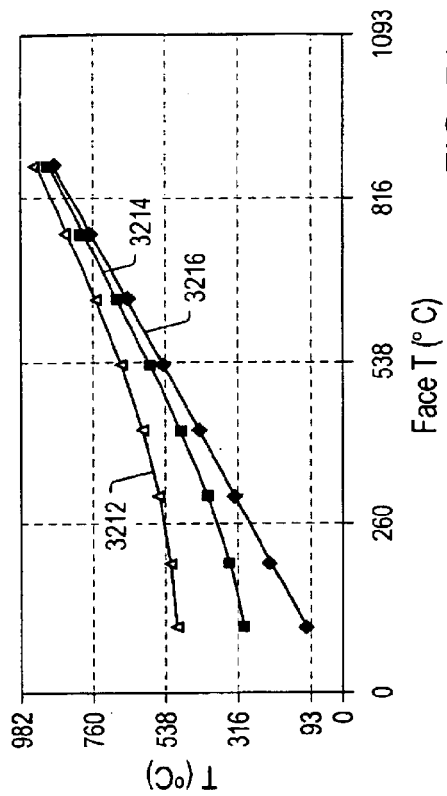
FIGS. 70–73 depict temperatures of a conductor, a conduit, and an opening in a formation versus a temperature at the face of a formation.

FIG. 70 illustrates temperatures of the conductor, the conduit; and the opening versus a temperature at a face of the coal formation for a helium filled conduit and a high emissivity of 0.86. The opening has a gas mixture equivalent to the second mixture described above having a hydrogen mole fraction of 0.6. Opening temperature 3216 was linearly increased from 93° C. to 871° C. Opening temperature 3216 was assumed to be the same as the temperature at the face of the coal formation. Conductor temperature 3212 and conduit temperature 3214 were calculated from opening temperature 3216 using the dimensions of the conductor, conduit, and opening, values of emissivities for the conductor, conduit, and face, and thermal conductivities for gases (helium, methane, carbon dioxide, and hydrogen). It may be seen from the plots of temperatures of the conductor, conduit, and opening for the conduit filled with helium, that at higher temperatures approaching 871° C., the temperatures of the conductor, conduit, and opening begin to substantially equilibrate.

Figure 71:
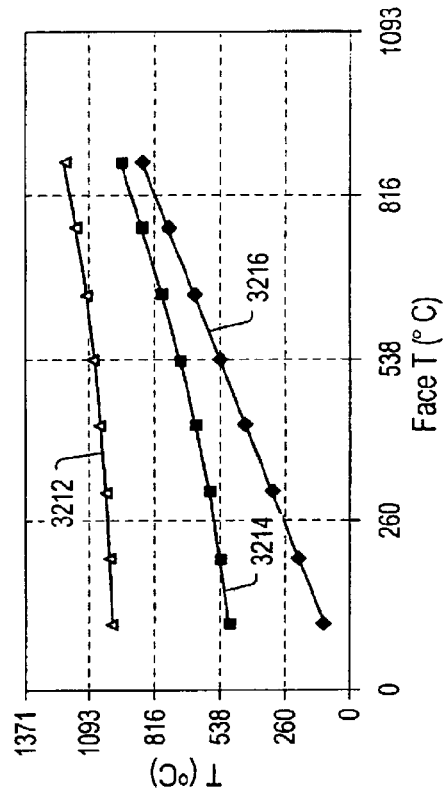

FIG. 71 illustrates temperatures of the conductor, the conduit, and the opening versus a temperature at a face of the coal formation for an air filled conduit and a high emissivity of 0.86. The opening has a gas mixture equivalent to the second mixture described above having a hydrogen mole fraction of 0.6. Opening temperature 3216 was linearly increased from 93° C. to 871° C. Opening temperature 3216 was assumed to be the same as the temperature at the face of the coal formation. Conductor temperature 3212 and conduit temperature 3214 were calculated from opening temperature 3216 using the dimensions of the conductor, conduit, and opening, values of emissivities for the conductor, conduit, and face, and thermal conductivities for gases (air, methane, carbon dioxide, and hydrogen). It may be seen from the plots of temperatures of the conductor, conduit, and opening for the conduit filled with air, that at higher temperatures approaching 871° C., the temperatures of the conductor, conduit, and opening begin to substantially equilibrate, as seen for the helium filled conduit with high emissivity.

Figure 72:
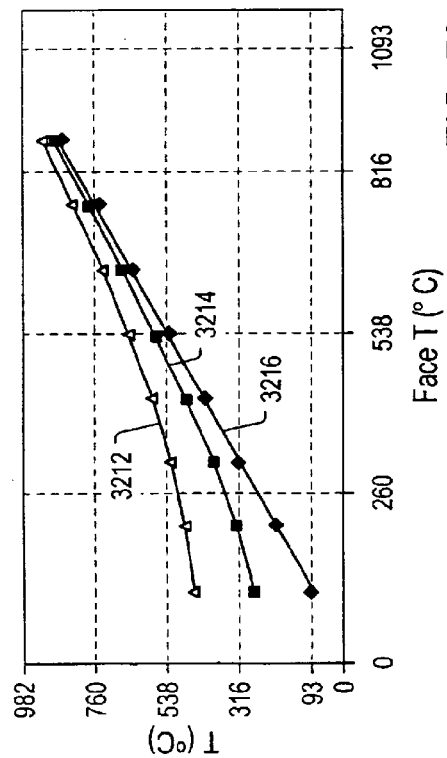

FIG. 72 illustrates temperatures of the conductor, the conduit, and the opening versus a temperature at a face of the coal formation for a helium filled conduit and a low emissivity of 0.1. The opening has a gas mixture equivalent to the second mixture described above having a hydrogen mole fraction of 0.6. Opening temperature 3216 was linearly increased from 93° C. to 871° C. Opening temperature 3216 was assumed to be the same as the temperature at the face of the coal formation. Conductor temperature 3212 and conduit temperature 3214 were calculated from opening temperature 3216 using the dimensions of the conductor, conduit, and opening, values of emissivities for the conductor, conduit, and face, and thermal conductivities for gases (helium, methane, carbon dioxide, and hydrogen). It may be seen from the plots of temperatures of the conductor, conduit, and opening for the conduit filled with helium, that at higher temperatures approaching 871° C., the temperatures of the conductor, conduit, and opening do not begin to substantially equilibrate as seen for the high emissivity example shown in FIG. 70. Also, higher temperatures in the conductor and the conduit are needed for an opening and face temperature of 871° C. than as for the example shown in FIG. 70. Thus, increasing an emissivity of the conductor and the conduit may be advantageous in reducing operating temperatures needed to produce a desired temperature in a coal formation. Such reduced operating temperatures may allow for the use of less expensive alloys for metallic conduits.

Figure 73:
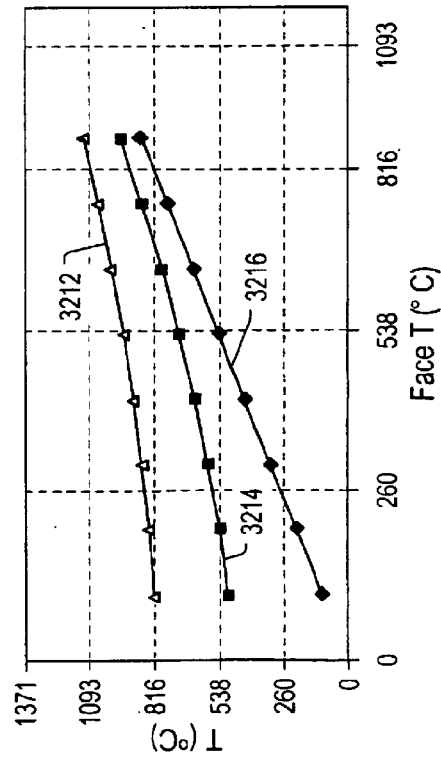

FIG. 73 illustrates temperatures of the conductor, the conduit, and the opening versus a temperature at a face of the coal formation for an air filled conduit and a low emissivity of 0.1. The opening has a gas mixture equivalent to the second mixture described above having a hydrogen mole fraction of 0.6. Opening temperature 3216 was linearly increased from 93° C. to 871° C. Opening temperature 3216 was assumed to be the same as the temperature at the face of the coal formation. Conductor temperature 3212 and conduit temperature 3214 were calculated from opening temperature 3216 using the dimensions of the conductor, conduit, and opening, values of emissivities for the conductor, conduit, and face, and thermal conductivities for gases (air, methane, carbon dioxide, and hydrogen). It may be seen from the plots of temperatures of the conductor, conduit, and opening for the conduit filled with helium, that at higher temperatures approaching 871° C., the temperatures of the conductor, conduit, and opening do not begin to substantially equilibrate as seen for the high emissivity example shown in FIG. 71. Also, higher temperatures in the conductor and the conduit are needed for an opening and face temperature of 871° C. than as for the example shown in FIG. 71. Thus, increasing an emissivity of the conductor and the conduit may be advantageous in reducing operating temperatures needed to produce a desired temperature in a coal formation. Such reduced operating temperatures may provide for a lesser metallurgical cost associated with materials that require less substantial temperature resistance (e.g., a lower melting point).

Calculations were also made using the first mixture of gas having a hydrogen mole fraction of 0.2. The calculations resulted in substantially similar results to those for a hydrogen mole fraction of 0.6.

A series of experiments was conducted to determine the effects of various properties of coal formations on properties of fluids produced from such coal formations. The fluids may be produced according to any of the embodiments as described herein. The series of experiments included organic petrography, proximate/ultimate analyses, Rock-Eval pyrolysis, Leco Total Organic Carbon ("TOC"), Fischer Assay, and pyrolysis-gas chromatography. Such a combination of petrographic and chemical techniques may provide a quick and inexpensive method for determining physical and chemical properties of coal and for providing a comprehensive understanding of the effect of geochemical parameters on potential oil and gas production from coal pyrolysis. The series of experiments were conducted on forty-five cubes of coals to determine source rock properties of each coal and to assess potential oil and gas production from each coal.

Organic petrology is the study, mostly under the microscope, of the organic constituents of coal and other rocks. The petrography of coal is important since it affects the physical and chemical nature of the coal. The ultimate analysis refers to a series of defined methods that are used to determine the carbon, hydrogen, sulfur, nitrogen, ash, oxygen, and the heating value of a coal. Proximate analysis is the measurement of the moisture, ash, volatile matter, and fixed carbon content of a coal.

Rock-Eval pyrolysis is a petroleum exploration tool developed to assess the generative potential and thermal maturity of prospective source rocks. A ground sample may be pyrolyzed in a helium atmosphere. For example, the sample may be initially heated and held at a temperature of 300° C. for 5 minutes. The sample may be further heated at a rate of 25° C./min to a final temperature of 600° C. The final temperature may be maintained for 1 minute. The products of pyrolysis may be oxidized in a separate chamber at 580° C. to determined the total organic carbon content. All components generated may be split into two streams passing through a flame ionization detector, which may measure hydrocarbon and a thermal conductivity detector, which may measure $CO_2$.

Leco Total Organic Carbon ("TOC") involves combustion of coal. For example, a small sample (about 1 gram) is heated to 1500° C. in a high-frequency electrical field under an oxygen atmosphere. Conversion of carbon to carbon dioxide is measured volumetrically. Pyrolysis-gas chromatography may be used for quantitative and qualitative analysis of pyrolysis gas.

Figure 77:
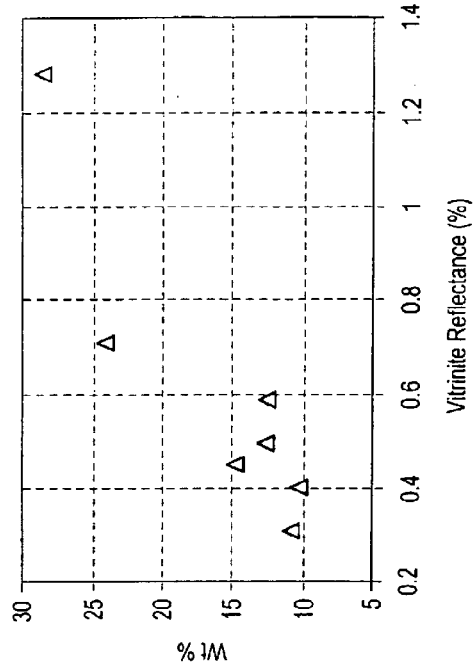
FIG. 77 depicts weight percent of paraffins versus vitrinite reflectance.
Figure 78:
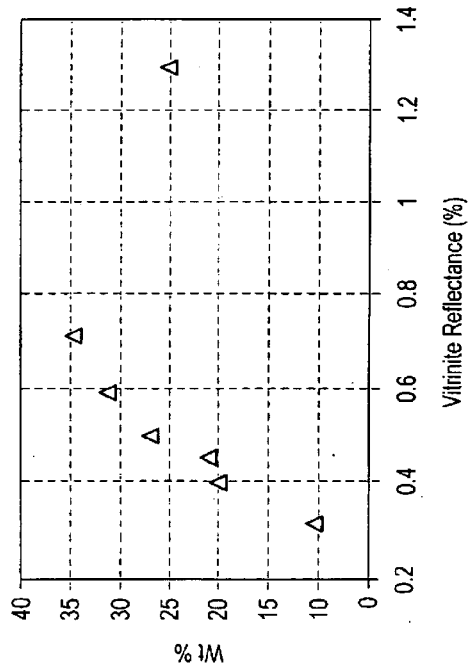
FIG. 78 depicts weight percent of cycloalkanes in produced oil versus vitrinite reflectance.
Figure 79:
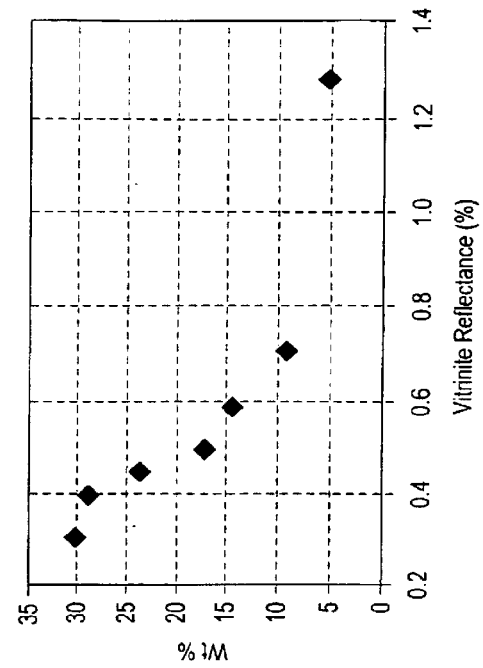
FIG. 79 depicts weight percentages of paraffins and cycloalkanes in produced oil versus vitrinite reflectance.
Figure 80:
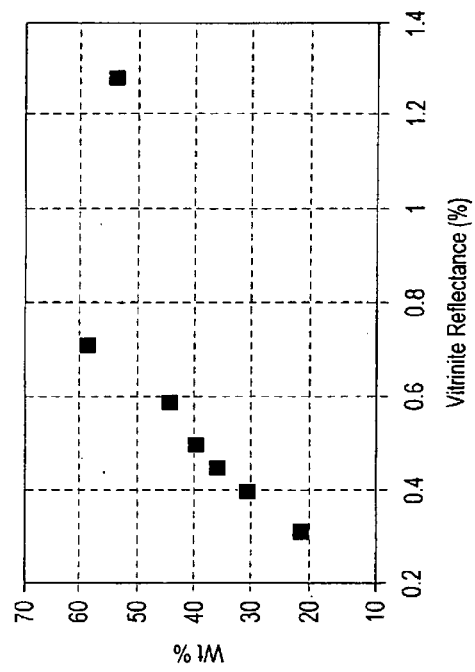
FIG. 80 depicts phenol weight percent in produced oil versus vitrinite reflectance.
Figure 81:
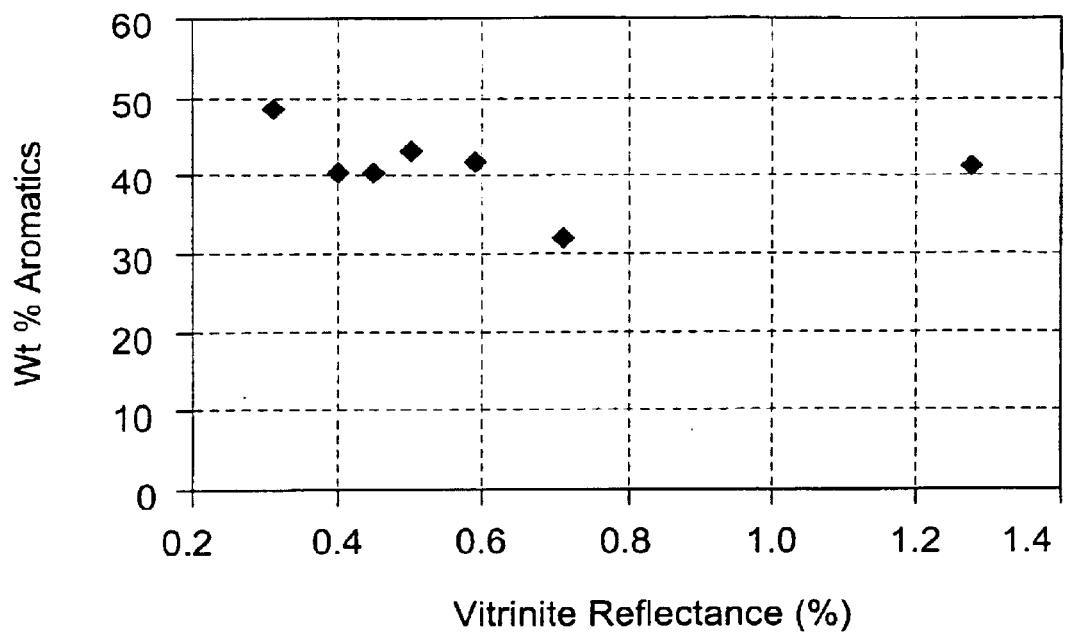
FIG. 81 depicts aromatic weight percent in produced oil versus vitrinite reflectance.
Figure 82:
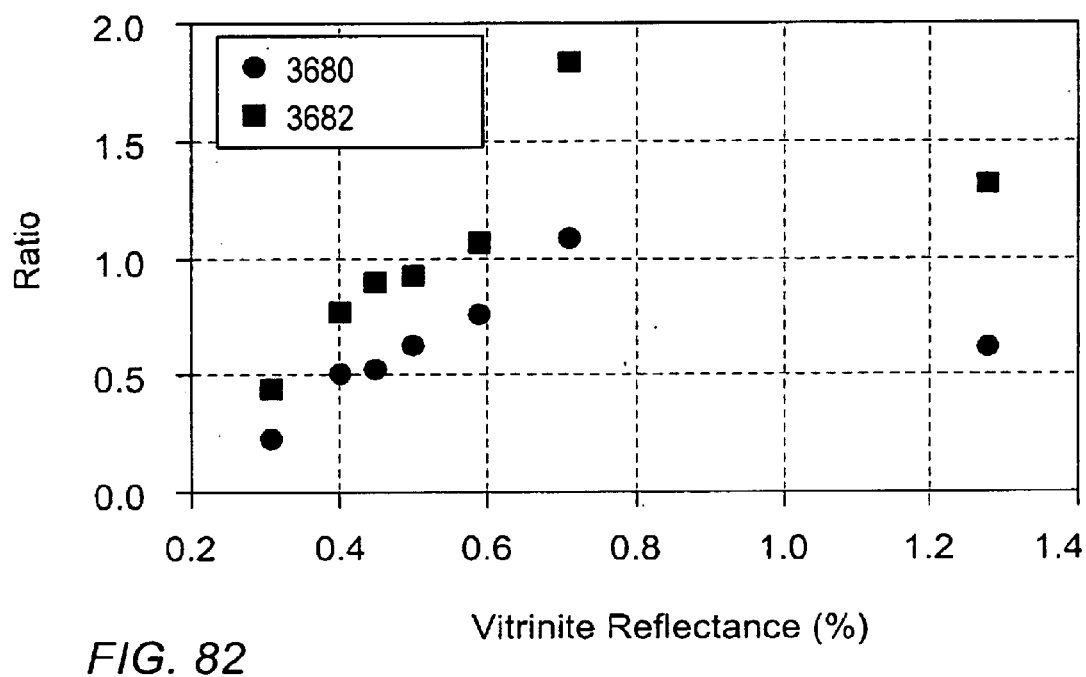
FIG. 82 depicts ratio of paraffins and aliphatics to aromatics versus vitrinite reflectance.

Coals of different ranks and vitrinite reflectances were treated in a laboratory to simulate an in situ conversion process. The different coal samples were heated at a rate of about 2° C./day and at a pressure of 1 bar or 4.4 bars absolute. FIG. 77 shows weight percents of paraffins plotted against vitrinite reflectance. As shown in FIG. 77 weight percent of paraffins in the produced oil increases at vitrinite reflectances of the coal below about 0.9%. In addition, a weight percent of paraffins in the produced oil approaches maximum at a vitrinite reflectance of about 0.9%. FIG. 78 depicts weight percent of in the produced oil plotted versus vitrinite reflectance. As shown in FIG. 78 a weight percent of cycloalkanes in the oil produced increased as vitrinite reflectance increased. Weight percentages of a sum of paraffins and cycloalkanes is plotted versus vitrinite reflectance in FIG. 79. In some embodiments, an in situ conversion process may be utilized to produce phenol. Phenol generation may increase when a fluid pressure within the formation is maintained at a lower pressure. Phenol weight percent in the produced oil is depicted in FIG. 80. A weight percent of phenol in the produced oil decreases as the vitrinite reflectance increases. FIG. 81 illustrates a weight percentage of aromatics in the hydrocarbon fluids plotted against vitrinite reflectance. As shown in FIG. 81, a weight percent of aromatics in the produced oil decreases below a vitrinite reflectance of about 0.9%. A weight percent of aromatics in the produced oil increases above a vitrinite reflectance of about 0.9%. FIG. 82 depicts a ratio of paraffins to aromatics 3680 and a ratio of aliphatics to aromatics 3682 plotted versus vitrinite reflectance. Both ratios increase to a maximum at a vitrinite reflectance between about 0.7% and about 0.9%. Above a vitrinite reflectance of about 0.9%, both ratios decrease as vitrinite reflectance increases.

Figure 96:
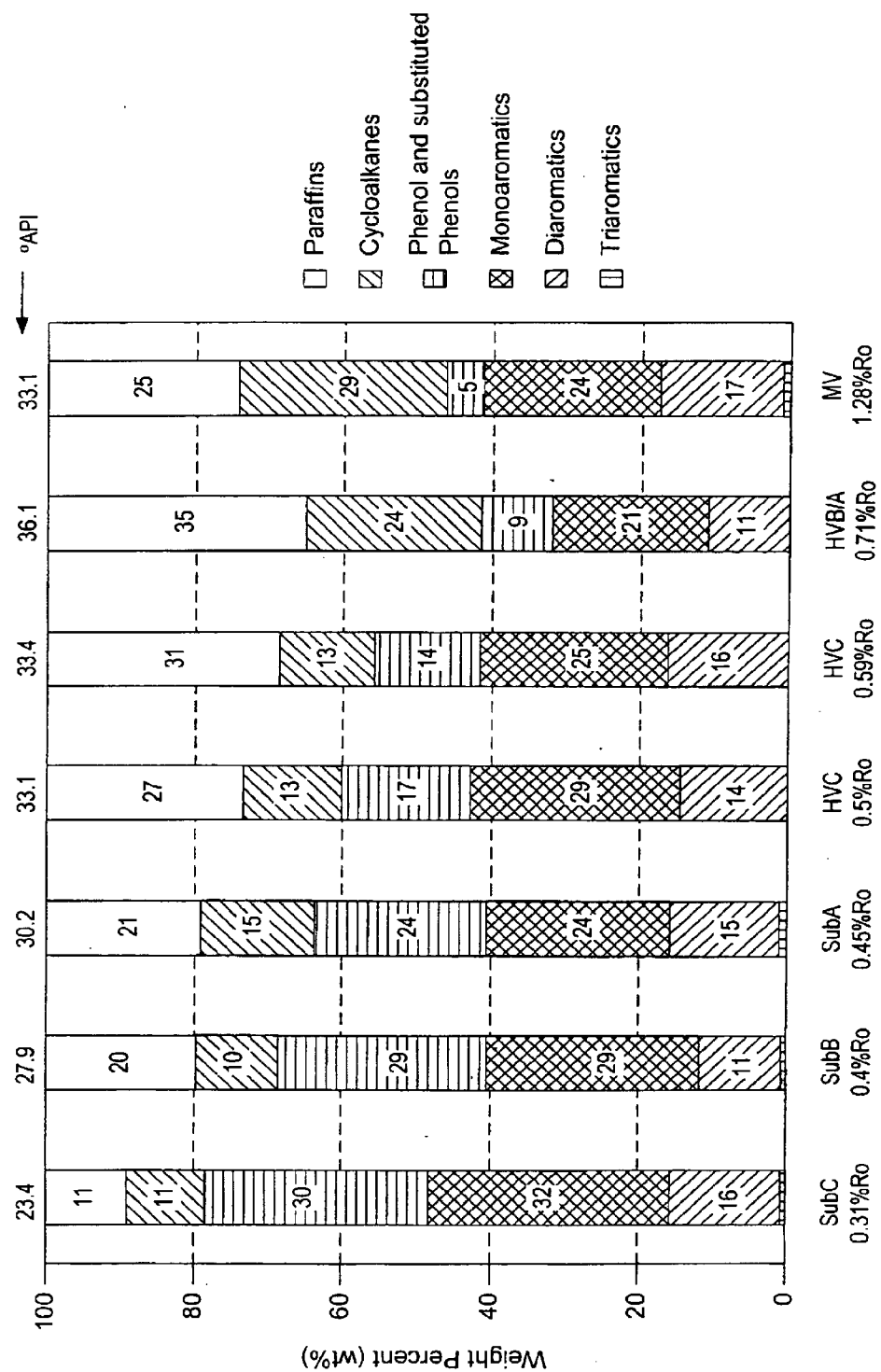
FIG. 96 depicts the compositions of condensable hydrocarbons produced when various ranks of coal were treated.

FIG. 96 depicts the condensable hydrocarbon compositions, and condensable hydrocarbon API gravities, that were produced when various ranks of coal were treated as is described above for FIGS. 77–82. In FIG. 96, "SubC" means a rank of sub-bituminous C coal, "SubB" means a rank of sub-bituminous B coal, "SubA" means a rank of sub-bituminous A coal, "HVC" means a rank of high volatile bituminous C coal, "HVB/A" means a rank of high volatile bituminous coal at the border between B and A rank coal. "MV" means a rank medium volatile bituminous coal, and "Ro" means vitrinite reflectance. As can be seen in FIG. 96, certain ranks of coal will produce different compositions when treated in certain embodiments described herein. For instance, in many circumstances it may be desirable to treat coal having a rank of HVB/A because such coal, when treated, has the highest API gravity, the highest weight percent of paraffins, and the highest weight percent of the sum of paraffins and cycloalkanes.

Results were also displayed as a yield of products. FIG. 83–86 illustrate the yields of components in terms of $m^3$ of product per kg of coal formation, when measured on a dry, ash free basis. As illustrated in FIG. 83 the yield of paraffins increased as the vitrinite reflectance of the coal increased. However, for coals with a vitrinite reflectance greater than about 0.7–0.8% the yield of paraffins fell off dramatically. In addition, a yield of cycloalkanes followed similar trends as the paraffins, increasing as the vitrinite reflectance of coal increased and decreasing for coals with a vitrinite reflectance greater than about 0.7% or 0.8% as illustrated in FIG. 84. FIG. 85 illustrates the increase of both paraffins and cycloalkanes as the vitrinite reflectance of coal increases to about 0.7% or 0.8%. As illustrated in FIG. 86 the yield of phenols may be relatively low for coal containing material with a vitrinite reflectance of less than about 0.3% and greater than about 1.25%. Production of phenols may be desired due to the value of phenol as a feedstock for chemical synthesis.

Figure 87:
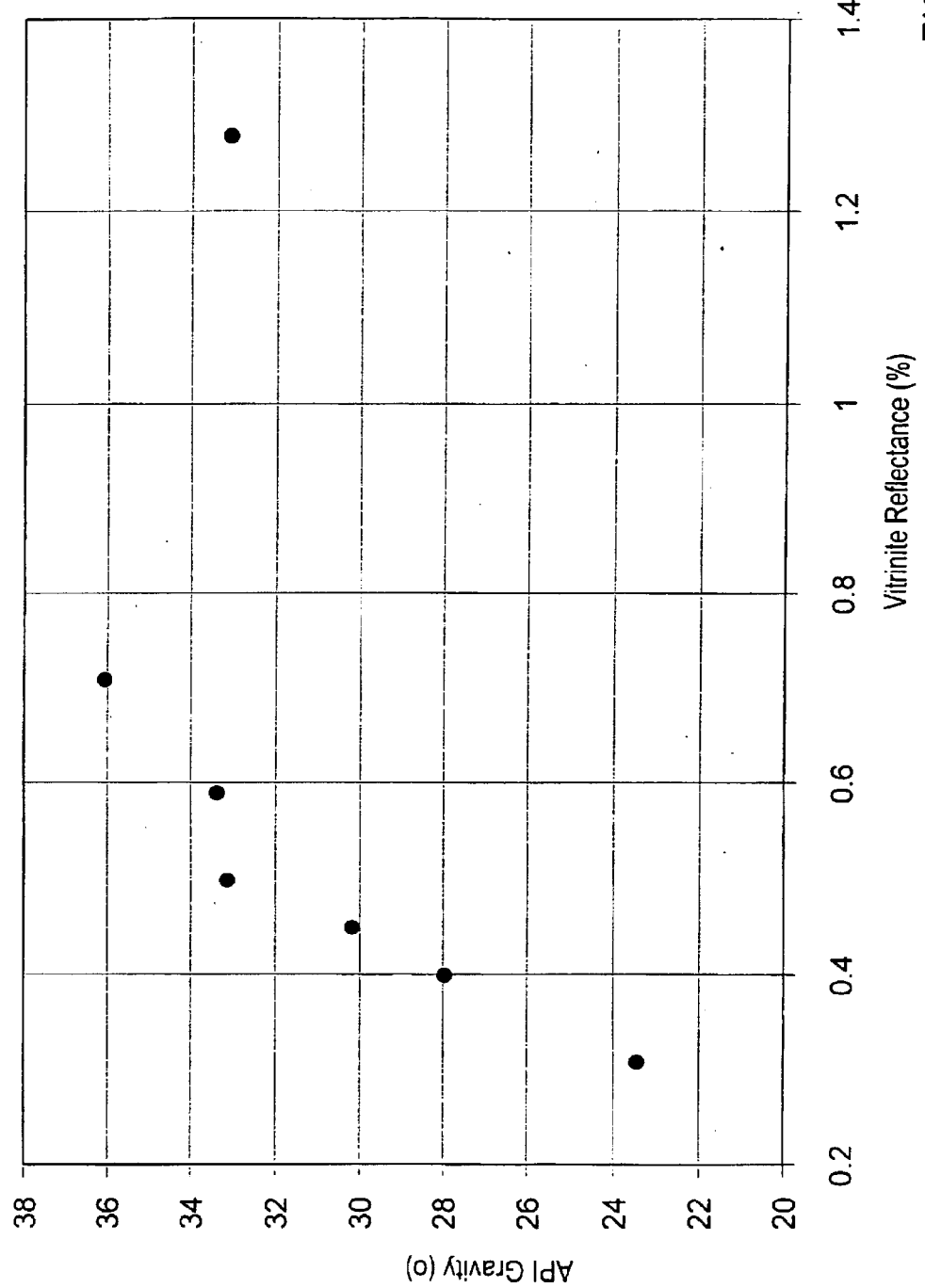
FIG. 87 depicts API gravity as a function of vitrinite reflectance.
Figure 88:
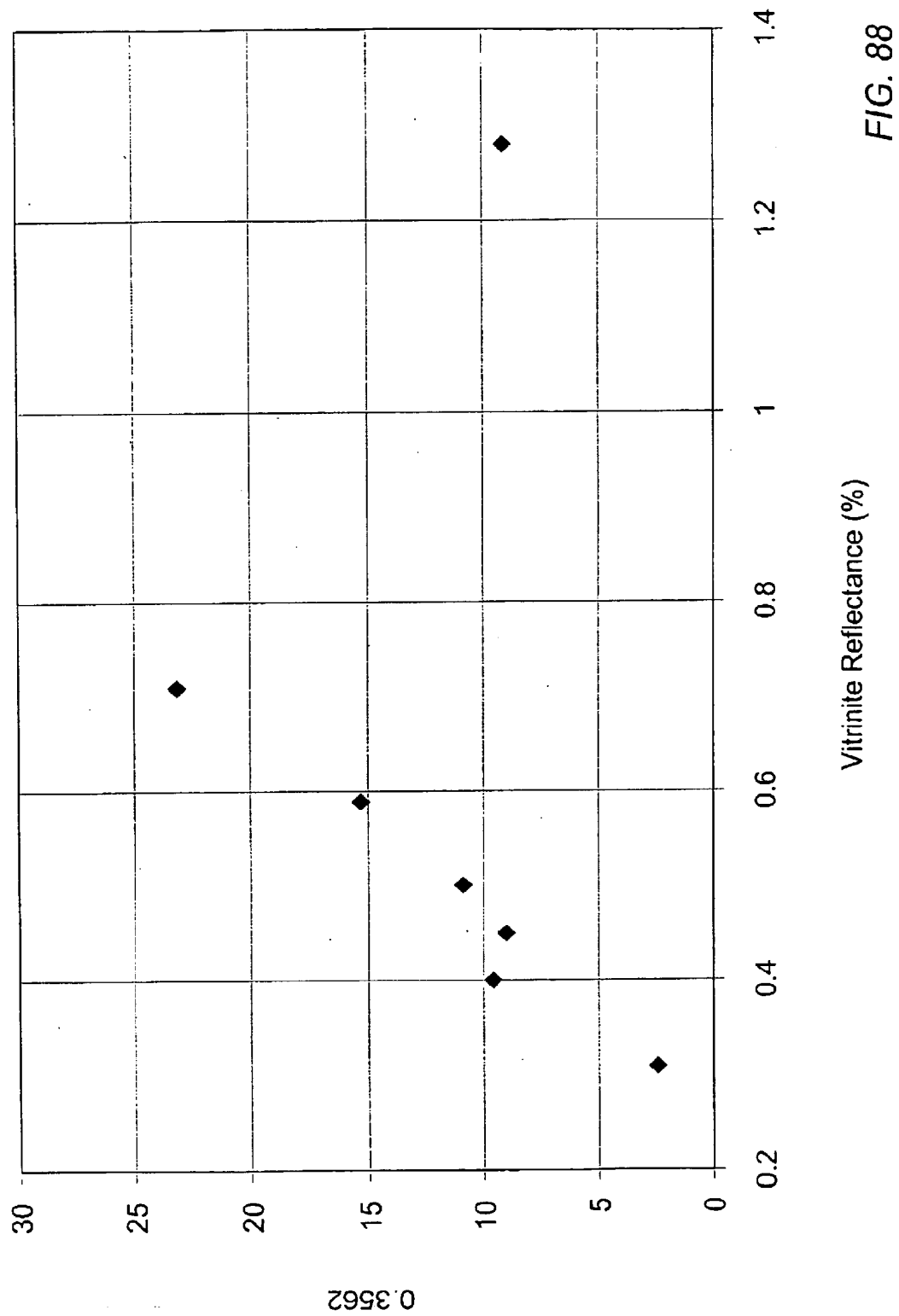
FIG. 88 depicts yield of oil from a coal formation as a function of vitrinite reflectance.

As demonstrated in FIG. 87, the API gravity appears to increase significantly when the vitrinite reflectance is greater than about 0.40%. In FIG. 88 the relationship between coal rank, i.e., vitrinite reflectance, and a yield of condensable hydrocarbons (in gallons per ton on a dry ash free basis) from a coal formation. The yield in this experiment appears to be in an optimal range when the coal has a vitrinite reflectance greater than about 0.4% to less than about 1.3%.

Figure 89:
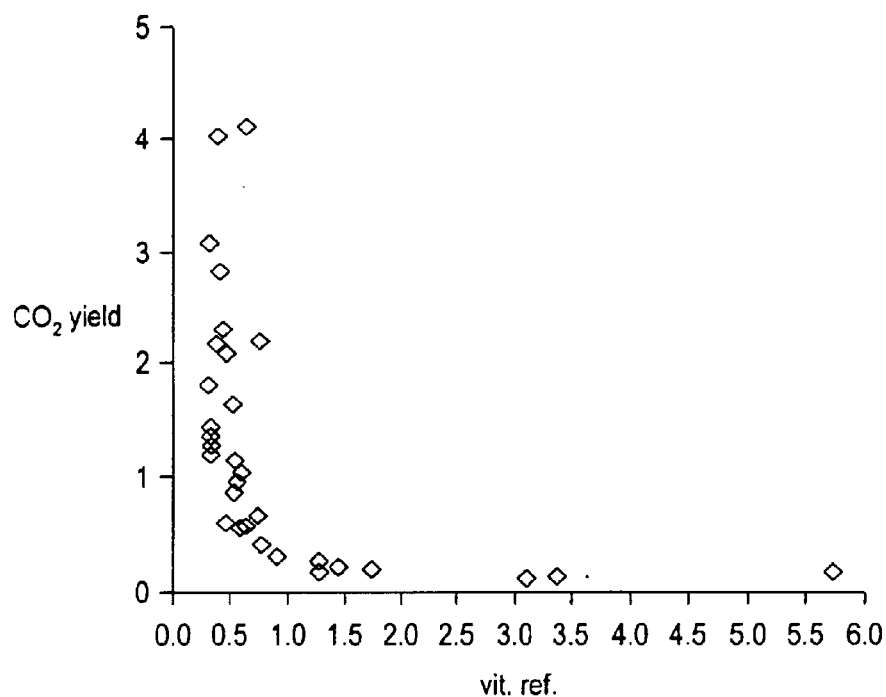
FIG. 89 depicts $CO_2$ yield from coal having various vitrinite reflectances.
Figure 90:
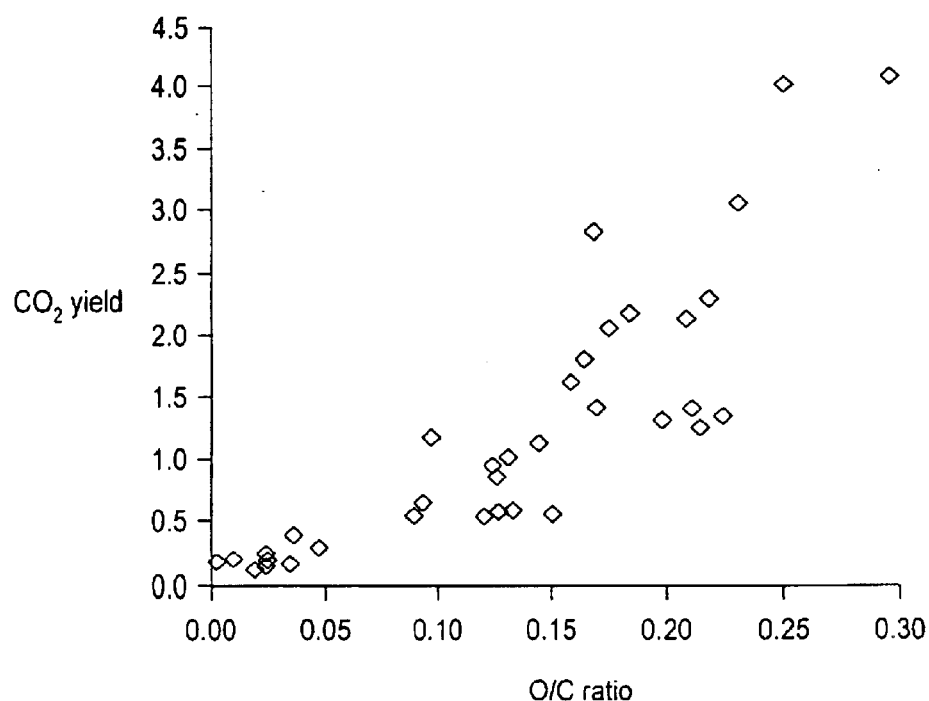
FIG. 90 depicts $CO_2$ yield versus atomic O/C ratio for a coal formation.

FIG. 89 illustrates a plot of $CO_2$ yield of coal having various vitrinite reflectances. In FIGS. 89 and 90. $CO_2$ yield is set forth in weight percent on a dry ash free basis. As shown in FIG. 89, at least some $CO_2$ was released from all of the coal samples. Such $CO_2$ production may correspond to various oxygenated functional groups present in the initial coal samples. A yield of $CO_2$ produced from low-rank coal samples was significantly higher than a production from high-rank coal samples. Low-rank coals may include lignite and sub-bituminous brown coals. High-rank coals may include semi-anthracite and anthracite coal. FIG. 90 illustrates a plot of $CO_2$ yield from a portion of a coal formation versus the atomic O/C ratio within a portion of a coal formation. As O/C atomic ratio increases, a $CO_2$ yield increases.

A slow heating process may produce condensed hydrocarbon fluids having API gravities in a range of 22 to 50, and average molecular weights of about 150 g/gmol to about 250 g/gmol. These properties may be compared to properties of condensed hydrocarbon fluids produced by ex situ retorting of coal as reported in Great Britain Published Patent Application No. GB 2,068,014 A, which is incorporated by reference as if fully set forth herein. For example, properties of condensed hydrocarbon fluids produced by an ex situ retort process include API gravities of 1.9 to 7.9 produced at temperature of 521° C. and 427° C. respectively.

Table 1 shows a comparison of gas compositions, in percent volume, obtained from in situ gasification of coal using air injection to heat the coal, in situ gasification of coal using oxygen injection to heat the coal, and in situ gasification of coal in a reducing atmosphere by thermal pyrolysis heating as described in embodiments herein.

TABLE 1

|  | Gasification With Air | Gasification With Oxygen | Thermal Pyrolysis Heating |
|---|---|---|---|
| $H_2$ | 18.6% | 35.5% | 16.7% |
| Methane | 3.6% | 6.9% | 61.9% |
| Nitrogen and Argon | 47.5% | 0.0 | 0.0 |
| Carbon Monoxide | 16.5% | 31.5% | 0.9% |
| Carbon Dioxide | 13.1% | 25.0% | 5.3% |
| Ethane | 0.6% | 1.1% | 15.2% |

As shown in Table 1, gas produced according to an embodiment described herein may be treated and sold through existing natural gas systems. In contrast, gas produced by typical in situ gasification processes may not be treated and sold through existing natural gas systems. For example, a heating value of the gas produced by gasification with air was 6000 $KJ/m^3$, and a heating value of gas produced by gasification with oxygen was 11,439 $KJ/m^3$. In contrast, a heating value of the gas produced by thermal conductive heating was 39,159 $KJ/m^3$.

Experiments were conducted to determine the difference between treating relatively large solid blocks of coal versus treating relatively small loosely packed particles of coal.

Figure 91:
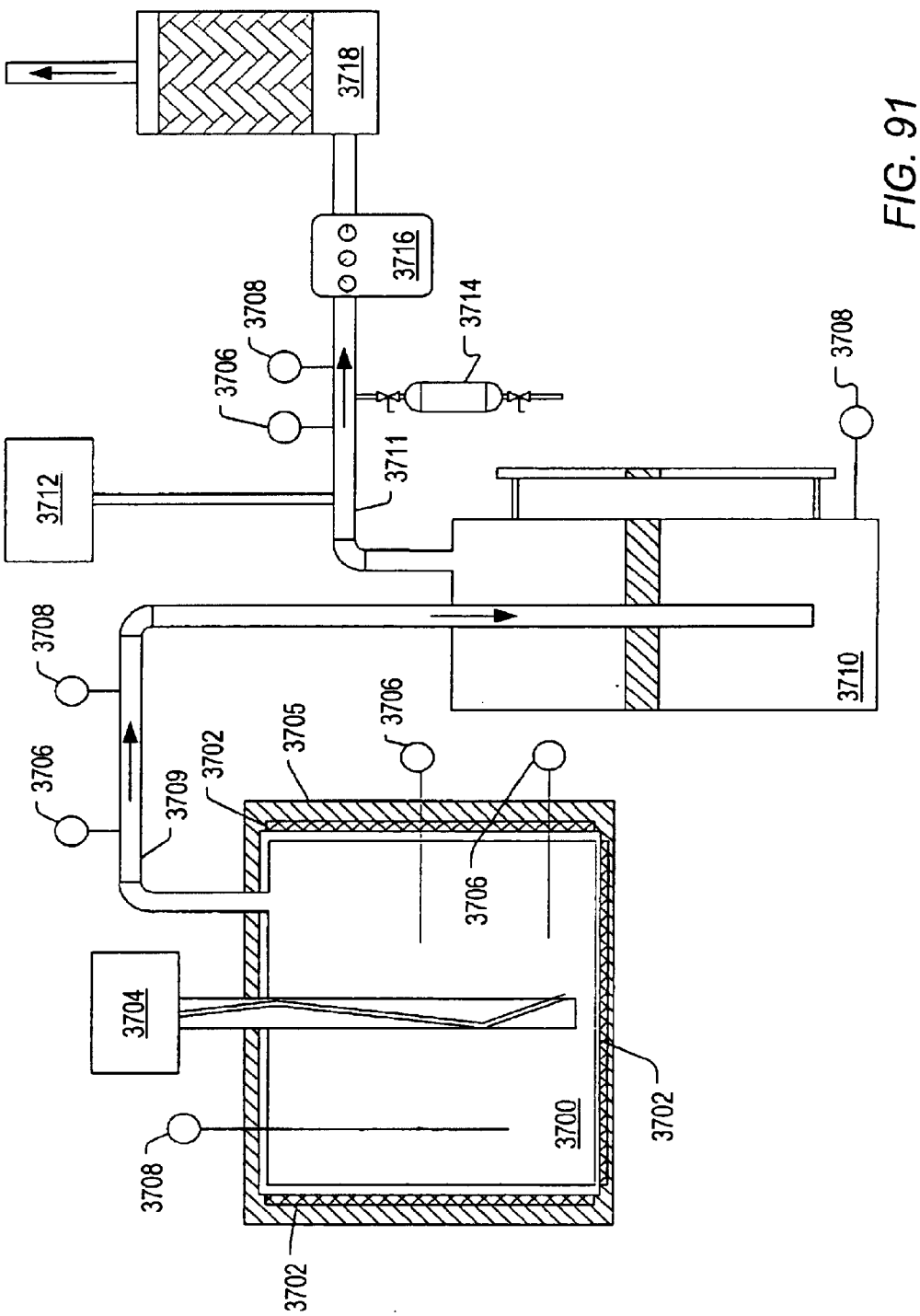
FIG. 91 depicts a schematic of a coal cube experiment.

As illustrated in FIG. 91, coal 3700 in the shape of a cube was heated to pyrolyze the coal. Heat was provided to cube 3700 from heat source 3704 inserted into the center of the cube and also from heat sources 3702 located on the sides of the cube. The cube was surrounded by insulation 3705. The temperature was raised simultaneously using heat sources 3704, 3702 at a rate of about 2° C./day at atmospheric pressure. Measurements from temperature gauges 3706 were used to determine an average temperature of cube

3700. Pressure in cube 3700 was monitored with pressure gauge 3708. The fluids produced from the cube of coal were collected and routed through conduit 3709. Temperature of the product fluids was monitored with temperature gauge 3706 on conduit 3709. A pressure of the product fluids was monitored with pressure gauge 3708 on conduit 3709. A hydrocarbon condensate was separated from a non-condensable fluid in separator 3710. Pressure in separator 3710 was monitored with pressure gauge 3708. A portion of the non-condensable fluid was routed through conduit 3711 to gas analyzers 3712 for characterization. Grab samples were taken from a grab sample port 3714. Temperature of the non-condensable fluids was monitored with temperature gauge 3706 on conduit 3711. A pressure of the non-condensable fluids was monitored with pressure gauge 3708 on conduit 3711. The remaining gas was routed through a flow meter 3716, a carbon bed 3718, and vented to the atmosphere. The produced hydrocarbon condensate was collected and analyzed to determine the composition of the hydrocarbon condensate.

Figure 75:
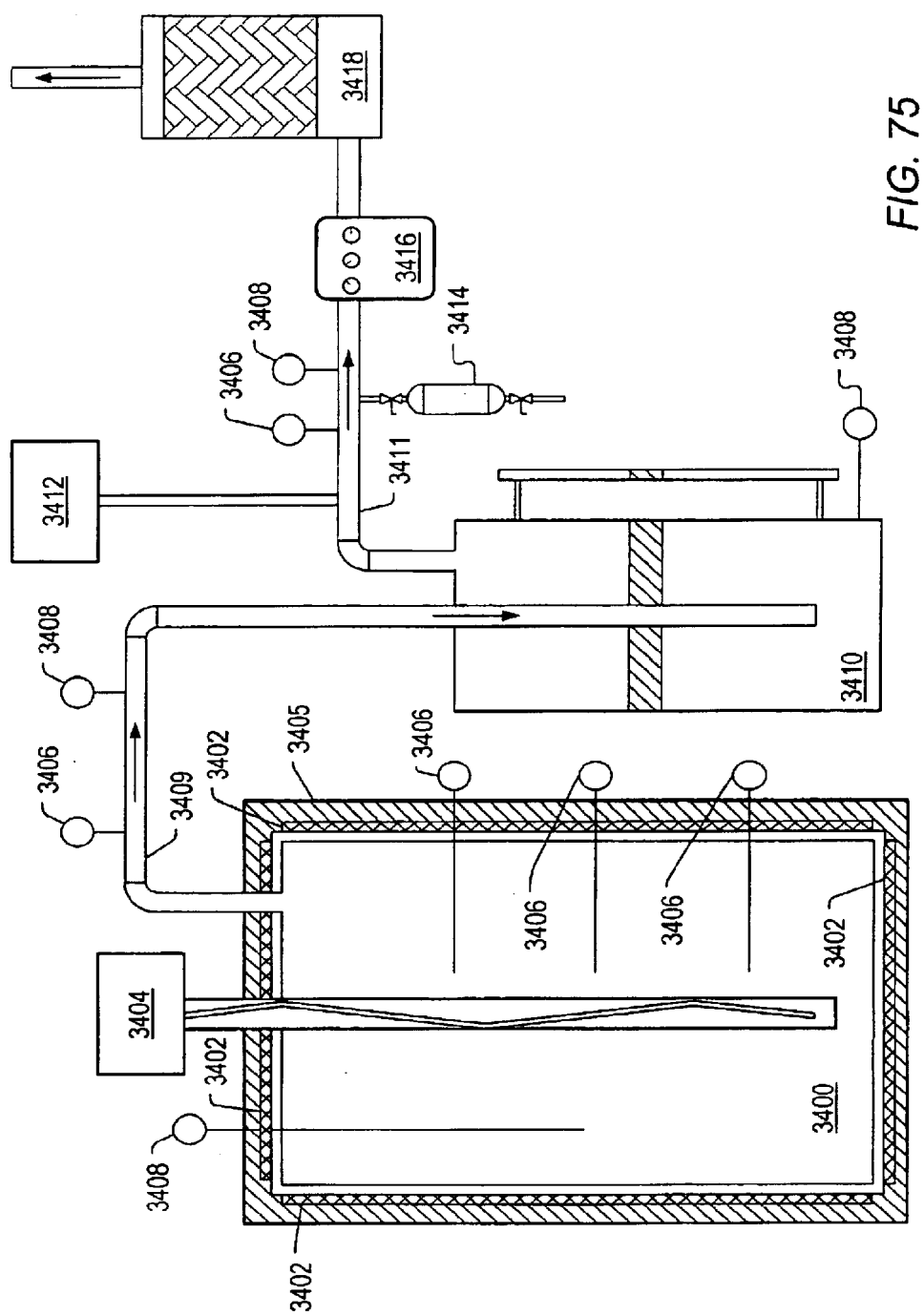
FIG. 75 depicts an embodiment of an apparatus for a drum experiment.

FIG. 75 illustrates a drum experimental apparatus. This apparatus was used to test coal. Electrical heater 3404 and bead heater 3402 were used to uniformly heat contents of drum 3400. Insulation 3405 surrounds drum 3400. Contents of drum 3400 were heated at a rate of about 2° C./day at various pressures. Measurements from temperature gauges 3406 were used to determine an average temperature in drum 3400. Pressure in the drum was monitored with pressure gauge 3408. Product fluids were removed from drum 3400 through conduit 3409. Temperature of the product fluids was monitored with temperature gauge 3406 on conduit 3409. A pressure of the product fluids was monitored with pressure gauge 3408 on conduit 3409. Product fluids were separated in separator 3410. Separator 3410 separated product fluids into condensable and non-condensable products. Pressure in separator 3410 was monitored with pressure gauge 3408. Non-condensable product fluids were removed through conduit 3411. A composition of a portion of non-condensable product fluids removed from separator 3410 was determined by gas analyzer 3412. A portion of condensable product fluids were removed from separator 3410. Compositions of the portion of condensable product fluids collected were determined by external analysis methods. Temperature of the non-condensable fluids was monitored with temperature gauge 3406 on conduit 3411. A pressure of the non-condensable fluids was monitored with pressure gauge 3408 on conduit 3411. Flow of non-condensable fluids from separator 3410 was determined by flow meter 3416. Fluids measured in flow meter 3416 were collected and neutralized in carbon bed 3418. Gas samples were collected in gas container 3414.

A large block of high volatile bituminous B Fruitland coal was separated into two portions. One portion (about 550 kg) was ground into small pieces and tested in a coal drum. The coal was ground to an approximate diameter of about $6.34 \times 10^{-4}$ m. The results of such testing are depicted with the circles in FIGS. 93 and 95. One portion (a cube having sides measuring 0.3048 m) was tested in a coal cube experiment. The results of such testing are depicted with the squares in FIGS. 93 and 95.

Figure 93:
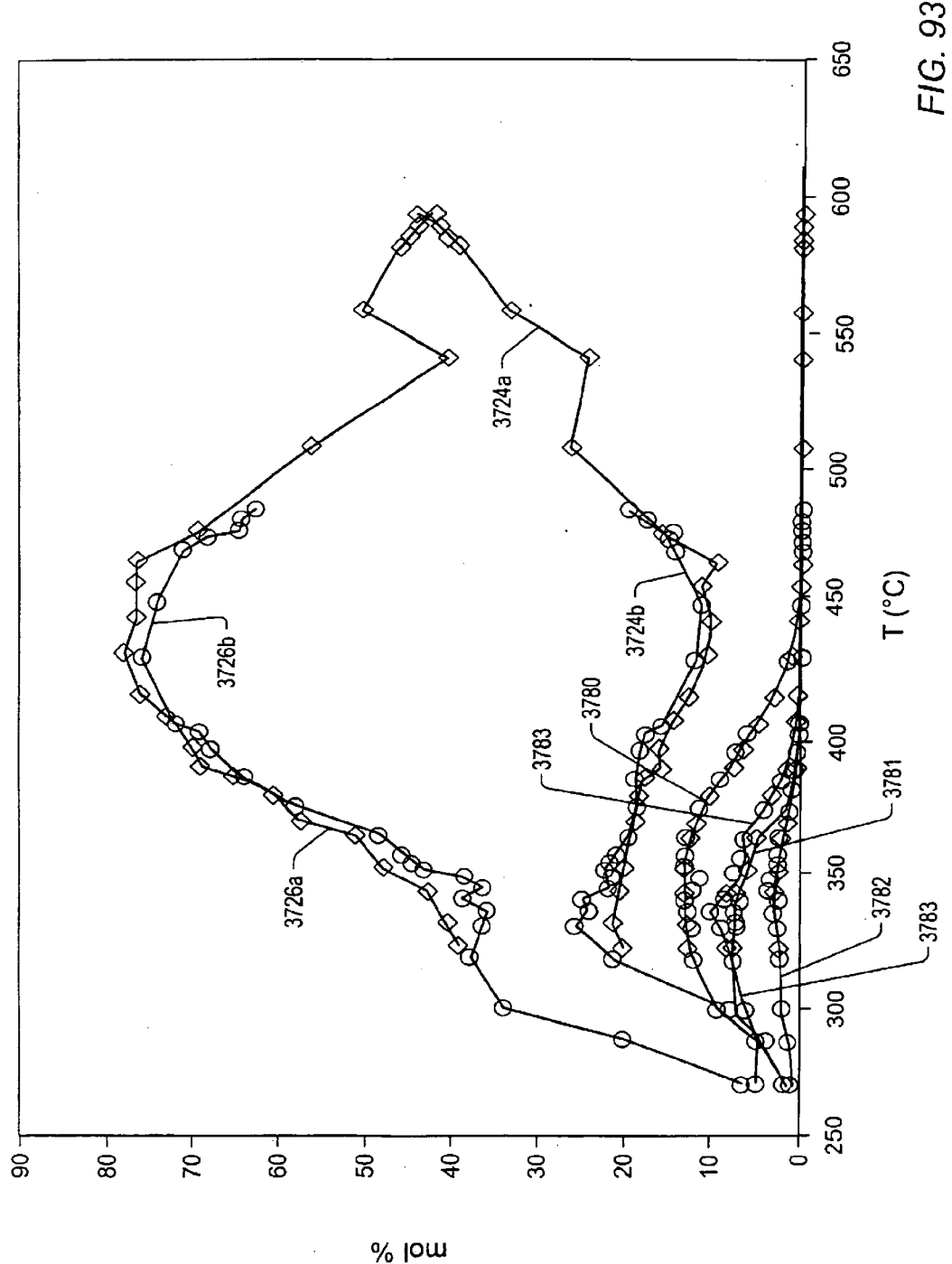
FIG. 93 depicts equilibrium gas phase compositions produced from experiments on a coal cube.

FIG. 93 is a plot of gas phase compositions from experiments on a coal cube and a coal drum for $H_2$ 3724, methane 3726, ethane 3780, propane 3781, n-butane 3782, and other hydrocarbons 3783 as a function of temperature. As can be seen for FIG. 93, the non condensable fluids produced from pyrolysis of the cube and the drum had similar concentrations of the various hydrocarbons generated within the coal. In FIG. 93 these results were so similar that only one line was drawn for ethane 3780, propane 3781, n-butane 3782, and other hydrocarbons 3783 for both the cube and the drum results, and the two lines that were drawn for $H_2$(3724a and 3724b) and the two lines drawn for methane (3726a and 3726b) were in both instances very close to each other. Crushing the coal did not have an apparent effect on the pyrolysis of the coal. The peak in methane production 3726 occurred at about 450° C. At higher temperatures methane cracks to hydrogen, so the methane concentration decreases while the hydrogen content 3724 increases.

Figure 94:
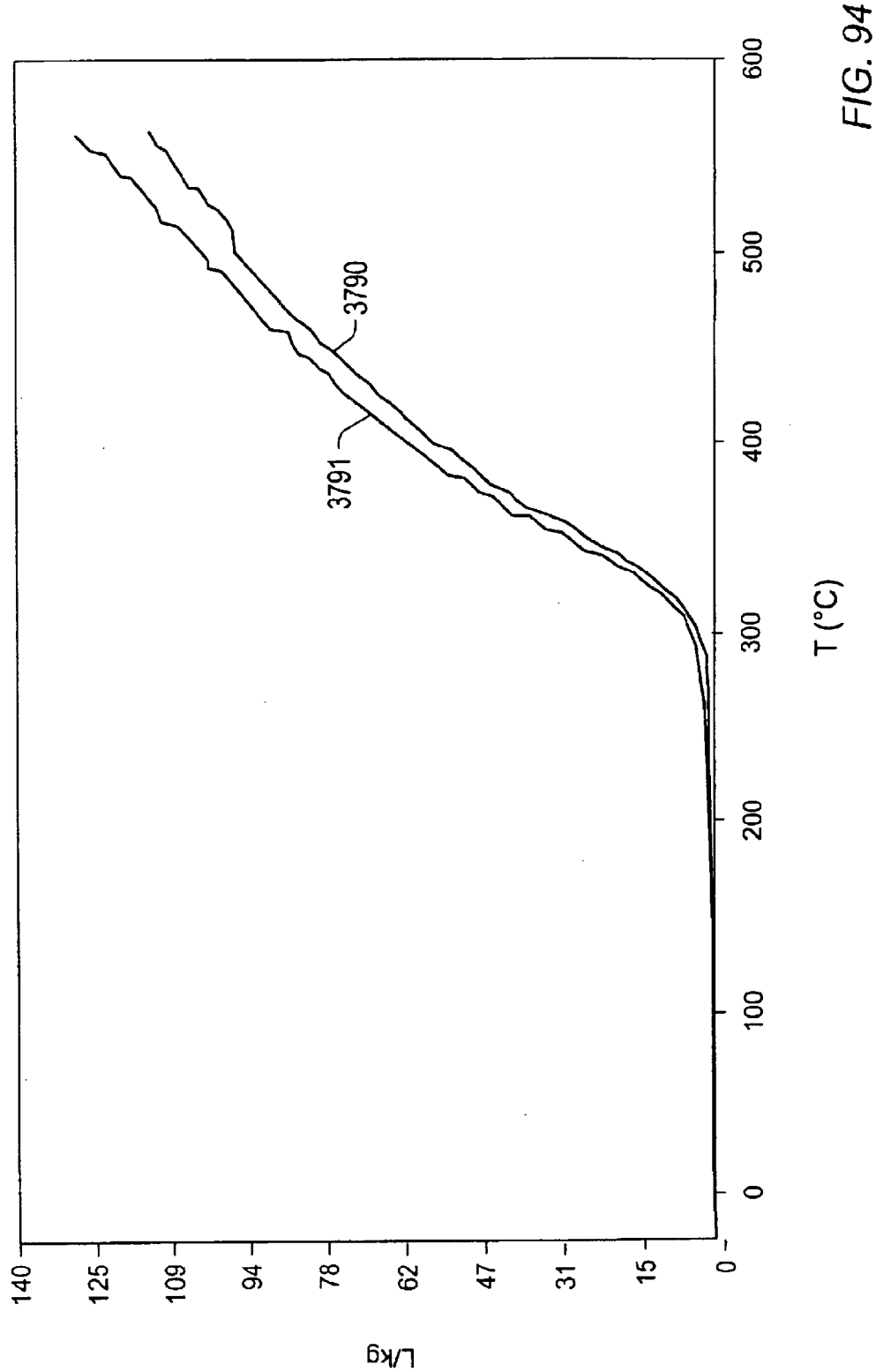
FIG. 94 depicts cumulative production of gas as a function of temperature produced by heating a coal cube.

FIG. 94 illustrates a plot of cumulative production of gas as a function of temperature from heating coal in the cube and coal in the drum. Line 3790 represents gas production from coal in the drum and line 3791 represents gas production from coal in the cube. As demonstrated by FIG. 94, the production of gas in both experiments yielded similar results. even though the particle sizes were dramatically different between the two experiments.

Figure 95:
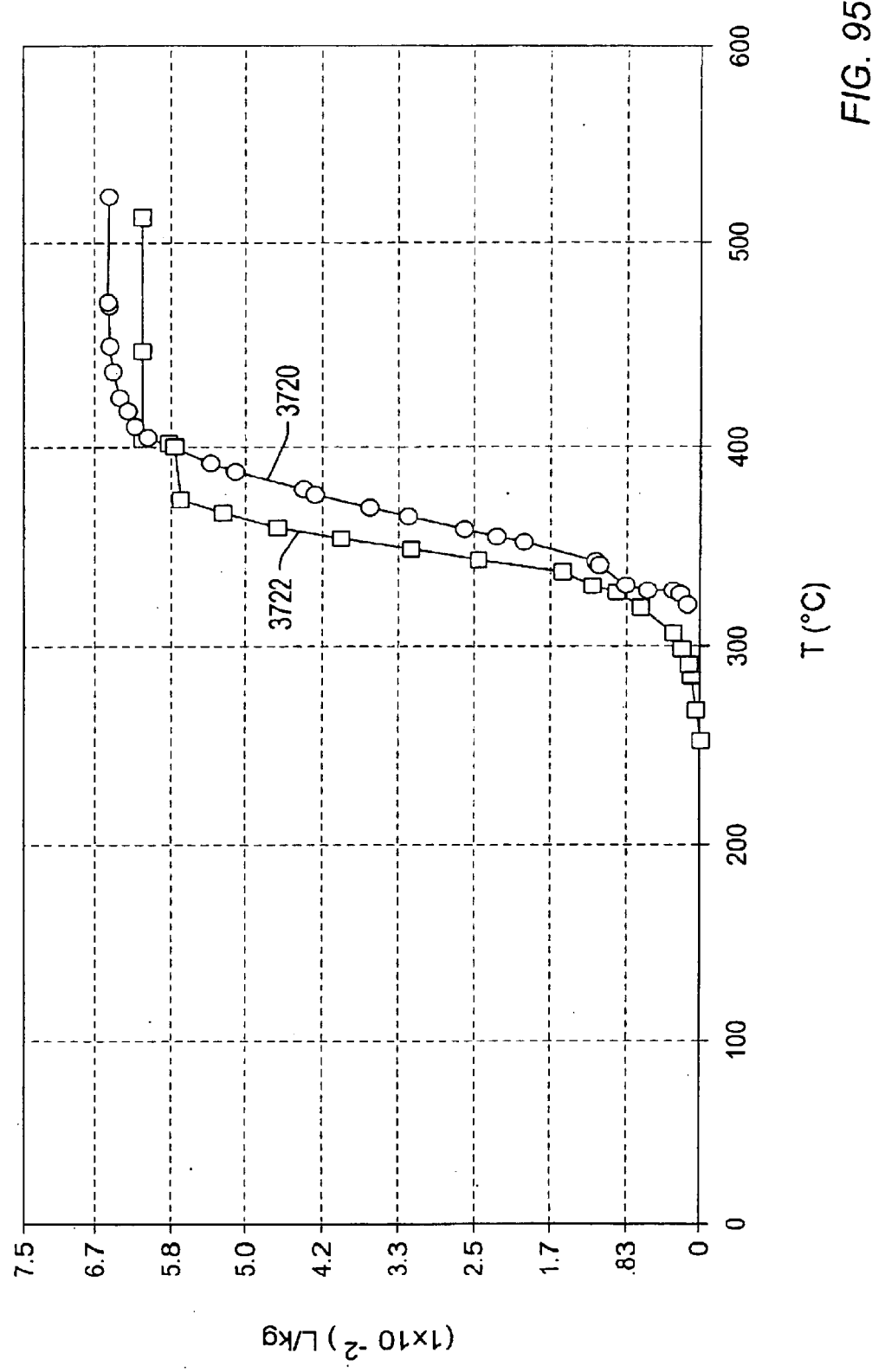
FIG. 95 depicts cumulative condensable hydrocarbons as a function of temperature produced by heating a coal cube.

FIG. 95 illustrates cumulative condensable hydrocarbons produced in the cube and drum experiments. Line 3720 represents cumulative condensable hydrocarbons production from the cube experiment, and line 3722 represents cumulative condensable hydrocarbons production from the drum experiment. As demonstrated by FIG. 95, the production of condensable hydrocarbons in both experiments yielded similar results, even though the particle sizes were dramatically different between the two experiments. Production of condensable hydrocarbons is substantially complete when the temperature reached about 390° C. In both experiments the condensable hydrocarbons had an API gravity of about 37 degrees.

As shown in FIG. 93, methane started to be produced at temperatures at or above about 270° C. Since the experiments were conduced at atmospheric pressure, it is believed that the methane is produced from the pyrolysis, and not from mere desorption. Between about 270° C. and about 400° C. condensable hydrocarbons, methane and $H_2$ were produced as shown in FIGS. 93, 94, and 95. FIG. 93 shows that above a temperature of about 400° C. methane and $H_2$ continue to be produced. Above about 450° C., however, methane concentration decreased in the produced gases whereas the produced gases contained increased amounts of $H_2$. If heating were continued, eventually all $H_2$ remaining in the coal w ould be depleted, and production of gas from the coal would cease. FIGS. 93–95 indicate that the ratio of a yield of gas to a yield of condensable hydrocarbons will increase as the temperature increases above about 390° C.

FIGS. 93–95 demonstrate that particle size did not substantially affect the quality of condensable hydrocarbons produced from the treated coal, the quantity of condensable hydrocarbons produced from the treated coal, the amount of gas produced from the treated coal, the composition of the gas produced from the treated coal, the time required to produce the condensable hydrocarbons and gas from the treated coal, or the temperatures required to produce the condensable hydrocarbons and gas from the treated coal. In essence a block of coal yielded substantially the same results from treatment as small particles of coal. As such, it is believed that scale-up issues when treating coal will not substantially affect treatment results.

An experiment was conducted to determine an effect of heating on thermal conductivity and thermal diffusivity of a portion of a coal formation. Thermal pulse tests performed in situ in a high volatile bituminous C coal at the field pilot site showed a thermal conductivity between $2.0 \times 10^{-3} - 2.39 \times 10^{-3}$ cal/cm sec° C. (0.85 to 1.0 W/(m ° K.)) at 20° C. Ranges in these values were due to different measurements between different wells. The thermal diffusivity was $4.8 \times 10^{-3}$ cm²/s at 20° C. (the range was from about $4.1 \times 10^{-3}$ to about $5.7 \times 10^{-3}$ cm²/s at 20° C.). It is believed that these measured values for thermal conductivity and thermal diffusivity are substantially higher than would be expected based on literature sources (e.g., about three times higher in many instances).

Figure 97:
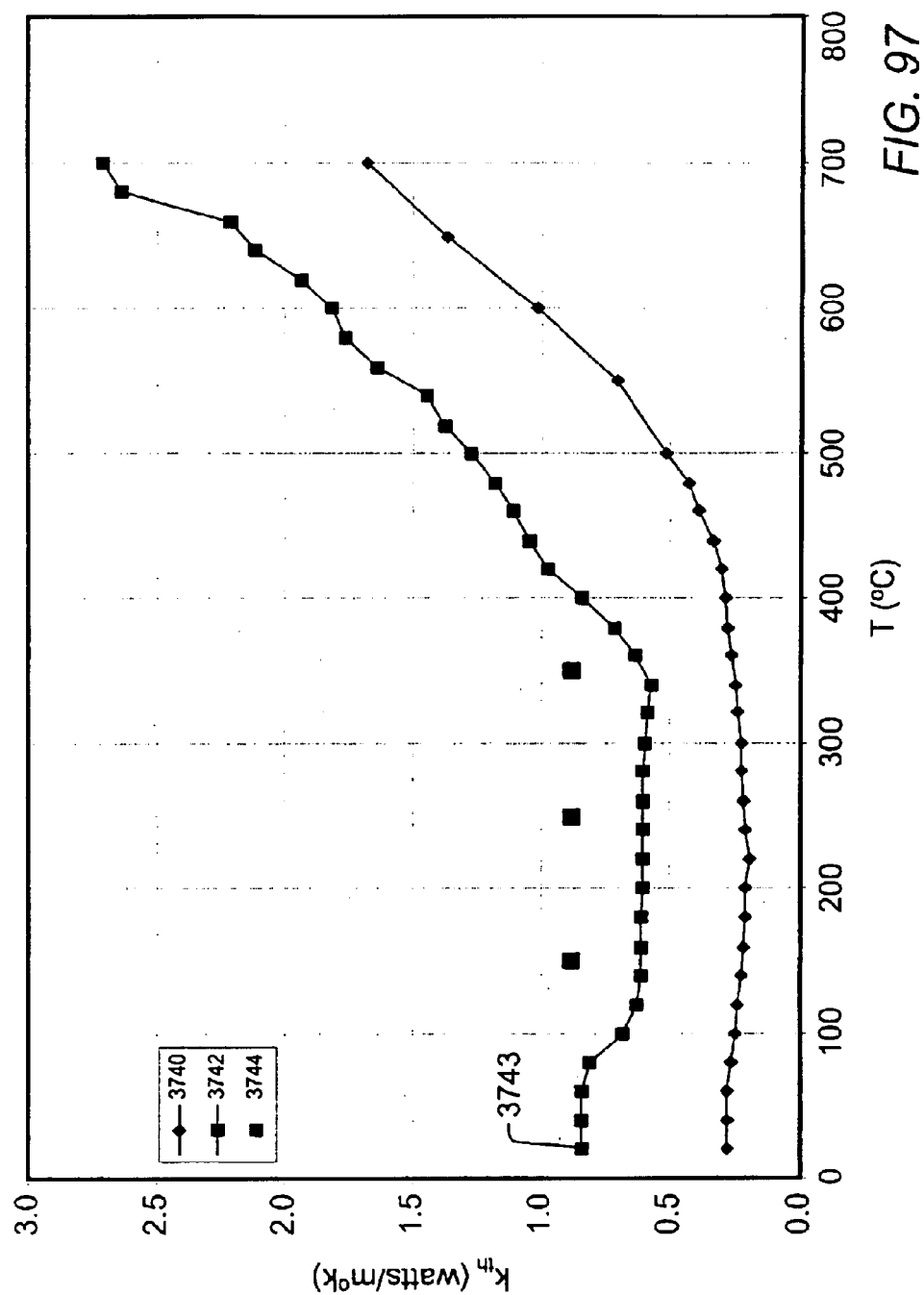
FIG. 97 depicts thermal conductivity of coal versus temperature.

An initial value for thermal conductivity, from the in situ experiment is plotted versus temperature in FIG. 97 (this initial value is point 3743 in FIG. 97). Additional points for thermal conductivity (i.e., all of the other values for line 3742 shown in FIG. 97) were assessed by calculating thermal conductivities using temperature measurements in all of the wells shown in FIG. 99, total heat input from all heaters shown in FIG. 99, measured heat capacity and density, for the coal being treated, gas and liquids production data (e.g., composition, quantity, etc.). etc. For comparison, these assessed thermal conductivity values (see line 3742) were plotted with data reported in two papers from S. Badzioch. et al. (1964) and R. E. Glass (1984) (see line 3740). As illustrated in FIG. 97, the assessed thermal conductivities from the in situ experiment were higher than reported values for thermal conductivities. The difference may be at least partially accounted for if it is assumed that the reported values do not take into consideration the confined nature of the coal in an in situ application. Because the reported values for thermal conductivity of coal are relatively low, they discourage the use of in situ heating for coal.

FIG. 97 illustrates a decrease in the assessed thermal conductivity values 3742 at about 100° C. It is believed that this decrease in thermal conductivity was caused by water vaporizing in the cracks and void spaces (water vapor has a lower thermal conductivity than liquid water). At about 350° C., the thermal conductivity began to increase, and it increased substantially as the temperature increased to 700° C. It is believed that the increases in thermal conductivity were the result of molecular changes in the carbon structure. As the carbon was heated it became more graphitic which is illustrated in Table 2 by an increased vitrinite reflectance after pyrolysis. As void spaces increased due to fluid production, heat was increasingly transferred by radiation and/or convection. In addition, concentrations of hydrogen in the void spaces were raised due to pyrolysis and generation of synthesis gas.

Three data points 3744 of thermal conductivities under high stress were derived from laboratory tests on the same high volatile bituminous C coal used for the in situ field pilot site (see FIG. 97). In the laboratory tests a sample of such coal was stressed from all directions, and heated relatively quickly. These thermal conductivities were determined at higher stress (i.e. 27.6 bars absolute), as compared to the stress in the in situ field pilot (which were about 3 bars absolute). Thermal conductivity values 3744 demonstrate that the application of stress increased the thermal conductivity of the coal at temperatures of 150° C. 250° C. and 350° C. It is believed that higher thermal conductivity values were obtained from stressed coal because the stress closed at least some cracks/void spaces and/or prevented new cracks/void spaces from forming.

Using the reported values for thermal conductivity and thermal diffusivity of coal and a 12 m heat source spacing on an equilateral triangle pattern. calculations show that a heating period of about ten years would be needed to raise an average temperature of coal to about 350° C. Such a heating period may not be economically viable. Using experimental values for thermal conductivity and thermal diffusivity and the same 12 m heat source spacing, calculations show that the heating period to reach an average temperature of 350° C. would be about 3 years. The elimination of about 7 years of heating a formation will in many instances significantly improve the economic viability of an in situ conversion process for coal.

Molecular hydrogen has a relatively high thermal conductivity (e.g., the thermal conductivity of molecular hydrogen is about 6 times the thermal conductivity of nitrogen or air). Therefore it is believed that as the amount of hydrogen in the formation void spaces increases, the thermal conductivity of the formation will also increase. The increases in thermal conductivity due to the presence of hydrogen in the void spaces somewhat offsets decreases in thermal conductivity caused by the void spaces themselves. It is believed that increases in thermal conductivity due to the presence of hydrogen will be larger for coal formations as compared to other hydrocarbon containing formations since the amount of void spaces created during pyrolysis will be larger (coal has a higher hydrocarbon density, so pyrolysis creates more void spaces in coal).

Figure 98:
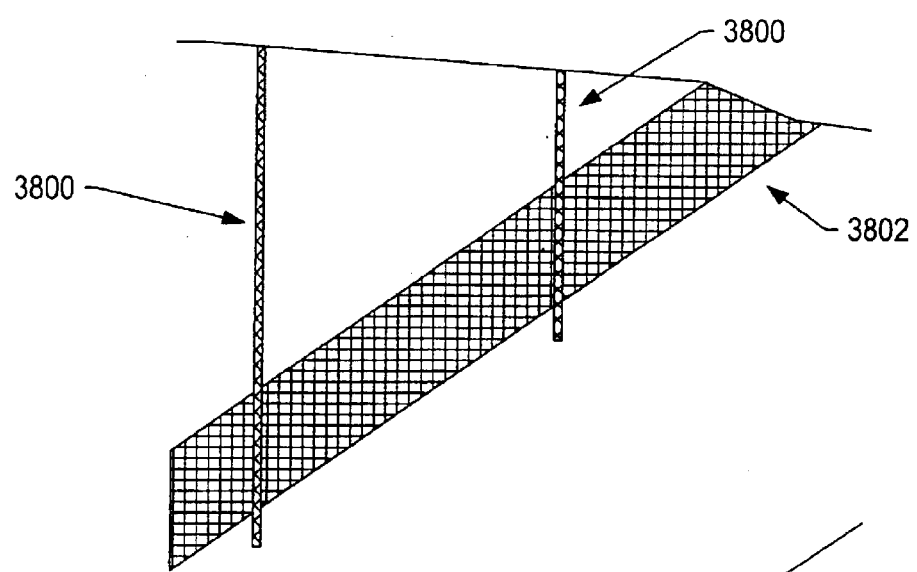
FIG. 98 depicts a cross-sectional view of an in situ experimental field test.
Figure 99:
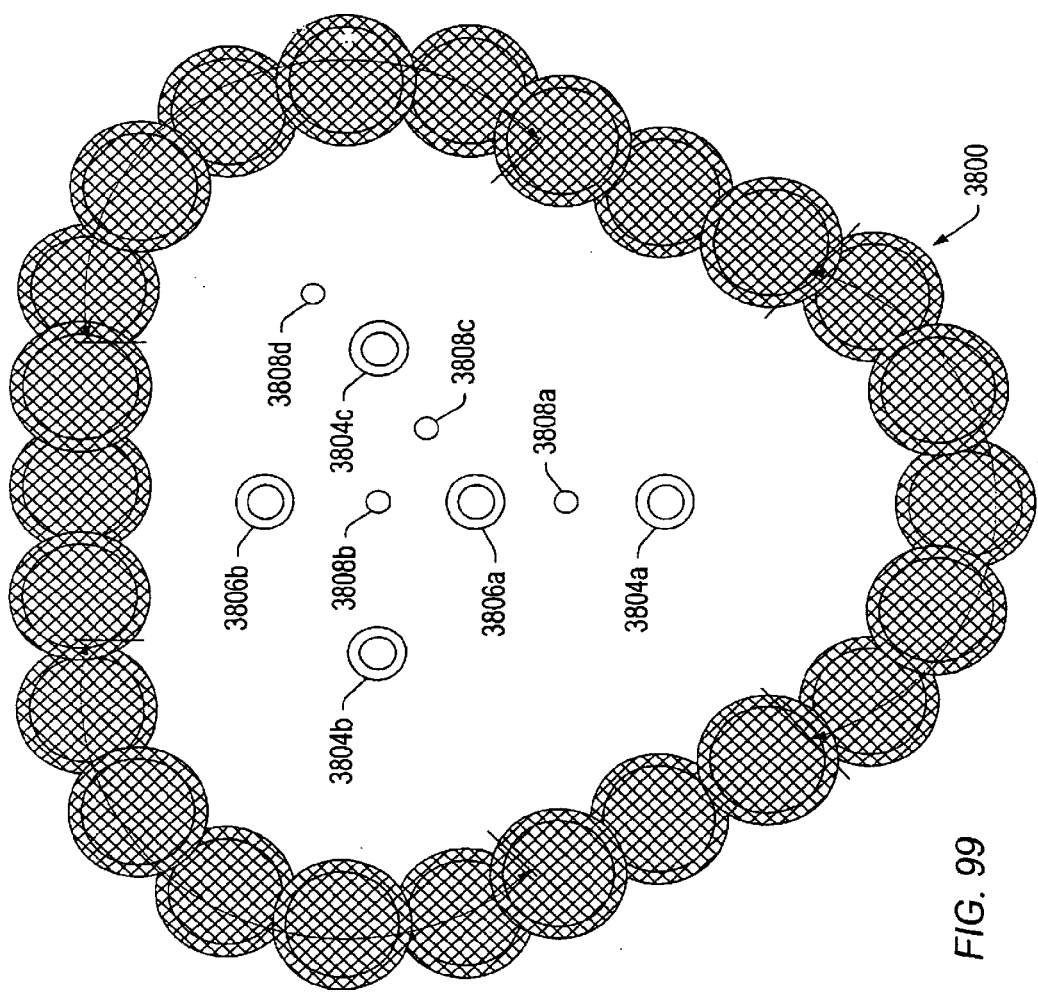
FIG. 99 depicts locations of heat sources and wells in an experimental field test.

Hydrocarbon fluids were produced from a portion of a coal formation by an in situ experiment conducted in a portion of a coal formation. The coal was high volatile bituminous C coal. It was heated with electrical heaters. FIG. 98 illustrates a cross-sectional view of the in situ experimental field test system. As shown in FIG. 98, the experimental field test system included coal formation 3802 within the ground and grout wall 3800. Coal formation 3802 dipped at an angle of approximately 36° with a thickness of approximately 4.9 meters. FIG. 99 illustrates a location of heat sources 3804a, 3804b, 3804c, production wells 3806a, 3806b, and temperature observation wells 3808a, 3808b, 3808c, 3808d used for the experimental field test system. The three heat sources were disposed in a triangular configuration. Production well 3806a was located proximate a center of the heat source pattern and equidistant from each of the heat sources. A second production well 3806b was located outside the heat source pattern and spaced equidistant from the two closest heat sources. Grout wall 3800 was formed around the heat source pattern and the production wells. The grout wall was formed of 24 pillars. Grout wall 3800 was configured to inhibit an influx of water into the portion during the in situ experiment. In addition, grout wall 3800 was configured to substantially inhibit loss of generated hydrocarbon fluids to an unheated portion of the formation.

Figure 100:
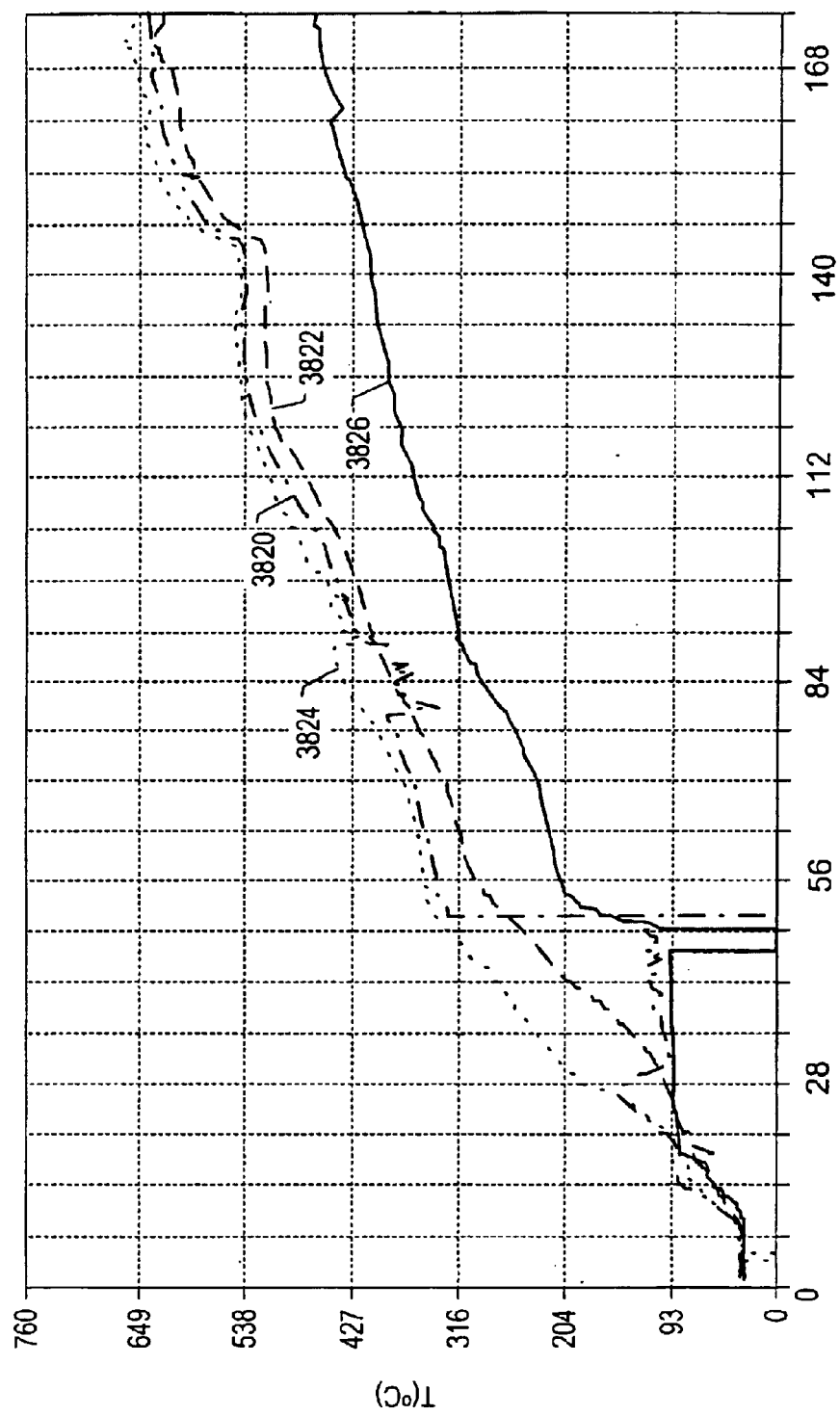
FIG. 100 and FIG. 101 depict temperature versus time in an experimental field test.
Figure 101:
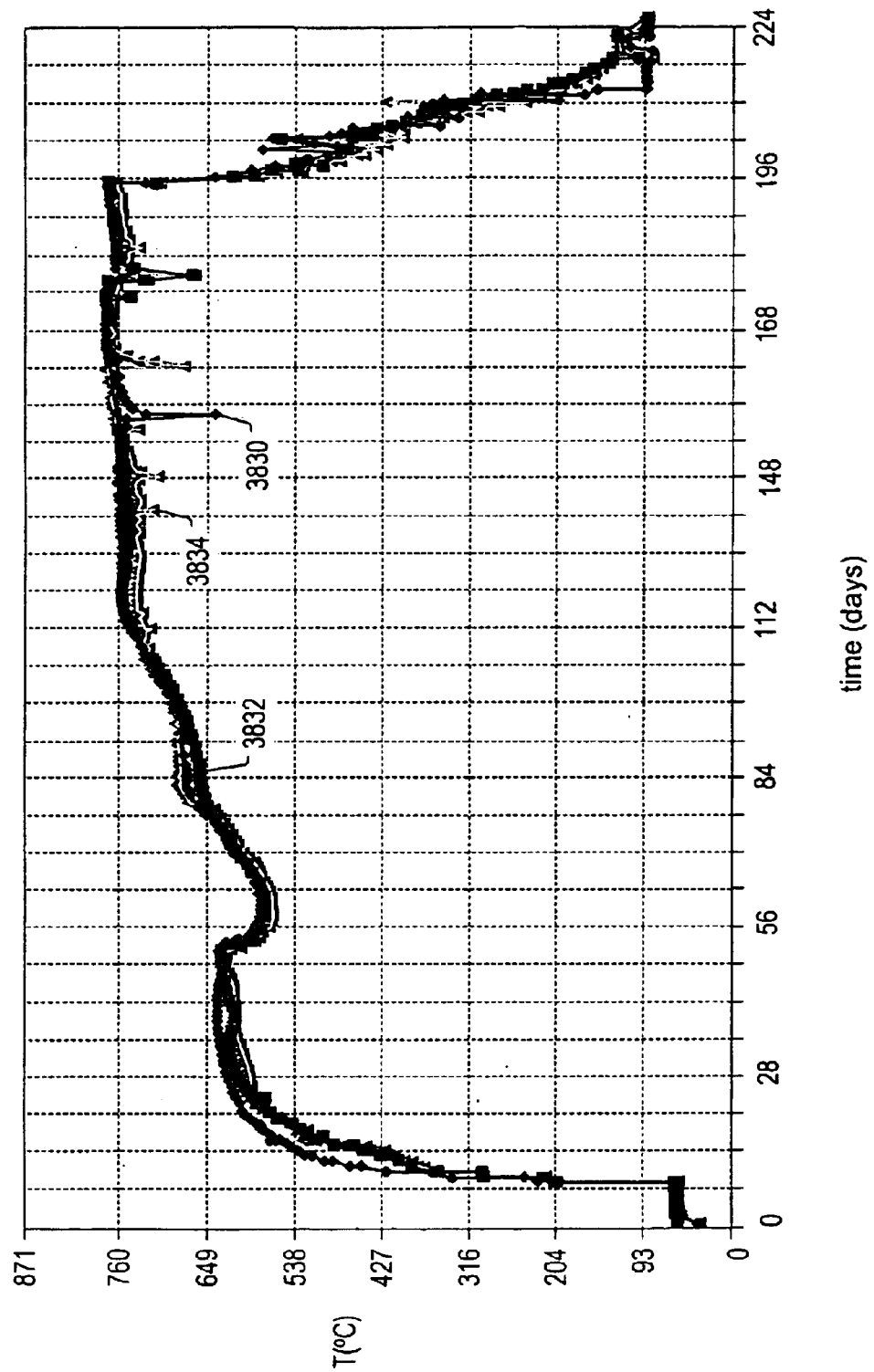

Temperatures were measured at various times during the experiment at each of four temperature observation wells 3808a, 3808b, 3808c, 3808d located within and outside of the heat source pattern as illustrated in FIG. 99. The temperatures measured (in degrees Celsius) at each of the temperature observation wells are displayed in FIG. 100 as a function of time. Temperatures at observation wells 3808a (3820), 3808b (3822), and 3808c (3824) were relatively close to each other. A temperature at temperature observation well 3808d (3826) was significantly colder. This temperature observation well was located outside of the heater well triangle illustrated in FIG. 99. This data demonstrates that in zones where there was little superposition of heat, temperatures were significantly lower. FIG. 101 illustrates temperature profiles measured at the heat sources 3804a (3830), 3804b (3832), and 3804c (3834). The temperature profiles were relatively uniform at the heat sources.

Figure 102:
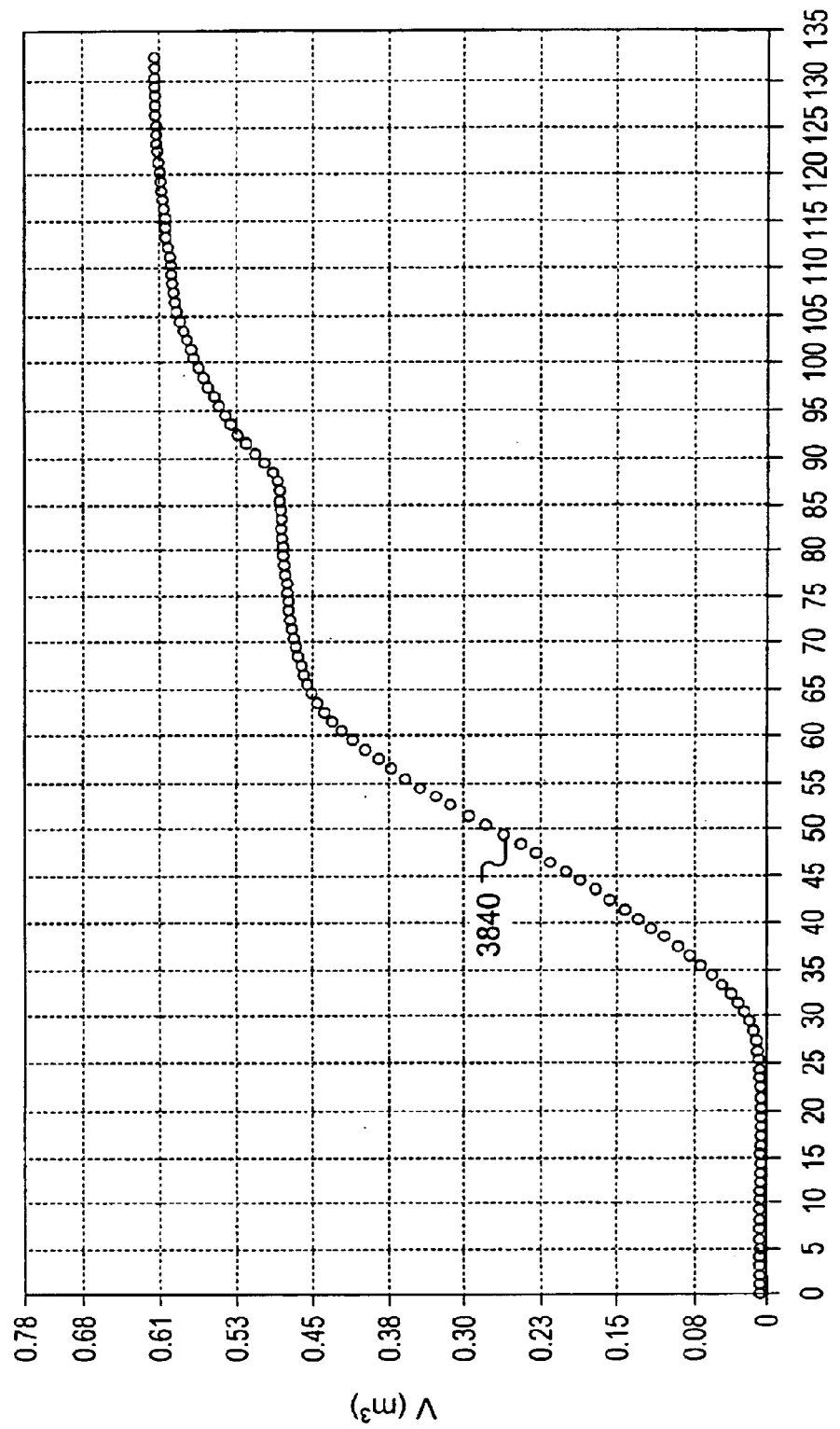
FIG. 102 depicts volume of oil produced from an experimental field test as a function of time.
Figure 111:
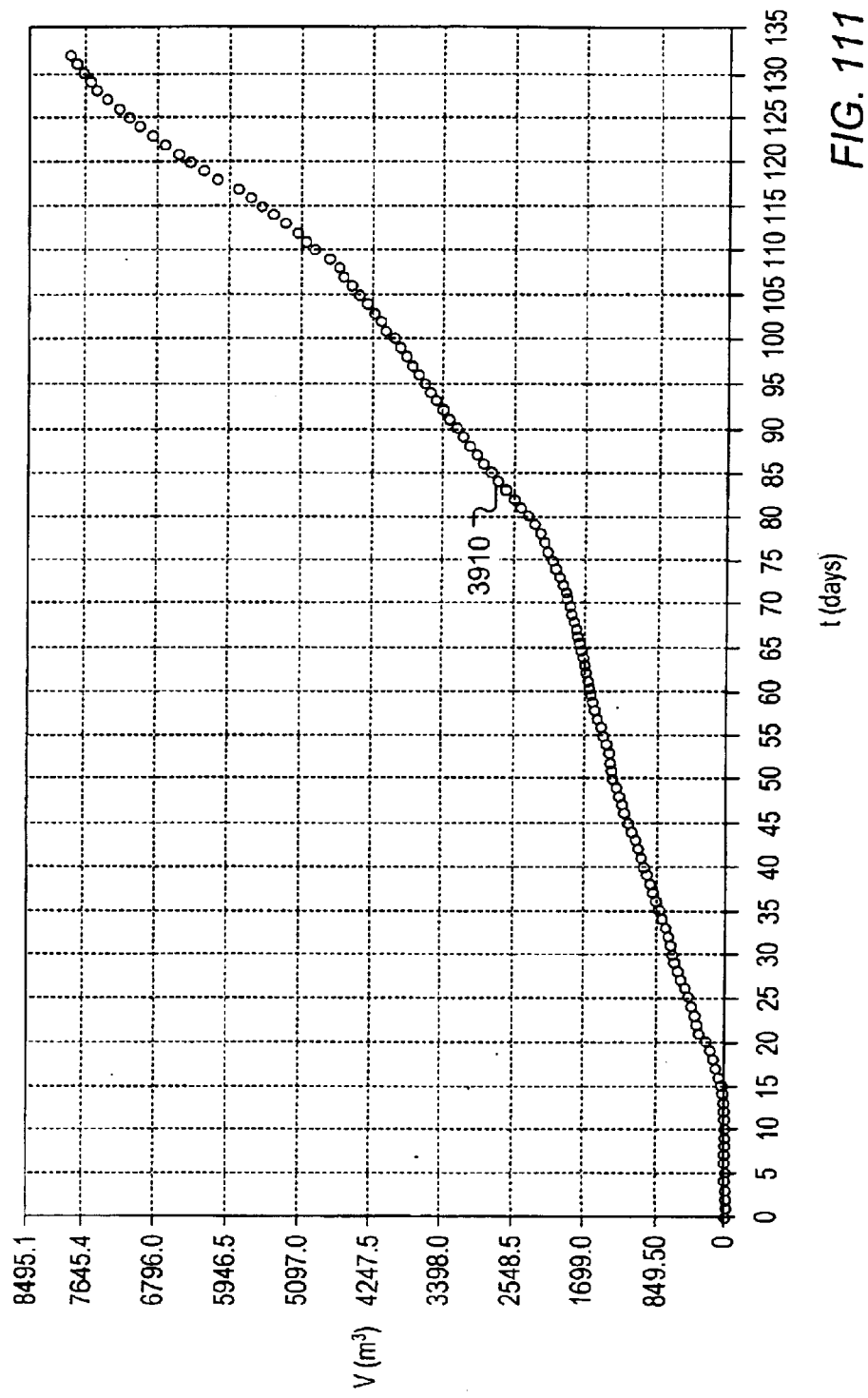
FIG. 111 depicts volume of gas produced from a coal formation in an experimental field test as a function of time.

FIG. 102 illustrates a plot of cumulative volume (m³) of liquid hydrocarbons produced 3840 as a function of time days). FIG. 111 illustrates a plot of cumulative volume of gas produced 3910 in standard cubic feet, produced as a function of time (in days) for the same in situ experiment. Both FIG. 102 and FIG. 111 show the results during the pyrolysis stage only of the in situ experiment.

Figure 103:
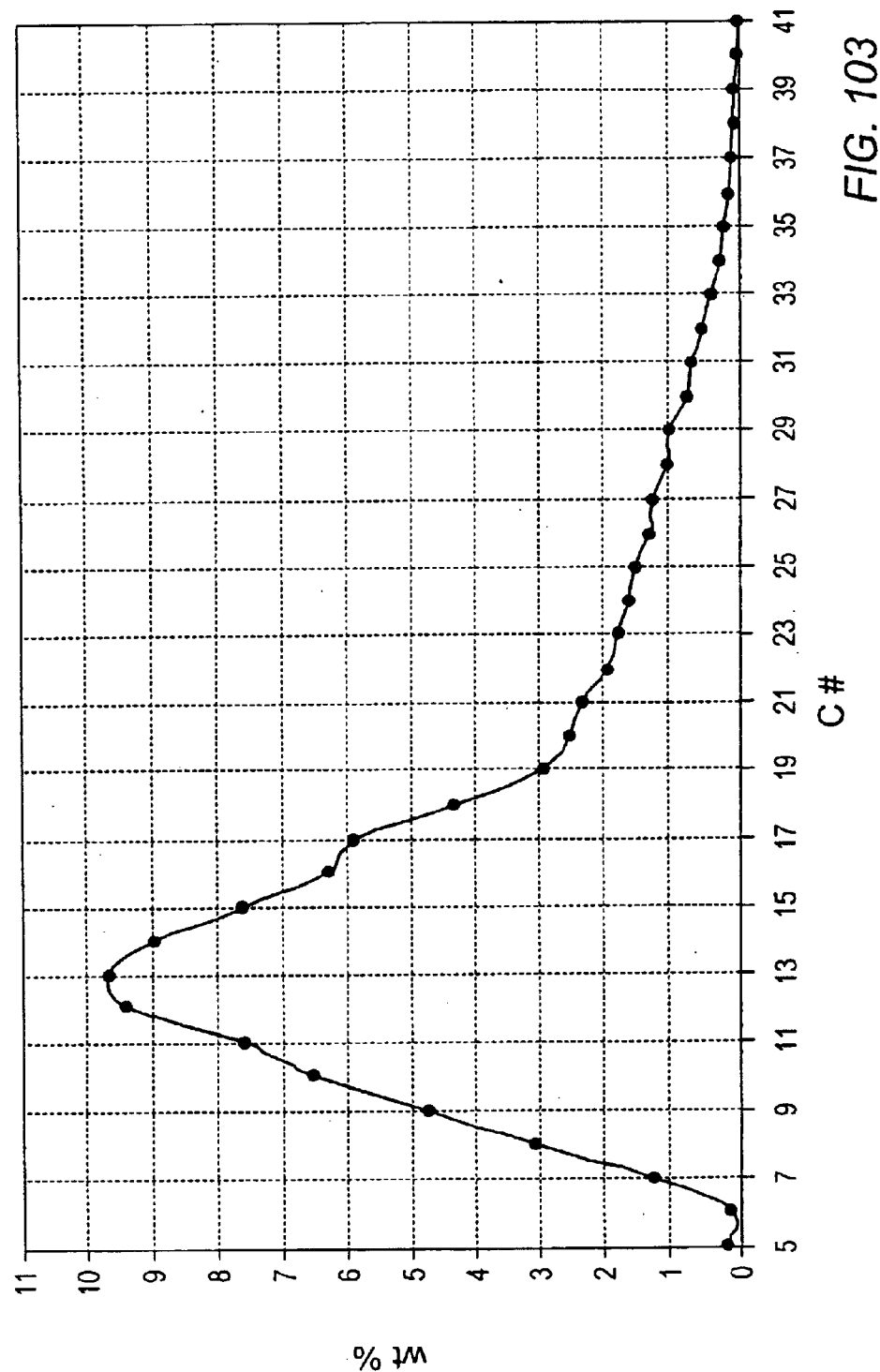
FIG. 103 depicts carbon number distribution of fluids produced from an experimental field test.

FIG. 103 illustrates the carbon number distribution of condensable hydrocarbons that were produced using the low temperature retorting process as described above. As can be seen in FIG. 103, relatively high quality products were produced during treatment. The results in FIG. 103 are consistent with the results set forth in FIG. 108, which show results from heating coal from the same formation in the laboratory for similar ranges of heating rates as were used in situ.

Table 2 illustrates the results from analyzing coal before and after it was treated (including heating the temperatures set forth in as is set forth in FIG. 101 (i.e., after pyrolysis and production of synthesis gas) as described above. The coal was cored at about 11–11.3 meters from the surface, midway into the coal bed, in both the "before treatment" and "after treatment" examples. Both cores were taken at about the same location. Both cores were taken at about 0.66 meters from well 3804c (between the grout wall and well 3804c) in FIG. 99. In the following Table 2 "FA" means Fisher Assay, "as rec'd" means the sample was tested as it was received and without any further treatment, "Py-Water" means the water produced during pyrolysis, "H/C Atomic Ratio" means the atomic ratio of hydrogen to carbon, "daf" means "dry ash free," "dmmf" means "dry mineral matter free," and "mmf" means "mineral matter free." The specific gravity of the "after treatment" core sample was approximately 0.85 whereas the specific gravity of the "before treatment" core sample was approximately 1.35.

TABLE 2

| Analysis | Before Treatment | After Treatment |
| --- | --- | --- |
| % Vitrinite Reflectance | 0.54 | 5.16 |
| FA (gal/ton, as-rec'd) | 11.81 | 0.17 |
| FA (wt %, as rec'd) | 6.10 | 0.61 |
| FA Py-Water (gal/ton, as-rec'd) | 10.54 | 2.22 |
| H/C Atomic Ratio | 0.85 | 0.06 |
| H (wt %, daf) | 5.31 | 0.44 |
| O (wt %, daf) | 17.08 | 3.06 |
| N (wt %, daf) | 1.43 | 1.35 |
| Ash (wt %, as rec'd) | 32.72 | 56.50 |
| Fixed Carbon (wt %, dmmf) | 54.45 | 94.43 |
| Volatile Matter (wt %, dmmf) | 45.55 | 5.57 |
| Heating Value (Btu/lb, moist, mmf) | 12048 | 14281 |

Even though the cores were taken outside the areas within the triangle formed by the three heaters in FIG. 99, nevertheless the cores demonstrate that the coal remaining in the formation changed significantly during treatment. The vitrinite reflectance results shown in Table 2 demonstrate that the rank of the coal remaining in the formation changed substantially during treatment. The coal was a high volatile bituminous C coal before treatment. After treatment, however, the coal was essentially anthracite. The Fischer Assay results shown in Table 2 demonstrate that most of the hydrocarbons in the coal had been removed during treatment. The H/C Atomic Ratio demonstrates that most of the hydrogen in the coal had been removed during treatment. A significant amount of nitrogen and ash was left in the formation.

In sum, the results shown in Table 2 demonstrate that a significant amount of hydrocarbons and hydrogen were removed during treatment of the coal by pyrolysis and generation of synthesis gas. Significant amounts of undesirable products (ash and nitrogen) remain in the formation, while the significant amounts of desirable products (e.g., condensable hydrocarbons and gas) were removed.

Figure 104:
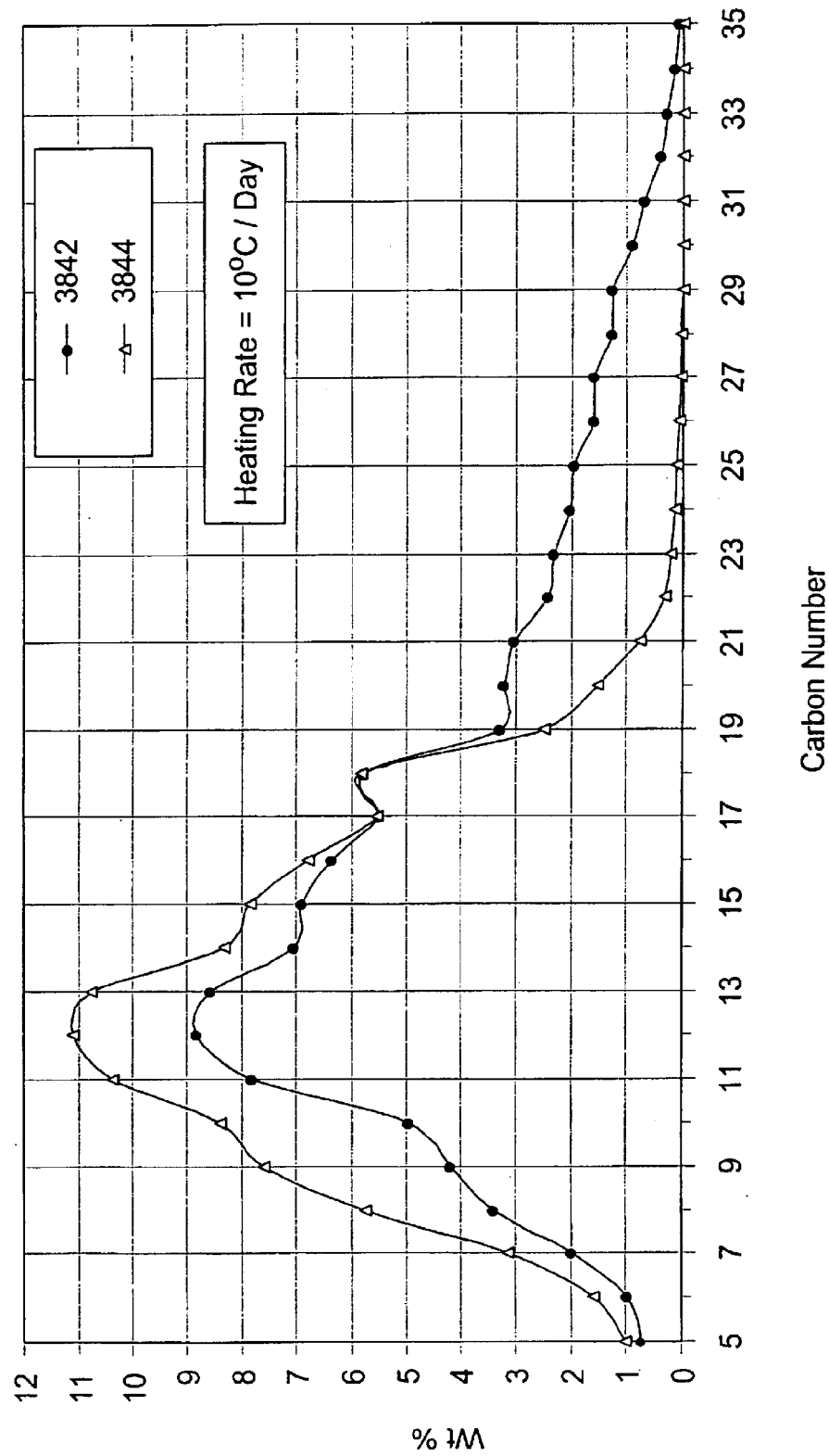
FIG. 104 depicts weight percent of a hydrocarbon produced from two laboratory experiments on coal from the field test site versus carbon number distribution.

FIG. 104 illustrates a plot of weight percent of a hydrocarbon produced versus carbon number distribution for two laboratory experiments on coal from the field experiment site. The coal was high volatile bituminous C coal. As shown in FIG. 104, a carbon number distribution of fluids produced from a formation varied depending on, for example, pressure. For example, first pressure 3842 was about 1 bar absolute and second pressure 3844 was about 8 bars absolute. The laboratory carbon number distribution shown in FIG. 104 was similar to that produced in the field experiment in FIG. 103 also at 1 bar absolute. As shown in FIG. 104, as pressure increased, a range of carbon numbers of the hydrocarbon fluids decreased. An increase in products having carbon numbers less than 20 was observed when operating at 8 bars absolute. Increasing the pressure from 1 bar absolute to 8 bars absolute also increased an API gravity of the condensed hydrocarbon fluids. The API gravities of condensed hydrocarbon fluids produced were approximately 23.1° and approximately 31.3° respectively. Such an increase in API gravity represents increased production of more valuable products.

Figure 105:
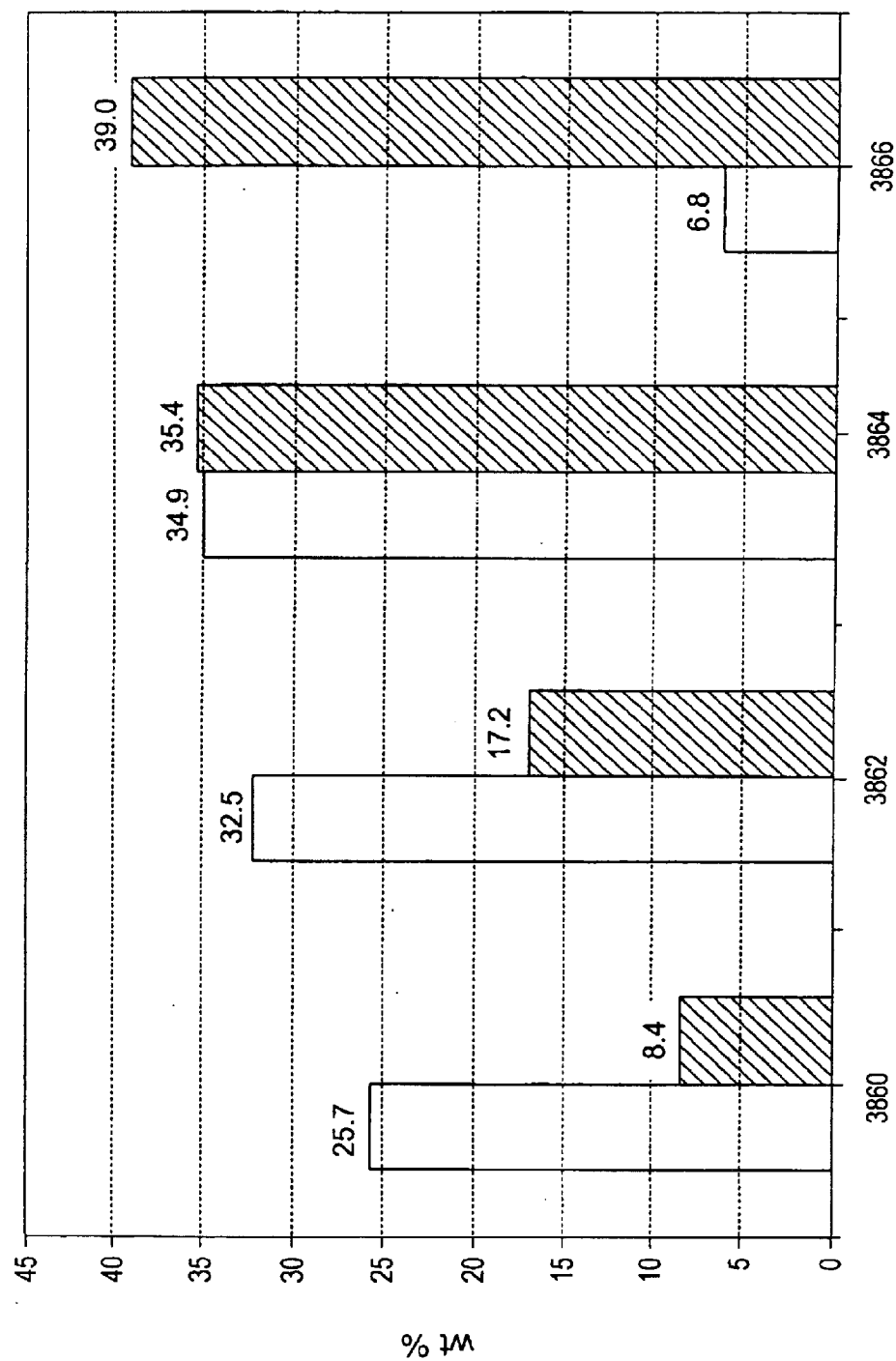
FIG. 105 depicts fractions from separation of coal oils treated by Fischer assay and treated by slow heating in a coal cube experiment.

FIG. 105 illustrates a bar graph of fractions from a boiling point separation of hydrocarbon liquids generated by a Fischer assay and a boiling point separation of hydrocarbon liquids from the coal cube experiment described herein (see, e.g., the system shown in FIG. 91). The experiment was conducted at a much slower heating rate (2 degrees Celsius per day) and the oil produced at a lower final temperature than the Fischer Assay. FIG. 105 shows the weight percent of various boiling point cuts of hydrocarbon liquids produced from a Fruitland high volatile bituminous B coal. Different boiling point cuts may represent different hydrocarbon fluid compositions. The boiling point cuts illustrated include naphtha 3860 (initial boiling point to 166° C.), jet fuel 3862 (166° C. to 249° C.), diesel 3864 (249° C. to 370° C.), and bottoms 3866 (boiling point greater than 370° C.). The hydrocarbon liquids from the coal cube were substantially more valuable products. The API gravity of such hydrocarbon liquids was significantly greater than the API gravity of the Fischer Assay liquid. The hydrocarbon liquids from the coal cube also included significantly less residual bottoms than were produced from the Fischer Assay hydrocarbon liquids.

Figure 106:
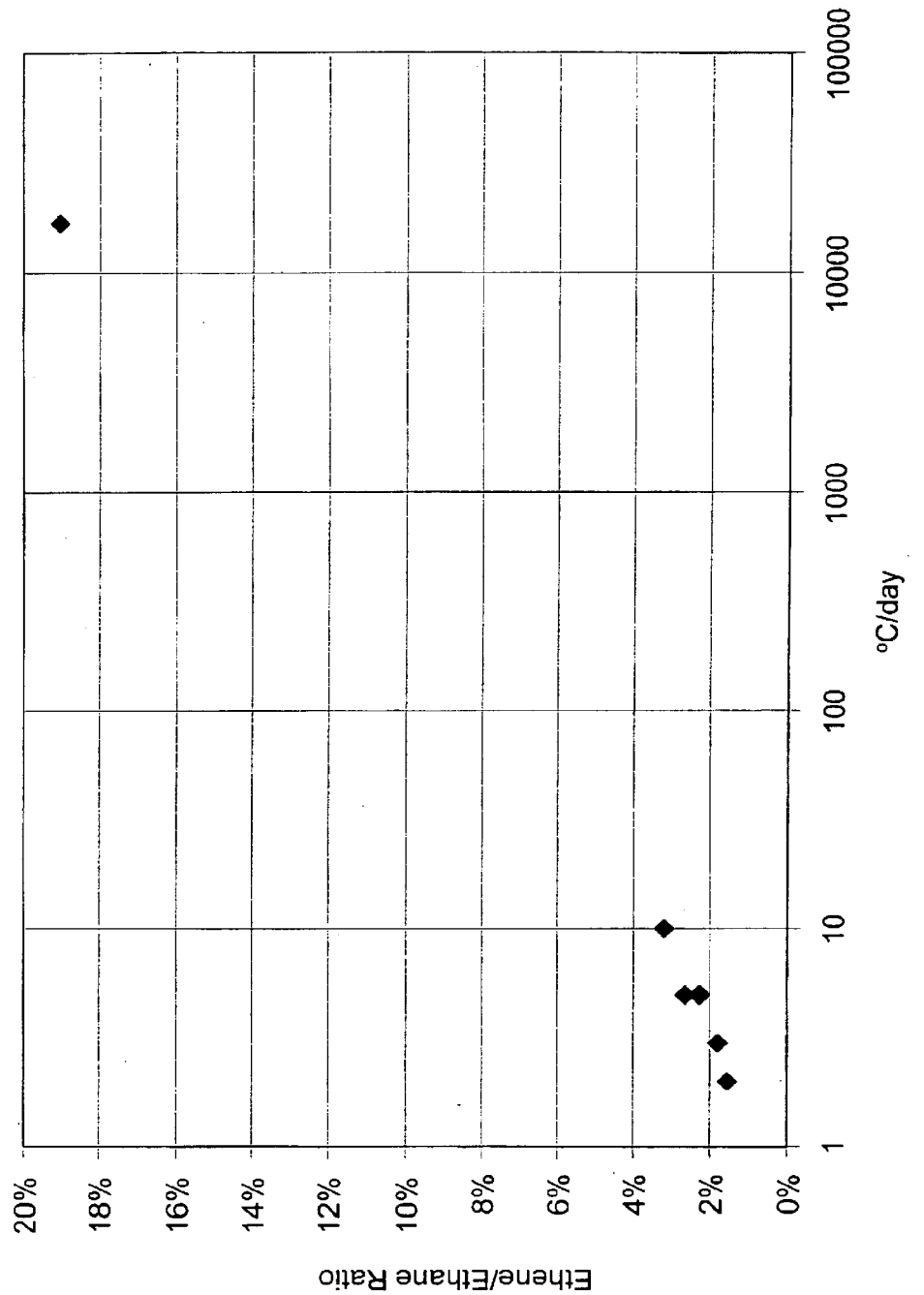
FIG. 106 depicts percentage ethene to ethane produced from a coal formation as a function of heating rate in a laboratory test.

FIG. 106 illustrates a plot of percentage ethene, which is an olefin, to ethane produced from a coal formation as a function of heating rate. Data points were derived from laboratory experimental data (see system shown in FIG. 74 and associated text) for slow, heating of high volatile bituminous C coal at atmospheric pressure, and from Fischer assay results. As illustrated in FIG. 106, the ratio of ethene to ethane increased as the heating rate increased. As such, it is believed that decreasing the heating rate of coal will decrease production of olefins. The heating rate of a formation may be determined in part by the spacings of heat sources within the formation, and by the amount of heat that is transferred from the heat sources to the formation.

Formation pressure may also have a significant effect on olefin production. A high formation pressure may tend to result in the production of small quantities of olefins. High pressure within a formation may result in a high $H_2$ partial pressure within the formation. The high $H_2$ partial pressure may result in hydrogenation of the fluid within the formation. Hydrogenation may result in a reduction of olefins in a fluid produced from the formation. A high pressure and high $H_2$ partial pressure may also result in inhibition of aromatization of hydrocarbons within the formation. Aromatization may include formation of aromatic and cyclic compounds from alkanes and/or alkenes within a hydrocarbon mixture. If it is desirable to increase production of olefins from a formation, the olefin content of fluid produced from the formation may be increased by reducing pressure within the formation. The pressure may be reduced by drawing off a larger quantity of formation fluid from a portion of the formation that is being produced. The pressure may be reduced by drawing a vacuum on the portion of the formation being produced.

Figure 74:
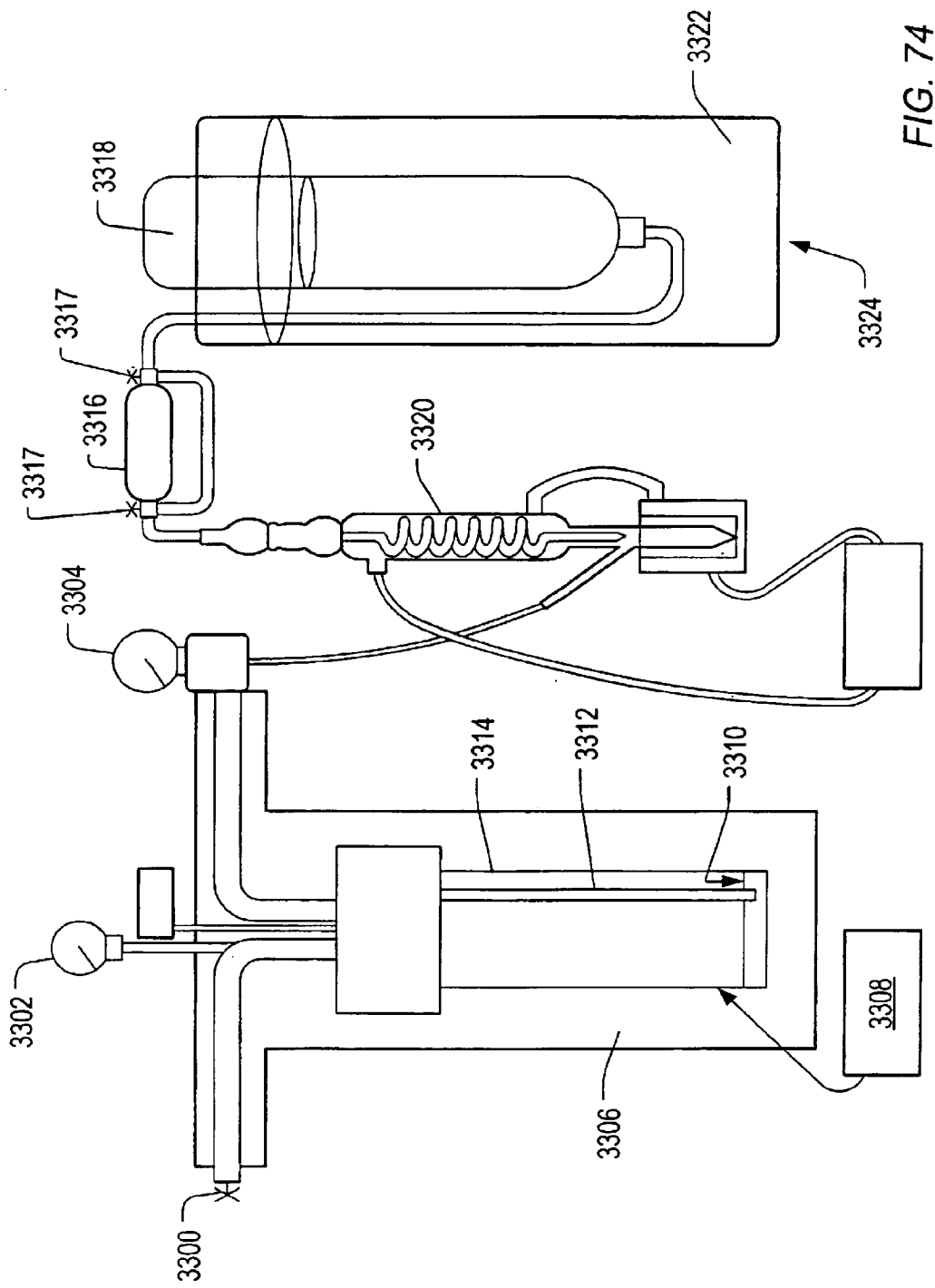
FIG. 74 depicts a retort and collection system.
Figure 76:
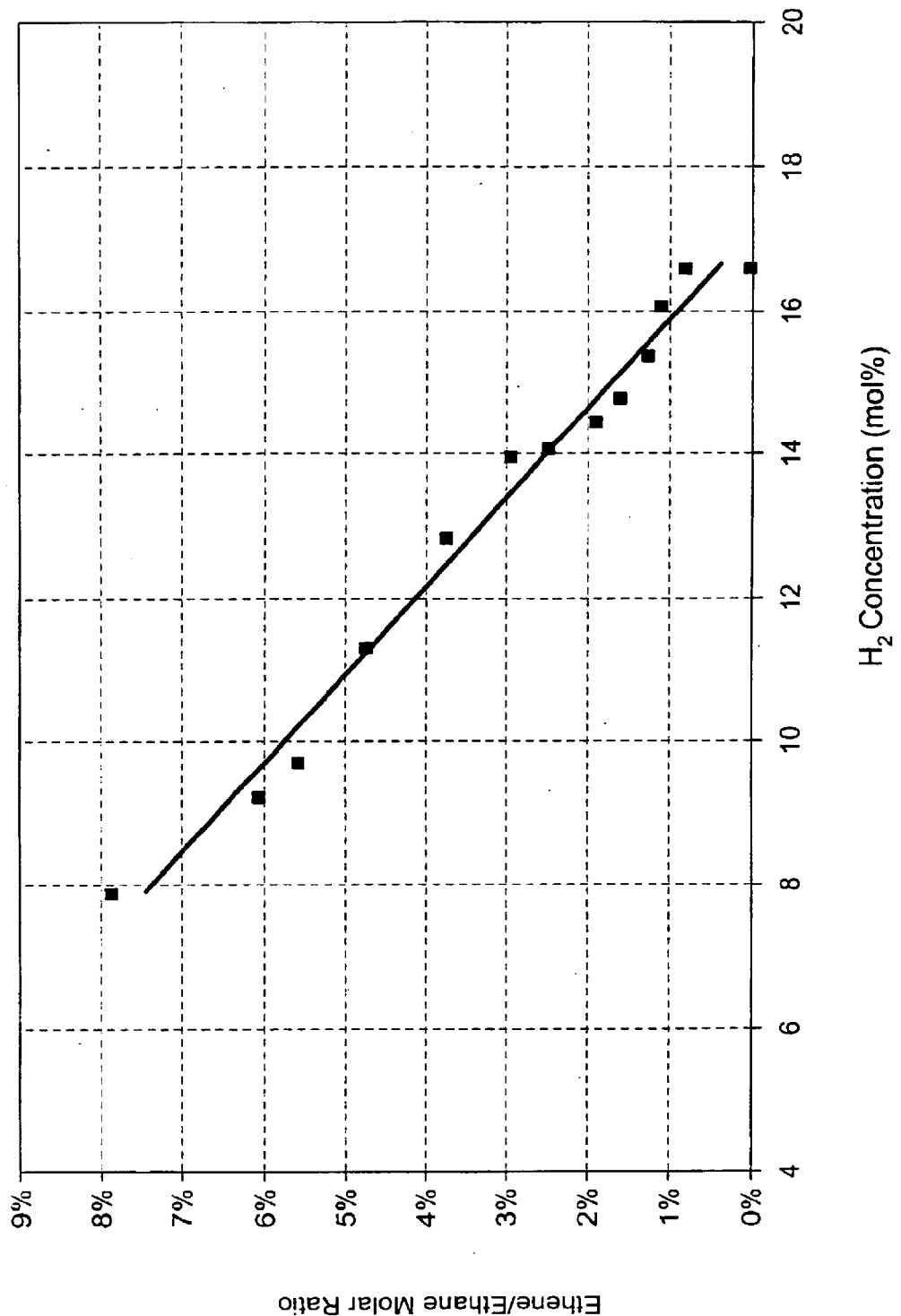
FIG. 76 depicts a plot of ethene to ethane ratio versus hydrogen concentration.

The system depicted in FIG. 74, and the method of using such system, was used to conduct experiments on high volatile bituminous C coal when such coal was heated at 5° C./day at atmospheric pressure. FIG. 76 depicts certain data points from such experiment (the line depicted in FIG. 76 was produced from a linear regression analysis of such data points). FIG. 76 illustrates the ethene to ethane molar ratio as a function of hydrogen molar concentration in non-condensable hydrocarbons produced from the coal during the experiment. The ethene to ethane ratio in the non-condensable hydrocarbons is reflective of olefin content in all hydrocarbons produced from the coal. As can be seen in FIG. 76, as the concentration of hydrogen autogenously increased during pyrolsis, the ratio of ethene to ethane decreased. It is believed that increases in the concentration (and partial pressure) of hydrogen during pyrolysis causes the olefin concentration to decrease in the fluids produced from pyrolysis.

Figure 107:
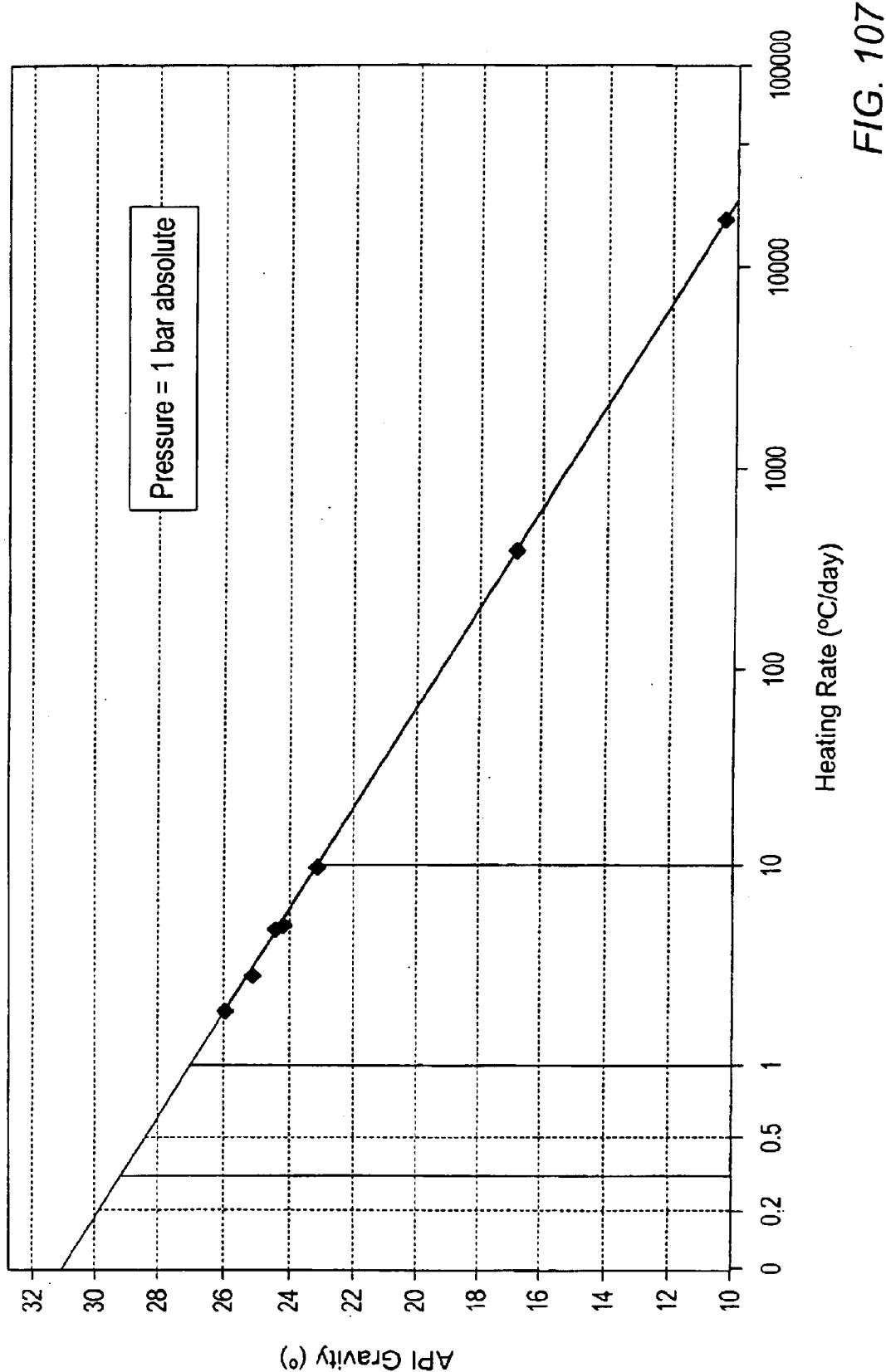
FIG. 107 depicts product quality of fluids produced from a coal formation as a function of heating rate in a laboratory test.

FIG. 107 illustrates product quality, as measured by API gravity, as a function of rate of temperature increase of fluids produced from high volatile bituminous "C" coal. Data points were derived from Fischer assay data and from laboratory experiments. For the Fischer assay data, the rate of temperature increase was approximately 17.100° C./day and the resulting API gravity was less than 11°. For the relatively slow laboratory experiments, the rate of temperature increase ranged from about 2° C./day to about 10° C./day, and the resulting API gravities ranged from about 23° to about 26°. A substantially linear decrease in quality (decrease in API gravity) was exhibited as the logarithmic heating rate increased.

Figure 108:
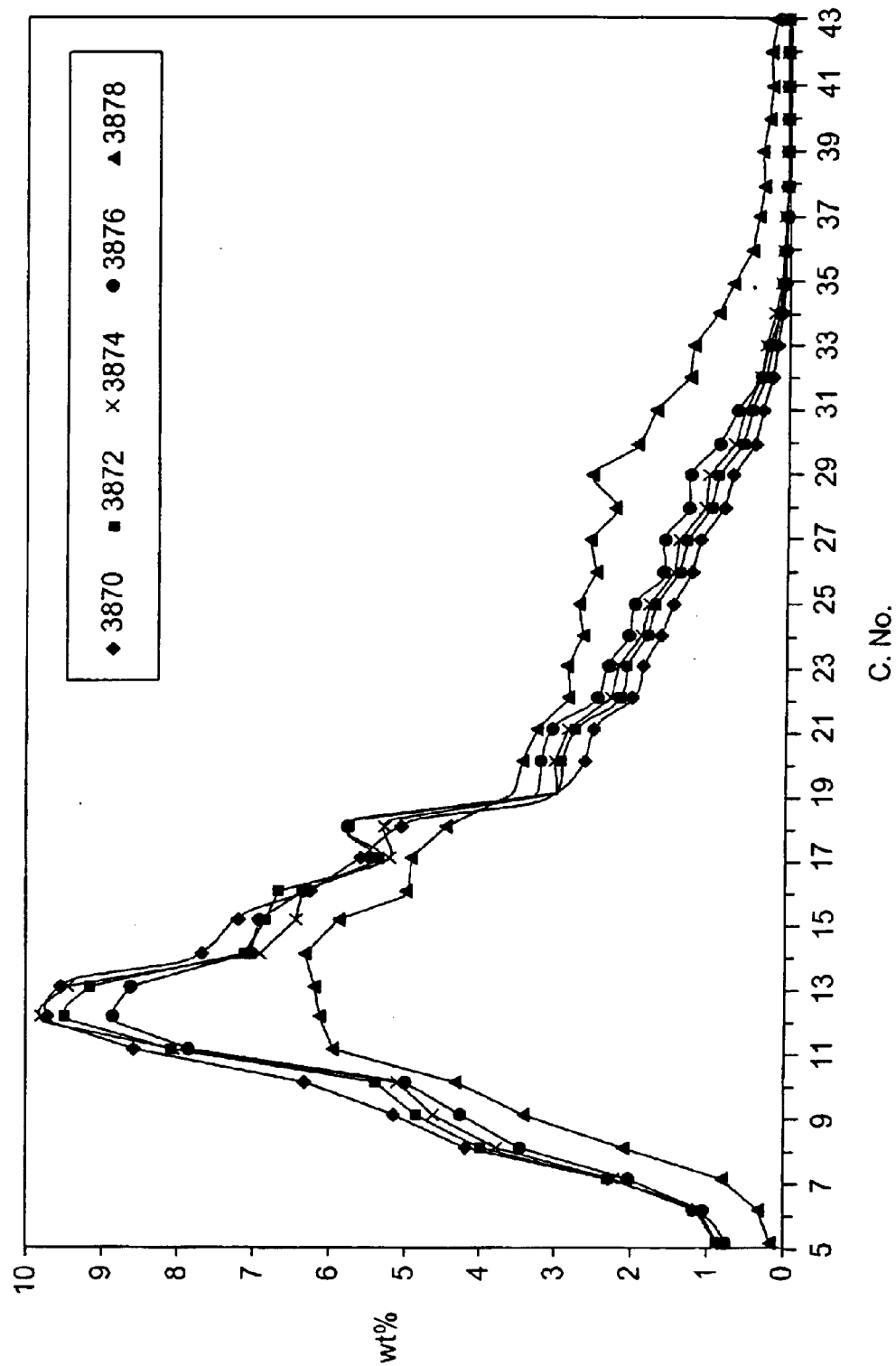
FIG. 108 depicts weight percentages of various fluids produced from a coal formation for various heating rates in a laboratory test.

FIG. 108 illustrates weight percentages of various carbon numbers products removed from high volatile bituminous "C" coal when coal is heated at various heating rates. Data points were derived from laboratory experiments and a Fischer assay. Curves for heating at a rate of 2° C./day 3870, 3° C./day 3872, 5° C./day 3874, and 10° C./day 3876 provided for similar carbon number distributions in the produced fluids. A coal sample was also heated in a Fischer assay test at a rate of about 17,100° C./day. The data from the Fischer assay test is indicated by reference numeral 3878. Slow heating rates resulted in less production of components having carbon numbers greater than 20 as compared to the Fischer assay results 3878. Lower heating rates also produced higher weight percentages of components with carbon numbers less than 20. The lower heating rates produced large amounts of components having carbon numbers near 12. A peak in carbon number distribution near 12 is typical of the in situ conversion process for coal and oil shale.

Figure 109:
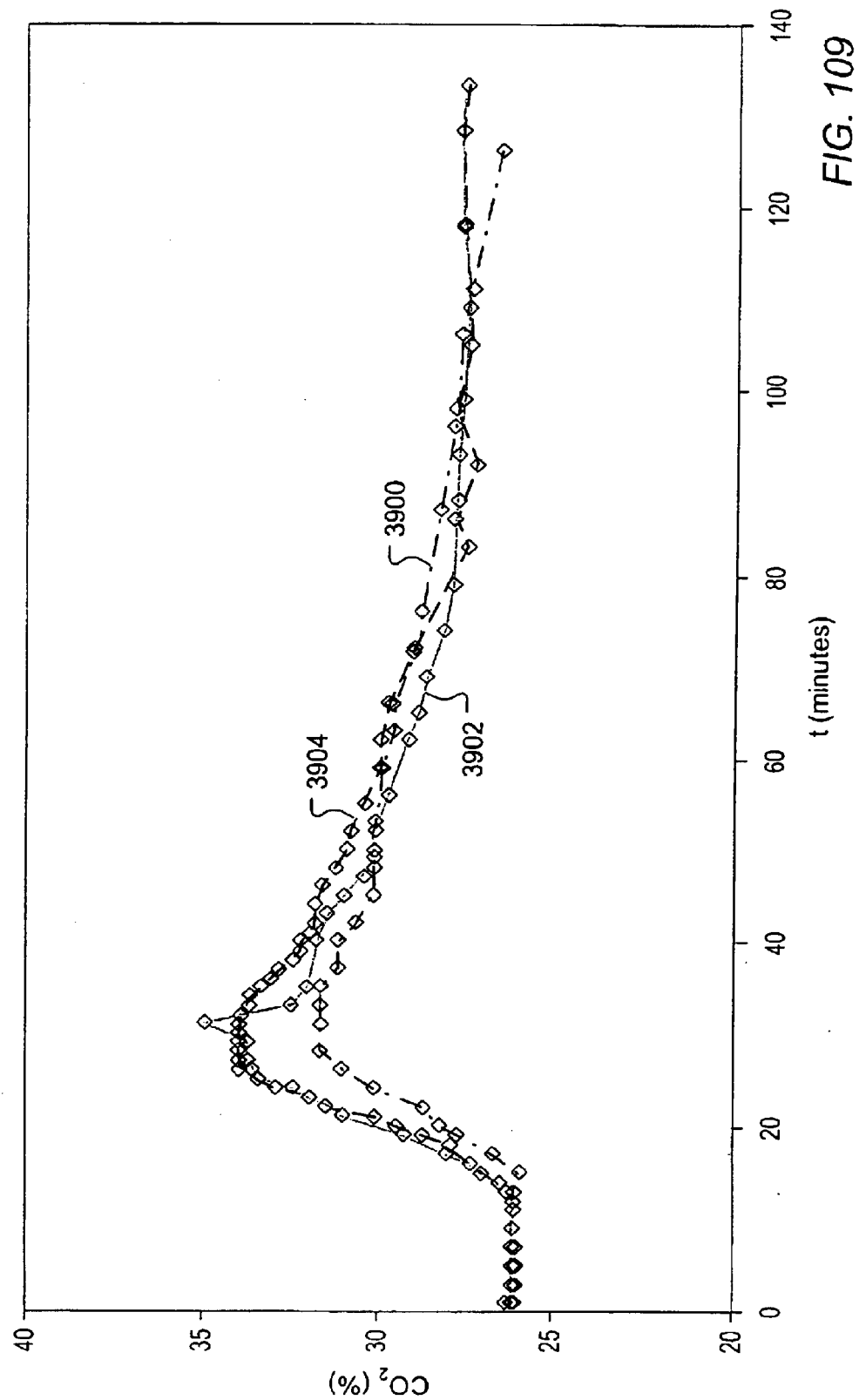
FIG. 109 depicts $CO_2$ produced at three different locations versus time in an experimental field test.

An experiment was conducted on the coal formation treated according to the in situ conversion process to measure the uniform permeability of the formation after pyrolysis. After heating a portion of the coal formation, a ten minute pulse of $CO_2$ was injected into the formation at first production well 3806a and produced at well 3804a, as shown in FIG. 99. The $CO_2$ tracer test was repeated from production well 3806a to well 3804b and from production well 3806a to well 3804c. As described above, each of the three different heat sources were located equidistant from the production well. The $CO_2$ was injected at a rate of 4.08 $m^3/h$ (144 standard cubic feet per hour). As illustrated in FIG. 109, the $CO_2$ reached each of the three different heat sources at approximately the same time. Line 3900 illustrates production of $CO_2$ at heat source 3804a, line 3902 illustrates production of $CO_2$ at heat source 3804b, and line 3904 illustrates production of $CO_2$ at heat source 3804c. As shown in FIG. 111, yield of $CO_2$ 3910 from each of the three different wells was also approximately equal over time. Such approximately equivalent transfer of a tracer pulse of $CO_2$ through the formation and yield of $CO_2$ from the formation indicated that the formation was substantially uniformly permeable. The fact that the first $CO_2$ arrival only occurs approximately 18 minutes after start of the $CO_2$ pulse indicates that no preferential paths had been created between well 3806a and wells 3804a, 3804b, and 3804c.

The in situ permeability was measured by injecting a gas between different wells after the pyrolysis and synthesis gas formation stages were complete. The measured permeability varied from about 4.5 darcy to 39 darcy (with an average of about 20 darcy), thereby indicating that the permeability was high and relatively uniform. The before-treatment permeability was only about 50 millidarcy.

Figure 110:
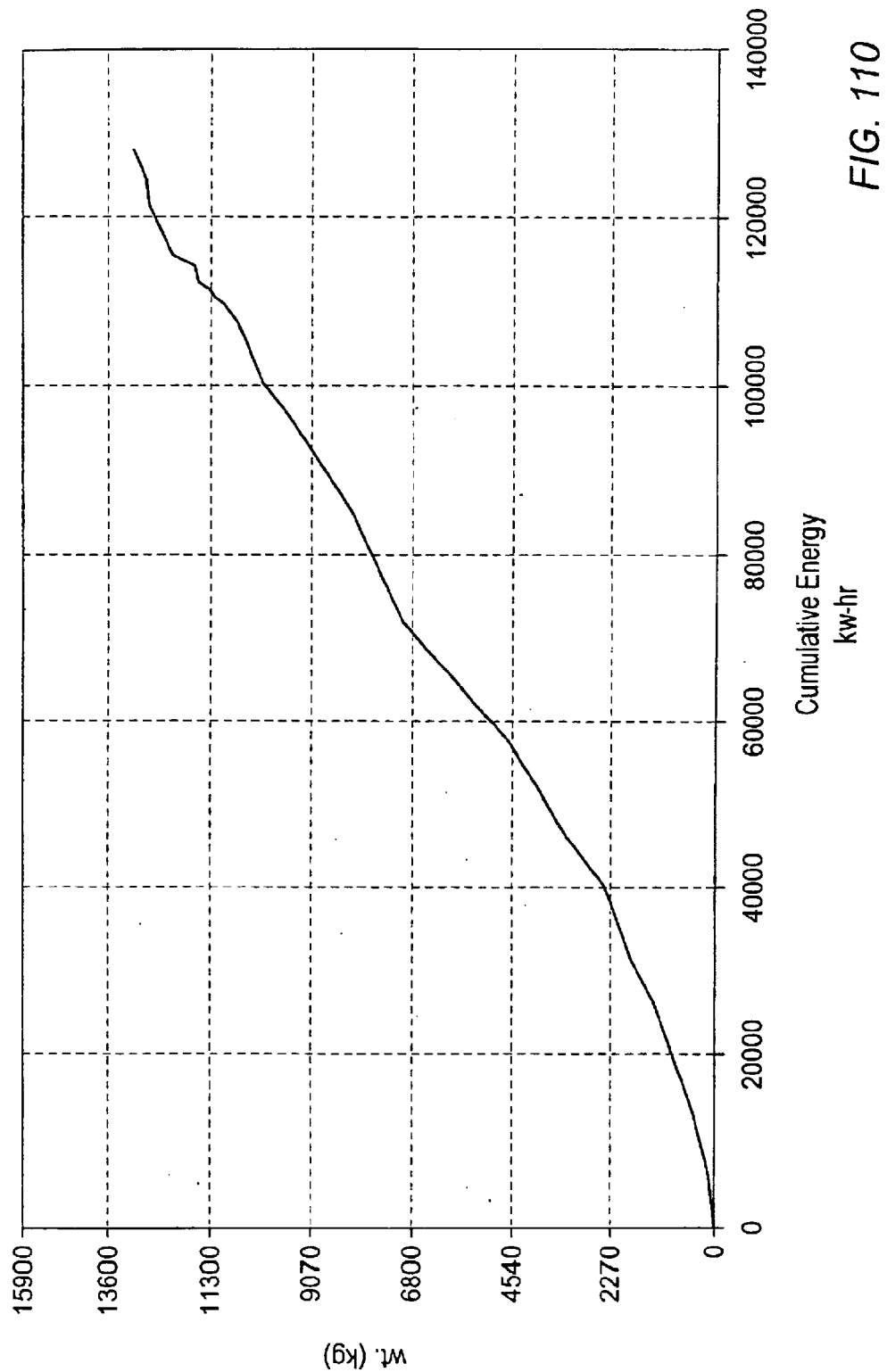
FIG. 110 depicts volatiles produced from a coal formation in an experimental field test versus cumulative energy content.

Synthesis gas was also produced in an in situ experiment from the portion of the coal formation shown in FIG. 98 and FIG. 99. In this experiment, heater wells were also configured to inject fluids. FIG. 110 is a plot of weight of produced volatiles (oil and noncondensable gas) in kilograms as a function of cumulative energy input in kilowatt hours with regard to the in situ experimental field test. The figure illustrates the quantity and energy content of pyrolysis fluids and synthesis gas produced from the formation.

Figure 112:
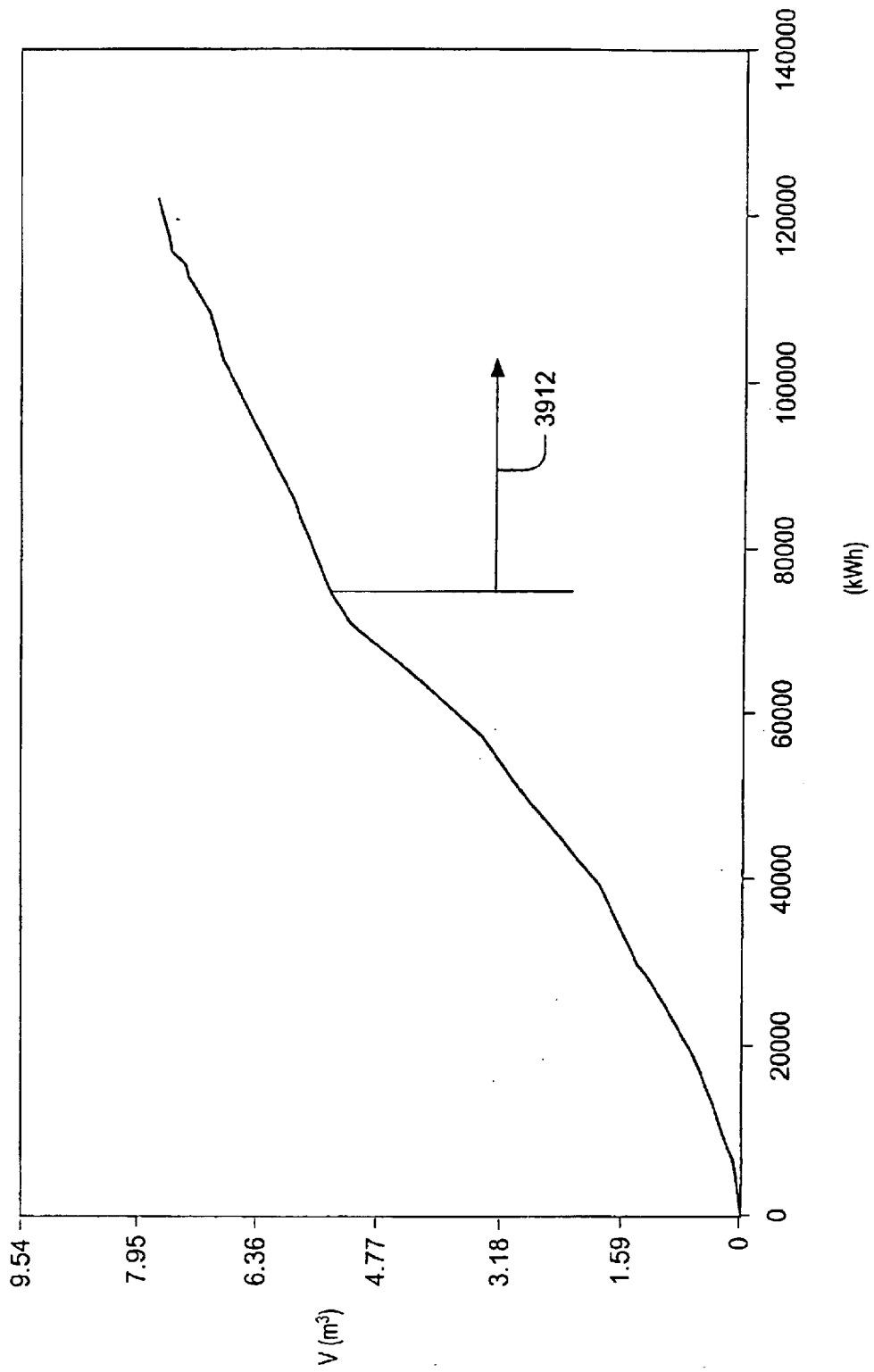
FIG. 112 depicts volume of oil produced from a coal formation in an experimental field test as a function of energy input.

FIG. 112 is a plot of the volume of oil equivalent produced ($m^3$) as a function of energy input into the coal formation (kW·hr) from the experimental field test. The volume of oil equivalent in cubic meters was determined by converting the energy content of the volume of produced oil plus gas to a volume of oil with the same energy content.

The start of synthesis gas production, indicated by arrow 3912, was at an energy input of approximately 77,000 kW·hr. The average coal temperature in the pyrolysis region had been raised to 620° C. Because the average slope of the curve in FIG. 112 in the pyrolysis region is greater than the average slope of the curve in the synthesis gas region. FIG. 112 illustrates that the amount of useable energy contained in the produced synthesis gas is less than that contained in the pyrolysis fluids. Therefore, synthesis gas production is less energy efficient than pyrolysis. There are two reasons for this result. First, the two $H_2$ molecules produced in the synthesis gas reaction have a lower energy content than low carbon number hydrocarbons produced in pyrolysis. Second, the endothermic synthesis gas reaction consumes energy.

Figure 113:
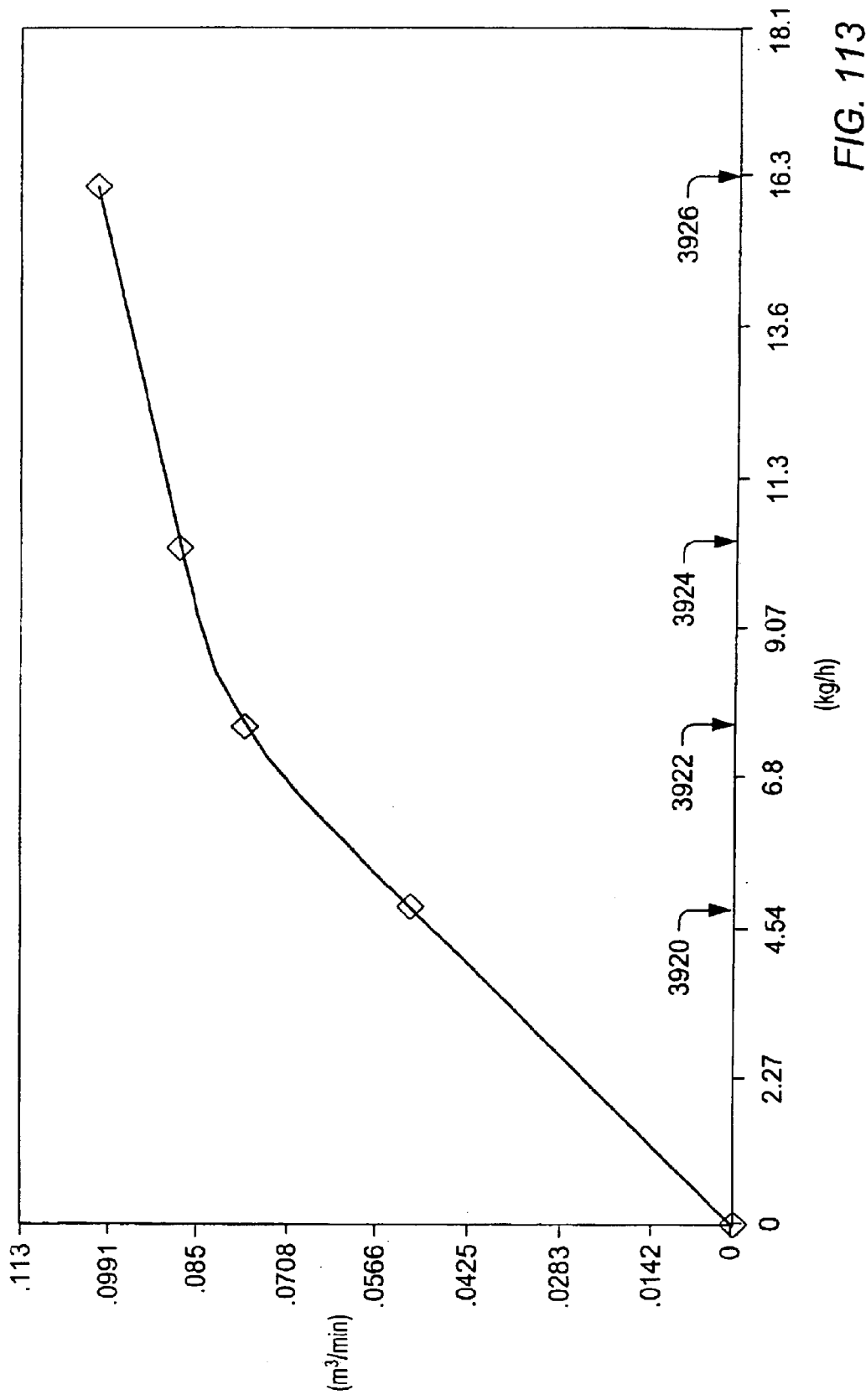
FIG. 113 depicts synthesis gas production from the coal formation in an experimental field test versus the total water inflow.

FIG. 113 is a plot of the total synthesis gas production ($m^3/min$) from the coal formation versus the total water inflow (kg/hr) due to injection into the formation from the experimental field test results facility. Synthesis gas may be generated in a formation at a synthesis gas generating temperature before the injection of water or steam due to the presence of natural water inflow into hot coal formation. Natural water may come from below the formation.

From FIG. 113, the maximum natural water inflow is approximately 5 kg/h as indicated by arrow 3920. Arrows 3922, 3924, and 3926 represent injected water rates of about 2.7 kg/h, 5.4 kg/h, and 11 kg/h, respectively, into central well 3806a of FIG. 99. Production of synthesis gas is at heater wells 3804a, 3804b, and 3804c. FIG. 113 shows that the synthesis gas production per unit volume of water injected decreases at arrow 3922 at approximately 2.7 kg/h of injected water or 7.7 kg/h of total water inflow. The reason for the decrease is that steam is flowing too fast through the coal seam to allow the reactions to approach equilibrium conditions.

Figure 114:
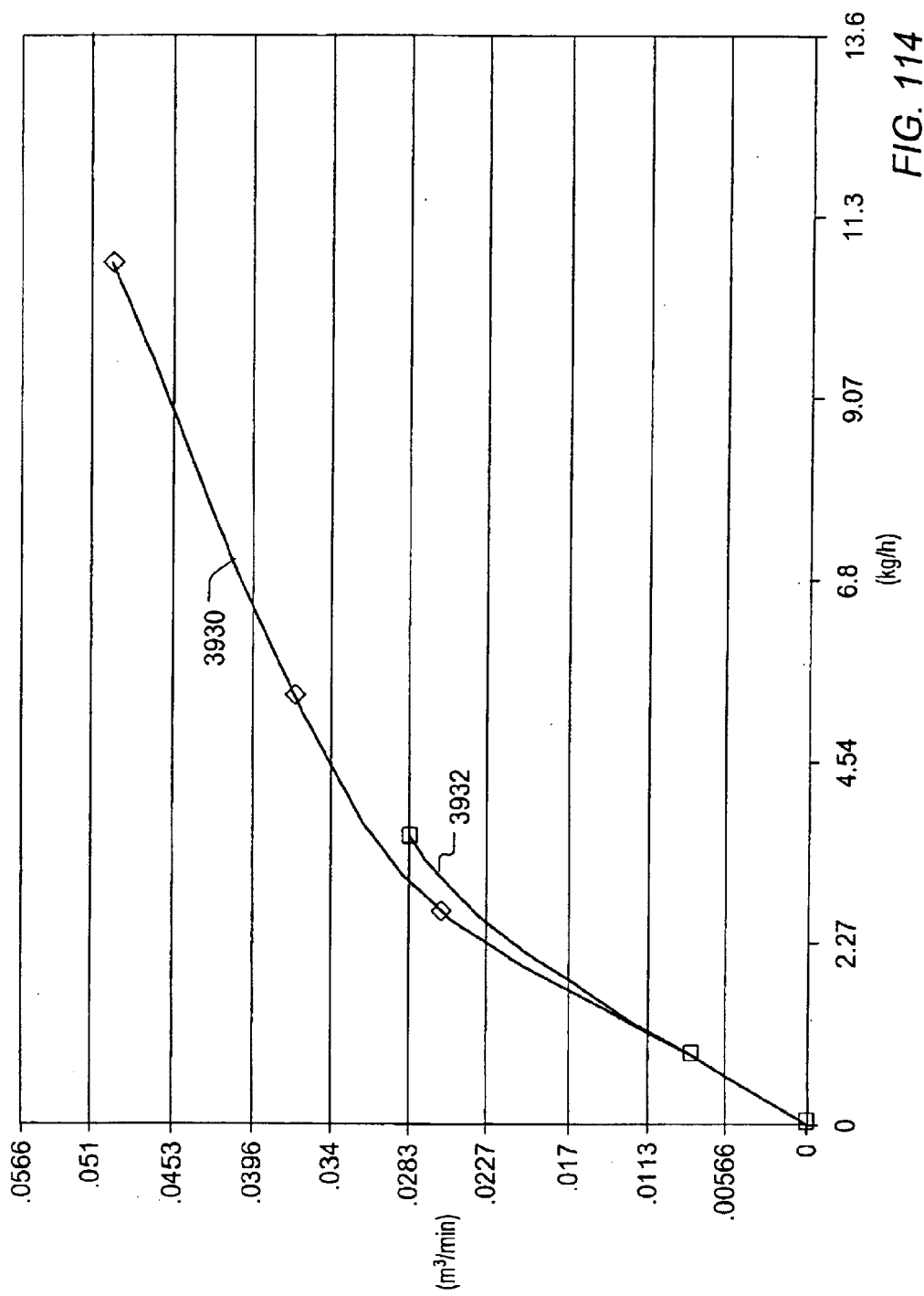
FIG. 114 depicts additional synthesis gas production from the coal formation in an experimental field test due to injected steam.

FIG. 114 illustrates production rate of synthesis gas ($m^3$/min) as a function of steam injection rate (kg/h) in a coal formation. Data 3930 for a first run corresponds to injection at producer well 3806a in FIG. 99, and production of synthesis gas at heater wells 3804a, 3804b, and 3804c. Data 3932 for a second run corresponds to injection of steam at heater well 3804c, and production of additional gas at a production well 3806a. Data 3930 for the first run corresponds to the data shown in FIG. 113. As shown in FIG. 114, the injected water is in reaction equilibrium with the formation to about 2.7 kg/h of injected water. The second run results in substantially the same amount of additional synthesis gas produced, shown by data 3932, as the first run to about 1.2 kg/h of injected steam. At about 1.2 kg/h, data 3930 starts to deviate from equilibrium conditions because the residence time is insufficient for the additional water to react with the coal. As temperature is increased, a greater amount of additional synthesis gas is produced for a given injected water rate. The reason is that at higher temperatures the reaction rate and conversion of water into synthesis gas increases.

Figure 115:
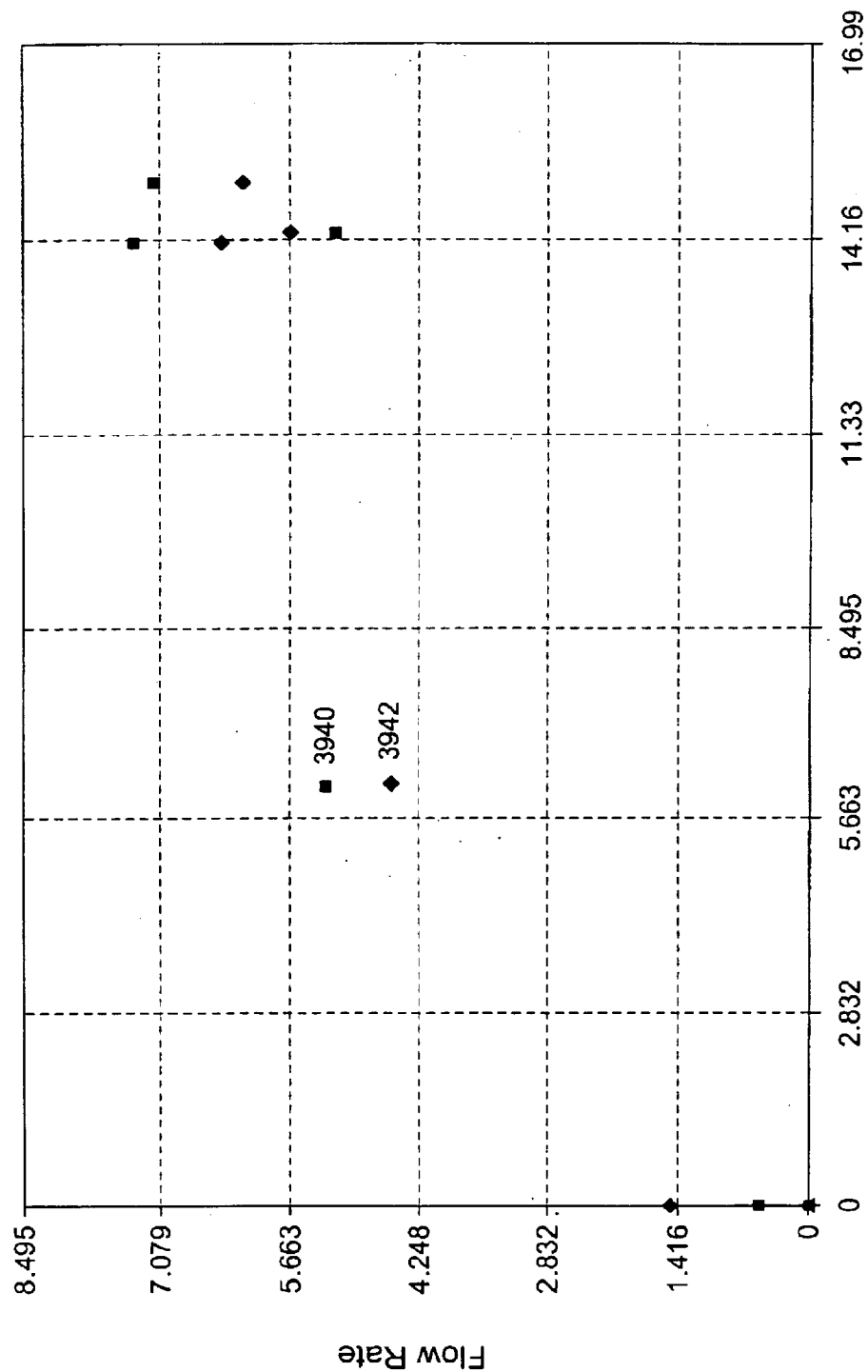
FIG. 115 depicts the effect of methane injection into a heated formation.
Figure 118:
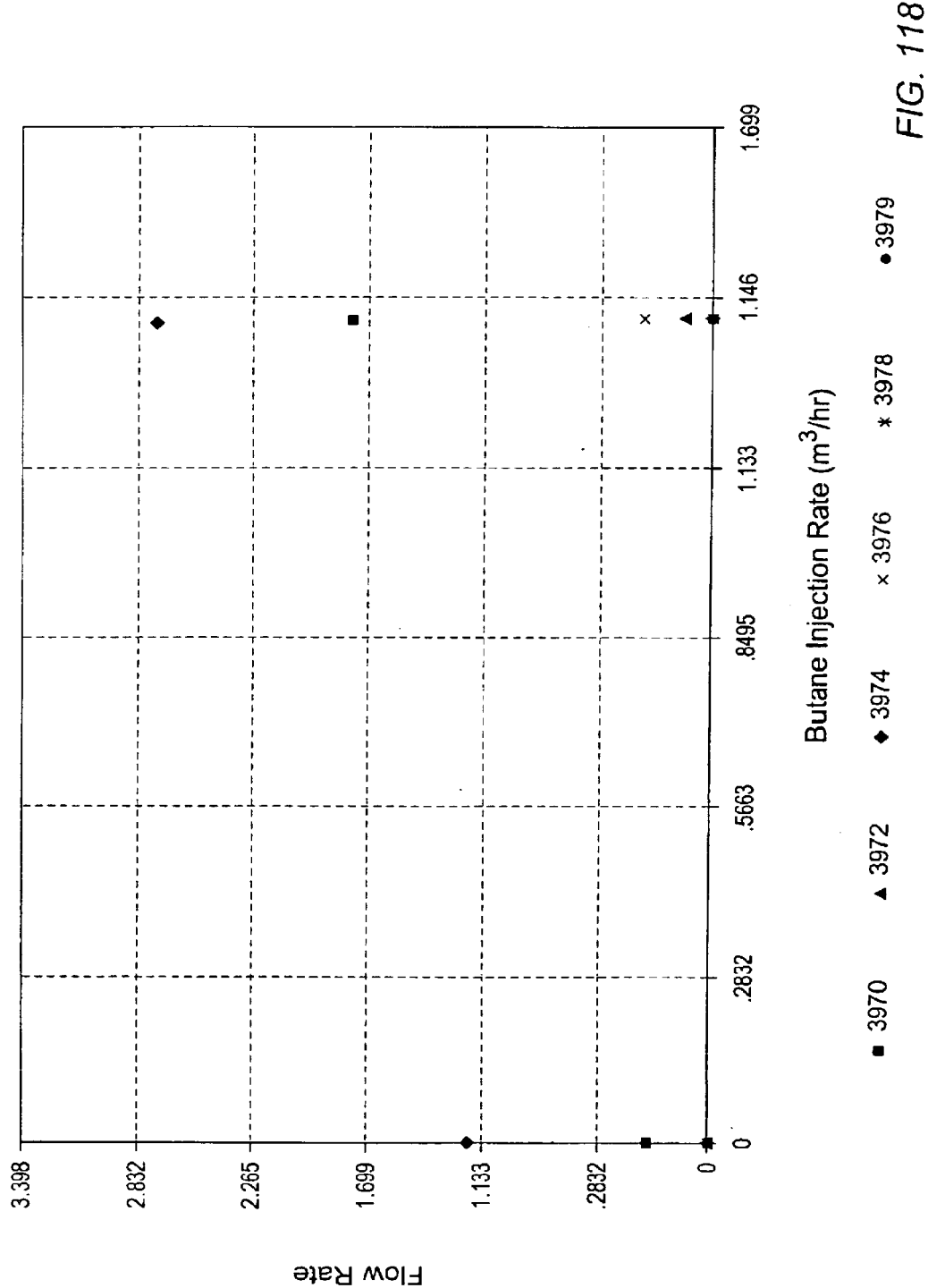
FIG. 118 depicts the effect of butane injection into a heated formation.

FIG. 115 is a plot that illustrates the effect of methane injection into a heated coal formation in the experimental field test (all of the units in FIGS. 151–118 are in $m^3$ per hour). FIG. 115 demonstrates hydrocarbons added to the synthesis gas producing fluid are cracked within the formation. FIG. 99 illustrates the layout of the heater and production wells at the field test facility. Methane was injected into production wells 3806a and 3806b and fluid was produced from heater wells 3804a, 3804b, and 3804c. The average temperatures measured at various wells were as follows: 3804a (746° C.), 3804b (746° C.), 3804c (767° C.), 3808a (592° C.), 3808b (573° C.), 3808c (606° C.), and 3806a (769° C.). When the methane contacted the formation, it cracked within the formation to produce $H_2$ and coke. FIG. 115 shows that as the methane injection rate increased, the production of $H_2$ 3940 increased. This indicated that methane was cracking to form $H_2$. Methane production 3942 also increased which indicates that not all of the injected methane is cracked. The measured compositions of ethane, ethene, propane, and butane were negligible.

Figure 116:
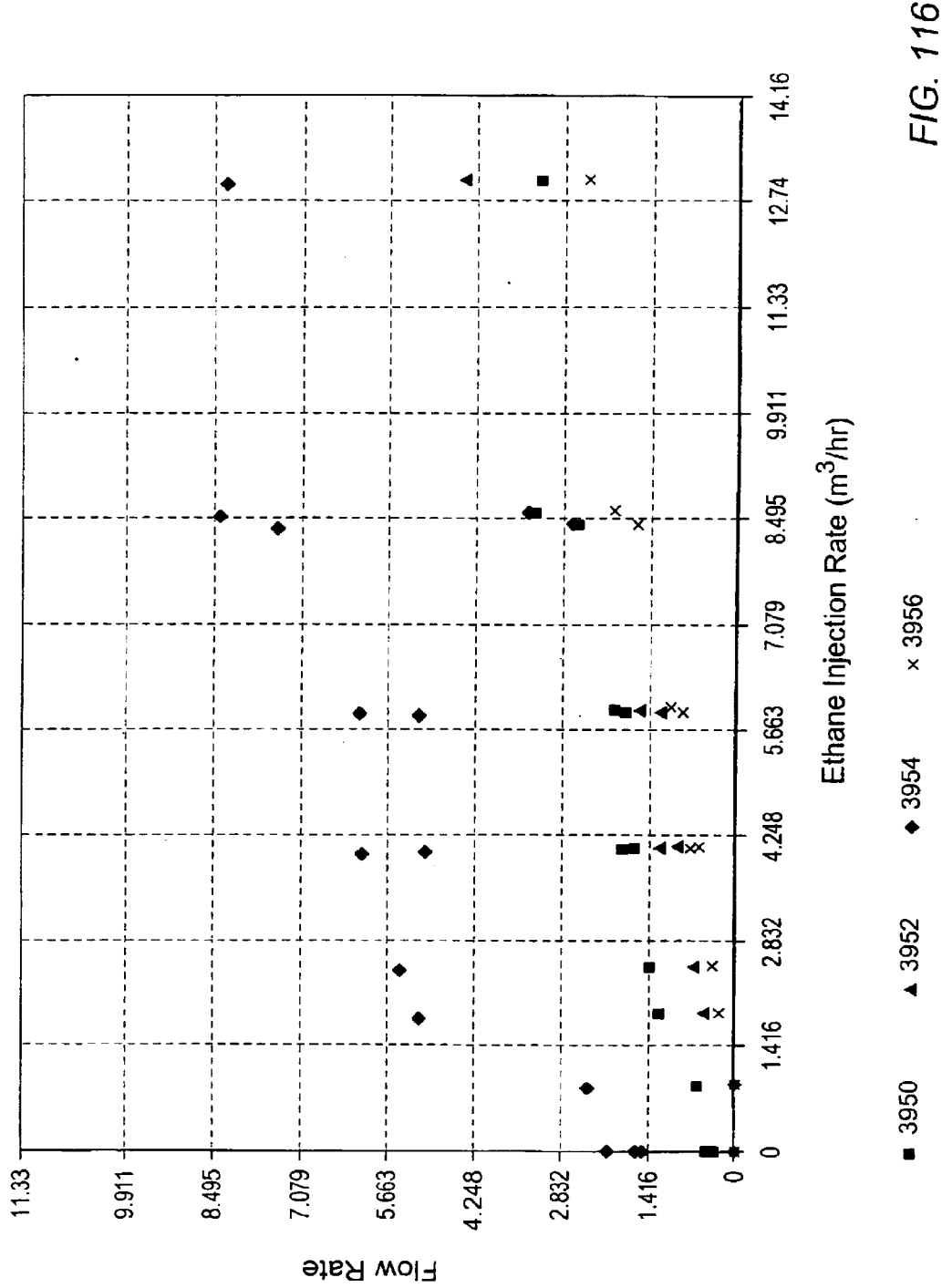
FIG. 116 depicts the effect of ethane injection into a heated formation.

FIG. 116 is a plot that illustrates the effect of ethane injection into a heated coal formation in the experimental field test. Ethane was injected into production wells 3806a and 3806b and fluid was produced from heater wells 3804a, 3804b, and 3804c. The average temperatures measured at various wells were as follows: 3804a (742° C.), 3804b (75° C.), 3804c (744° C.), 3808a (611° C.), 3808b (595° C.), 3808c (626° C.), and 3806a (818° C.). When ethane contacted the formation, it cracked to produce $H_2$, methane, ethene, and coke. FIG. 116 shows that as the ethane injection rate increased, the production of $H_2$ 3950, methane 3952, ethane 3954, and ethene 3956 increased. This indicates that ethane is cracking to form $H_2$ and low molecular weight hydrocarbons. The production rate of higher carbon number products (i.e. propane and propylene) were unaffected by the injection of ethane.

Figure 117:
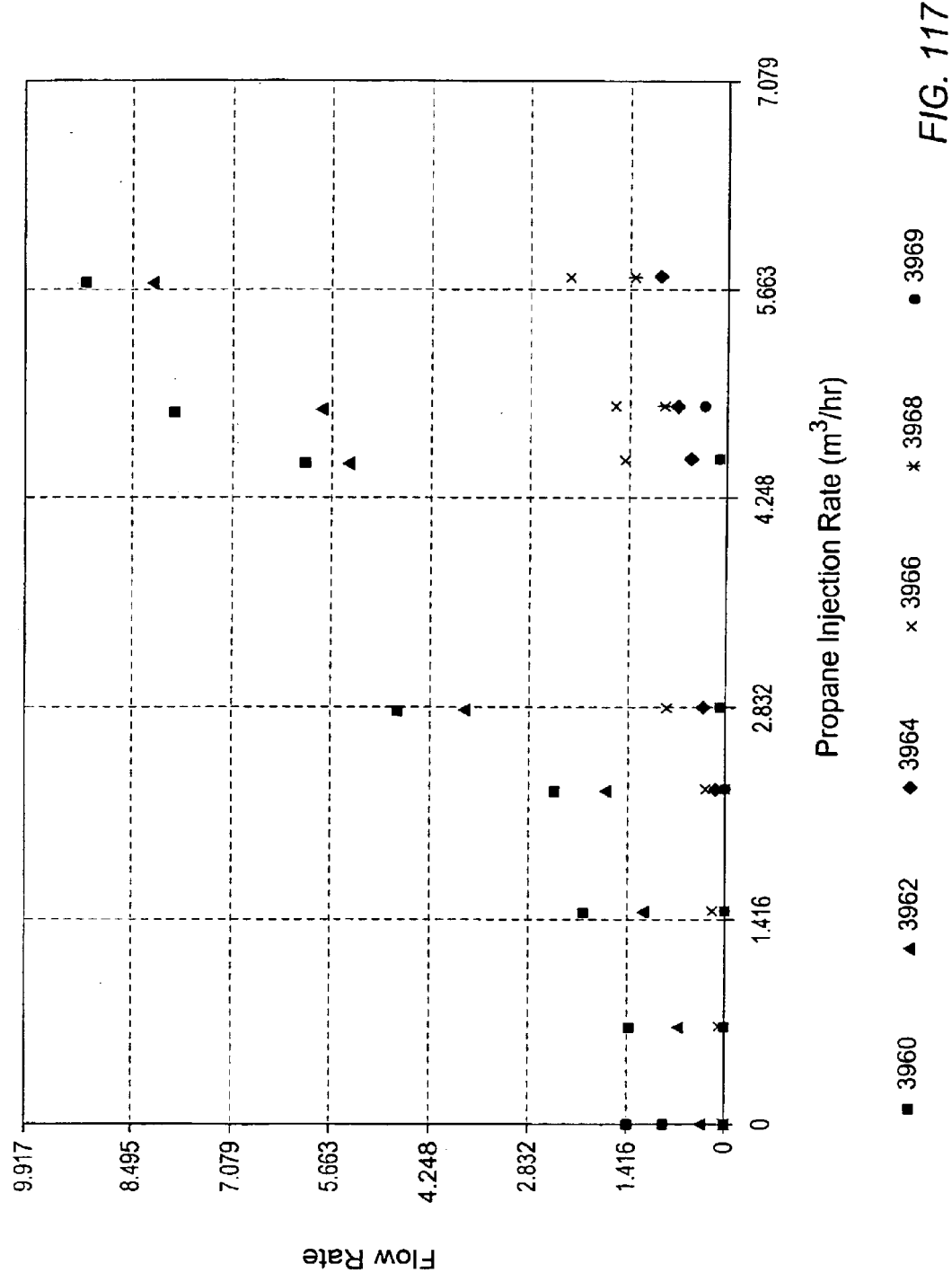
FIG. 117 depicts the effect of propane injection into a heated formation.

FIG. 117 is a plot that illustrates the effect of propane injection into a heated coal formation in the experimental field test. Propane was injected into production wells 3806a and 3806b and fluid was produced from heater wells 3804a, 3804b, and 3804c. The average temperatures measured at various wells were as follows: 3804a (737° C.), 3804b (753° C.), 3804c (726° C.), 3808a (589° C.), 3808b, (573° C.), 3808c (606° C.), and 3806a (769° C.). When propane contacted the formation, it cracked to produce $H_2$, methane, ethane, ethene, propylene and coke. FIG. 117 shows that as the propane injection rate increased, the production of $H_2$ 3960, methane 3962, ethane 3964, ethene 3966, propane 3968, and propylene 3969 increased. This indicates that propane is cracking to form $H_2$ and lower molecular weight components.

FIG. 118 is a plot that illustrates the effect of butane injection into a heated coal formation in the experimental field test. Butane was injected into production wells 3806a and 3806b and fluid was produced from heater wells 3804a, 3804b, and 3804c. The average temperature measured at various wells were as follows: 3804a (772° C.), 3804b (764° C.), 3804c (753° C.), 3808a (650° C.), 3808b (591° C.), 3808c (624° C.), and 3806a (830° C.). When butane contacted the formation, it cracked to produce $H_2$, methane, ethane, ethene, propane, propylene, and coke. FIG. 118 shows that as the butane injection rate increased, the production of $H_2$ 3970, methane 3972, ethane 3974, ethene 3976, propane 3978, and propylene 3979 increased. This indicates that butane is cracking to form $H_2$ and lower molecular weight components.

Figure 119:
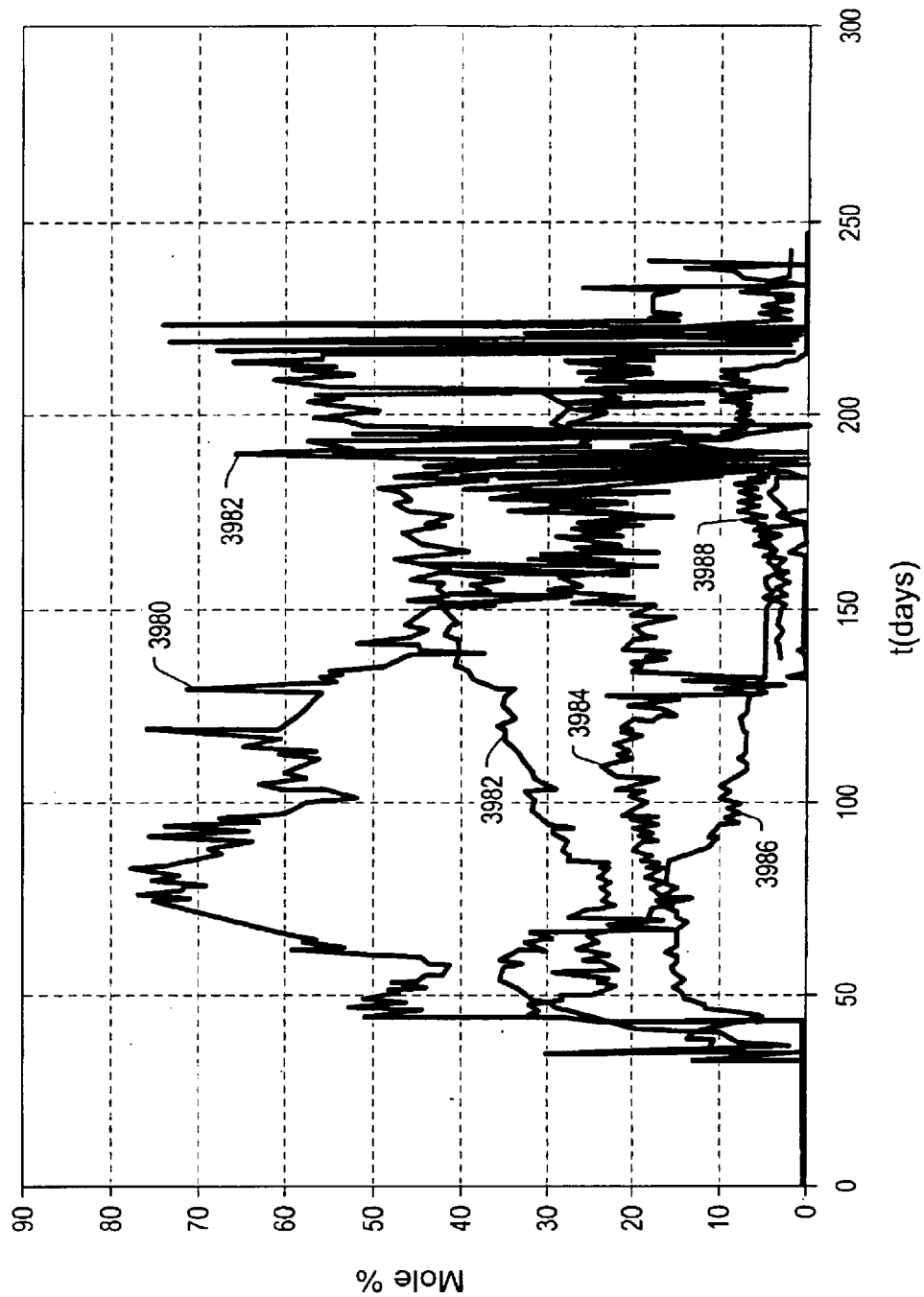
FIG. 119 depicts composition of gas produced from a formation versus time.

FIG. 119 is a plot of the composition of gas (in volume percent) produced from the heated coal formation versus time in days at the experimental field test. The species compositions included 3980-methane, 3982-$H_2$, 3984-carbon dioxide, 3986-hydrogen sulfide, and 3988-carbon monoxide. FIG. 119 shows a dramatic increase in the $H_2$ 3982 concentration after about 150 days, or when synthesis gas production began.

Figure 120:
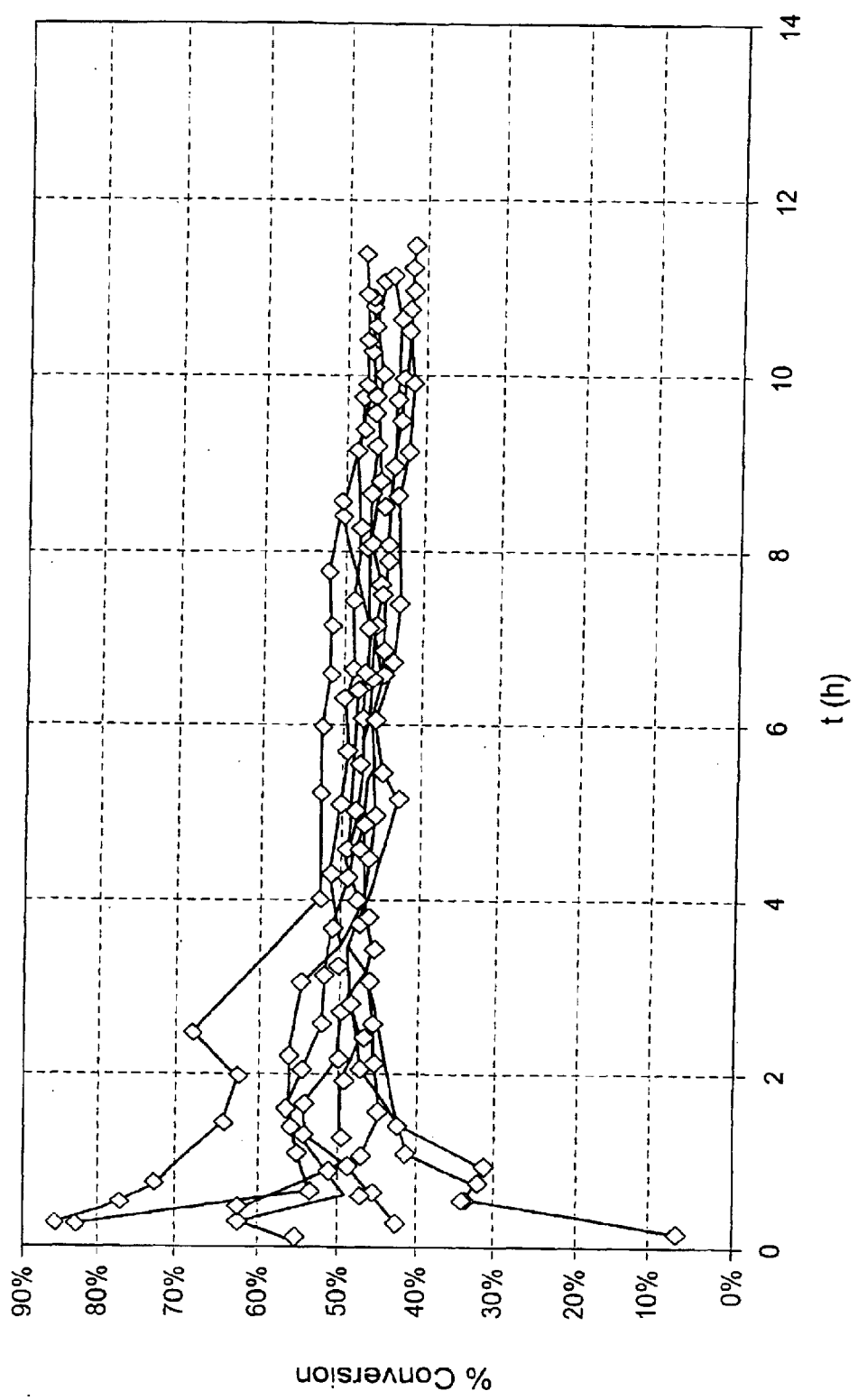
FIG. 120 depicts synthesis gas conversion versus time.

FIG. 120 is a plot of synthesis gas conversion versus time for synthesis gas generation runs in the experimental field test performed on separate days. The temperature of the formation was about 600° C. The data demonstrates initial uncertainty in measurements in the oil/water separator. Synthesis gas conversion consistently approached a conversion of between about 40% and 50% after about 2 hours of synthesis gas producing fluid injection.

Table 3 includes a composition of synthesis gas produced during a run of the in situ coal field experiment.

TABLE 3

| Component | Mol % | Wt % |
|---|---|---|
| Methane | 12.263 | 12.197 |
| Ethane | 0.281 | 0.525 |
| Ethene | 0.184 | 0.320 |
| Acetylene | 0.000 | 0.000 |
| Propane | 0.017 | 0.046 |
| Propylene | 0.026 | 0.067 |
| Propadiene | 0.001 | 0.004 |
| Isobutane | 0.001 | 0.004 |
| n-Butane | 0.000 | 0.001 |
| 1-Butene | 0.001 | 0.003 |
| Isobutene | 0.000 | 0.000 |
| cis-2-Butene | 0.005 | 0.018 |
| trans-2-Butene | 0.001 | 0.003 |
| 1,3-Butadiene | 0.001 | 0.005 |

TABLE 3-continued

| Component | Mol % | Wt % |
|---|---|---|
| Isopentane | 0.001 | 0.002 |
| n-Pentane | 0.000 | 0.002 |
| Pentene-1 | 0.000 | 0.000 |
| T-2-Pentene | 0.000 | 0.000 |
| 2-Methyl-2-Butene | 0.000 | 0.000 |
| C-2-Pentene | 0.000 | 0.000 |
| Hexanes | 0.081 | 0.433 |
| $H_2$ | 51.247 | 6.405 |
| Carbon monoxide | 11.556 | 20.067 |
| Carbon dioxide | 17.520 | 47.799 |
| Nitrogen | 5.782 | 10.041 |
| Oxygen | 0.955 | 1.895 |
| Hydrogen sulfide | 0.077 | 0.163 |
| Total | 100.000 | 100.000 |

The experiment was performed in batch oxidation mode at about 620° C. The presence of nitrogen and oxygen is due to contamination of the sample with air. The mole percent of $H_2$, carbon monoxide, and carbon dioxide, neglecting the composition of all other species, may be determined for the above data. For example, mole percent of $H_2$, carbon monoxide, and carbon dioxide may be increased proportionally such that the mole percentages of the three components equals approximately 100%. In this manner, the mole percent of $H_2$, carbon monoxide, and carbon dioxide, neglecting the composition of all other species, were 63.8%, 14.4%, and 21.8%, respectively. The methane is believed to come primarily from the pyrolysis region outside the triangle of heaters. These values are in substantial agreement with the results of equilibrium calculations shown in FIG. 121.

FIG. 121 is a plot of calculated equilibrium gas dry mole fractions for a coal reaction with water. Methane reactions are not included for FIGS. 121–122. The fractions are representative of a synthesis gas that has been produced from a coal formation and has been passed through a condenser to remove water from the produced gas. Equilibrium gas dry mole fractions are shown in FIG. 121 for $H_2$ 4000, carbon monoxide 4002, and carbon dioxide 4004 as a function of temperature at a pressure of 2 bar absolute. As shown in FIG. 121, at 390° C., liquid production tends to cease, and production of gases tends to commence. The gases produced at this temperature include about 67% $H_2$, and about 33% carbon dioxide. Carbon monoxide is present in negligible quantities below about 410° C. At temperatures of about 500° C., however, carbon monoxide is present in the produced gas in measurable quantities. For example, at 500° C., about 66.5% $H_2$, about 32% carbon dioxide, and about 2.5% carbon monoxide are present. At 700° C., the produced gas includes about 57.5% $H_2$, about 15.5% carbon dioxide, and about 27% carbon monoxide.

Figure 122:
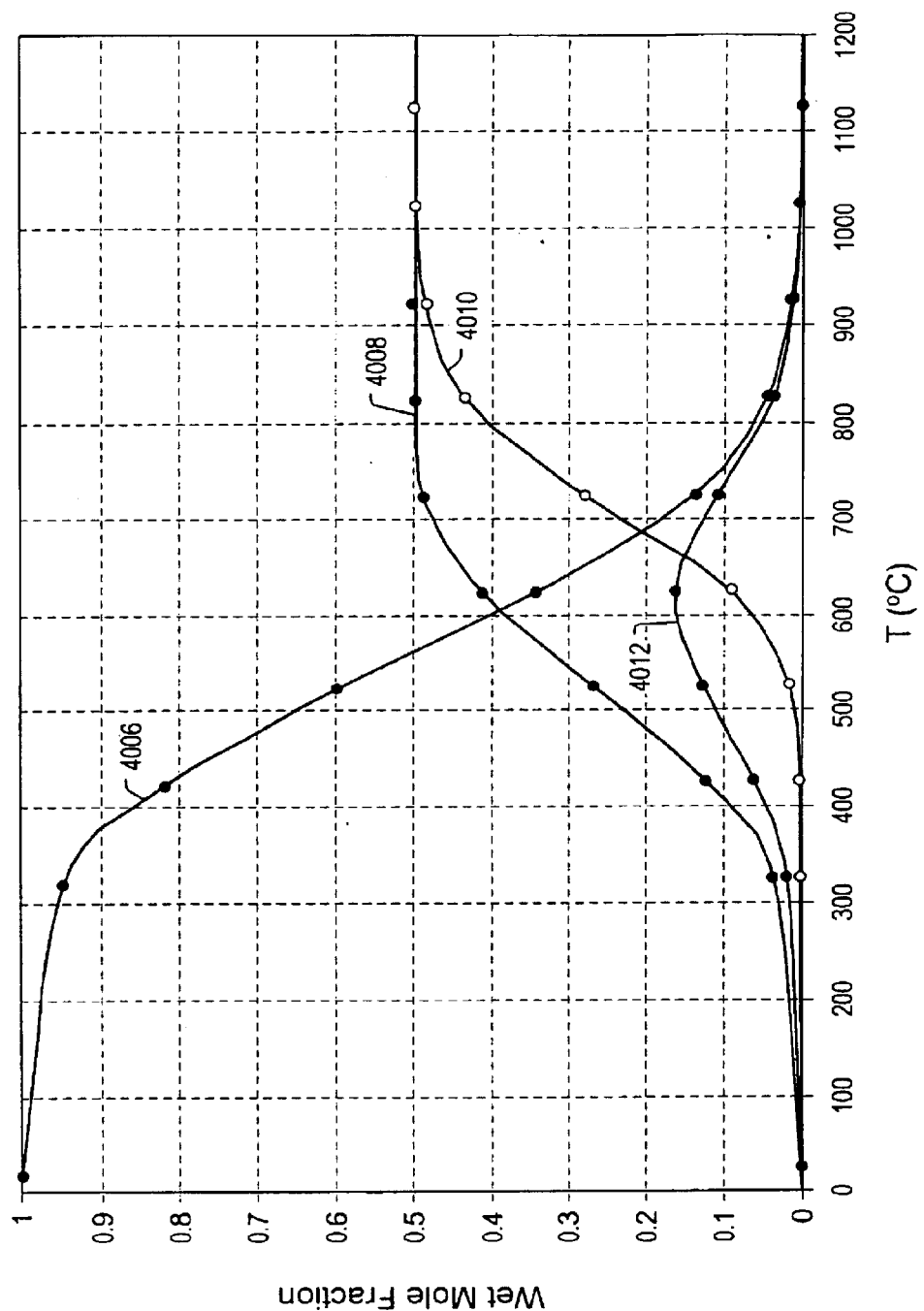
FIG. 122 depicts calculated equilibrium gas wet mole fractions for a reaction of coal with water.

FIG. 122 is a plot of calculated equilibrium wet mole fractions for a coal reaction with water. Equilibrium wet mole fractions are shown for water 4006, $H_2$ 4008, carbon monoxide 4010, and carbon dioxide 4012 as a function of temperature at a pressure of 2 bars absolute. At 390° C., the produced gas includes about 89% water, about 7% $H_2$, and about 4% carbon dioxide. At 500° C., the produced gas includes about 66% water, about 22% $H_2$, about 11% carbon dioxide, and about 1% carbon monoxide. At 700° C., the produced gas includes about 18% water, about 47.5% $H_2$, about 12% carbon dioxide, and about 22.5% carbon monoxide.

FIG. 121 and FIG. 122 illustrate that at the lower end of the temperature range at which synthesis gas may be produced (i.e., about 400° C.) equilibrium gas phase fractions may not favor production of $H_2$ within a formation. As temperature increases, the equilibrium gas phase fractions increasingly favor the production of $H_2$. For example, as shown in FIG. 122, the gas phase equilibrium wet mole fraction of $H_2$ increases from about 9% at 400° C., to about 39% at 610° C., and reaches 50% at about 800° C. FIG. 121 and FIG. 122 further illustrate that at temperatures greater than about 660° C., equilibrium gas phase fractions tend to favor production of carbon monoxide over carbon dioxide.

FIG. 121 and FIG. 122 illustrate that as the temperature increases from between about 400° C., to about 1000° C., the $H_2$ to carbon monoxide ratio of produced synthesis gas may continuously decrease throughout this range. For example, as shown in FIG. 122, the equilibrium gas phase $H_2$ to carbon monoxide ratio at 500° C., 660° C., and 1000° C., is about 22:1, about 3:1, and about 1:1, respectively. FIG. 122 also indicates that produced synthesis gas at lower temperatures may have a larger quantity of water and carbon dioxide than at higher temperatures. As the temperature increases, the overall percentage of carbon monoxide and hydrogen within the synthesis gas may increase.

Figure 123:
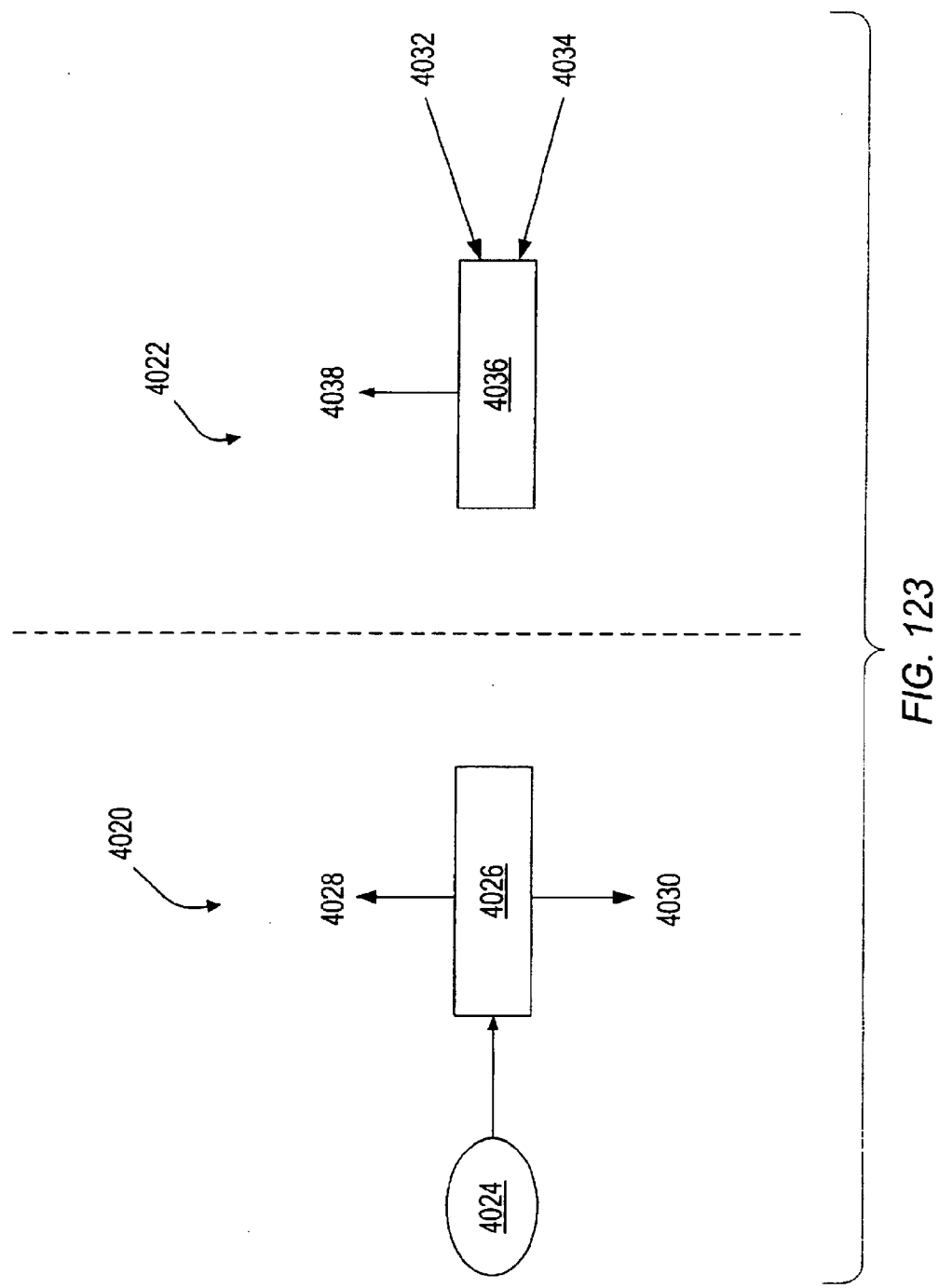
FIG. 123 depicts an example of pyrolysis and synthesis gas production stages in a coal formation.

FIG. 123 is a flowchart of an example of a pyrolysis stage 4020 and synthesis gas production stage 4022 with heat and mass balances in high volatile type A or B bituminous coal. In the pyrolysis stage 4020, heat 4024 is supplied to the coal formation 4026. Liquid and gas products 4028 and water 4030 exit the formation 4026. The portion of the formation subjected to pyrolysis is composed substantially of char after undergoing pyrolysis heating. Char refers to a solid carbonaceous residue that results from pyrolysis of organic material. In the synthesis gas production stage 4022, steam 4032 and heat 4034 are supplied to formation 4036 that has undergone pyrolysis and synthesis gas 4038 is produced.

In the embodiments of FIG. 123, the methane reactions in Equations (4) and (5) are included. The calculations set forth herein assume that char is only made of carbon and that there is an excess of carbon to steam. About 890 MW of energy 4024 is required to pyrolyze about 105,800 metric tons per day of coal. The pyrolysis products 4028 include liquids and gases with a production of 23,000 cubic meters per day. The pyrolysis process also produces about 7,160 metric tons per day of water 4030. In the synthesis gas stage about 57,800 metric tons per day of char with injection of 23,000 metric tons per day of steam 4032 and 2,000 MW of energy 4034 with a 20% conversion will produce 12,700 cubic meters equivalent oil per day of synthesis gas 4038.

Figure 124:
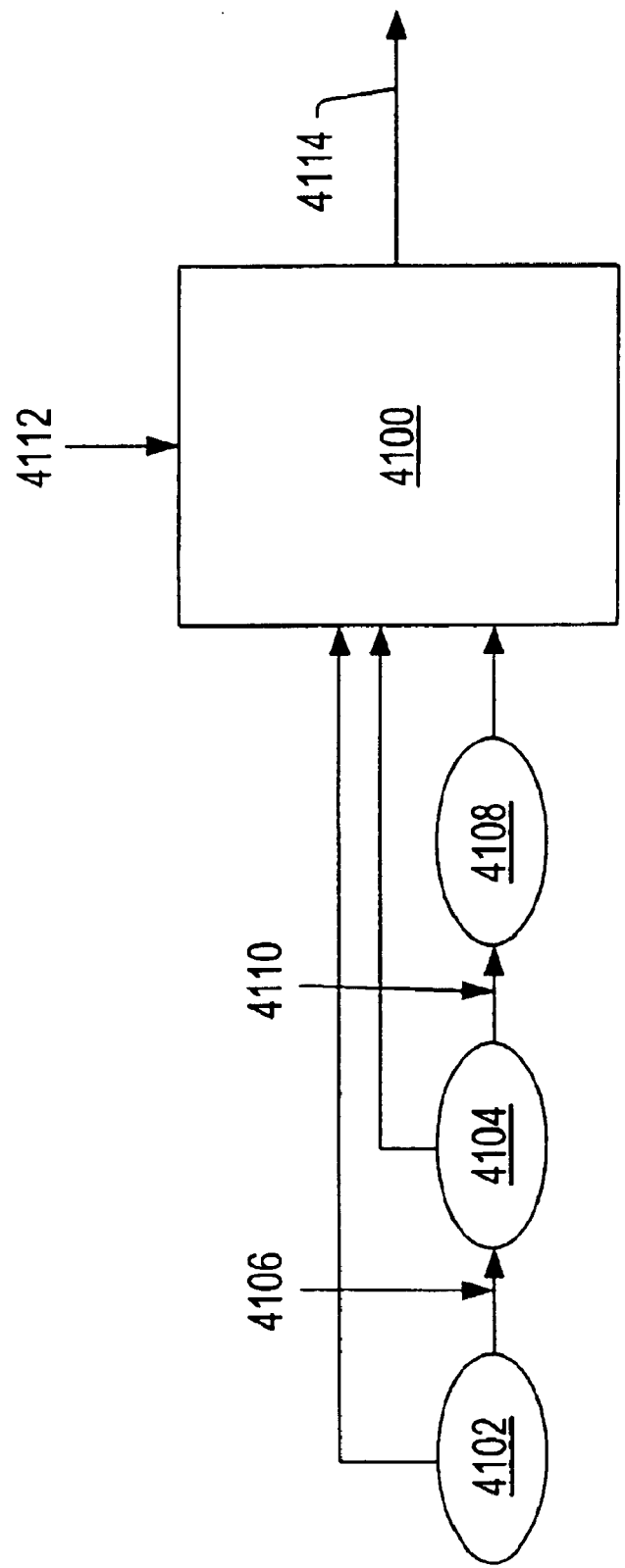
FIG. 124 depicts an example of low temperature in situ synthesis gas production.

FIG. 124 is an example of a low temperature in situ synthesis gas production that occurs at a temperature of about 450° C., with heat and mass balances in a coal formation that was previously pyrolyzed. A total of about 42,900 metric tons per day of water is injected into formation 4100 which may be char. FIG. 124 illustrates that a portion of water 4102 at 25° C., is injected directly into the formation 4100. A portion of water 4102 is converted into steam 4104 at a temperature of about 130° C., and a pressure at about 3 bars absolute using about 1227 MW of energy 4106 and injected into formation 4100. A portion of the remaining steam may be converted into steam 4108 at a temperature of about 450° C., and a pressure at about 3 bars absolute using about 318 MW of energy 4110. The synthesis gas production involves about 23% conversion of 13,137 metric tons per day of char to produce 56.6 millions of cubic meters per day of synthesis gas with an energy content of 5,230 MW. About 238 MW of energy 4112 is supplied to formation 4100 to account for the endothermic heat of reaction of the synthesis gas reaction. The product stream 4114 of the synthesis gas reaction includes 29,470 metric tons per day of water at 46 volume percent, 501 metric tons per day carbon monoxide at 0.7 volume percent, 540 tons per day $H_2$ at 10.7 volume percent, 26,455 metric tons per day carbon dioxide at 23.8 volume percent, and 7,610 metric tons per day methane at 18.8 volume percent.

Figure 125:
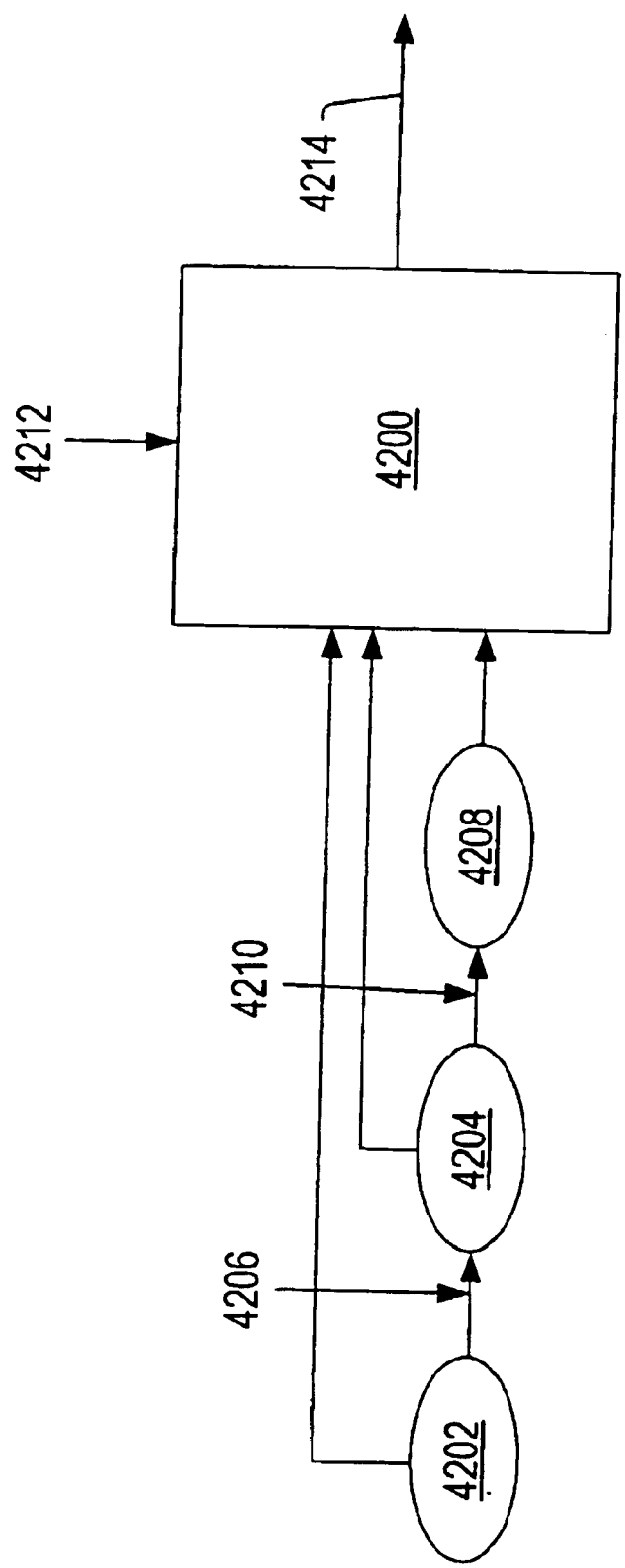
FIG. 125 depicts an example of high temperature in situ synthesis gas production.

FIG. 125 is an example of a high temperature in situ synthesis gas production that occurs at a temperature of about 650° C., with heat and mass balances in a coal formation that was previously pyrolyzed. A total of about 34,352 metric tons per day of water is injected into formation 4200. FIG. 125 illustrates that a portion of water 4202 at 25° C., is injected directly into formation 4200. A portion of water 4202 is converted into steam 4204 at a temperature of about 130° C., and a pressure at about 3 bars absolute using about 982 MW of energy 4206, and injected into formation 4200. A portion of the remaining steam is converted into steam 4208 at a temperature of about 650° C., and a pressure at about 3 bars absolute using about 413 MW of energy 4210. The synthesis gas production involves about 22% conversion of 12,771 metric tons per day of char to produce 56.6 millions of cubic meters per day of synthesis gas with an energy content of 5,699 MW. About 898 MW of energy 4212 is supplied to formation 4200 to account for the endothermic heat of reaction of the synthesis gas reaction. The product stream 4214 of the synthesis gas reaction includes 10,413 metric tons per day of water at 22.8 volume percent, 9,988 metric tons per day carbon monoxide at 14.1 volume percent, 1771 metric tons per day $H_2$ at 35 volume percent, 21,410 metric tons per day carbon dioxide at 19.3 volume percent, and 3535 metric tons per day methane at 8.7 volume percent.

Figure 126:
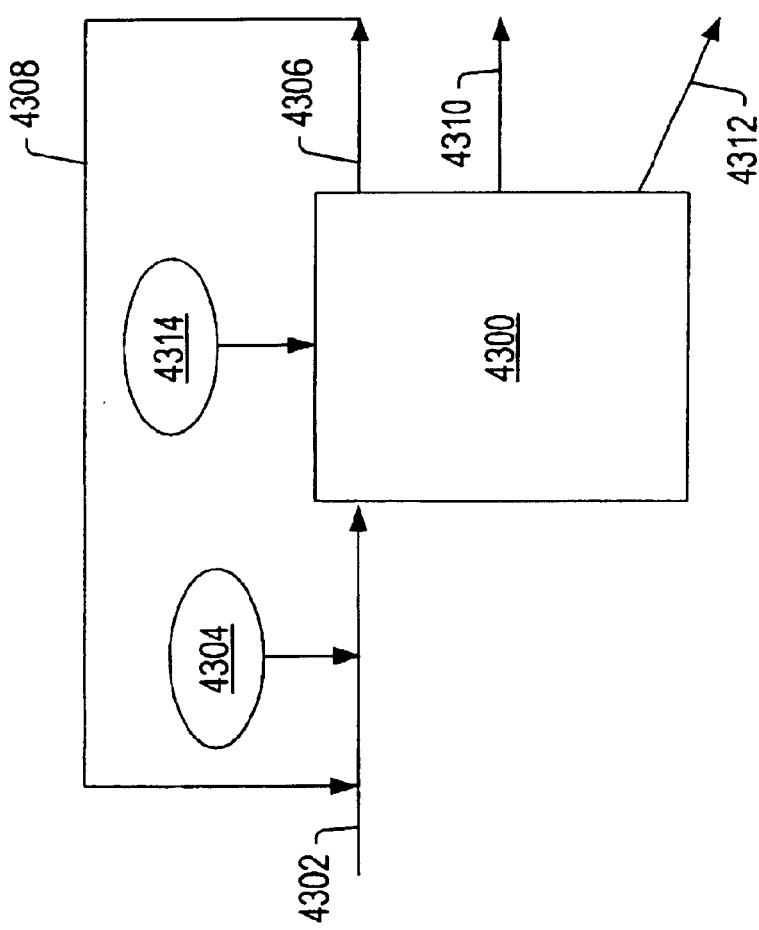
FIG. 126 depicts an example of in situ synthesis gas production in a coal formation.

FIG. 126 is an example of an in situ synthesis gas production in a coal formation with heat and mass balances. Synthesis gas generating fluid that includes water 4302 is supplied to the formation 4300. A total of about 22,000 metric tons per day of water is required for a low temperature process and about 24,000 metric tons per day is required for a high temperature process. A portion of the water may be introduced into the formation as steam. Steam 4304 is produced by supplying heat to the water from an external source. About 7,119 metric tons per day of steam is provided for the low temperature process and about 6913 metric tons per day of steam is provided for the high temperature process.

At least a portion of the aqueous fluid 4306 exiting formation 4300 is recycled 4308 back into the formation for generation of synthesis gas. For a low temperature process about 21,000 metric tons per day of aqueous fluids is recycled and for a high temperature process about 10,000 metric tons per day of aqueous fluids is recycled. The produced synthesis gas 4310 includes carbon monoxide, $H_2$, and methane. The produced synthesis gas has a heat content of about 430,000 MMBtu per day for a low temperature process and a heat content of about 470,000 MMBtu per day for a low temperature process. Carbon dioxide 4312 produced in the synthesis gas process includes about 26,500 metric tons per day in the low temperature process and about 21,500 metric tons per day in the high temperature process. At least a portion of the produced synthesis gas 4310 is used for combustion to heat the formation. There is about 7,119 metric tons per day of carbon dioxide in the steam 4308 for the low temperature process and about 6,913 metric tons per day of carbon dioxide in the steam for the high temperature process. There is about 2,551 metric tons per day of carbon dioxide in a heat reservoir for the low temperature process and about 9,628 metric tons per day of carbon dioxide in a heat reservoir for the high temperature process. There is about 14,571 metric tons per day of carbon dioxide in the combustion of synthesis gas for the low temperature process and about 18,503 metric tons per day of carbon dioxide in produced combustion synthesis gas for the high temperature process. The produced carbon dioxide has a heat content of about 60 gigajoules ("GJ") per metric ton for the low temperature process and about 6.3 GJ per metric ton for the high temperature process.

Table 4 is an overview of the potential production volume of applications of synthesis gas produced by wet oxidation. The estimates are based on 56.6 million standard cubic meters of synthesis gas produced per day at 700° C.

TABLE 4

| Application | Production (main product) |
|---|---|
| Power | 2720 Megawatts |
| Hydrogen | 2,700 metric tons/day |
| $NH_3$ | 13,800 metric tons/day |
| $CH_4$ | 7,600 metric tons/day |
| Methanol | 13,300 metric tons/day |
| Shell Middle Distillates | 5,300 metric tons/day |

Figure 127:
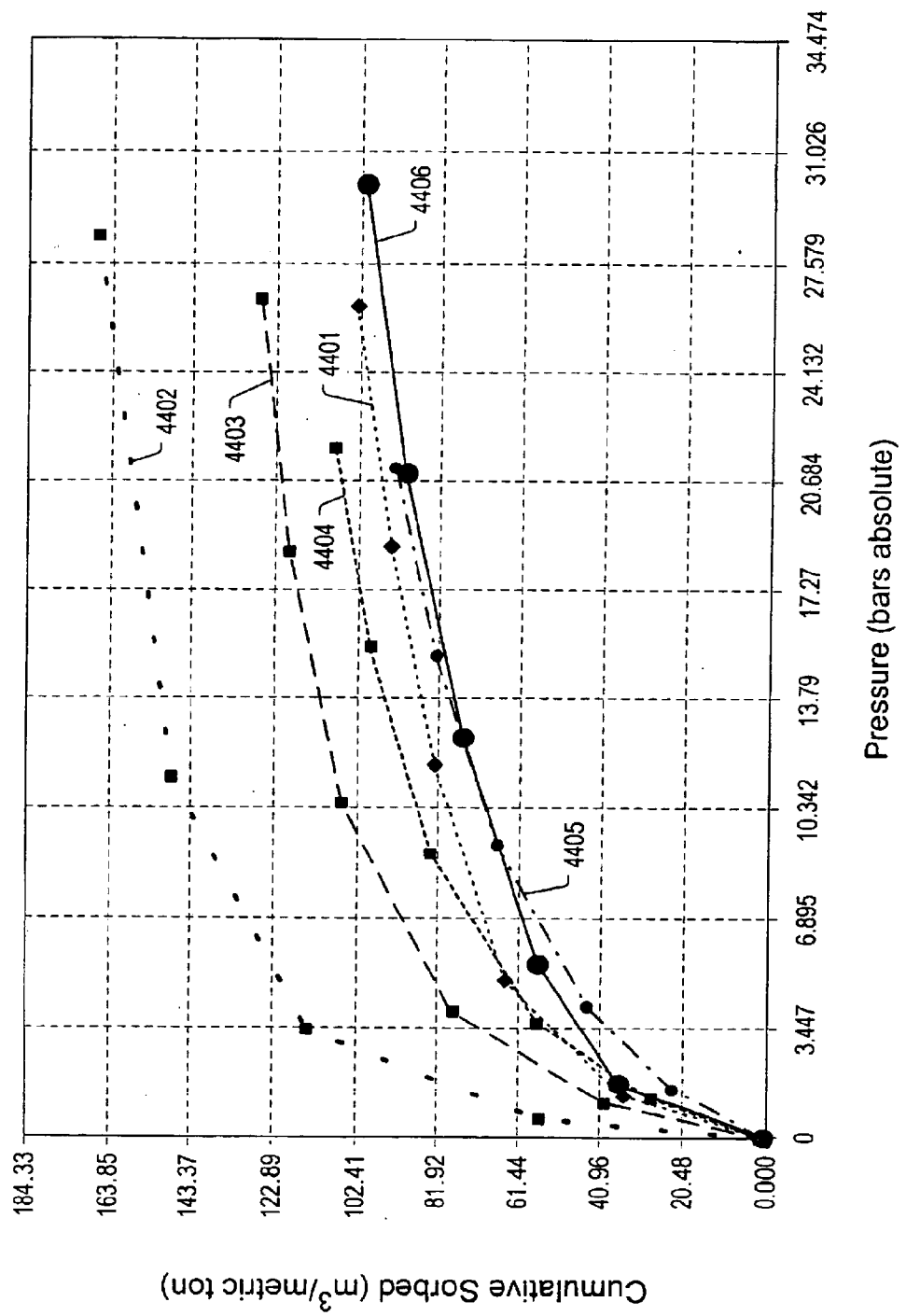
FIG. 127 depicts a plot of cumulative adsorbed methane and carbon dioxide versus pressure in a coal formation.

Experimental adsorption data has demonstrated that carbon dioxide may be stored in coal that has been pyrolyzed. FIG. 127 is a plot of the cumulative adsorbed methane and carbon dioxide in cubic meters per metric ton versus pressure in bar absolute at 25° C., on coal. The coal sample is sub-bituminous coal from Gillette, Wyo. Data sets 4401, 4402, 4403, 4404, and 4405 are for carbon dioxide adsorption on a post treatment coal sample that has been pyrolyzed and has undergone synthesis gas generation. Data set 4406 is for adsorption on an unpyrolyzed coal sample from the same formation. Data set 4401 is adsorption of methane at 25° C. Data sets 4402, 4403, 4404, and 4405 are adsorption of carbon dioxide at 25° C., 50° C., 100° C., and 150° C., respectively. Data set 4406 is adsorption of carbon dioxide at 25° C., on the unpyrolyzed coal sample. FIG. 127 shows that carbon dioxide at temperatures between 25° C., and 100° C. is more strongly adsorbed than methane at 25° C., in the pyrolyzed coal. FIG. 127 demonstrates that a carbon dioxide stream passed through post treatment coal tends to displace methane from the post treatment coal.

Computer simulations have demonstrated that carbon dioxide may be sequestered in both a deep coal formation and a post treatment coal formation. The Comet2 Simulator determined the amount of carbon dioxide that could be sequestered in a San Juan Basin type deep coal formation and a post treatment coal formation. The simulator also determined the amount of methane produced from the San Juan Basin type deep coal formation due to the carbon dioxide injection. The model employed for both the deep coal formation and the post treatment coal formation was a 1.3 $km^2$ area, with a repeating 5 spot well pattern. The 5 spot well pattern included four injection wells arranged in a square and one production well at the center of the square. The properties of the San Juan Basin and the post treatment coal formations are shown in Table 5. Additional details of simulations of carbon dioxide sequestration in deep coal formations and comparisons with field test results may be found in *Pilot Test Demonstrates How Carbon Dioxide Enhances Coal Bed Methane Recovery*, Lanny Schoeling and Michael McGovern, Petroleum Technology Digest, September 2000, p, 14–15.

TABLE 5

|  | Deep Coal Formation (San Juan Basin) | Post treatment coal formation (Post pyrolysis process) |
|---|---|---|
| Coal Thickness (m) | 9 | 9 |
| Coal Depth (m) | 990 | 460 |
| Initial Pressure (bars abs.) | 114 | 2 |
| Initial Temperature | 25° C. | 25° C. |
| Permeability (md) | 5.5 (horiz.), 0 (vertical) | 10,000 (horiz.), 0 (vertical) |
| Cleat porosity | 0.2% | 40% |

The simulation model accounts for the matrix and dual porosity nature of coal and post treatment coal. For example, coal and post treatment coal are composed of matrix blocks. The spaces between the blocks are called "cleats". Cleat porosity is a measure of available space for flow of fluids in the formation. The relative permeabilities of gases and water within the cleats required for the simulation were derived from field data from the San Juan coal. The same values for relative permeabilities were used in the post treatment coal formation simulations. Carbon dioxide and methane were assumed to have the same relative permeability.

The cleat system of the deep coal formation was modeled as initially saturated with water. Relative permeability data for carbon dioxide and water demonstrate that high water saturation inhibits absorption of carbon dioxide within cleats. Therefore, water is removed from the formation before injecting carbon dioxide into the formation.

In addition, the gases within the cleats may adsorb in the coal matrix. The matrix porosity is a measure of the space available for fluids to adsorb in the matrix. The matrix porosity and surface area were taken into account with experimental mass transfer and isotherm adsorption data for coal and post treatment coal. Therefore, it is not necessary to specify a value of the matrix porosity and surface area in the model.

The preferential adsorption of carbon dioxide over methane on post treatment coal was incorporated into the model based on experimental adsorption data. For example, FIG. 127 demonstrates that carbon dioxide has a significantly higher cumulative adsorption than methane over an entire range of pressures at a specified temperature. Once the carbon dioxide enters in the cleat system, methane diffuses out of and desorbs off the matrix. Similarly, carbon dioxide diffuses into and adsorbs onto the matrix. In addition, FIG. 127 also shows carbon dioxide may have a higher cumulative adsorption on a pyrolyzed coal sample than an unpyrolyzed coal.

The pressure-volume-temperature (PVT) properties and viscosity required for the model were taken from literature data for the pure component gases.

The simulation modeled a sequestration process over a time period of about 3700 days for the deep coal formation model. Removal of the water in the coal formation was simulated by production from all five wells. The production rate of water was about 40 m$^3$/day for about the first 370 days. The production rate of water decreased significantly after the first 370 days. It continued to decrease through the remainder of the simulation run to about zero at the end. Carbon dioxide injection was started at approximately 370 days at a flow rate of about 113,000 standard (in this context "standard" means 1 atmosphere pressure and 15.5 degrees Celsius) m$^3$/day. The injection rate of carbon dioxide was doubled to about 226,000 standard m$^3$/day at approximately 1440 days. The injection rate remained at about 226,000 standard m$^3$/day until the end of the simulation run.

Figure 130:
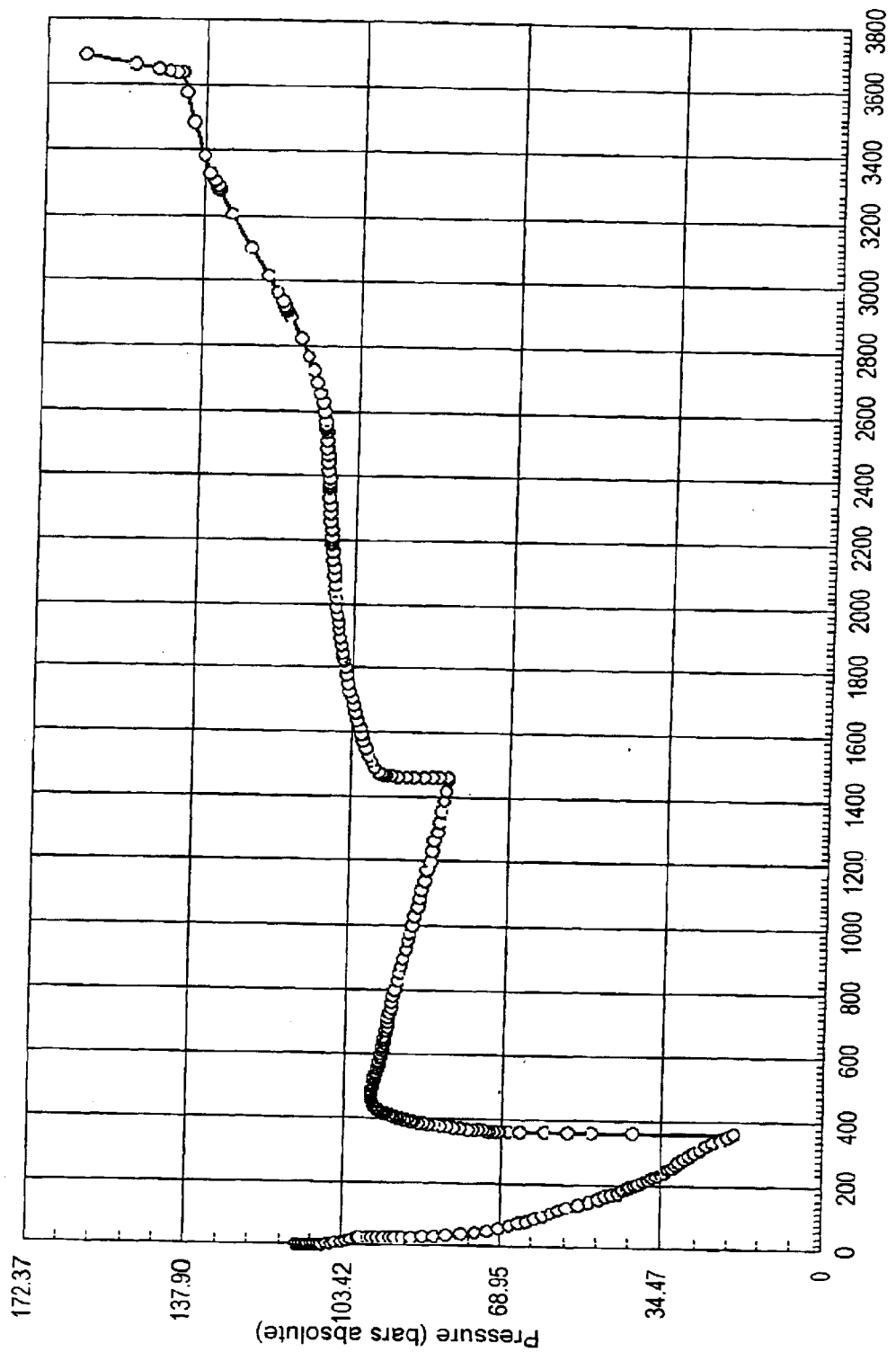
FIG. 130 depicts pressure at wellheads as a function of time from a numerical simulation.

FIG. 130 illustrates the pressure at the wellhead of the injection wells as a function of time during the simulation. The pressure decreased from about 114 bars absolute to about 19 bars absolute over the first 370 days. The decrease in the pressure was due to removal of water from the coal formation. Pressure then started to increase substantially as carbon dioxide injection started at 370 days. The pressure reached a maximum of about 98 bars absolute. The pressure then began to gradually decrease after 480 days. At about 1440 days, the pressure increased again to about 98 bars absolute due to the increase in the carbon dioxide injection rate. The pressure gradually increased until about 3640 days. The pressure jumped at about 3640 days because the production well was closed off.

Figure 131:
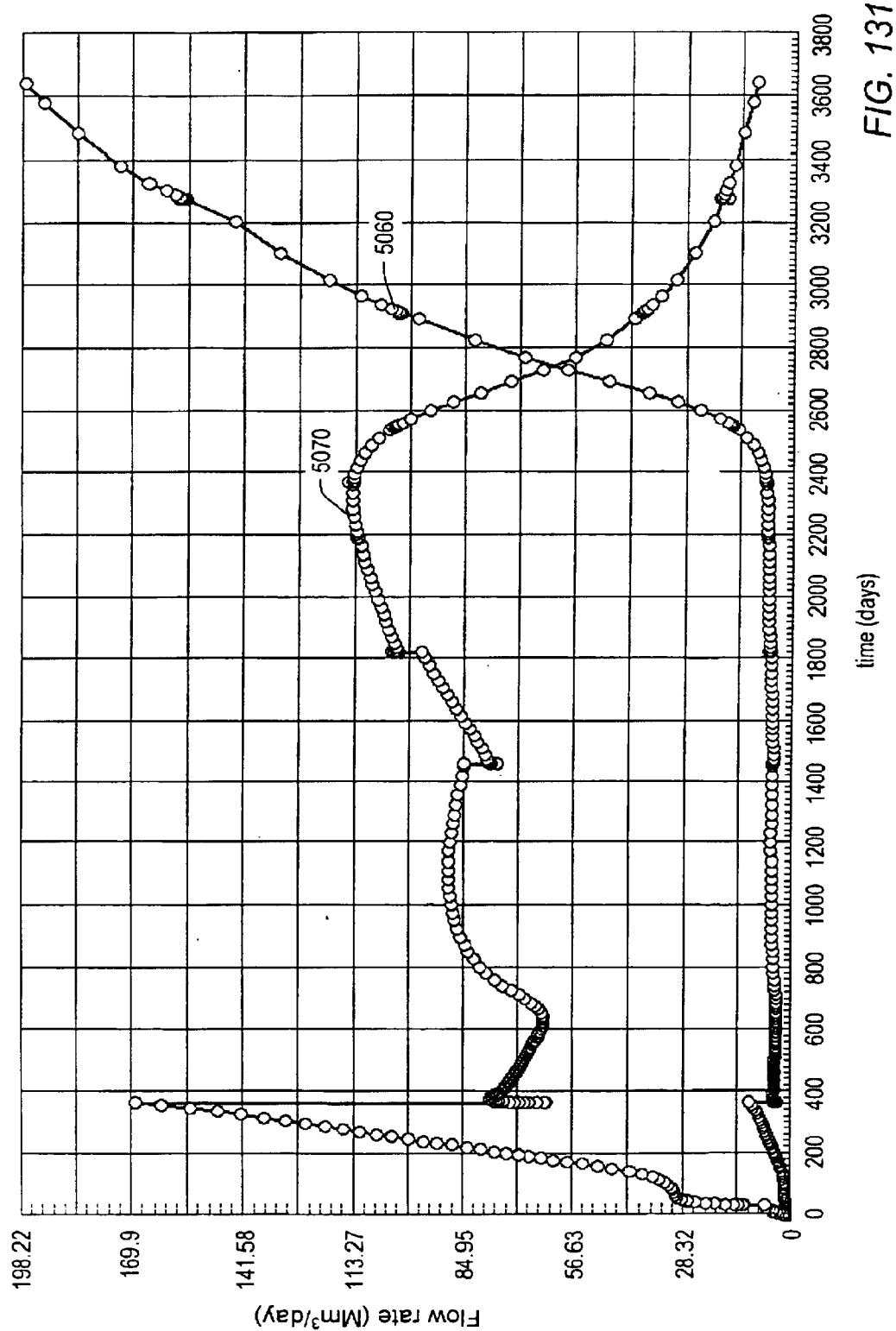
FIG. 131 depicts production rate of carbon dioxide and methane as a function of time from a numerical simulation.

FIG. 131 illustrates the production rate of carbon dioxide 5060 and methane 5070 as a function of time in the simulation. FIG. 131 shows that carbon dioxide was produced at a rate between about 0–10.000 m$^3$/day during approximately the first 2400 days. The production rate of carbon dioxide was significantly below the injection rate. Therefore, the simulation predicts that most of the injected carbon dioxide is being sequestered in the coal formation. However, at about 2400 days, the production rate of carbon dioxide started to rise significantly due to onset of saturation of the coal formation.

In addition, FIG. 131 shows that methane was desorbing as carbon dioxide was adsorbing in the coal formation. Between about 370–2400 days, the methane production rate 5070 increased from about 60,000 to about 115,000 standard m$^3$/day. The increase in the methane production rate between about 1440–2400 days was caused by the increase in carbon dioxide injection rate at about 1440 days. The production rate of methane started to decrease after about 2400 days. This was due to the saturation of the coal formation. The simulation predicted a 50% breakthrough at about 2700 days. "Breakthrough" is defined as the ratio of the flow rate of carbon dioxide to the total flow rate of the total produced gas times 100%. Also, the simulation predicted about a 90% breakthrough at about 3600 days.

Figure 132:
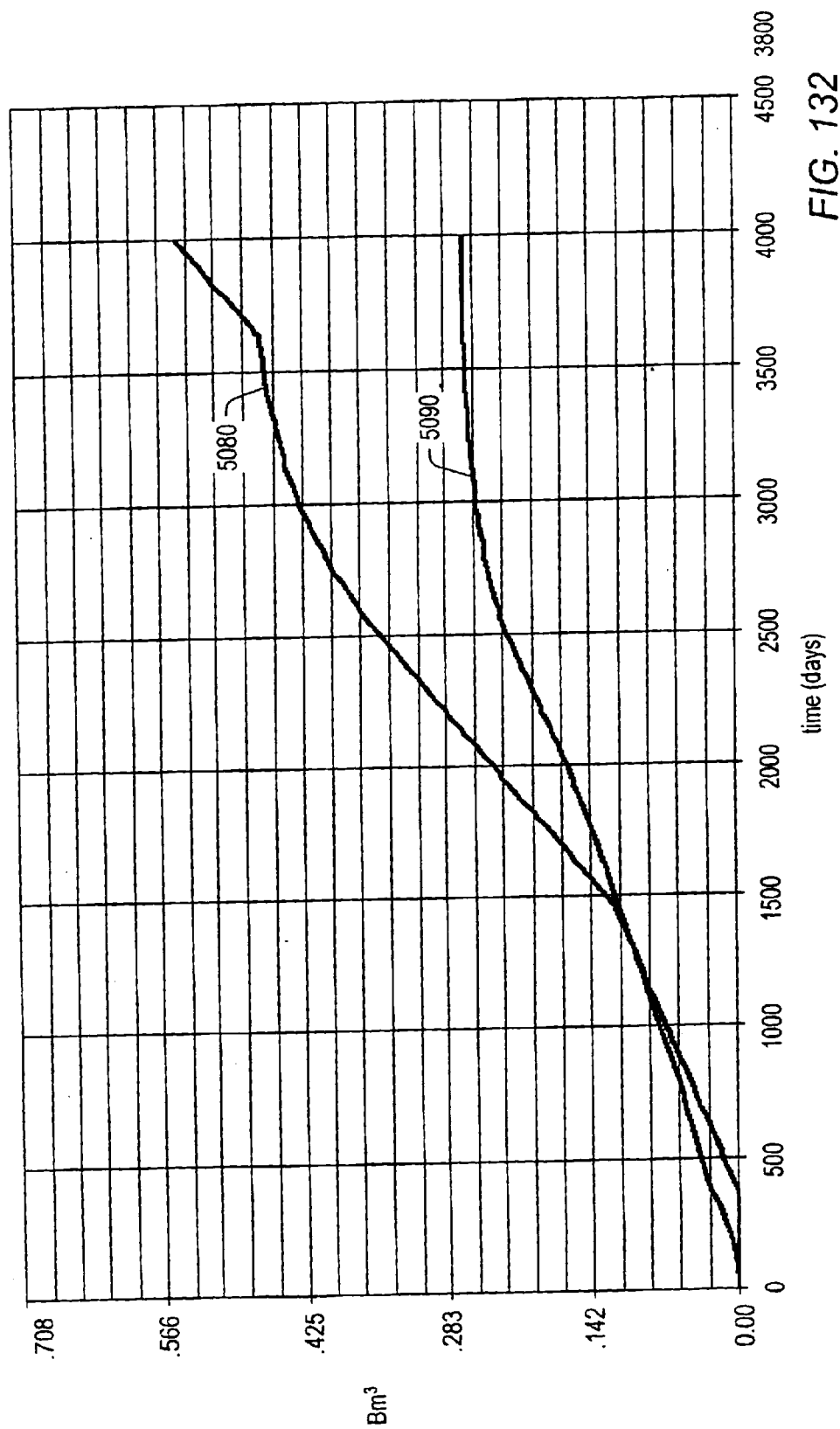
FIG. 132 depicts cumulative methane produced and net carbon dioxide injected as a function of time from a numerical simulation.

FIG. 132 illustrates cumulative methane produced 5090 and the cumulative net carbon dioxide injected 5080 as a function of time during the simulation. The cumulative net carbon dioxide injected is the total carbon dioxide produced subtracted from the total carbon dioxide injected. FIG. 132 shows that by the end of the simulated injection about twice as much carbon dioxide was stored than methane produced. In addition, the methane production was about 0.24 billion standard m$^3$ at 50% carbon dioxide breakthrough. Also, the carbon dioxide sequestration was about 0.39 billion standard m$^3$ at 50% carbon dioxide breakthrough. The methane production was about 0.26 billion standard m$^3$ at 90% carbon dioxide breakthrough. Also, the carbon dioxide sequestration was about 0.46 billion standard m$^3$ at 90% carbon dioxide breakthrough.

Table 5 shows that the permeability and porosity of the simulation in the post treatment coal formation were both significantly higher than in the deep coal formation prior to treatment. Also, the initial pressure was much lower. The depth of the post treatment coal formation was shallower than the deep coal bed methane formation. The same relative permeability data and PVT data used for the deep coal formation were used for the coal formation simulation. The initial water saturation for the post treatment coal formation was set at 70%. Water was present because it is used to cool the hot spent coal formation to 25° C. The amount of methane initially stored in the post treatment coal is very low.

The simulation modeled a sequestration process over a time period of about 3800 days for the post treatment coal formation model. The simulation modeled removal of water from the post treatment coal formation with production from all five wells. During about the first 200 days, the production rate of water was about 680,000 standard m³/day. From about 200–3300 days the water production rate was between about 210,000 to about 480,000 standard m³/day. Production rate of water was negligible after about 3300 days. Carbon dioxide injection was started at approximately 370 days at a flow rate of about 113,000 standard m³/day. The injection rate of carbon dioxide was increased to about 226,000 standard m³/day at approximately 1440 days. The injection rate remained at 226,000 standard m³/day until the end of the simulated injection.

Figure 133:
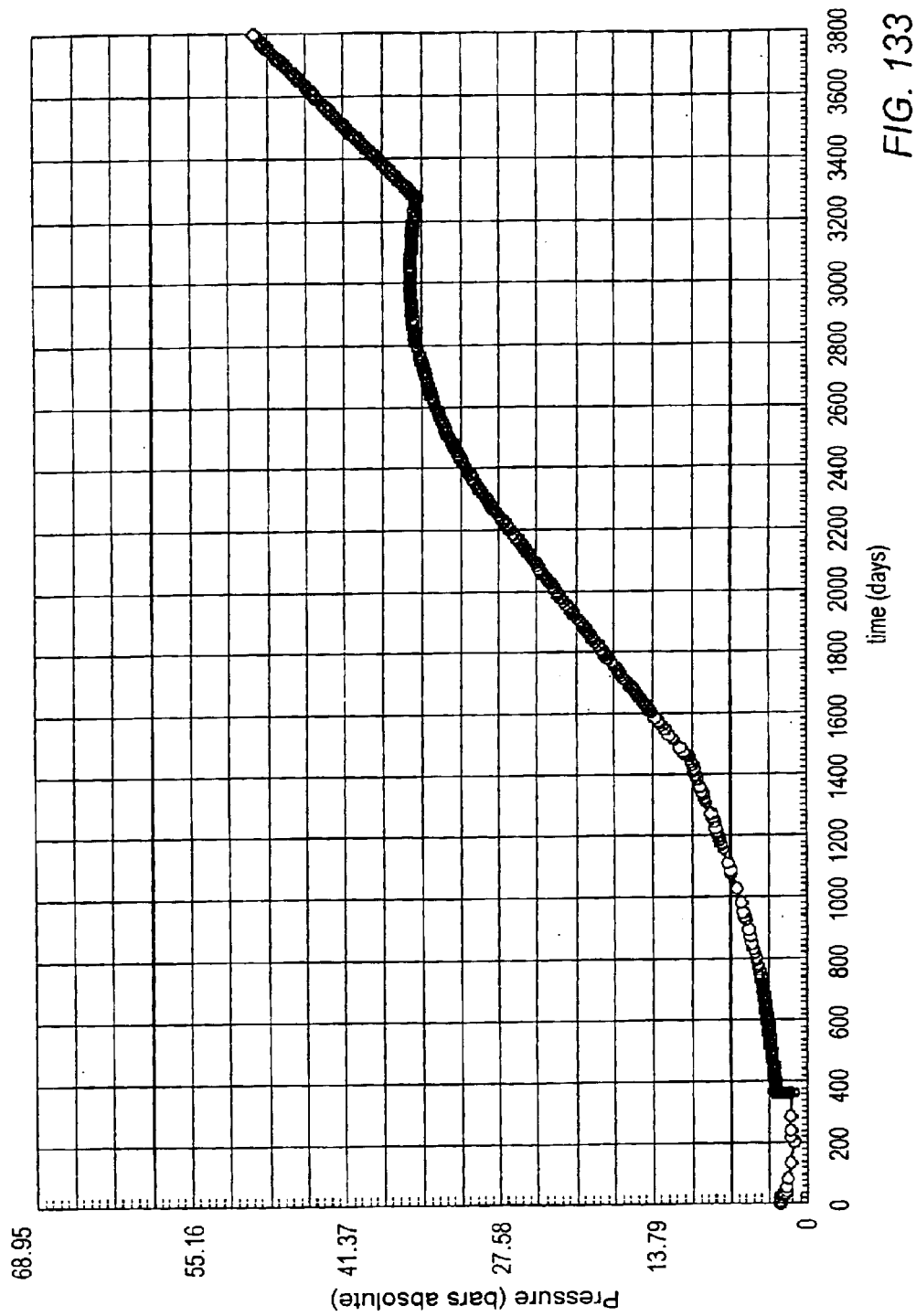
FIG. 133 depicts pressure at wellheads as a function of time from a numerical simulation.

FIG. 133 illustrates the pressure at the wellhead of the injection wells as a function of time during the simulation of the post treatment coal formation model. The pressure was relatively constant up to about 370 days. The pressure increased through most of the rest of the simulation run up to about 36 bars absolute. The pressure rose steeply starting at about 3300 days because the production well was closed off.

Figure 134:
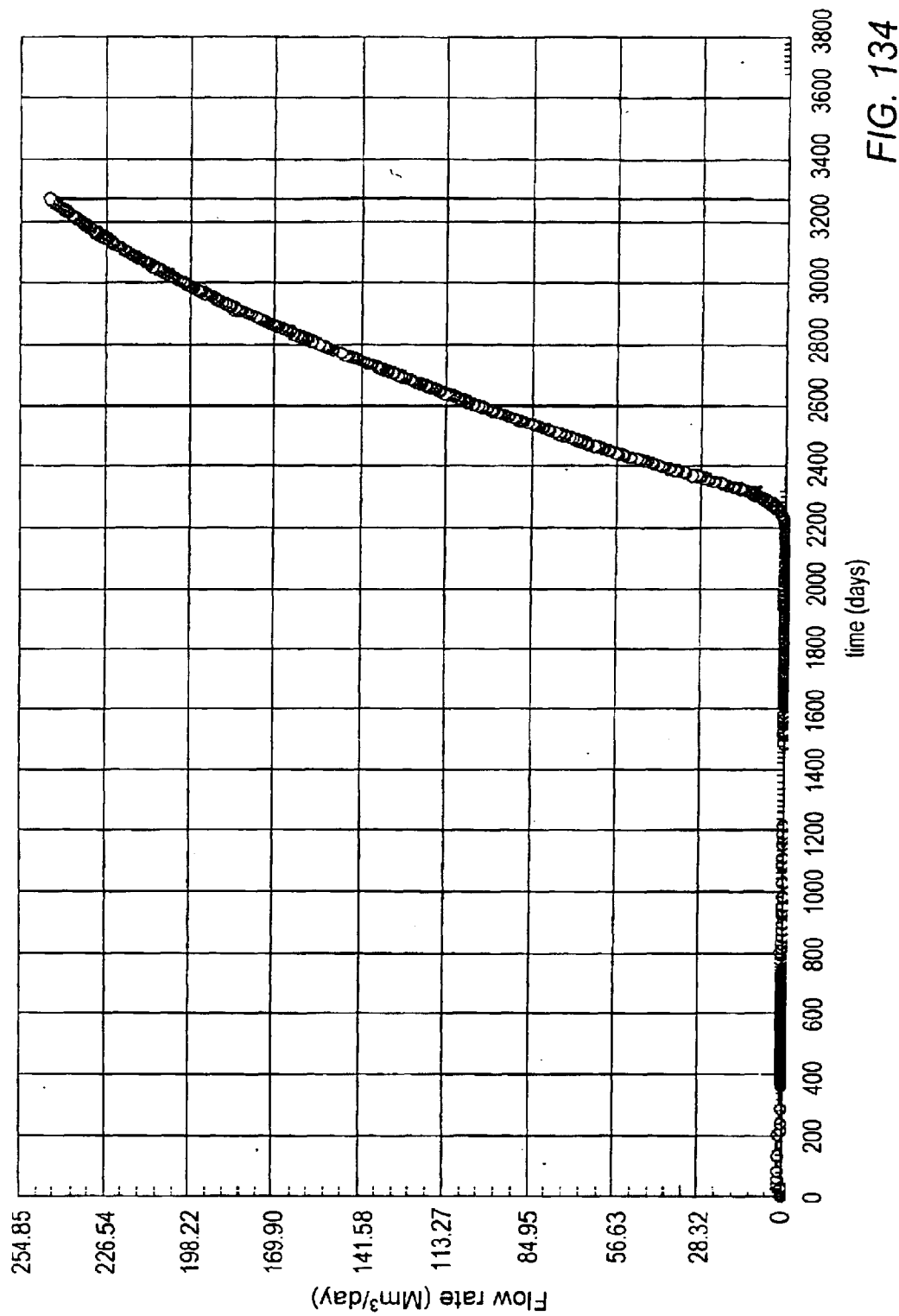
FIG. 134 depicts production rate of carbon dioxide as a function of time from a numerical simulation.

FIG. 134 illustrates the production rate of carbon dioxide as a function of time in the simulation of the post treatment coal formation model. FIG. 134 shows that the production rate of carbon dioxide was almost negligible during approximately the first 2200 days. Therefore, the simulation predicts that nearly all of the injected carbon dioxide is being sequestered in the post treatment coal formation. However, at about 2240 days, the produced carbon dioxide began to increase. The production rate of carbon dioxide started to rise significantly due to onset of saturation of the post treatment coal formation.

Figure 135:
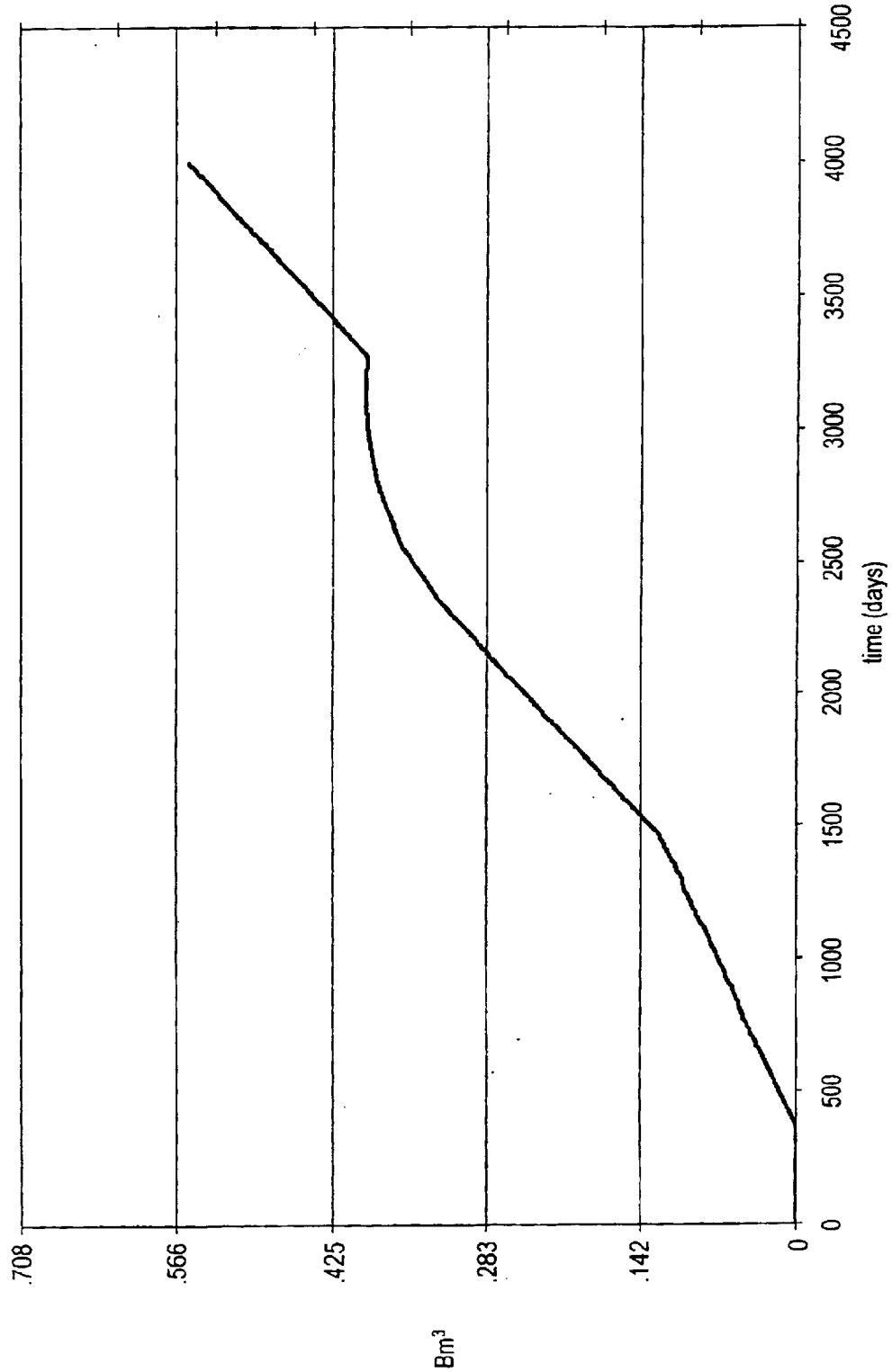
FIG. 135 depicts cumulative net carbon dioxide injected as a function of time from a numerical simulation.

FIG. 135 illustrates cumulative net carbon dioxide injected as a function of time during the simulation in the post treatment coal formation model. The cumulative net carbon dioxide injected is the total carbon dioxide produced subtracted from the total carbon dioxide injected. FIG. 135 shows that the simulation predicts a potential net sequestration of carbon dioxide of 0.56 Bm³. This value is greater than the value of 0.46 Bm³ at 90% carbon dioxide breakthrough in the deep coal formation. However, comparison of FIG. 130 with FIG. 133 shows that sequestration occurs at much lower pressures in the post treatment coal formation model. Therefore, less compression energy was required for sequestration in the post treatment coal formation.

The simulations show that large amounts of carbon dioxide may be sequestered in both deep coal formations and in post treatment coal formations that have been cooled.

Carbon dioxide may be sequestered in the post treatment coal formation, in coal formations that have not been pyrolyzed, and/or in both types of formations.

Figure 128:
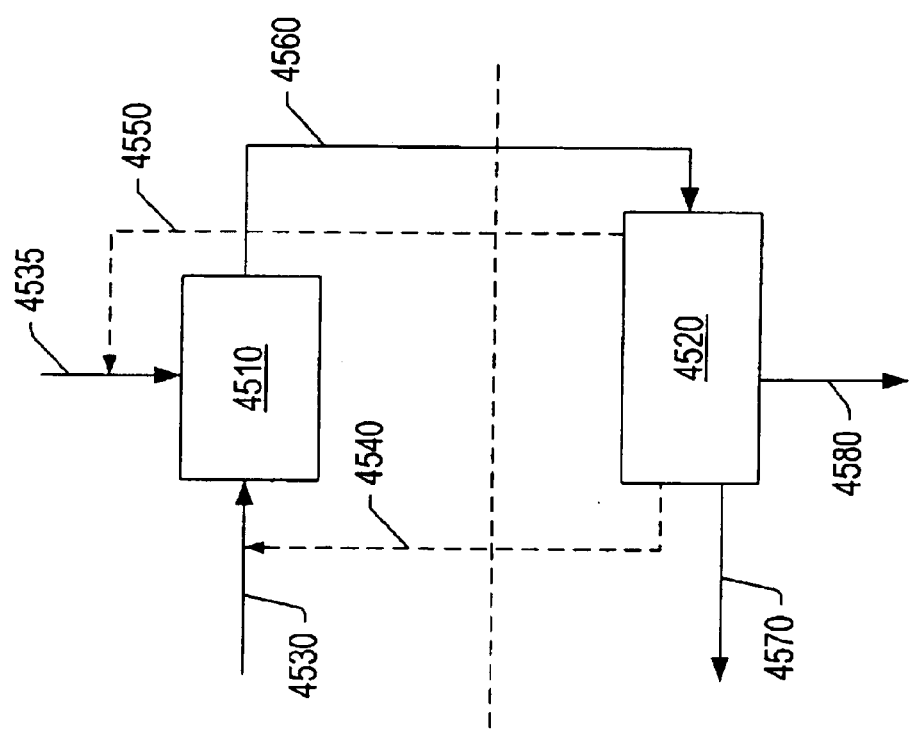
FIG. 128 depicts an embodiment of in situ synthesis gas production integrated with a Fischer-Tropsch process.

FIG. 128 is a flowchart of an embodiment of an in situ synthesis gas production process 4510 integrated with a SMDS Fischer-Tropsch and wax cracking process with heat and mass balances. The synthesis gas generating fluid injected into the formation includes about 24,000 metric tons per day of water 4530, which includes about 5,500 metric tons per day of water 4540 recycled from the SMDS Fischer-Tropsch and wax cracking process 4520. A total of about 1700 MW of energy is supplied to the in situ synthesis gas production process 4510. About 1020 MW of energy 4535 of the approximately 1700 MW of energy is supplied by in situ reaction of an oxidizing fluid with the formation, and approximately 680 MW of energy 4550 is supplied by the SMDS Fischer-Tropsch and wax cracking process 4520 in the form of steam. About 12,700 cubic meters equivalent oil per day of synthesis gas 4560 is used as feed gas to the SMDS Fischer-Tropsch and wax cracking process 4520. The SMDS Fischer-Tropsch and wax cracking process 4520 produces about 4,770 cubic meters per day of products 4570 that may include naphtha, kerosene, diesel, and about 5,880 cubic meters equivalent oil per day of off gas 4580 for a power generation facility.

Figure 129:
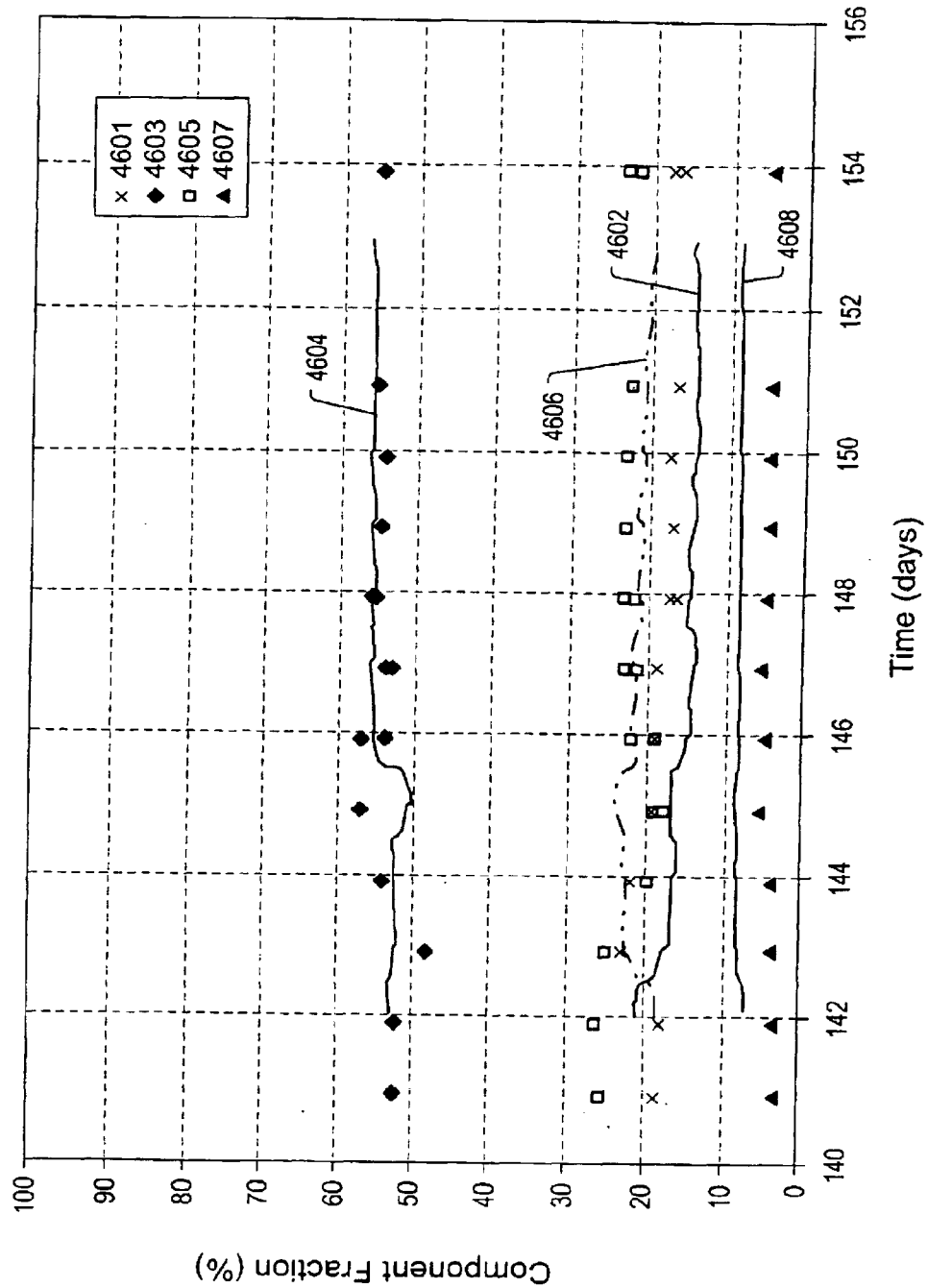
FIG. 129 depicts a comparison between numerical simulation data and experimental field test data of synthesis gas composition produced as a function of time.

FIG. 129 is a comparison between numerical simulation and the in situ experimental coal field test composition of synthesis gas produced as a function of time. The plot excludes nitrogen and traces of oxygen that were contaminants during gas sampling. Symbols represent experimental data and curves represent simulation results. Hydrocarbons 4601 are methane since all other heavier hydrocarbons have decomposed at the prevailing temperatures. The simulation results are moving averages of raw results, which exhibit peaks and troughs of approximately ±10 percent of the averaged value. In the model, the peaks of $H_2$ occurred when fluids were injected into the coal seam, and coincided with lows in $CO_2$ and CO.

The simulation of $H_2$ 4604 provides a good fit to observed fraction of $H_2$ 4603. The simulation of methane 4602 provides a good fit to observed fraction of methane 4601. The simulation of carbon dioxide 4606 provides a good fit to observed fraction of carbon dioxide 4605. The simulation of CO 4608 overestimated the fraction of CO 4607 by 4–5 percentage points. Carbon monoxide is the most difficult of the synthesis gas components to model. Also, the carbon monoxide discrepancy may be due to fact that the pattern temperatures exceeded 550° C., the upper limit at which the numerical model was calibrated.

Other methods of producing synthesis gas were successfully demonstrated at the experimental field test. These included continuous injection of steam and air, steam and oxygen, water and air, water and oxygen, steam, air and carbon dioxide. All these injections successfully generated synthesis gas in the hot coke formation.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of treating a coal formation in situ, comprising:
   providing heat from two or more heaters to at least a section of the formation;
   allowing the heat to transfer from at least two of the heaters to a part of the formation such that a permeability of at least some of the part of the formation increases to greater than about 100 millidarcy, wherein superposition of heat from at least two of the heaters pyrolyzes at least some hydrocarbons in the part of the formation; and
   controlling a pressure within at least a majority of the part of the formation, wherein the controlled pressure is at least about 2.0 bar absolute.

2. The method of claim 1, further comprising maintaining a temperature in the part of the formation in a pyrolysis temperature range.

3. The method of claim 1, wherein at least one of the heaters comprises an electrical heater.

4. The method of claim 1, wherein at least one of the heaters comprises a surface burner.

5. The method of claim 1, wherein at least one of the heaters comprises a flameless distributed combustor.

6. The method of claim 1, wherein at least one of the heaters comprises a natural distributed combustor.

7. The method of claim 1, further comprising controlling the heat such that an average heating rate of the part of the formation is less than about 1° C., per day in a pyrolysis temperature range.

8. The method of claim 1, wherein providing heat from two or more of the heaters to at least the section of the formation comprises:
heating a selected volume (V) of the coal formation from two or more of the heaters, wherein the formation has an average heat capacity ($C_v$), and wherein the heating pyrolyzes at least some hydrocarbons in the selected volume of the formation; and
wherein heating energy/day (Pwr) provided to the selected volume is equal to or less than $h*V*C_v*\rho_B$, wherein $\rho_B$ is formation bulk density, and wherein an average heating rate (h) of the selected volume is about 10° C./day.

9. The method of claim 1, wherein allowing the heat to transfer comprises transferring heat substantially by conduction.

10. The method of claim 1, wherein providing heat from two or more of the heaters increases a thermal conductivity of at least a portion of the part of the formation to greater than about 0.5 W/(m° C.).

11. The method of claim 1, further comprising producing a mixture from the formation, wherein the produced mixture comprises condensable hydrocarbons having an API gravity of at least about 25°.

12. The method of claim 1, further comprising producing a mixture from the formation, wherein the produced mixture comprises condensable hydrocarbons, and wherein about 0.1% by weight to about 15% by weight of the condensable hydrocarbons are olefins.

13. The method of claim 1, further comprising producing a mixture from the formation, wherein the produced mixture comprises non-condensable hydrocarbons, and wherein a molar ratio of ethene to ethane in the non-condensable hydrocarbons ranges from about 0.001 to about 0.15.

14. The method of claim 1, further comprising producing a mixture from the formation, wherein the produced mixture comprises condensable hydrocarbons, and wherein less than about 1% by weight, when calculated on an atomic basis, of the condensable hydrocarbons is nitrogen.

15. The method of claim 1, further comprising producing a mixture from the formation, wherein the produced mixture comprises condensable hydrocarbons, and wherein less than about 1% by weight, when calculated on an atomic basis, of the condensable hydrocarbons is oxygen.

16. The method of claim 1, further comprising producing a mixture from the formation, wherein the produced mixture comprises condensable hydrocarbons, and wherein less than about 1% by weight, when calculated on an atomic basis, of the condensable hydrocarbons is sulfur.

17. The method of claim 1, further comprising producing a mixture from the formation, wherein the produced mixture comprises condensable hydrocarbons, wherein about 5% by weight to about 30% by weight of the condensable hydrocarbons comprise oxygen containing compounds, and wherein the oxygen containing compounds comprise phenols.

18. The method of claim 1, further comprising producing a mixture from the formation, wherein the produced mixture comprises condensable hydrocarbons, and wherein greater than about 20% by weight of the condensable hydrocarbons are aromatic compounds.

19. The method of claim 1, further comprising producing a mixture from the formation, wherein the produced mixture comprises condensable hydrocarbons, and wherein less than about 5% by weight of the condensable hydrocarbons comprises multi-ring aromatics with more than two rings.

20. The method of claim 1, further comprising producing a mixture from the formation, wherein the produced mixture comprises condensable hydrocarbons, and wherein less than about 0.3% by weight of the condensable hydrocarbons are asphaltenes.

21. The method of claim 1, further comprising producing a mixture from the formation, wherein the produced mixture comprises condensable hydrocarbons, and wherein about 5% by weight to about 30% by weight of the condensable hydrocarbons are cycloalkanes.

22. The method of claim 1, further comprising producing a mixture from the formation, wherein the produced mixture comprises a non-condensable component, wherein the non-condensable component comprises molecular hydrogen, wherein the molecular hydrogen is greater than about 10% by volume of the non-condensable component at 25° C., and one atmosphere absolute pressure, and wherein the molecular hydrogen is less than about 80% by volume of the non-condensable component at 25° C., and one atmosphere absolute pressure.

23. The method of claim 1, further comprising producing a mixture from the formation, wherein the produced mixture comprises ammonia, and wherein greater than about 0.05% by weight of the produced mixture is ammonia.

24. The method of claim 1, further comprising producing a mixture from the formation, wherein the produced mixture comprises ammonia, and wherein the ammonia is used to produce fertilizer.

25. The method of claim 1, further comprising controlling formation conditions to produce a mixture from the formation, wherein a partial pressure of $H_2$ in the mixture is greater than about 0.5 bar.

26. The method of claim 25, wherein the partial pressure of $H_2$ in the mixture is measured when the mixture is at a production well.

27. The method of claim 1, further comprising altering a pressure within the formation to inhibit production of hydrocarbons from the formation having carbon numbers greater than about 25.

28. The method of claim 1, further comprising producing a mixture from the formation and controlling formation conditions by recirculating a portion of hydrogen from the mixture into the formation.

29. The method of claim 1, further comprising:
providing hydrogen ($H_2$) to the heated part to hydrogenate hydrocarbons in the part; and
heating a portion of the part with heat from hydrogenation.

30. The method of claim 1, further comprising:
producing hydrogen ($H_2$) and condensable hydrocarbons from the formation; and
hydrogenating a portion of the produced condensable hydrocarbons with at least a portion of the produced hydrogen.

31. The method of claim 1, further comprising increasing a permeability of a majority of the part of the formation to greater than about 5 Darcy.

32. The method of claim 1, wherein allowing the heat to transfer increases a permeability of a majority of the part of the formation such that the permeability of the part is substantially uniform.

33. The method of claim 1, further comprising controlling the heat to yield greater than about 60% by weight of condensable hydrocarbons, as measured by Fischer Assay.

34. The method of claim 1, further comprising producing a mixture in a production well, wherein at least about 7 heaters are disposed in the formation for each production well.

35. The method of claim 34, wherein at least about 20 heaters are disposed in the formation for each production well.

36. The method of claim 1, further comprising providing heat from three or more heaters to at least a portion of the formation, wherein three or more of the heaters are located in the formation in a unit of heaters, and wherein the unit of heaters comprises a triangular pattern.

37. The method of claim 1, further comprising providing heat from three or more heaters to at least a portion of the formation, wherein three or more of the heaters are located in the formation in a unit of heaters, wherein the unit of heaters comprises a triangular pattern, and wherein a plurality of the units are repeated over an area of the formation to form a repetitive pattern of units.

38. The method of claim 1, wherein the part of the formation comprises a selected section.

39. The method of claim 1, wherein a pyrolysis zone is established in the part of the formation.

40. The method of claim 1, wherein a pyrolysis zone is established in the part of the formation proximate to and/or surrounding at least one of the heaters.

41. The method of claim 1, wherein at least one of the heaters is disposed in an open wellbore.

42. The method of claim 1, further comprising providing hydrogen ($H_2$) to the heated part of the formation to hydrogenate hydrocarbons in the part.

43. A method of treating a coal formation in situ, comprising:
providing heat from one or more heaters to at least a section of the formation;
allowing the heat to transfer from one or more of the heaters to a part of the formation to increase a permeability of a majority of the part of the formation such that the permeability of the majority of the part is substantially uniform; and
controlling the heat such that an average heating rate of the part of the formation is less than about 1° C. per day in pyrolysis temperature range.

44. The method of claim 43, wherein the one or more heaters comprise at least two heaters, and wherein superposition of heat from at least the two heaters pyrolyzes at least some hydrocarbons in the part of the formation.

45. The method of claim 43, further comprising maintaining a temperature in the part of the formation in a pyrolysis temperature range.

46. The method of claim 43, wherein at least one of the heaters comprises an electrical heater.

47. The method of claim 43, wherein at least one of the heaters comprises a surface burner.

48. The method of claim 43, wherein at least one of the heaters comprises a flameless distributed combustor.

49. The method of claim 43, wherein at least one of the heaters comprises a natural distributed combustor.

50. The method of claim 43, wherein providing heat from one or more of the heaters to at least the section of the formation comprises:
heating a selected volume (V) of the coal formation from one or more of the heaters, wherein the formation has an average heat capacity ($C_v$), and wherein the heating pyrolyzes at least some hydrocarbons in the selected volume of the formation; and
wherein heating energy/day (Pwr) provided to the selected volume is equal to or less than $h*V*C_v*\rho_B$, wherein $\rho_B$ is formation bulk density, and wherein an average heating rate (h) of the selected volume is about 1° C./day.

51. The method of claim 43, wherein allowing the heat to transfer comprises transferring heat substantially by conduction.

52. The method of claim 43, wherein providing heat from one or more of the heaters increases a thermal conductivity of at least a portion of the part of the formation to greater than about 0.5 W/(m° C.).

53. The method of claim 43, further comprising producing a mixture from the formation, wherein the produced mixture comprises condensable hydrocarbons having an API gravity of at least about 25°.

54. The method of claim 43, further comprising producing a mixture from the formation, wherein the produced mixture comprises condensable hydrocarbons, and wherein about 0.1% by weight to about 15% by weight of the condensable hydrocarbons are olefins.

55. The method of claim 43, further comprising producing a mixture from the formation, wherein the produced mixture comprises non-condensable hydrocarbons, and wherein a molar ratio of ethene to ethane in the non-condensable hydrocarbons ranges from about 0.001 to about 0.15.

56. The method of claim 43, further comprising producing a mixture from the formation, wherein the produced mixture comprises condensable hydrocarbons, and wherein less than about 1% by weight, when calculated on an atomic basis, of the condensable hydrocarbons is nitrogen.

57. The method of claim 43, further comprising producing a mixture from the formation, wherein the produced mixture comprises condensable hydrocarbons, and wherein less than about 1% by weight, when calculated on an atomic basis, of the condensable hydrocarbons is oxygen.

58. The method of claim 43, further comprising producing a mixture from the formation, wherein the produced mixture comprises condensable hydrocarbons, and wherein less than about 1% by weight, when calculated on an atomic basis, of the condensable hydrocarbons is sulfur.

59. The method of claim 43, further comprising producing a mixture from the formation, wherein the produced mixture comprises condensable hydrocarbons, wherein about 5% by weight to about 30% by weight of the condensable hydrocarbons comprise oxygen containing compounds, and wherein the oxygen containing compounds comprise phenols.

60. The method of claim 43, further comprising producing a mixture from the formation, wherein the produced mixture comprises condensable hydrocarbons, and wherein greater than about 20% by weight of the condensable hydrocarbons are aromatic compounds.

61. The method of claim 43, further comprising producing a mixture from the formation, wherein the produced mixture comprises condensable hydrocarbons, and wherein less than about 5% by weight of the condensable hydrocarbons comprises multi-ring aromatics with more than two rings.

62. The method of claim 43, further comprising producing a mixture from the formation, wherein the produced mixture comprises condensable hydrocarbons, and wherein less than about 0.3% by weight of the condensable hydrocarbons are asphaltenes.

63. The method of claim 43, further comprising producing a mixture from the formation, wherein the produced mixture comprises condensable hydrocarbons, and wherein about 5% by weight to about 30% by weight of the condensable hydrocarbons are cycloalkanes.

64. The method of claim 43, further comprising producing a mixture from the formation, wherein the produced mixture comprises a non-condensable component, wherein the non-condensable component comprises molecular hydrogen, wherein the molecular hydrogen is greater than about 10% by volume of the non-condensable component at 25° C., and one atmosphere absolute pressure, and wherein the molecular hydrogen is less than about 80% by volume of the non-condensable component at 25° C., and one atmosphere absolute pressure.

65. The method of claim 43, further comprising producing a mixture from the formation, wherein the produced mixture comprises ammonia, and wherein greater than about 0.05% by weight of the produced mixture is ammonia.

66. The method of claim 43, further comprising producing a mixture from the formation, wherein the produced mixture comprises ammonia, and wherein the ammonia is used to produce fertilizer.

67. The method of claim 43, further comprising controlling a pressure in at least a majority of the part of the formation, wherein the controlled pressure is at least about 2.0 bar absolute.

68. The method of claim 43, further comprising controlling formation conditions to produce a mixture from the formation, wherein a partial pressure of $H_2$ in the mixture is greater than about 0.5 bar.

69. The method of claim 43, further comprising producing a mixture from the formation, wherein a partial pressure of $H_2$ in the mixture is measured when the mixture is at a production well.

70. The method of claim 43, further comprising altering a pressure in the formation to inhibit production of hydrocarbons from the formation having carbon numbers greater than about 25.

71. The method of claim 43, further comprising producing a mixture from the formation and controlling formation conditions by recirculating a portion of hydrogen from the mixture into the formation.

72. The method of claim 43, further comprising:
providing hydrogen ($H_2$) to the heated part to hydrogenate hydrocarbons in the part; and
heating a portion of the part with heat from hydrogenation.

73. The method of claim 43, further comprising:
producing hydrogen ($H_2$) and condensable hydrocarbons from the formation; and
hydrogenating a portion of the produced condensable hydrocarbons with at least a portion of the produced hydrogen.

74. The method of claim 43, wherein allowing the heat to transfer increases a permeability of a majority of the part of the formation to greater than about 100 millidarcy.

75. The method of claim 43, further comprising controlling the heat to yield greater than about 60% by weight of condensable hydrocarbons, as measured by Fischer Assay.

76. The method of claim 43, further comprising producing a mixture in a production well, wherein at least about 7 heaters are disposed in the formation for each production well.

77. The method of claim 76, wherein at least about 20 heaters are disposed in the formation for each production well.

78. The method of claim 43, further comprising providing heat from three or more heaters to at least a portion of the formation, wherein three or more of the heaters are located in the formation in a unit of heaters, wherein the unit of heaters comprises a triangular pattern.

79. The method of claim 43, further comprising providing heat from three or more heaters to at least a portion of the formation, wherein three or more of the heaters are located in the formation in a unit of heaters, wherein the unit of heaters comprises a triangular pattern, and wherein a plurality of the units are repeated over an area of the formation to form a repetitive pattern of units.

80. The method of claim 43, wherein the part of the formation comprises a selected section.

81. The method of claim 43, wherein a pyrolysis zone is established in the part of the formation.

82. The method of claim 43, wherein a pyrolysis zone is established in the part of the formation proximate to and/or surrounding at least one of the heaters.

83. The method of claim 43, wherein at least one of the heaters is disposed in an open wellbore.

84. The method of claim 43, further comprising providing hydrogen ($H_2$) to the heated part of the formation to hydrogenate hydrocarbons in the part.

85. A method for treating hydrocarbons in at least a section of a coal formation, wherein the section has an average permeability of less than about 10 millidarcy, comprising:
providing heat from one or more heaters to the formation;
allowing the heat to transfer from one or more of the heaters to a part of the formation such that heat from one or more of the heaters pyrolyzes at least some hydrocarbons in the part of the formation, and wherein heat from one or more of the heaters increases the permeability of at least a portion of the part of the formation;
producing a mixture comprising hydrocarbons from the formation;
monitoring a composition of the produced mixture; and
controlling a pressure in at least some of the formation to control the composition of the produced mixture.

86. The method of claim 85, wherein the one or more heaters comprise at least two heaters, and wherein superposition of heat from at least the two heaters pyrolyzes at least some hydrocarbons in the part of the formation, and wherein superposition of heat from at least the two heaters increases the permeability of at least the portion of the part of the formation.

87. The method of claim 85, further comprising allowing heat to transfer from at least one of the heaters to the part of the formation to create thermal fractures in the formation, wherein the thermal fractures substantially increase the permeability of the part of the formation.

88. The method of claim 85, wherein the heat is provided such that an average temperature in the part of the formation ranges from about 270° C., to about 400° C.

89. The method of claim 85, wherein at least one of the heaters comprises an electrical heater located in the formation.

90. The method of claim 85, wherein at least one of the heaters is located in a heater well, and wherein at least one of the heater wells comprises a conduit located in the formation, and further comprising heating the conduit by flowing a hot fluid through the conduit.

91. The method of claim 85, wherein at least some of the heaters are arranged in a triangular pattern.

92. The method of claim 85, wherein the pressure is controlled by a valve proximate to a location where the mixture is produced.

93. The method of claim 85, wherein the pressure is controlled such that pressure proximate to one or more of the heaters is greater than a pressure proximate to a location where the fluid is produced.

94. The method of claim 85, wherein the part of the formation comprises a selected selection.

95. The method of claim 85, wherein a pyrolysis zone is established in the part of the formation.

96. The method of claim 85, wherein a pyrolysis zone is established in the part of the formation proximate to and/or surrounding at least one of the heaters.

97. The method of claim 85, wherein at least one of the heaters is disposed in an open wellbore.

98. The method of claim 85, further comprising providing hydrogen ($H_2$) to the heated part of the formation to hydrogenate hydrocarbons in the part.

99. A method of treating a coal formation in situ, comprising:
providing heat from one or more heaters to at least a section of the formation;
allowing the heat to transfer from one or more of the heaters to a part of the formation such that a permeability of at least some of the part of the formation increases to greater than about 100 millidarcy;
controlling the heat such that an average heating rate of the part of the formation is less than about 1° C., per day in a pyrolysis temperature range; and
controlling formation conditions to produce a mixture from the formation, wherein a partial pressure of $H_2$ in the mixture is greater than about 0.5 bar.

100. The method of claim 99, wherein the one or more heaters comprise at least two heaters, and wherein superposition of heat from at least the two heaters pyrolyzes at least some hydrocarbons in the part of the formation.

101. The method of claim 99, further comprising maintaining a temperature in the part of the formation in a pyrolysis temperature range.

102. The method of claim 99, further comprising controlling a pressure and a temperature in at least a majority of the part of the formation, wherein the pressure is controlled as a function of temperature, or the temperature is controlled as a function of pressure.

103. The method of claim 99, wherein allowing the heat to transfer comprises transferring heat substantially by conduction.

104. The method of claim 99, wherein providing heat from one or more of the heaters increases a thermal conductivity of at least a portion of the part of the formation to greater than about 0.5 W/(m° C.).

105. The method of claim 99, wherein the produced mixture comprises condensable hydrocarbons, and wherein about 0.1% by weight to about 15% by weight of the condensable hydrocarbons are olefins.

106. The method of claim 99, wherein the produced mixture comprises non-condensable hydrocarbons, and wherein a molar ratio of ethene to ethane in the non-condensable hydrocarbons ranges from about 0.001 to about 0.15.

107. The method of claim 99, wherein the produced mixture comprises condensable hydrocarbons, and wherein less than about 1% by weight, when calculated on an atomic basis, of the condensable hydrocarbons is nitrogen.

108. The method of claim 99, wherein the produced mixture comprises condensable hydrocarbons, and wherein less than about 1% by weight, when calculated on an atomic basis, of the condensable hydrocarbons is oxygen.

109. The method of claim 99, wherein the produced mixture comprises condensable hydrocarbons, and wherein less than about 1% by weight, when calculated on an atomic basis, of the condensable hydrocarbons is sulfur.

110. The method of claim 99, wherein the produced mixture comprises condensable hydrocarbons, wherein about 5% by weight to about 30% by weight of the condensable hydrocarbons comprise oxygen containing compounds, and wherein the oxygen containing compounds comprise phenols.

111. The method of claim 99, wherein the produced mixture comprises condensable hydrocarbons, and wherein greater than about 20% by weight of the condensable hydrocarbons are aromatic compounds.

112. The method of claim 99, wherein the produced mixture comprises condensable hydrocarbons, and wherein less than about 5% by weight of the condensable hydrocarbons comprises multi-ring aromatics with more than two rings.

113. The method of claim 99, wherein the produced mixture comprises condensable hydrocarbons, and wherein less than about 0.3% by weight of the condensable hydrocarbons are asphaltenes.

114. The method of claim 99, wherein the produced mixture comprises condensable hydrocarbons, and wherein about 5% by weight to about 30% by weight of the condensable hydrocarbons are cycloalkanes.

115. The method of claim 99, wherein the produced mixture comprises a non-condensable component, wherein the non-condensable component comprises molecular hydrogen, wherein the molecular hydrogen is greater than about 10% by volume of the non-condensable component at 25° C., and one atmosphere absolute pressure, and wherein the molecular hydrogen is less than about 80% by volume of the non-condensable component at 25° C., and one atmosphere absolute pressure.

116. The method of claim 99, wherein the produced mixture comprises ammonia, and wherein greater than about 0.05% by weight of the produced mixture is ammonia.

117. The method of claim 99, further comprising controlling a pressure in at least a majority of the part of the formation, wherein the controlled pressure is at least about 2.0 bar absolute.

118. The method of claim 99, further comprising altering a pressure within the formation to inhibit production of hydrocarbons from the formation having carbon numbers greater than about 25.

119. The method of claim 99, further comprising controlling formation conditions by recirculating a portion of hydrogen from the mixture into the formation.

120. The method of claim 99, wherein allowing the heat to transfer increases a permeability of a majority of the part of the formation such that the permeability of the majority of the part is substantially uniform.

121. The method of claim 99, further comprising controlling the heat to yield greater than about 60% by weight of condensable hydrocarbons, as measured by Fischer Assay.

122. The method of claim 99, further comprising producing a mixture in a production well, wherein at least about 7 heaters are disposed in the formation for each production well.

123. The method of claim 122, wherein at least about 20 heaters are disposed in the formation for each production well.

124. The method of claim 99, wherein the part of the formation comprises a selected section.

125. The method of claim 99, wherein a pyrolysis zone is established in the part of the formation.

126. The method of claim 99, wherein a pyrolysis zone is established in the part of the formation proximate to and/or surrounding at least one of the heaters.

127. The method of claim 99, wherein at least one of the heaters is disposed in an open wellbore.

128. The method of claim 99, further comprising providing hydrogen ($H_2$) to the heated part of the formation to hydrogenate hydrocarbons in the part.

129. A method of treating a coal formation in situ, comprising:

providing heat from two or more heaters to at least a section of the formation;

allowing the heat to transfer from two or more of the heaters to a part of the formation such that a permeability of at least some of the part of the formation increases to greater than about 100 millidarcy, and wherein superposition of heat from at least two of the heaters pyrolyzes at least some hydrocarbons in the part of the formation;

controlling a pressure in at least a majority of the part of the formation, wherein the controlled pressure is at least about 2.0 bar absolute; and producing a mixture from the formation, wherein the produced mixture comprises non-condensable hydrocarbons, and wherein a molar ratio of ethene to ethane in the non-condensable hydrocarbons ranges from about 0.001 to about 0.15.

130. The method of claim 129, further comprising maintaining a temperature in the part of the formation in a pyrolysis temperature range.

131. The method of claim 129, further comprising controlling a pressure and a temperature in at least a majority of the part of the formation, wherein the pressure is controlled as a function of temperature, or the temperature is controlled as a function of pressure.

132. The method of claim 129, further comprising controlling the heat such that an average heating rate of the part of the formation is less than about 1° C. per day in a pyrolysis temperature range.

133. The method of claim 129, wherein allowing the heat to transfer comprises transferring heat substantially by conduction.

134. The method of claim 129, wherein providing heat from two or more of the heaters increases a thermal conductivity of at least a portion of the part of the formation to greater than 0.5 W/(m° C.).

135. The method of claim 129, wherein the produced mixture comprises condensable hydrocarbons, and wherein about 0.1% by weight to about 15% by weight of the condensable hydrocarbons are olefins.

136. The method of claim 129, wherein the produced mixture comprises condensable hydrocarbons, and wherein less than about 1% by weight, when calculated on an atomic basis, of the condensable hydrocarbons is nitrogen.

137. The method of claim 129, wherein the produced mixture comprises condensable hydrocarbons, and wherein less than about 1% by weight, when calculated on an atomic basis, of the condensable hydrocarbons is oxygen.

138. The method of claim 129, wherein the produced mixture comprises condensable hydrocarbons, and wherein less than about 1% by weight, when calculated on an atomic basis, of the condensable hydrocarbons is sulfur.

139. The method of claim 129, wherein the produced mixture comprises condensable hydrocarbons, wherein about 5% by weight to about 30% by weight of the condensable hydrocarbons comprise oxygen containing compounds, and wherein the oxygen containing compounds comprise phenols.

140. The method of claim 129, wherein the produced mixture comprises condensable hydrocarbons, and wherein greater than about 20% by weight of the condensable hydrocarbons are aromatic compounds.

141. The method of claim 129, wherein the produced mixture comprises condensable hydrocarbons, and wherein less than about 5% by weight of the condensable hydrocarbons comprises multi-ring aromatics with more than two rings.

142. The method of claim 129, wherein the produced mixture comprises condensable hydrocarbons, and wherein less than about 0.3% by weight of the condensable hydrocarbons are asphaltenes.

143. The method of claim 129, wherein the produced mixture comprises condensable hydrocarbons, and wherein about 5% by weight to about 30% by weight of the condensable hydrocarbons are cycloalkanes.

144. The method of claim 129, wherein the produced mixture comprises a non-condensable component, wherein the non-condensable component comprises molecular hydrogen, wherein the molecular hydrogen is greater than about 10% by volume of the non-condensable component at 25° C. and one atmosphere absolute pressure, and wherein the molecular hydrogen is less than about 80% by volume of the non-condensable component at 25° C. and one atmosphere absolute pressure.

145. The method of claim 129, wherein the produced mixture comprises ammonia, and wherein greater than about 0.05% by weight of the produced mixture is ammonia.

146. The method of claim 129, further comprising controlling formation conditions to produce a mixture from the formation, wherein a partial pressure of $H_2$ in the mixture is greater than about 0.5 bar.

147. The method of claim 129, further comprising altering a pressure in the formation to inhibit production of hydrocarbons from the formation having carbon numbers greater than about 25.

148. The method of claim 129, wherein allowing the heat to transfer increases a permeability of a majority of the part of the formation such that the permeability of the majority of the part is substantially uniform.

149. The method of claim 129, further comprising controlling the heat to yield greater than about 60% by weight of condensable hydrocarbons, as measured by Fischer Assay.

150. The method of claim 129, further comprising producing a mixture in a production well, wherein at least about 7 heaters are disposed in the formation for each production well.

151. The method of claim 150, wherein at least about 20 heaters are disposed in the formation for each production well.

152. The method of claim 129, wherein the part of the formation comprises a selected section.

153. The method of claim 129, wherein a pyrolysis zone is established in the part of the formation.

154. The method of claim 129, wherein a pyrolysis zone is established in the part of the formation proximate to and/or surrounding at least one of the heaters.

155. The method of claim 129, wherein at least one of the heaters is disposed in an open wellbore.

156. The method of claim 129, further comprising providing hydrogen ($H_2$) to the heated part of the formation to hydrogenate hydrocarbons in the part.

* * * * *